(12) United States Patent
Ko et al.

(10) Patent No.: US 12,495,798 B2
(45) Date of Patent: Dec. 16, 2025

(54) NICOTINAMIDE COMPOUND AND HERBICIDAL COMPOSITION COMPRISING COMPOUND

(71) Applicants: KOREA RESEARCH INSTITUTE OF CHEMICAL TECHNOLOGY, Daejeon (KR); FARMHANNONG CO., LTD., Seoul (KR)

(72) Inventors: Young Kwan Ko, Daejeon (KR); Eun Ae Kim, Daejeon (KR); Ill Young Lee, Daejeon (KR); Hee Nam Lim, Daejeon (KR); Jung Sub Choi, Daejeon (KR); Jee Hee Suh, Daejeon (KR); Nack Jeong Kim, Daejeon (KR); Dong Wan Koo, Daejeon (KR); Hyun Jin Kim, Daejeon (KR); Gyu Hwan Yon, Daejeon (KR); Jae Deok Kim, Daejeon (KR); Seungae Oh, Daejeon (KR); So-Young Lee, Daejeon (KR); Chan Yong Park, Daejeon (KR); Yun Kyoung Hwang, Daejeon (KR); Byung Hoon Ahn, Daejeon (KR); Ah Reum Kim, Daejeon (KR); Hye Ji Han, Daejeon (KR); Sungjun Park, Nonsan-si (KR); Junhyuk Choi, Nonsan-si (KR); Jisoo Lim, Nonsan-si (KR); Mi Sook Hong, Nonsan-si (KR)

(73) Assignees: KOREA RESEARCH INSTITUTE OF CHEMICAL TECHNOLOGY, Daejeon (KR); FARMHANNONG CO., LTD., Seoul (KR)

( * ) Notice: Subject to any disclaimer, the term of this patent is extended or adjusted under 35 U.S.C. 154(b) by 867 days.

(21) Appl. No.: 17/770,681

(22) PCT Filed: Oct. 21, 2020

(86) PCT No.: PCT/KR2020/014438
§ 371 (c)(1),
(2) Date: Apr. 21, 2022

(87) PCT Pub. No.: WO2021/080330
PCT Pub. Date: Apr. 29, 2021

(65) Prior Publication Data
US 2022/0386607 A1    Dec. 8, 2022

(30) Foreign Application Priority Data

Oct. 21, 2019  (KR) .................. 10-2019-0130935

(51) Int. Cl.
| | | |
|---|---|---|
| A01N 43/40 | (2006.01) | |
| A01N 43/713 | (2006.01) | |
| A01P 13/00 | (2006.01) | |
| C07D 213/30 | (2006.01) | |

(52) U.S. Cl.
CPC .......... *A01N 43/40* (2013.01); *A01N 43/713* (2013.01); *A01P 13/00* (2021.08)

(58) Field of Classification Search
CPC ............................ C07D 231/30; A01N 43/40
See application file for complete search history.

(56) References Cited

U.S. PATENT DOCUMENTS

| | | | |
|---|---|---|---|
| 8,481,749 B2 | 7/2013 | Braun et al. | |
| 8,822,378 B2 | 9/2014 | Braun et al. | |
| 9,204,650 B2 | 12/2015 | Koehn et al. | |
| 9,371,315 B2 | 6/2016 | Braun et al. | |
| 10,548,318 B2 | 2/2020 | Koehn et al. | |
| 2014/0296069 A1 | 10/2014 | Braun et al. | |
| 2014/0371068 A1 | 12/2014 | Koehn et al. | |
| 2015/0175588 A1 | 6/2015 | Braun et al. | |
| 2018/0282290 A1 | 10/2018 | Koehn et al. | |

FOREIGN PATENT DOCUMENTS

| | | |
|---|---|---|
| EP | 3892618 A1 | 10/2021 |
| JP | H07-173155 A | 7/1995 |
| WO | 2011/125317 A1 | 10/2011 |
| WO | 2012/028579 A1 | 3/2012 |
| WO | 2013/017559 A1 | 2/2013 |
| WO | 2013/064457 A1 | 5/2013 |
| WO | 2013/087577 A1 | 6/2013 |
| WO | 2013/092834 A1 | 6/2013 |
| WO | 2013/164331 A1 | 11/2013 |
| WO | 2017/005567 A1 | 1/2017 |
| WO | 2017/055146 A1 | 4/2017 |
| WO | 2018/050677 A1 | 3/2018 |
| WO | 2020/147705 A1 | 7/2020 |

OTHER PUBLICATIONS

International Search Report dated Jan. 22, 2021 for corresponding International Patent Application No. PCT/KR2020/014438.
Written Opinion dated Jan. 22, 2021 for corresponding International Patent Application No. PCT/KR2020/014438.

*Primary Examiner* — Adam C Milligan
*Assistant Examiner* — Karen Cheng
(74) *Attorney, Agent, or Firm* — Hauptman Ham, LLP

(57) ABSTRACT

The present invention relates to a novel nicotinamide compound, a method for preparing the same, and a herbicide comprising the compound. The compound of the present invention is useful as a herbicide for foliar treatment or soil treatment because it has high safety for wheat or corn and has excellent herbicidal activity against grassy weeds, sedge weeds or broadleaf weeds.

18 Claims, No Drawings

NICOTINAMIDE COMPOUND AND HERBICIDAL COMPOSITION COMPRISING COMPOUND

CROSS-REFERENCE TO RELATED APPLICATION

The present application is a national stage filing under 35 U.S.C. § 371 of PCT application number PCT/KR2020/014438 filed on Oct. 21, 2020 which is based upon and claims the benefit of priorities to Korean Patent Application No. 10-2019-0130935, filed on Oct. 21, 2019, in the Korean Intellectual Property Office, which is incorporated herein in its entirety by reference.

TECHNICAL FIELD

The present invention relates to a novel nicotinamide compound, a method for preparing the same, and a herbicide composition comprising the compound.

BACKGROUND ART

In general, weed control is very important for improving the productivity of agriculture, and various types of herbicides have been used in the meantime. For example, triazine herbicides such as atrazine, or anilide herbicides such as alachlor or metolachlor have been used in corn cultivation. On the other hand, as non-selective herbicides, herbicides such as paraquat or glyphosate have been used. However, there are still many weeds that cause losses in agriculture, and it is reported that many existing pesticides have developed resistance and do not exhibit satisfactory effects.

For this reason, farmers are usually showing high preference for new products in herbicide field. In particular, the need for the development of new herbicides has been raised because the resistance problem cannot be solved when only relying on previously registered herbicides.

DISCLOSURE

Technical Problem

PCT Publication Nos. WO2012-028579 and WO2013-017559 disclose N-(tetrazol-5-yl)- and N-(triazol-5-yl)arylcarboxamides and their use as herbicides, respectively; WO2013-064457 discloses 5-phenyl substituted N-(tetrazol-5-yl)aryl carboxylic acid amide and N-(triazol-5-yl)arylcarboxylic acid amide, and their use as herbicides; and WO2013-087577 discloses N-(1,2,5-oxadiazol-3-yl)-, N-(1,3,4-oxadiazol-2-yl)-, N-(tetrazol-5-yl)-, and N-(triazol-5-yl)arylcarboxylic acid amides and their use as herbicides. In addition, WO2013-092834 discloses a herbicidal compound; WO2013-164331 discloses N-(tetrazol-5-yl)- and N-(triazol-5-yl)arylcarboxamide salts and their use as herbicides; and WO2017-005567 discloses N-(tetrazol-5-yl)- and N-(triazol-5-yl)arylcarboxamide derivatives having herbicidal action. Acylated N-(1,2,5-oxadiazol-3-yl)-, N-(1,3,4-oxadiazol-2-yl)-, N-(tetrazol-5-yl)-, and N-(triazol-5-yl)arylcarboxamide, and their use as a herbicide are disclosed in WO2017-055146, and herbicidal pyridines are disclosed in WO2018-050677. Also, WO2020-147705 discloses 4-pyridinyl formamide compound derivatives having herbicidal activity. The prior arts are similar in that it contains an N-(tetrazol-5-yl)arylcarboxamide compound having a herbicidal activity in common, but they need a high treatment dose, there are not various weed species showing herbicidal activity, and selectivity for the crops such as wheat and corn has not been reported. And, in the prior arts, nicotinamide represented by Chemical Formula 1 of the present invention is not disclosed.

Under these circumstances, an object of the present invention is to provide a nicotinamide compound having a novel structure.

Another object of the present invention is to provide a herbicide composition comprising the novel nicotinamide compound; use of a composition comprising the novel nicotinamide compound for weed control and/or weeding; use of a composition comprising the novel nicotinamide compound for the preparation of herbicides; or a method of controlling weeds using a composition comprising the novel nicotinamide compound.

The other object of the present invention is to provide a method for preparing a nicotinamide compound having a novel structure.

Other objects and advantages of the present invention will become more apparent by the following detailed description, claims and drawings.

Technical Solution

According to one embodiment for solving the above objects, the present invention provides a nicotinamide compound represented by the following Chemical Formula 1, or an agrochemically acceptable salt thereof.

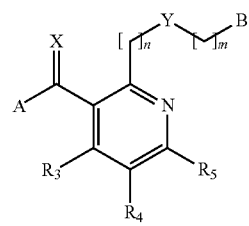

[Chemical Formula 1]

In the Chemical Formula 1,

A is

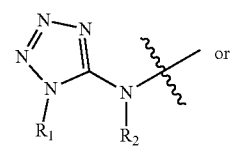

(A-1)

or

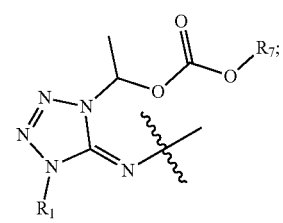

(A-2)

B is

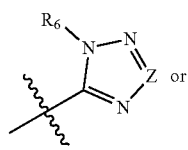
(B-1)

or

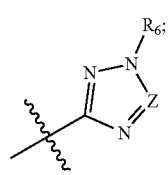
(B-2)

X is O or S;
Y is O, S, SO, $SO_2$, NH, N—$(C_1$-$C_6)$-alkyl, N—O—$(C_1$-$C_6)$-alkyl, N—S—$(C_1$-$C_6)$-alkyl, N—S(O)—$(C_1$-$C_6)$-alkyl, N—$SO_2$—$(C_1$-$C_6)$-alkyl, N—O—$(C_1$-$C_3)$-alkyl-aryl, or hydroxylamino;
Z is N or C—$R_8$;
$R_1$ is $(C_1$-$C_6)$-alkyl, $(C_1$-$C_6)$-haloalkyl, $(C_2$-$C_6)$-alkenyl, $(C_2$-$C_6)$-haloalkenyl, $(C_2$-$C_6)$-alkynyl, $(C_2$-$C_6)$-haloalkynyl, $(C_3$-$C_6)$-cycloalkyl, or $(C_3$-$C_6)$-halocycloalkyl;
$R_2$ is hydrogen, $(C_1$-$C_6)$-alkyl, $(C_1$-$C_6)$-haloalkyl, $(C_2$-$C_6)$-alkenyl, $(C_2$-$C_6)$-haloalkenyl, $(C_2$-$C_6)$-alkynyl, $(C_2$-$C_6)$-haloalkynyl, C(O)—$(C_1$-$C_6)$-alkyl, C(O)aryl, C(O)heteroaryl, or $SO_2$—$(C_1$-$C_6)$-alkyl;
$R_3$ or $R_4$ is each independently hydrogen, halogen, $(C_1$-$C_6)$-alkyl, $(C_2$-$C_6)$-alkenyl, or $(C_3$-$C_6)$-cycloalkyl;
$R_5$ is halogen, $(C_1$-$C_3)$-alkyl, or $(C_1$-$C_3)$-haloalkyl;
$R_6$ is $(C_1$-$C_6)$-alkyl, $(C_1$-$C_6)$-haloalkyl, $(C_2$-$C_6)$-alkenyl, $(C_2$-$C_6)$-haloalkenyl, $(C_2$-$C_6)$-alkynyl, $(C_2$-$C_6)$-haloalkynyl, $(C_3$-$C_6)$-cycloalkyl, $(C_3$-$C_6)$-halocycloalkyl, $(C_1$-$C_3)$-alkyl-O—$(C_1$-$C_3)$-alkyl, or $(C_1$-$C_3)$-alkyl-S—$(C_1$-$C_3)$-alkyl;
$R_7$ is $(C_1$-$C_6)$-alkyl, $(C_1$-$C_6)$-haloalkyl, $(C_3$-$C_6)$-cycloalkyl, or $(C_3$-$C_6)$-halocycloalkyl;
$R_8$ is hydrogen, $(C_1$-$C_6)$-alkyl, $(C_1$-$C_6)$-haloalkyl, $(C_2$-$C_6)$-alkenyl, $(C_2$-$C_6)$-haloalkenyl, $(C_2$-$C_6)$-alkynyl, $(C_2$-$C_6)$-haloalkynyl, $(C_3$-$C_6)$-cycloalkyl, $(C_3$-$C_6)$-halocycloalkyl, $(C_1$-$C_6)$-alkoxy, $(C_1$-$C_6)$-haloalkoxy, $(C_1$-$C_6)$-alkylthio, $(C_1$-$C_6)$-haloalkylthio, S(O)—$(C_1$-$C_6)$-alkyl, S(O)—$(C_1$-$C_6)$-haloalkyl, $SO_2$—$(C_1$-$C_6)$-alkyl, $SO_2$—$(C_1$-$C_6)$-haloalkyl, $NR_9R_{10}$, cyano, or halogen;
$R_9$ or $R_{10}$ is each independently hydrogen, $(C_1$-$C_3)$-alkyl, or $(C_1$-$C_3)$-haloalkyl;
n and m are each independently 0, 1, or 2.

According to another embodiment of the present invention, a herbicide composition comprising a nicotinamide compound represented by Chemical Formula 1; the use of a composition comprising a nicotinamide compound represented by Chemical Formula 1 for weed control and/or weeding; the use of a composition comprising a nicotinamide compound represented by Chemical Formula 1 for the preparation of a herbicide; or a method of controlling weeds by using a composition comprising a nicotinamide compound represented by Chemical Formula 1 is provided.

According to other embodiment of the present invention, the present invention provides a method for preparing a novel nicotinamide compound represented by Chemical Formula 1.

Advantageous Effects

The novel compounds according to the present invention exhibit excellent crop selectivity and herbicidal activity.

In particular, it is useful as a selective herbicide because it has excellent safety about wheat or corn, and has excellent removal effect against grassy weeds, sedge weeds or broadleaf weeds in foliar treatment or soil treatment.

MODE FOR INVENTION

One aspect of the present invention is to provide a novel nicotinamide compound. More specifically, the present invention provides the following embodiments.

Embodiment 1. The present invention provides a compound selected from the group consisting of a nicotinamide compound represented by the following Chemical Formula 1 and agrochemically acceptable salts thereof.

[Chemical Formula 1]

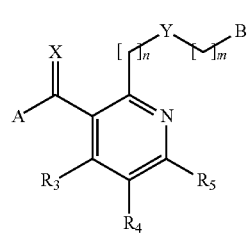

In the Chemical Formula 1,
A is

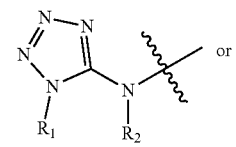
(A-1)

or

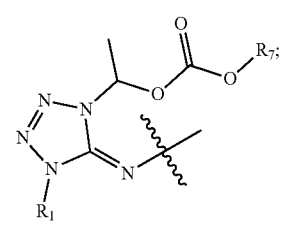
(A-2)

B is

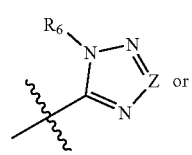
(B-1)

or

-continued

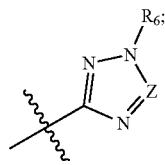
(B-2)

X is O or S;

Y is O, S, SO, $SO_2$, NH, N—$(C_1-C_6)$-alkyl, N—O—$(C_1-C_6)$-alkyl, N—S—$(C_1-C_6)$-alkyl, N—S(O)—$(C_1-C_6)$-alkyl, N—$SO_2$—$(C_1-C_6)$-alkyl, N—O—$(C_1-C_3)$-alkyl-aryl, or hydroxylamino;

Z is N or C—$R_8$;

$R_1$ is $(C_1-C_6)$-alkyl, $(C_1-C_6)$-haloalkyl, $(C_2-C_6)$-alkenyl, $(C_2-C_6)$-haloalkenyl, $(C_2-C_6)$-alkynyl, $(C_2-C_6)$-haloalkynyl, $(C_3-C_6)$-cycloalkyl, or $(C_3-C_6)$-halocycloalkyl;

$R_2$ is hydrogen, $(C_1-C_6)$-alkyl, $(C_1-C_6)$-haloalkyl, $(C_2-C_6)$-alkenyl, $(C_2-C_6)$-haloalkenyl, $(C_2-C_6)$-alkynyl, $(C_2-C_6)$-haloalkynyl, C(O)—$(C_1-C_6)$-alkyl, C(O)aryl, C(O)heteroaryl, or $SO_2$—$(C_1-C_6)$-alkyl;

$R_3$ or $R_4$ is each independently hydrogen, halogen, $(C_1-C_6)$-alkyl, $(C_2-C_6)$-alkenyl, or $(C_3-C_6)$-cycloalkyl;

$R_5$ is halogen, $(C_1-C_3)$-alkyl, or $(C_1-C_3)$-haloalkyl;

$R_6$ is $(C_1-C_6)$-alkyl, $(C_1-C_6)$-haloalkyl, $(C_2-C_6)$-alkenyl, $(C_2-C_6)$-haloalkenyl, $(C_2-C_6)$-alkynyl, $(C_2-C_6)$-haloalkynyl, $(C_3-C_6)$-cycloalkyl, $(C_3-C_6)$-halocycloalkyl, $(C_1-C_3)$-alkyl-O—$(C_1-C_3)$-alkyl, or $(C_1-C_3)$-alkyl-S—$(C_1-C_3)$-alkyl;

$R_7$ is $(C_1-C_6)$-alkyl, $(C_1-C_6)$-haloalkyl, $(C_3-C_6)$-cycloalkyl, or $(C_3-C_6)$-halocycloalkyl;

$R_8$ is hydrogen, $(C_1-C_6)$-alkyl, $(C_1-C_6)$-haloalkyl, $(C_2-C_6)$-alkenyl, $(C_2-C_6)$-haloalkenyl, $(C_2-C_6)$-alkynyl, $(C_2-C_6)$-haloalkynyl, $(C_3-C_6)$-cycloalkyl, $(C_3-C_6)$-halocycloalkyl, $(C_1-C_6)$-alkoxy, $(C_1-C_6)$-haloalkoxy, $(C_1-C_6)$-alkylthio, $(C_1-C_6)$-haloalkylthio, S(O)—$(C_1-C_6)$-alkyl, S(O)—$(C_1-C_6)$-haloalkyl, $SO_2$—$(C_1-C_6)$-alkyl, $SO_2$—$(C_1-C_6)$-haloalkyl, $NR_9R_{10}$, cyano, or halogen;

$R_9$ or $R_{10}$ is each independently hydrogen, $(C_1-C_3)$-alkyl, or $(C_1-C_3)$-haloalkyl;

n and m are each independently 0, 1 or 2.

Embodiment 2. In the compound represented by Chemical Formula 1,

A is

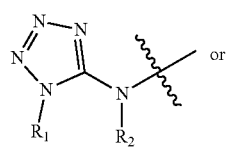
(A-1)

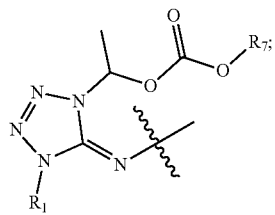
(A-2)

B is

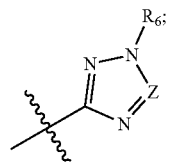
(B-1)

(B-2)

X is O or S;

Y is O, S, SO, $SO_2$, NH, N—$(C_1-C_3)$-alkyl, N—O—$(C_1-C_3)$-alkyl, N—S—$(C_1-C_6)$-alkyl, N—S(O)—$(C_1-C_6)$-alkyl, N—$SO_2$—$(C_1-C_6)$-alkyl, N—O—$(C_1-C_3)$-alkyl-aryl or hydroxylamino;

Z is N or C—$R_8$;

$R_1$ is $(C_1-C_6)$-alkyl, $(C_1-C_6)$-haloalkyl, $(C_2-C_6)$-alkenyl or $(C_2-C_6)$-alkynyl;

$R_2$ is hydrogen, $(C_1-C_3)$-alkyl, $(C_1-C_3)$-haloalkyl, C(O)—$(C_1-C_6)$-alkyl, C(O)aryl, or $SO_2$—$(C_1-C_3)$-alkyl;

$R_3$ or $R_4$ is each independently hydrogen, halogen, $(C_1-C_6)$-alkyl or $(C_2-C_6)$-alkenyl;

$R_5$ is halogen or $(C_1-C_3)$-haloalkyl;

$R_6$ is $(C_1-C_6)$-alkyl, $(C_1-C_6)$-haloalkyl or $(C_1-C_3)$-alkyl-O—$(C_1-C_3)$-alkyl;

$R_7$ is $(C_1-C_6)$-alkyl or $(C_3-C_6)$-cycloalkyl;

$R_8$ is hydrogen, $(C_1-C_3)$-alkyl, $(C_1-C_6)$-haloalkyl, $(C_2-C_6)$-alkenyl, $(C_1-C_3)$-alkoxy, $(C_1-C_3)$-haloalkoxy, $(C_1-C_3)$-alkylthio, $SO_2$—$(C_1-C_3)$-alkyl, $NR_9R_{10}$, cyano or halogen;

$R_9$ or $R_{10}$ is each independently hydrogen or $(C_1-C_3)$-alkyl;

n is 0 or 1;

m is 0, 1 or 2.

Embodiment 3. In the compound represented by Chemical Formula 1 described in any one of the preceding embodiments, A is

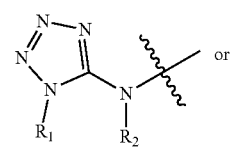
(A-1)

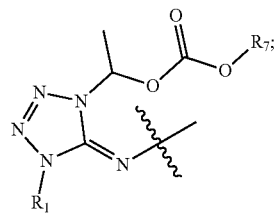
(A-2)

B is

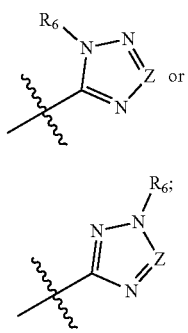

X is O or S;
Y is O, S, SO, SO$_2$, NH, methylamino, ethylamino, propargylamino, benzylhydroxyamino, methoxyamino, ethoxyamino or hydroxylamino;
Z is N or C—R$_8$;
R$_1$ is methyl, ethyl, propyl, difluoromethyl, allyl or propargyl;
R$_2$ is hydrogen, methyl, acetyl, benzoyl, or methanesulfonyl;
R$_3$ or R$_4$ is each independently hydrogen, chlorine, bromine, iodine, methyl, ethyl or vinyl;
R$_5$ is chlorine, difluoromethyl, trifluoromethyl, chlorodifluoromethyl or perfluoroethyl;
R$_6$ is methyl, ethyl, difluoromethyl or methoxymethyl;
R$_7$ is methyl, ethyl, isopropyl or cyclohexyl;
R$_8$ is hydrogen, methyl, fluoromethyl, difluoromethyl, trifluoromethyl, ethenyl, methylethenyl, methoxy, trifluoroethoxy, methylthio, methanesulfonyl, dimethylamino, cyano, chlorine, bromine or iodine;
n is 0 or 1;
m is 0, 1 or 2.
Embodiment 4. In any one of the preceding embodiments, the nicotinamide compound represented by Chemical Formula 1 is specifically illustrated as follows:
N-(1-methyl-1H-tetrazol-5-yl)-2-((1-methyl-1H-tetrazol-5-yl)methoxy)-6-(trifluoromethyl)nicotinamide (Compound No. 1-1);
N-(1-(difluoromethyl)-1H-tetrazol-5-yl)-2-((1-methyl-1H-tetrazol-5-yl)methoxy)-6-(trifluoromethyl)nicotinamide (Compound No. 1-4);
2-((1-(difluoromethyl)-1H-tetrazol-5-yl)methoxy)-N-methyl-N-(1-methyl-1H-tetrazol-5-yl)-6-(trifluoromethyl)nicotinamide (Compound No. 1-8);
4-chloro-N-(1-methyl-1H-tetrazol-5-yl)-2-((1-methyl-1H-tetrazol-5-yl)methoxy)-6-(trifluoromethyl)nicotinamide (Compound No. 1-13);
4-methyl-N-(1-methyl-1H-tetrazol-5-yl)-2-((1-methyl-1H-tetrazol-5-yl)methoxy)-6-(trifluoromethyl)nicotinamide (Compound No. 1-15);
5-methyl-N-(1-methyl-1H-tetrazol-5-yl)-2-((1-methyl-1H-tetrazol-5-yl)methoxy)-6-(trifluoromethyl)nicotinamide (Compound No. 1-17);
N-(1-methyl-1H-tetrazol-5-yl)-2-((1-methyl-1H-tetrazol-5-yl)methoxy)-6-(trifluoromethyl)-5-vinylnicotinamide (Compound No. 1-18);
5-ethyl-N-(1-methyl-1H-tetrazol-5-yl)-2-((1-methyl-1H-tetrazol-5-yl)methoxy)-6-(trifluoromethyl)nicotinamide (Compound No. 1-19);
6-chloro-N-(1-methyl-1H-tetrazol-5-yl)-2-((1-methyl-1H-tetrazol-5-yl)methoxy)nicotinamide (Compound No. 1-20);
2-((1-(difluoromethyl)-1H-tetrazol-5-yl)methoxy)-N-(1-methyl-1H-tetrazol-5-yl)-6-(trifluoromethyl)nicotinamide (Compound No. 1-26);
2-(methyl((1-methyl-1H-tetrazol-5-yl)methyl)amino)-N-(1-methyl-1H-tetrazol-5-yl)-6-(trifluoromethyl)nicotinamide (Compound No. 1-27);
N-(1-methyl-1H-tetrazol-5-yl)-2-((1-methyl-1H-tetrazol-5-yl)thio)-6-(trifluoromethyl)nicotinamide (Compound No. 1-40);
N-(1-methyl-1H-tetrazol-5-yl)-2-((1-methyl-1H-tetrazol-5-yl)methoxy)-6-(trifluoromethyl)pyridin-3-carbothioamide (Compound No. 1-43);
2-((1-methyl-1H-1,2,4-triazol-5-yl)methoxy)-N-(1-methyl-1H-tetrazol-5-yl)-6-(trifluoromethyl)nicotinamide (Compound No. 1-45);
N-(1-methyl-1H-tetrazol-5-yl)-2-(((1-methyl-1H-tetrazol-5-yl)methoxy)methyl)-6-(trifluoromethyl)nicotinamide (Compound No. 1-61);
2-(((1-(difluoromethyl)-1H-tetrazol-5-yl)methoxy)methyl)-N-(1-methyl-1H-tetrazol-5-yl)-6-(trifluoromethyl)nicotinamide (Compound No. 1-85);
2-((methyl((1-methyl-1H-tetrazol-5-yl)methyl)amino)-N-((1-methyl-1H-tetrazol-5-yl)-6-(trifluoromethyl)nicotinamide (Compound No. 1-86);
2-((methoxy((1-methyl-1H-1,2,4-triazol-5-yl)methyl)amino)methyl)-N-(1-methyl-1H-tetrazol-5-yl)-6-(trifluoromethyl)nicotinamide (Compound No. 1-91);
N-(1-methyl-1H-tetrazol-5-yl)-2-(((1-methyl-1H-tetrazol-5-yl)thio)methyl)-6-(trifluoromethyl)nicotinamide (Compound No. 1-97);
2-(((1-methyl-1H-1,2,4-triazol-5-yl)methoxy)methyl)-N-(1-methyl-1H-tetrazol-5-yl)-6-(trifluoromethyl)nicotinamide (Compound No. 1-102);
N-(1-methyl-1H-tetrazol-5-yl)-2-(((1-methyl-1H-tetrazol-5-yl)oxy)methyl)-6-(trifluoromethyl)nicotinamide (Compound No. 1-103);
N-(1-methyl-1H-tetrazol-5-yl)-2-((2-methyl-2H-tetrazol-5-yl)methoxy)-6-(trifluoromethyl)nicotinamide (Compound No. 2-1);
2-(methyl((2-methyl-2H-tetrazol-5-yl)methyl)amino)-N-(1-methyl-1H-tetrazol-5-yl)-6-(trifluoromethyl)nicotinamide (Compound No. 2-26);
2-(ethyl((2-methyl-2H-tetrazol-5-yl)methyl)amino)-N-(1-methyl-1H-tetrazol-5-yl)-6-(trifluoromethyl)nicotinamide (Compound No. 2-27);
N-(1-methyl-1H-tetrazol-5-yl)-2-(((2-methyl-2H-tetrazol-5-yl)methyl)(prop-2-yn-1-yl)amino)-6-(trifluoromethyl)nicotinamide (Compound No. 2-28);
2-((benzyloxy)((2-methyl-2H-tetrazol-5-yl)methyl)amino)-N-(1-methyl-1H-tetrazol-5-yl)-6-(trifluoromethyl)nicotinamide (Compound No. 2-29);
2-(methoxy((2-methyl-2H-tetrazol-5-yl)methyl)amino)-N-(1-methyl-1H-tetrazol-5-yl)-6-(trifluoromethyl)nicotinamide (Compound No. 2-30);
2-(ethoxy((2-methyl-2H-tetrazol-5-yl)methyl)amino)-N-(1-methyl-1H-tetrazol-5-yl)-6-(trifluoromethyl)nicotinamide (Compound No. 2-31);
N-(1-methyl-1H-tetrazol-5-yl)-2-(((2-methyl-2H-tetrazol-5-yl)methyl)amino)-6-(trifluoromethyl)nicotinamide (Compound No. 2-32);
2-(hydroxy((2-methyl-2H-tetrazol-5-yl)methyl)amino)-N-(1-methyl-1H-tetrazol-5-yl)-6-(trifluoromethyl)nicotinamide (Compound No. 2-33);

2-(methyl(2-((2-methyl-2H-tetrazol-5-yl)methoxy)ethyl)
amino)-N-(1-methyl-1H-tetrazol-5-yl)-6-(trifluoromethyl)nicotinamide (Compound No. 2-34);

2-(methyl((1-methyl-1H-1,2,4-triazol-3-yl)methyl)amino)-
N-(1-methyl-1H-tetrazol-5-yl)-6-(trifluoromethyl)nicotinamide (Compound No. 2-35);

2-(methyl(2-(2-methyl-2H-tetrazol-5-yl)ethyl)amino)-N-(1-methyl-1H-tetrazol-5-yl)-6-(trifluoromethyl)nicotinamide (Compound No. 2-36);

2-((1-methyl-1H-1,2,4-triazol-3-yl)methoxy)-N-(1-methyl-1H-tetrazol-5-yl)-6-(trifluoromethyl)nicotinamide (Compound No. 2-43);

N-(1-methyl-1H-tetrazol-5-yl)-2-(((2-methyl-2H-tetrazol-5-yl)methoxy)methyl)-6-(trifluoromethyl)nicotinamide (Compound No. 2-59);

N-acetyl-N-(1-methyl-1H-tetrazol-5-yl)-2-(((2-methyl-2H-tetrazol-5-yl)methoxy)methyl)-6-(trifluoromethyl)nicotinamide (Compound No. 2-67);

N-benzoyl-N-(1-methyl-1H-tetrazol-5-yl)-2-(((2-methyl-2H-tetrazol-5-yl)methoxy)methyl)-6-(trifluoromethyl)nicotinamide (Compound No. 2-68);

N-(1-methyl-1H-tetrazol-5-yl)-2-(((2-methyl-2H-tetrazol-5-yl)methoxy)methyl)-N-(methylsulfonyl)-6-(trifluoromethyl)nicotinamide (Compound No. 2-69);

6-(chlorodifluoromethyl)-N-(1-methyl-1H-tetrazol-5-yl)-2-(((2-methyl-2H-tetrazol-5-yl)methoxy)methyl)nicotinamide (Compound No. 2-78);

6-(chlorodifluoromethyl)-2-((methoxy((2-methyl-2H-tetrazol-5-yl)methyl)amino)methyl)-N-(1-methyl-1H-tetrazol-5-yl)nicotinamide (Compound No. 2-79);

6-(chlorodifluoromethyl)-2-(((1-methyl-1H-1,2,4-triazol-3-yl)methoxy)methyl)-N-(1-methyl-1H-tetrazol-5-yl)nicotinamide (Compound No. 2-80);

N-(1-methyl-1H-tetrazol-5-yl)-2-(((2-methyl-2H-tetrazol-5-yl)methoxy)methyl)-6-(perfluoroethyl)nicotinamide (Compound No. 2-81);

2-(((1-methyl-1H-1,2,4-triazol-3-yl)methoxy)methyl)-N-(1-methyl-1H-tetrazol-5-yl)-6-(perfluoroethyl)nicotinamide (Compound No. 2-83);

6-(difluoromethyl)-N-(1-methyl-1H-tetrazol-5-yl)-2-(((2-methyl-2H-tetrazol-5-yl)methoxy)methyl)nicotinamide (Compound No. 2-84);

6-(difluoromethyl)-2-(((1-methyl-1H-1,2,4-triazol-3-yl)methoxy)methyl)-N-((1-methyl-1H-tetrazol-5-yl)nicotinamide (Compound No. 2-85);

6-(difluoromethyl)-2-((methoxy((2-methyl-2H-tetrazol-5-yl)methyl)amino)methyl)-N-(1-methyl-1H-tetrazol-5-yl)nicotinamide (Compound No. 2-86);

2-(((2-ethyl-2H-tetrazol-5-yl)methoxy)methyl)-N-(1-methyl-1H-tetrazol-5-yl)-6-(trifluoromethyl)nicotinamide (Compound No. 2-87);

N-(1-ethyl-1H-tetrazol-5-yl)-2-(((2-ethyl-2H-tetrazol-5-yl)methoxy)methyl)-6-(trifluoromethyl)nicotinamide (Compound No. 2-88);

2-(((2-ethyl-2H-tetrazol-5-yl)methoxy)methyl)-N-(1-propyl-1H-tetrazol-5-yl)-6-(trifluoromethyl)nicotinamide (Compound No. 2-89);

N-(1-allyl-1H-tetrazol-5-yl)-2-(((2-ethyl-2H-tetrazol-5-yl)methoxy)methyl)-6-(trifluoromethyl)nicotinamide (Compound No. 2-90);

2-(((2-(methoxymethyl)-2H-tetrazol-5-yl)methoxy)methyl)-N-(1-methyl-1H-tetrazol-5-yl)-6-(trifluoromethyl)nicotinamide (Compound No. 2-91);

2-(((2-(difluoromethyl)-2H-tetrazol-5-yl)methoxy)methyl)-N-(1-methyl-1H-tetrazol-5-yl)-6-(trifluoromethyl)nicotinamide (Compound No. 2-92);

2-((methyl((2-methyl-2H-tetrazol-5-yl)methyl)amino)methyl)-N-(1-methyl-1H-tetrazol-5-yl)-6-(trifluoromethyl)nicotinamide (Compound No. 2-93);

2-((ethyl((2-methyl-2H-tetrazol-5-yl)methyl)amino)methyl)-N-(1-methyl-1H-tetrazol-5-yl)-6-(trifluoromethyl)nicotinamide (Compound No. 2-94);

2-((methoxy((2-methyl-2H-tetrazol-5-yl)methyl)amino)methyl)-N-(1-methyl-1H-tetrazol-5-yl)-6-(trifluoromethyl)nicotinamide (Compound No. 2-97);

N-(1-methyl-1H-tetrazol-5-yl)-2-((((2-methyl-2H-tetrazol-5-yl)methyl)thio)methyl)-6-(trifluoromethyl)nicotinamide (Compound No. 2-102);

N-(1-methyl-1H-tetrazol-5-yl)-2-((((2-methyl-2H-tetrazol-5-yl)methyl)sulfinyl)methyl)-6-(trifluoromethyl)nicotinamide (Compound No. 2-104);

N-(1-methyl-1H-tetrazol-5-yl)-2-((((2-methyl-2H-tetrazol-5-yl)methyl)sulfonyl)methyl)-6-(trifluoromethyl)nicotinamide (Compound No. 2-105);

N-(1-methyl-1H-tetrazol-5-yl)-2-(((2-methyl-2H-tetrazol-5-yl)methoxy)methyl)-6-(trifluoromethyl)pyridin-3-carbothioamide (Compound No. 2-106);

N-(1-methyl-1H-tetrazol-5-yl)-2-((((2-methyl-2H-tetrazol-5-yl)methyl)thio)methyl)-6-(trifluoromethyl)pyridin-3-carbothioamide (Compound No. 2-107);

6-(difluoromethyl)-N-(1-methyl-1H-tetrazol-5-yl)-2-((((2-methyl-2H-tetrazol-5-yl)methyl)thio)methyl)nicotinamide (Compound No. 2-108);

N-benzoyl-N-(1-methyl-1H-tetrazol-5-yl)-2-((((2-methyl-2H-tetrazol-5-yl)methyl)thio)methyl)-6-(trifluoromethyl)nicotinamide (Compound No. 2-109);

N-(1-methyl-1H-tetrazol-5-yl)-2-((((2-methyl-2H-tetrazol-5-yl)methyl)thio)methyl)-N-(methylsulfonyl)-6-(trifluoromethyl)nicotinamide (Compound No. 2-110);

6-(difluoromethyl)-N-(1-methyl-1H-tetrazol-1-yl)-2-((((2-methyl-2H-tetrazol-5-yl)methyl)sulfinyl)methyl)nicotinamide (Compound No. 2-111);

N-benzoyl-6-(difluoromethyl)-N-(1-methyl-1H-tetrazol-5-yl)-2-((((2-methyl-2H-tetrazol-5-yl)methyl)thio)methyl)nicotinamide (Compound No. 2-112);

2-(((1-methyl-1H-1,2,4-triazol-3-yl)methoxy)methyl)-N-(1-methyl-1H-tetrazol-5-yl)-6-(trifluoromethyl)nicotinamide (Compound No. 2-113);

2-(((1-methyl-1H-1,2,4-triazol-3-yl)methoxy)methyl)-N-(1-propyl-1H-tetrazol-5-yl)-6-(trifluoromethyl)nicotinamide (Compound No. 2-114);

N-(1-allyl-1H-tetrazol-5-yl)-2-(((1-methyl-1H-1,2,4-triazol-3-yl)methoxy)methyl)-6-(trifluoromethyl)nicotinamide (Compound No. 2-115);

2-(((1,5-dimethyl-1H-1,2,4-triazol-3-yl)methoxy)methyl)-N-(1-methyl-1H-tetrazol-5-yl)-6-(trifluoromethyl)nicotinamide (Compound No. 2-116);

2-(((1,5-dimethyl-1H-1,2,4-triazol-3-yl)methoxy)methyl)-N-(1-methyl-1H-tetrazol-5-yl)-6-(trifluoromethyl)pyridin-3-carbothioamide (Compound No. 2-117);

N-(1-methyl-1H-tetrazol-5-yl)-2-(((1-methyl-5-(trifluoromethyl)-1H-1,2,4-triazol-3-yl)methoxy)methyl)-6-(trifluoromethyl)nicotinamide (Compound No. 2-118);

N-(1-ethyl-1H-tetrazol-5-yl)-2-(((1-methyl-5-(trifluoromethyl)-1H-1,2,4-triazol-3-yl)methoxy)methyl)-6-(trifluoromethyl)nicotinamide (Compound No. 2-119);

2-(((1-methyl-5-(trifluoromethyl)-1H-1,2,4-triazol-3-yl)methoxy)methyl)-N-(1-propyl-1H-tetrazol-5-yl)-6-(trifluoromethyl)nicotinamide (Compound No. 2-120);

N-(1-allyl-1H-tetrazol-5-yl)-2-(((1-methyl-5-(trifluoromethyl)-1H-1,2,4-triazol-3-yl)methoxy)methyl)-6-(trifluoromethyl)nicotinamide (Compound No. 2-121);

2-(((1-methyl-5-(trifluoromethyl)-1H-1,2,4-triazol-3-yl)methoxy)methyl)-N-(1-prop-2-yn-1-yl)-1H-tetrazol-5-yl)-6-(trifluoromethyl)nicotinamide (Compound No. 2-122);

2-(((5-(difluoromethyl)-1-methyl-1H-1,2,4-triazol-3-yl)methoxy)methyl)-N-(1-methyl-1H-tetrazol-5-yl)-6-trifluoromethyl)nicotinamide (Compound No. 2-123);

2-(((5-(difluoromethyl)-1-methyl-1H-1,2,4-triazol-3-yl)-methoxy)-N-(1-propyl-1H-tetrazol-5-yl)-6-(trifluoromethyl)nicotinamide (Compound No. 2-124);

N-(1-allyl-1H-tetrazol-5-yl)-2-(((5-(difluoromethyl)-1-methyl-1H-1,2,4-triazol-3-yl)methoxy)methyl)-6-(trifluoromethyl)nicotinamide (Compound No. 2-125);

2-(((5-(fluoromethyl)-1-methyl-1H-1,2,4-triazol-3-yl)methoxy)methyl)-N-(1-methyl-1H-tetrazol-5-yl)-6-(trifluoromethyl)nicotinamide (Compound No. 2-126);

N-(1-methyl-1H-tetrazol-5-yl)-2-(((1-methyl-5-vinyl-1H-1,2,4-triazol-3-yl)methoxy)methyl)-6-(trifluoromethyl)nicotinamide (Compound No. 2-127);

N-(1-methyl-1H-tetrazol-5-yl)-2-(((1-methyl-5-(prop-1-en-2-yl)-1H-1,2,4-triazol-3-yl)methoxy)methyl)-6-(trifluoromethyl)nicotinamide (Compound No. 2-128);

2-(((5-methoxy-1-methyl-1H-1,2,4-triazol-3-yl)methoxy)methyl)-N-(1-methyl-1H-tetrazol-5-yl)-6-(trifluoromethyl)nicotinamide (Compound No. 2-129);

N-(1-methyl-1H-tetrazol-5-yl)-2-(((1-methyl-5-(2,2,2-trifluoroethoxy)-1H-1,2,4-triazol-3-yl)methoxy)methyl)-6-(trifluoromethyl)nicotinamide (Compound No. 2-130);

N-(1-methyl-1H-tetrazol-5-yl)-2-(((1-methyl-5-(methylthio)-1H-1,2,4-triazol-3-yl)methoxy)methyl)-6-(trifluoromethyl)nicotinamide (Compound No. 2-131);

N-(1-methyl-1H-tetrazol-5-yl)-2-(((1-methyl-5-(methylsulfonyl)-1H-1,2,4-triazol-3-yl)methoxy)methyl)-6-(trifluoromethyl)nicotinamide (Compound No. 2-132);

2-(((5-(dimethylamino)-1-methyl-1H-1,2,4-triazol-3-yl)methoxy)methyl)-N-(1-methyl-1H-tetrazol-5-yl)-6-(trifluoromethyl)nicotinamide (Compound No. 2-133);

2-(((5-cyano-1-methyl-1H-1,2,4-triazol-3-yl)methoxy)methyl)-N-(1-methyl-1H-tetrazol-5-yl)-6-(trifluoromethyl)nicotinamide (Compound No. 2-134);

2-(((5-chloro-1-methyl-1H-1,2,4-triazol-3-yl)methoxy)methyl)-N-(1-methyl-1H-tetrazol-5-yl)-6-(trifluoromethyl)nicotinamide (Compound No. 2-135);

2-(((5-bromo-1-methyl-1H-1,2,4-triazol-3-yl)methoxy)methyl)-N-(1-methyl-1H-tetrazol-5-yl)-6-(trifluoromethyl)nicotinamide (Compound No. 2-136);

2-(((5-iodo-1-methyl-1H-1,2,4-triazol-3-yl)methoxy)methyl-N-(1-methyl-1H-tetrazol-5-yl)-6-(trifluoromethyl)nicotinamide (Compound No. 2-137);

methyl(1-(2-(((1-methyl-1H-1,2,4-triazol-3-yl)methoxy)methyl)-N-(1-methyl-1H-tetrazol-5-yl)-6-(trifluoromethyl)nicotinamido)ethyl)carbonate (Compound No. 4-1);

methyl(1-(N-(1-methyl-1H-tetrazol-5-yl)-2-(((2-methyl-2H-tetrazol-5-yl)methoxy)methyl)-6-(trifluoromethyl)pyridin-3-carbothioamido)ethyl)carbonate (Compound No. 4-2);

methyl(1-(N-(1-methyl-1H-tetrazol-5-yl)-2-((((2-methyl-2H-tetrazol-5-yl)methyl)thio)methyl)-6-(trifluoromethyl)nicotinamido)ethyl)carbonate (Compound No. 4-3);

methyl(1-(N-(1-methyl-1H-tetrazol-5-yl)-2-(((2-methyl-2H-tetrazol-5-yl)methoxy)methyl)-6-(trifluoromethyl)nicotinamido)ethyl)carbonate (Compound No. 4-4);

ethyl(1-(N-(1-methyl-1H-tetrazol-5-yl)-2-(((2-methyl-2H-tetrazol-5-yl)methoxy)methyl)-6-(trifluoromethyl)nicotinamido)ethyl)carbonate (Compound No. 4-8);

ethyl (1-(N-(1-methyl-1H-tetrazol-5-yl)-2-((((2-methyl-2H-tetrazol-5-yl)methyl)thio)methyl)-6-(trifluoromethyl)pyridin-3-carbothioamido)ethyl)carbonate (Compound No. 4-9);

ethyl (1-(4-methyl-5-((2-((((2-methyl-2H-tetrazol-5-yl)methyl)thio)methyl)-6-(trifluoromethyl)nicotinoyl)imino)-4,5-dihydro-1H-tetrazol-1-yl)ethyl)carbonate (Compound No. 4-10);

cyclohexyl(1-(N-(1-methyl-1H-tetrazol-5-yl)-2-(((2-methyl-2H-tetrazol-5-yl)methoxy)methyl)-6-(trifluoromethyl)nicotinamido)ethyl)carbonate (Compound No. 4-11);

isopropyl(1-(N-(1-methyl-1H-tetrazol-5-yl)-2-(((2-methyl-2H-tetrazol-5-yl)methoxy)methyl)-6-(trifluoromethyl)nicotinamido)ethyl)carbonate (Compound No. 4-12); and agrochemically acceptable salts thereof.

The compounds represented by Chemical Formula 1 of the present invention may have one or more chiral centers, and such compounds may be enantiomers or diastereomers. Accordingly, the present invention includes each isomer or mixture of these isomers.

Another aspect of the present invention is to provide a herbicide composition comprising the novel nicotinamide compound; use of a composition comprising the novel nicotinamide compound for weed control and/or weeding; use of a composition comprising a novel nicotinamide compound for the preparation of herbicides; or a method for controlling weeds by using a composition comprising the novel nicotinamide compound. More specifically, the present invention provides the following embodiments.

Embodiment 5. The present invention provides a herbicide composition comprises (i) at least one active ingredient selected from the group consisting of a nicotinamide compound according to any one of the preceding embodiments and an agrochemically acceptable salt thereof, and (ii) an agrochemically acceptable additive;

use of a composition for weed control and/or weeding comprising (i) at least one active ingredient selected from the group consisting of the nicotinamide compound according to any one of the preceding embodiments and agrochemically acceptable salts thereof, and (ii) an agrochemically acceptable additive;

use of a composition for the preparation of herbicides comprising (i) at least one active ingredient selected from the group consisting of the nicotinamide compound according to any one of the preceding embodiments and agrochemically acceptable salts thereof, and (ii) an agrochemically acceptable additive; or a method for controlling weeds by using a composition comprising (i) at least one active ingredient selected from the group consisting of the nicotinamide compound according to any one of the preceding embodiments and agrochemically acceptable salts thereof, and (ii) an agrochemically acceptable additive.

Embodiment 6. In any one of the preceding embodiments, the herbicide composition comprises 0.1 wt % to 99.9 wt % of the at least one active ingredient; and 0.1 wt % to 99.9 wt % of the additive, and the additive may be at least one selected from the group consisting of a surfactant, a solid diluent, and a liquid diluent.

Embodiment 7. In any one of the preceding embodiments, the herbicide composition can be formulated as a wettable powder, a suspension, an emulsifiable concentrate, an emulsion, a microemulsion, a soluble concentrate, a dispersible concentrate, a granule, a powder, a suspension concentrate, a water-dispersible granule, a water-floating granule, or a tablet.

Embodiment 8. In any one of the preceding embodiments, the composition may further comprise, as an additional active ingredient, at least one selected from the group consisting of acetylCoA carboxylase inhibitors, acetolactate synthase inhibitors, microtubule assembly inhibitors, auxin-mimic herbicides, photosynthetic photosystem II inhibitors, EPSP synthase inhibitors, glutamine synthetase inhibitors, PDS inhibitors, DOXP synthase inhibitors, PPO inhibitors, VLCFAs inhibitors, DHP inhibitors, auxin transport inhibitors, photosystem I electron conversion herbicides, microtubule tissue inhibitors, uncoupler herbicides, HPPD inhibitors, cellulose synthesis inhibitors, fatty acid thioesterase inhibitors, serine threonine protein kinase inhibitors, solanesyl diphosphate synthase inhibitors, homogentisate solanesyl transferase inhibitors, lycopene cyclase inhibitors, and other herbicides.

Embodiment 9. In any one of the preceding embodiments, the herbicide composition may be treated to control weeds.

Embodiment 10. In any one of the preceding embodiments, the herbicide composition may be used by foliar treatment or soil treatment.

Embodiment 11. In any one of the preceding embodiments, the herbicide composition is safe for wheat or corn, and can control at least one selected from the group consisting of grassy weeds, sedge weeds and broadleaf weeds.

Embodiment 12. In any one of the preceding embodiments, the weed that is effectively controlled by the herbicide composition can be at least one selected from the group consisting of sorghum, barnyard grass, quack grass, crabgrass, fall *panicum*, black nightshade, indian jointvetch, velvetleaf, cocklebur and bindweed.

Other aspect of the present invention is to provide a method for preparing a novel nicotinamide compound represented by Chemical Formula 1. More specifically, the present invention provides the following embodiments.

Embodiment 13. The nicotinamide compound represented by Chemical Formula 1 according to any one of the preceding embodiments can be the following Chemical Formula 1-a, and the nicotinamide compound represented by Chemical Formula 1-a can be prepared by reacting nicotinic acid represented by Chemical Formula 2 with 5-amino-1H-tetrazole represented by Chemical Formula 3 as shown in Scheme 1 below.

[Scheme 1] Synthesis of a compound represented by Chemical Formual 1-a where A is A-1 and X = O

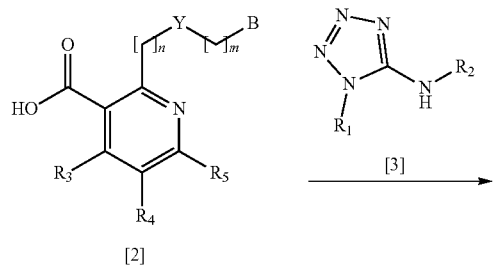

-continued

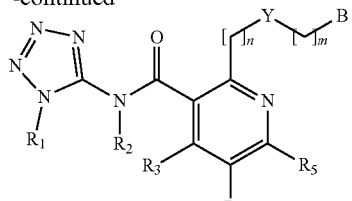

[1-a]

(In Scheme 1, B, Y, $R_1$, $R_2$, $R_3$, $R_4$, $R_5$, n, and m are as defined in Chemical Formula 1, respectively.)

The preparation method according to Scheme 1 can be carried out by activating nicotinic acid represented by Chemical Formula 2 with carbonyldiimidazole, and then reacting with 5-amino-1H-tetrazole represented Chemical Formula 3 under 1,8-diazabicyclo[5.4.0]undec-7-ene. The reaction solvent may include tetrahydrofuran, dimethylformamide, acetonitrile, dichloromethane, chloroform, 1,2-dichloroethane, ethyl acetate, and the like. After completion of the reaction, it can be diluted with an organic solvent, washed with acid, and the obtained organic layer can be dried, concentrated, and purified by column chromatography.

In addition, the preparation method according to Scheme 1 can be carried out by reacting nicotinic acid represented by Chemical Formula 2 with a halogenating agent, and then reacting with 5-amino-1H-tetrazole represented by Chemical Formula 3 under basic conditions. Specific examples of the halogenating agent may include oxalyl chloride, thionyl chloride, thionyl bromide or phosgene. Specific examples of the base may include triethylamine, diisopropylethylamine, pyridine and the like. The reaction solvent may include tetrahydrofuran, dimethylformamide, toluene, 1,4-dioxane, pyridine, acetonitrile, dichloromethane, chloroform, 1,2-dichloroethane, ethyl acetate, and the like. After completion of the reaction, it can be diluted with an organic solvent, washed with acid, and the obtained organic layer can be dried, concentrated, and purified by column chromatography.

In addition, the preparation method according to Scheme 1 may be performed by reacting nicotinic acid represented by Chemical Formula 2 and 5-amino-1H-tetrazole represented by Chemical Formula 3 with a coupling agent under basic conditions. Specific examples of the coupling agent may include O-(7-azabenzotriazol-1-yl)-N,N,N',N'-tetramethyluronium hexafluorophosphate (HATU), O-(benzotriazol-1-yl)-N,N,N',N'-tetramethyluronium hexafluorophosphate (HBTU), O-(6-chlorobenzotriazol-1-yl)-N,N,N',N'-tetramethyluronium hexafluorophosphate (HCTU) and the like. Specific examples of the base may include triethylamine, diisopropylethylamine, pyridine, N-methylmorpholine, and the like. The reaction solvent may include tetrahydrofuran, dimethylformamide, toluene, 1,4-dioxane, acetonitrile, dichloromethane, chloroform, 1,2-dichloroethane, ethyl acetate, and the like. After completion of the reaction, it can be diluted with an organic solvent, washed with water, dried, concentrated, and purified by column chromatography.

Embodiment 14. The nicotinamide compound represented by Chemical Formula 1 according to any one of the preceding embodiments may be the following Chemical Formula 1-a, and the nicotinamide compound represented by Chemical Formula 1-a can be prepared by reacting nicotinamide represented by Chemical Formula 1-b and the compound represented by Chemical Formula 4 as shown in Scheme 2,

[Scheme 2] Synthesis of a compound represented by Chemical Formula 1-a where A is A - 1 and X = O

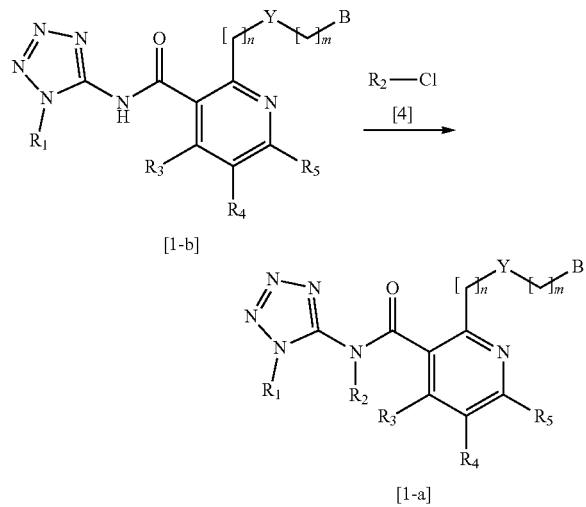

[1-b]

[1-a]

(In Scheme 2, B, Y, $R_1$, $R_2$, $R_3$, $R_4$, $R_5$, n, and m are as defined in Chemical Formula 1, respectively.)

The preparation method according to Scheme 2 can be carried out by reacting a compound represented by Chemical Formula 1-b with a chloro compound represented by Chemical Formula 4 under basic conditions. Specific examples of the base may include triethylamine, diisopropylethylamine, potassium carbonate, cesium carbonate, sodium hydride, and the like. The reaction solvent may include tetrahydrofuran, dimethylformamide, toluene, 1,4-dioxane, pyridine, acetonitrile, dichloromethane, chloroform, 1,2-dichloroethane, ethyl acetate, and the like. After completion of the reaction, it can be diluted with an organic solvent, washed with acid, and the obtained organic layer can be dried, concentrated, and purified by column chromatography.

Embodiment 15. The nicotinamide compound represented by Chemical Formula 1 according to any one of the preceding embodiments may be the following Chemical Formula 1-c, and the nicotinthioamide compound represented by Chemical Formula 1-c can by prepared from nicotinamide represented by Chemical Formula 1-a as shown in Scheme 3.

[Scheme 3] Synthesis of a compound represented by Chemical Formula 1-c where A is A - 1 and X = S

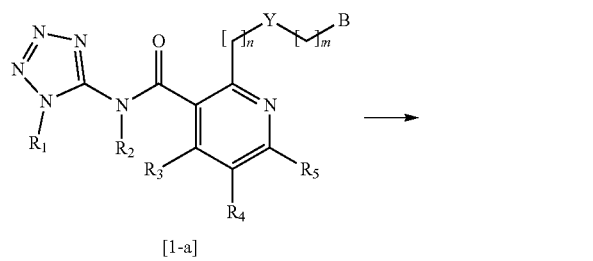

[1-a]

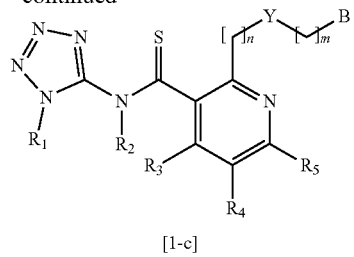

[1-c]

(In Scheme 3, B, Y, $R_1$, $R_2$, $R_3$, $R_4$, $R_5$, n and m are as defined in Chemical Formula 1, respectively.)

The preparation method according to Scheme 3 can by carried out by thionating a compound represented by Chemical Formula 1-a with Lawesson's reagent or phosphorus sulfide. The reaction solvent may include tetrahydrofuran, dimethylformamide, toluene, benzene, 1,4-dioxane, acetonitrile, dichloromethane, chloroform, 1,2-dichloroethane, ethyl acetate, and the like. After completion of the reaction, it can be diluted with an organic solvent, washed with acid, and the obtained organic layer can be dried, concentrated, and purified by column chromatography.

Embodiment 16. The nicotinamide compound represented by Chemical Formula 1 according to any one of the preceding embodiments may be the following Chemical Formula 1-e, and the nicotinamide compound represented by Chemical Formula 1-e can be prepared by reacting the nicotinamide represented by Chemical Formula 1-d and a compound represented by Chemical Formula 5 as shown in Scheme 4.

[Scheme 4] Synthesis of a compound represented by Chemical Formula 1-c where A is A - 2

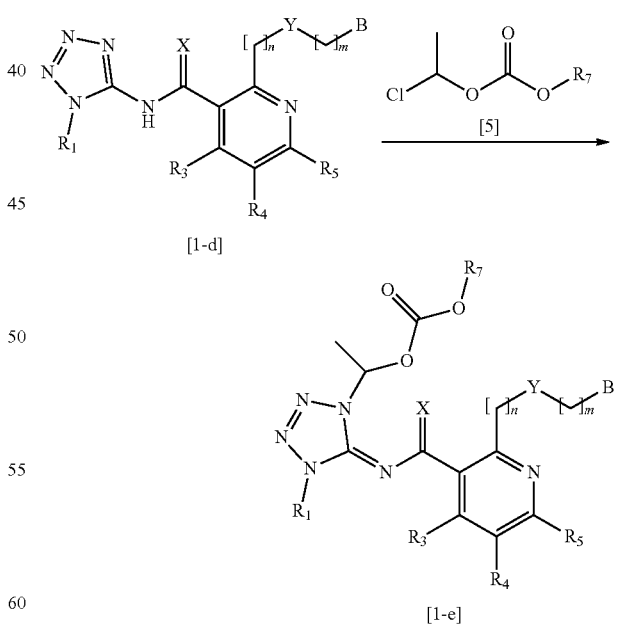

[1-e]

(In Scheme 4, B, X, Y, $R_1$, $R_3$, $R_4$, $R_5$, $R_7$, n and m are as defined in Chemical Formula 1, respectively.)

The preparation method according to Scheme 4 may be performed by reacting a compound represented by Chemical Formula 1-d with a chloro-compound represented by Chemical Formula 5 under basic conditions. Specific examples of the base may include triethylamine, diisopropylethylamine, potassium carbonate, cesium carbonate, and the like. If necessary, a catalyst such as tetrabutylammonium bromide can be used. The reaction solvent may include tetrahydrofuran, dimethylformamide, toluene, 1,4-dioxane, pyridine, acetonitrile, dichloromethane, chloroform, 1,2-dichloroethane, ethyl acetate, and the like. After completion of the reaction, it can be diluted with an organic solvent, washed with water, and the obtained organic layer can be dried, concentrated, and purified by column chromatography.

Embodiment 17. In any one of the preceding embodiments, the nicotinic acid compound represented by Chemical Formula 2 can be prepared according to Scheme 5 below.

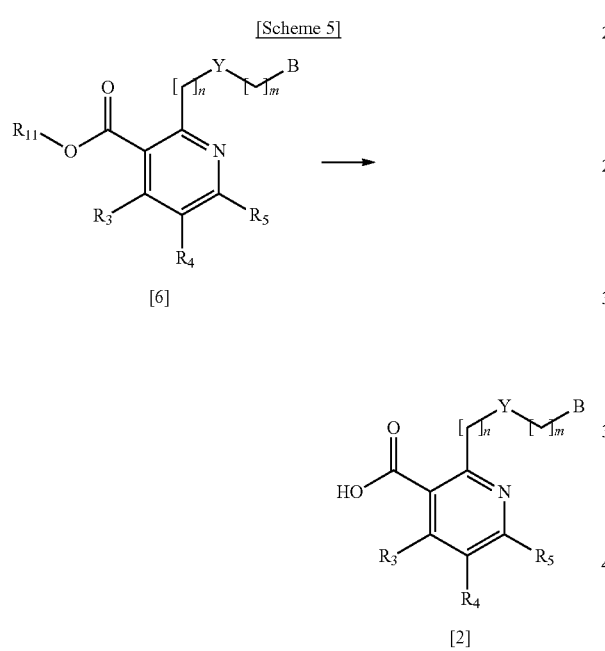

(In Scheme 5, B, Y, $R_3$, $R_4$, $R_5$, n and m are as defined in Chemical Formula 1, respectively, and $R_{11}$ is $C_1$~$C_3$ alkyl.)

The preparation method according to Scheme 5 can be carried out by hydrolyzing a compound represented by Chemical Formula 6 with an appropriate base such as sodium hydroxide and lithium hydroxide in the presence of an organic solvent and water. The reaction solvent may include tetrahydrofuran, dimethylformamide, toluene, 1,4-dioxane, acetonitrile, dichloromethane, chloroform, 1,2-dichloroethane, ethyl acetate, methanol, ethanol, and the like. After the reaction is completed, it can be obtained by acidifying it with an aqueous hydrochloric acid solution, extracting it with an organic solvent, and drying and concentrating the obtained organic layer.

Embodiment 18. In any one of the preceding embodiments, the compound represented by Chemical Formula 6 can be prepared according to Scheme 6 below.

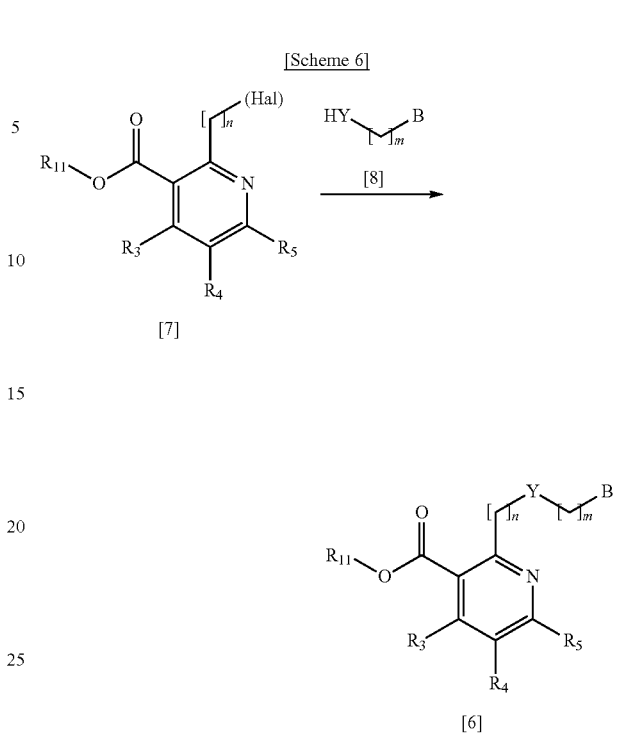

(In Scheme 6, B, Y, $R_3$, $R_4$, $R_5$, n and m are as defined in Chemical Formula 1, respectively, $R_{11}$ is as defined in Scheme 5, and (Hal) is halogen, that is, bromine, chlorine or iodine.)

The preparation method according to Scheme 6 can be performed by reacting a compound represented by Chemical Formula 7 with a compound represented by Chemical Formula 8 under basic conditions. Specific examples of the base may include triethylamine, diisopropylethylamine, potassium carbonate, cesium carbonate, sodium hydride, and the like. The reaction solvent may include tetrahydrofuran, dimethylformamide, toluene, 1,4-dioxane, pyridine, acetonitrile, dichloromethane, chloroform, 1,2-dichloroethane, ethyl acetate, and the like. After completion of the reaction, it can be diluted with an organic solvent, washed with acid, and the obtained organic layer can be dried, concentrated, and purified by column chromatography.

Embodiment 19. In any one of the preceding embodiments, the compound represented by Chemical Formula 6 may also be prepared according to Scheme 7 below.

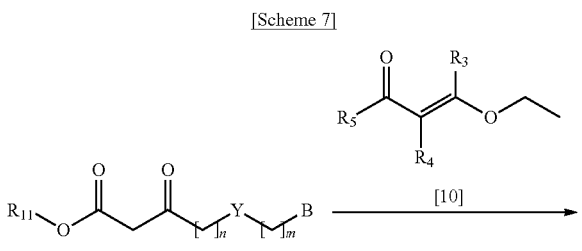

-continued

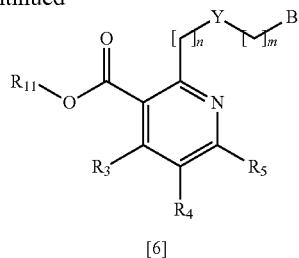

[6]

(In Scheme 7, B, Y, $R_3$, $R_4$, $R_5$, n and m are as defined in Chemical Formula 1, respectively, and $R_{11}$ is as defined in Scheme 5.)

The preparation method according to Scheme 7 can be performed by reacting a compound represented by Chemical Formula 9 with a compound represented by Chemical Formula 10 under ammonium acetate. The reaction solvent may include acetic acid, toluene and the like. After completion of the reaction, it can be diluted with an organic solvent, washed with water, and the obtained organic layer can be dried, concentrated, and purified by column chromatography.

Embodiment 20. In any one of the preceding embodiments, the compound represented by Chemical Formula 9 may be prepared according to Scheme 8 below.

[Scheme 8]

$$R_{11}O\underset{O}{\overset{O}{\|}}\overset{O}{\|}\underset{[n]}{\text{(Hal)}} \quad \underset{[8]}{\overset{HY\underset{[m]}{\frown}B}{\longrightarrow}}$$

[11]

-continued $$R_{11}O\underset{O}{\overset{O}{\|}}\overset{O}{\|}\underset{[n]}{Y\underset{[m]}{\frown}B}$$

[9]

(In Scheme 8, B, Y, n and m are as defined in Chemical Formula 1, respectively, $R_{11}$ is as defined in Scheme 5, and (Hal) is as defined in Scheme 6.)

The preparation method according to Scheme 8 can be performed by reacting a compound represented by Chemical Formula 11 with a compound represented by Chemical Formula 8 under basic conditions. Specific examples of the base may include triethylamine, diisopropylethylamine, potassium carbonate, cesium carbonate, sodium hydride, and the like. The reaction solvent may include tetrahydrofuran, dimethylformamide, toluene, 1,4-dioxane, pyridine, acetonitrile, dichloromethane, chloroform, 1,2-dichloroethane, ethyl acetate, and the like. After completion of the reaction, it can be diluted with an organic solvent, neutralized with acid, washed with water, and the obtained organic layer can be dried, concentrated, and purified by column chromatography.

EXAMPLES

Specific examples of the compound represented by Chemical Formula 1 synthesized through this examples are shown in Table 1-Table 4 below. Those of ordinary skill in the art can easily synthesize the compounds exemplified in Table 1-Table 4 by using or applying the synthesis method embodied in this example.

TABLE 1

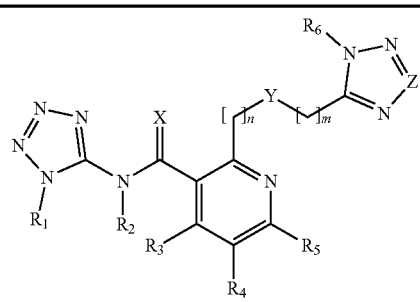

| Com. No | $R_1$ | $R_2$ | $R_3$ | $R_4$ | $R_5$ | $R_6$ | X | Y | Z | n | m |
|---|---|---|---|---|---|---|---|---|---|---|---|
| 1-1 | $CH_3$ | H | H | H | $CF_3$ | $CH_3$ | O | O | N | 0 | 1 |
| 1-2 | $CH_2CH_3$ | H | H | H | $CF_3$ | $CH_3$ | O | O | N | 0 | 1 |
| 1-3 | $CH_2CH_2CH_3$ | H | H | H | $CF_3$ | $CH_3$ | O | O | N | 0 | 1 |
| 1-4 | $CHF_2$ | H | H | H | $CF_3$ | $CH_3$ | O | O | N | 0 | 1 |
| 1-5 | $CH_2CHCH_2$ | H | H | H | $CF_3$ | $CH_3$ | O | O | N | 0 | 1 |
| 1-6 | $CH_2CCH$ | H | H | H | $CF_3$ | $CH_3$ | O | O | N | 0 | 1 |
| 1-7 | $CH_3$ | $CH_3$ | H | H | $CF_3$ | $CH_3$ | O | O | N | 0 | 1 |
| 1-8 | $CH_3$ | $CH_3$ | H | H | $CF_3$ | $CHF_2$ | O | O | N | 0 | 1 |
| 1-9 | $CH_3$ | $CH_2CH_3$ | H | H | $CF_3$ | $CH_3$ | O | O | N | 0 | 1 |
| 1-10 | $CH_3$ | $COCH_3$ | H | H | $CF_3$ | $CH_3$ | O | O | N | 0 | 1 |
| 1-11 | $CH_3$ | COPh | H | H | $CF_3$ | $CH_3$ | O | O | N | 0 | 1 |
| 1-12 | $CH_3$ | $SO_2CH_3$ | H | H | $CF_3$ | $CH_3$ | O | O | N | 0 | 1 |
| 1-13 | $CH_3$ | H | Cl | H | $CF_3$ | $CH_3$ | O | O | N | 0 | 1 |
| 1-14 | $CH_3$ | H | Br | H | $CF_3$ | $CH_3$ | O | O | N | 0 | 1 |

TABLE 1-continued

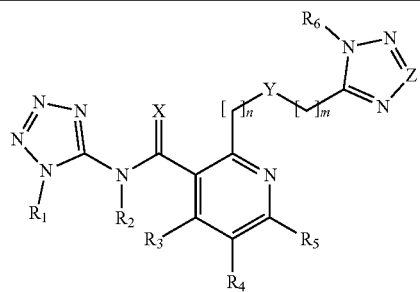

| Com. No | R$_1$ | R$_2$ | R$_3$ | R$_4$ | R$_5$ | R$_6$ | X | Y | Z | n | m |
|---|---|---|---|---|---|---|---|---|---|---|---|
| 1-15 | CH$_3$ | H | CH$_3$ | H | CF$_3$ | CH$_3$ | O | O | N | 0 | 1 |
| 1-16 | CH$_3$ | H | CH$_2$CH$_3$ | H | CF$_3$ | CH$_3$ | O | O | N | 0 | 1 |
| 1-17 | CH$_3$ | H | H | CH$_3$ | CF$_3$ | CH$_3$ | O | O | N | 0 | 1 |
| 1-18 | CH$_3$ | H | H | CHCH$_2$ | CF$_3$ | CH$_3$ | O | O | N | 0 | 1 |
| 1-19 | CH$_3$ | H | H | CH$_2$CH$_3$ | CF$_3$ | CH$_3$ | O | O | N | 0 | 1 |
| 1-20 | CH$_3$ | H | H | H | Cl | CH$_3$ | O | O | N | 0 | 1 |
| 1-21 | CH$_3$ | H | H | H | CClF$_2$ | CH$_3$ | O | O | N | 0 | 1 |
| 1-22 | CH$_3$ | H | H | H | CF$_2$CF$_3$ | CH$_3$ | O | O | N | 0 | 1 |
| 1-23 | CH$_3$ | H | H | H | CHF$_2$ | CH$_3$ | O | O | N | 0 | 1 |
| 1-24 | CH$_3$ | H | H | H | CF$_3$ | CH$_2$CH$_3$ | O | O | N | 0 | 1 |
| 1-25 | CH$_3$ | H | H | H | CF$_3$ | CH$_2$OCH$_3$ | O | O | N | 0 | 1 |
| 1-26 | CH$_3$ | H | H | H | CF$_3$ | CHF$_2$ | O | O | N | 0 | 1 |
| 1-27 | CH$_3$ | H | H | H | CF$_3$ | CH$_3$ | O | NCH$_3$ | N | 0 | 1 |
| 1-28 | CH$_3$ | H | H | H | CF$_3$ | CH$_3$ | O | NCH$_2$CH$_3$ | N | 0 | 1 |
| 1-29 | CH$_3$ | H | H | H | CF$_3$ | CH$_3$ | O | NCH$_2$CCH | N | 0 | 1 |
| 1-30 | CH$_3$ | H | H | H | CF$_3$ | CH$_3$ | O | NOCH$_2$Ph | N | 0 | 1 |
| 1-31 | CH$_3$ | H | H | H | CF$_3$ | CH$_3$ | O | NOCH$_3$ | N | 0 | 1 |
| 1-32 | CH$_3$ | H | H | H | CF$_3$ | CH$_3$ | O | NOCH$_2$CH$_3$ | N | 0 | 1 |
| 1-33 | CH$_3$ | H | H | H | CF$_3$ | CH$_3$ | O | NH | N | 0 | 1 |
| 1-34 | CH$_3$ | H | H | H | CF$_3$ | CH$_3$ | O | NOH | N | 0 | 1 |
| 1-35 | CH$_3$ | H | H | H | CF$_3$ | CH$_3$ | O | N(CH$_3$)CH$_2$CH$_2$O | N | 0 | 1 |
| 1-36 | CH$_3$ | H | H | H | CF$_3$ | CH$_3$ | O | NCH$_3$ | CH | 0 | 1 |
| 1-37 | CH$_3$ | H | H | H | CF$_3$ | CH$_3$ | O | NCH$_3$ | N | 0 | 2 |
| 1-38 | CH$_3$ | H | H | H | CF$_3$ | CH$_3$ | O | S | N | 0 | 1 |
| 1-39 | CH$_3$ | H | H | H | CF$_3$ | CHF$_2$ | O | S | N | 0 | 1 |
| 1-40 | CH$_3$ | H | H | H | CF$_3$ | CH$_3$ | O | S | N | 0 | 0 |
| 1-41 | CH$_3$ | H | H | H | CF$_3$ | CH$_3$ | O | SO | N | 0 | 1 |
| 1-42 | CH$_3$ | H | H | H | CF$_3$ | CH$_3$ | O | SO$_2$ | N | 0 | 1 |
| 1-43 | CH$_3$ | H | H | H | CF$_3$ | CH$_3$ | S | O | N | 0 | 1 |
| 1-44 | CH$_3$ | H | H | H | CF$_3$ | CH$_3$ | S | S | N | 0 | 1 |
| 1-45 | CH$_3$ | H | H | H | CF$_3$ | CH$_3$ | O | O | CH | 0 | 1 |
| 1-46 | CH$_3$ | H | H | H | CF$_3$ | CH$_3$ | O | O | CCH$_3$ | 0 | 1 |
| 1-47 | CH$_3$ | H | H | H | CF$_3$ | CH$_3$ | O | O | CCF$_3$ | 0 | 1 |
| 1-48 | CH$_3$ | H | H | H | CF$_3$ | CH$_3$ | O | O | CHF$_2$ | 0 | 1 |
| 1-49 | CH$_3$ | H | H | H | CF$_3$ | CH$_3$ | O | O | CH$_2$F | 0 | 1 |
| 1-50 | CH$_3$ | H | H | H | CF$_3$ | CH$_3$ | O | O | CCHCH$_2$ | 0 | 1 |
| 1-51 | CH$_3$ | H | H | H | CF$_3$ | CH$_3$ | O | O | C(CH$_3$)CH$_2$ | 0 | 1 |
| 1-52 | CH$_3$ | H | H | H | CF$_3$ | CH$_3$ | O | O | COCH$_3$ | 0 | 1 |
| 1-53 | CH$_3$ | H | H | H | CF$_3$ | CH$_3$ | O | O | COCH$_2$CF$_3$ | 0 | 1 |
| 1-54 | CH$_3$ | H | H | H | CF$_3$ | CH$_3$ | O | O | CSCH$_3$ | 0 | 1 |
| 1-55 | CH$_3$ | H | H | H | CF$_3$ | CH$_3$ | O | O | CSO$_2$CH$_3$ | 0 | 1 |
| 1-56 | CH$_3$ | H | H | H | CF$_3$ | CH$_3$ | O | O | CN(CH$_3$)$_2$ | 0 | 1 |
| 1-57 | CH$_3$ | H | H | H | CF$_3$ | CH$_3$ | O | O | CCN | 0 | 1 |
| 1-58 | CH$_3$ | H | H | H | CF$_3$ | CH$_3$ | O | O | CCl | 0 | 1 |
| 1-59 | CH$_3$ | H | H | H | CF$_3$ | CH$_3$ | O | O | CBr | 0 | 1 |
| 1-60 | CH$_3$ | H | H | H | CF$_3$ | CH$_3$ | O | O | Cl | 0 | 1 |
| 1-61 | CH$_3$ | H | H | H | CF$_3$ | CH$_3$ | O | O | N | 1 | 1 |
| 1-62 | CH$_2$CH$_3$ | H | H | H | CF$_3$ | CH$_3$ | O | O | N | 1 | 1 |
| 1-63 | CH$_2$CH$_2$CH$_3$ | H | H | H | CF$_3$ | CH$_3$ | O | O | N | 1 | 1 |
| 1-64 | CHF$_2$ | H | H | H | CF$_3$ | CH$_3$ | O | O | N | 1 | 1 |
| 1-65 | CH$_2$CHCH$_2$ | H | H | H | CF$_3$ | CH$_3$ | O | O | N | 1 | 1 |
| 1-66 | CH$_2$CCH | H | H | H | CF$_3$ | CH$_3$ | O | O | N | 1 | 1 |
| 1-67 | CH$_3$ | CH$_3$ | H | H | CF$_3$ | CH$_3$ | O | O | N | 1 | 1 |
| 1-68 | CH$_3$ | CH$_2$CH$_3$ | H | H | CF$_3$ | CH$_3$ | O | O | N | 1 | 1 |
| 1-69 | CH$_3$ | COCH$_3$ | H | H | CF$_3$ | CH$_3$ | O | O | N | 1 | 1 |
| 1-70 | CH$_3$ | COPh | H | H | CF$_3$ | CH$_3$ | O | O | N | 1 | 1 |
| 1-71 | CH$_3$ | SO$_2$CH$_3$ | H | H | CF$_3$ | CH$_3$ | O | O | N | 1 | 1 |
| 1-72 | CH$_3$ | H | Cl | H | CF$_3$ | CH$_3$ | O | O | N | 1 | 1 |
| 1-73 | CH$_3$ | H | Br | H | CF$_3$ | CH$_3$ | O | O | N | 1 | 1 |
| 1-74 | CH$_3$ | H | CH$_3$ | H | CF$_3$ | CH$_3$ | O | O | N | 1 | 1 |
| 1-75 | CH$_3$ | H | CH$_2$CH$_3$ | H | CF$_3$ | CH$_3$ | O | O | N | 1 | 1 |
| 1-76 | CH$_3$ | H | H | CH$_3$ | CF$_3$ | CH$_3$ | O | O | N | 1 | 1 |

TABLE 1-continued

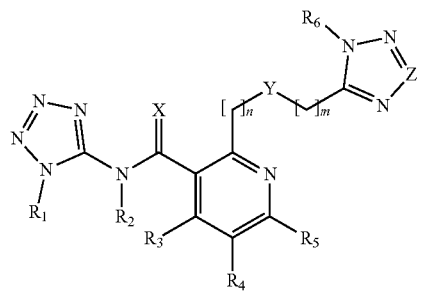

| Com. No | R₁ | R₂ | R₃ | R₄ | R₅ | R₆ | X | Y | Z | n | m |
|---|---|---|---|---|---|---|---|---|---|---|---|
| 1-77 | CH₃ | H | H | CHCH₂ | CF₃ | CH₃ | O | O | N | 1 | 1 |
| 1-78 | CH₃ | H | H | CH₂CH₃ | CF₃ | CH₃ | O | O | N | 1 | 1 |
| 1-79 | CH₃ | H | H | H | Cl | CH₃ | O | O | N | 1 | 1 |
| 1-80 | CH₃ | H | H | H | CClF₂ | CH₃ | O | O | N | 1 | 1 |
| 1-81 | CH₃ | H | H | H | CF₂CF₃ | CH₃ | O | O | N | 1 | 1 |
| 1-82 | CH₃ | H | H | H | CHF₂ | CH₃ | O | O | N | 1 | 1 |
| 1-83 | CH₃ | H | H | H | CF₃ | CH₂CH₃ | O | O | N | 1 | 1 |
| 1-84 | CH₃ | H | H | H | CF₃ | CH₂OCH₃ | O | O | N | 1 | 1 |
| 1-85 | CH₃ | H | H | H | CF₃ | CHF₂ | O | O | N | 1 | 1 |
| 1-86 | CH₃ | H | H | H | CF₃ | CH₃ | O | NCH₃ | N | 1 | 1 |
| 1-87 | CH₃ | H | H | H | CF₃ | CH₃ | O | NCH₂CH₃ | N | 1 | 1 |
| 1-88 | CH₃ | H | H | H | CF₃ | CH₃ | O | NCH₂CH | N | 1 | 1 |
| 1-89 | CH₃ | H | H | H | CF₃ | CH₃ | O | NOCH₂Ph | N | 1 | 1 |
| 1-90 | CH₃ | H | H | H | CF₃ | CH₃ | O | NOCH₃ | N | 1 | 1 |
| 1-91 | CH₃ | H | H | H | CF₃ | CH₃ | O | NOCH₃ | CH | 1 | 1 |
| 1-92 | CH₃ | H | H | H | CF₃ | CH₃ | O | NOCH₂CH₃ | N | 1 | 1 |
| 1-93 | CH₃ | H | H | H | CF₃ | CH₃ | O | NH | N | 1 | 1 |
| 1-94 | CH₃ | H | H | H | CF₃ | CH₃ | O | NOH | N | 1 | 1 |
| 1-95 | CH₃ | H | H | H | CF₃ | CH₃ | O | N(CH₃)CH₂CH₂O | N | 1 | 1 |
| 1-96 | CH₃ | H | H | H | CF₃ | CH₃ | O | S | N | 1 | 1 |
| 1-97 | CH₃ | H | H | H | CF₃ | CH₃ | O | S | N | 1 | 0 |
| 1-98 | CH₃ | H | H | H | CF₃ | CH₃ | O | SO | N | 1 | 1 |
| 1-99 | CH₃ | H | H | H | CF₃ | CH₃ | O | SO₂ | N | 1 | 1 |
| 1-100 | CH₃ | H | H | H | CF₃ | CH₃ | S | O | N | 1 | 1 |
| 1-101 | CH₃ | H | H | H | CF₃ | CH₃ | S | S | N | 1 | 1 |
| 1-102 | CH₃ | H | H | H | CF₃ | CH₃ | O | O | CH | 1 | 1 |
| 1-103 | CH₃ | H | H | H | CF₃ | CH₃ | O | O | CH | 1 | 0 |
| 1-104 | CH₃ | H | H | H | CF₃ | CH₃ | O | O | CCH₃ | 1 | 1 |
| 1-105 | CH₃ | H | H | H | CF₃ | CH₃ | O | O | CCF₃ | 1 | 1 |
| 1-106 | CH₃ | H | H | H | CF₃ | CH₃ | O | O | CHF₂ | 1 | 1 |
| 1-107 | CH₃ | H | H | H | CF₃ | CH₃ | O | O | CH₂F | 1 | 1 |
| 1-108 | CH₃ | H | H | H | CF₃ | CH₃ | O | O | CCHCH₂ | 1 | 1 |
| 1-109 | CH₃ | H | H | H | CF₃ | CH₃ | O | O | C(CH₃)CH₂ | 1 | 1 |
| 1-110 | CH₃ | H | H | H | CF₃ | CH₃ | O | O | COCH₃ | 1 | 1 |
| 1-111 | CH₃ | H | H | H | CF₃ | CH₃ | O | O | COCH₂CF₃ | 1 | 1 |
| 1-112 | CH₃ | H | H | H | CF₃ | CH₃ | O | O | CSCH₃ | 1 | 1 |
| 1-113 | CH₃ | H | H | H | CF₃ | CH₃ | O | O | CSO₂CH₃ | 1 | 1 |
| 1-114 | CH₃ | H | H | H | CF₃ | CH₃ | O | O | CN(CH₃)₂ | 1 | 1 |
| 1-115 | CH₃ | H | H | H | CF₃ | CH₃ | O | O | CCN | 1 | 1 |
| 1-116 | CH₃ | H | H | H | CF₃ | CH₃ | O | O | CCl | 1 | 1 |
| 1-117 | CH₃ | H | H | H | CF₃ | CH₃ | O | O | CBr | 1 | 1 |
| 1-118 | CH₃ | H | H | H | CF₃ | CH₃ | O | O | Cl | 1 | 1 |

TABLE 2

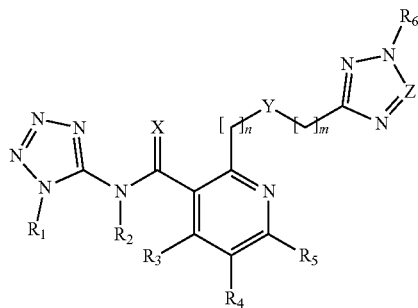

| Com. No | R₁ | R₂ | R₃ | R₄ | R₅ | R₆ | X | Y | Z | n | m |
|---|---|---|---|---|---|---|---|---|---|---|---|
| 2-1 | $CH_3$ | H | H | H | $CF_3$ | $CH_3$ | O | O | N | 0 | 1 |
| 2-2 | $CH_2CH_3$ | H | H | H | $CF_3$ | $CH_3$ | O | O | N | 0 | 1 |
| 2-3 | $CH_2CH_2CH_3$ | H | H | H | $CF_3$ | $CH_3$ | O | O | N | 0 | 1 |
| 2-4 | $CHF_2$ | H | H | H | $CF_3$ | $CH_3$ | O | O | N | 0 | 1 |
| 2-5 | $CH_2CHCH_2$ | H | H | H | $CF_3$ | $CH_3$ | O | O | N | 0 | 1 |
| 2-6 | $CH_2CCH$ | H | H | H | $CF_3$ | $CH_3$ | O | O | N | 0 | 1 |
| 2-7 | $CH_3$ | $CH_3$ | H | H | $CF_3$ | $CH_3$ | O | O | N | 0 | 1 |
| 2-8 | $CH_3$ | $CH_2CH_3$ | H | H | $CF_3$ | $CH_3$ | O | O | N | 0 | 1 |
| 2-9 | $CH_3$ | $COCH_3$ | H | H | $CF_3$ | $CH_3$ | O | O | N | 0 | 1 |
| 2-10 | $CH_3$ | COPh | H | H | $CF_3$ | $CH_3$ | O | O | N | 0 | 1 |
| 2-11 | $CH_3$ | $SO_2CH_3$ | H | H | $CF_3$ | $CH_3$ | O | O | N | 0 | 1 |
| 2-12 | $CH_3$ | H | Cl | H | $CF_3$ | $CH_3$ | O | O | N | 0 | 1 |
| 2-13 | $CH_3$ | H | Br | H | $CF_3$ | $CH_3$ | O | O | N | 0 | 1 |
| 2-14 | $CH_3$ | H | $CH_3$ | H | $CF_3$ | $CH_3$ | O | O | N | 0 | 1 |
| 2-15 | $CH_3$ | H | $CH_2CH_3$ | H | $CF_3$ | $CH_3$ | O | O | N | 0 | 1 |
| 2-16 | $CH_3$ | H | H | $CH_3$ | $CF_3$ | $CH_3$ | O | O | N | 0 | 1 |
| 2-17 | $CH_3$ | H | H | $CHCH_2$ | $CF_3$ | $CH_3$ | O | O | N | 0 | 1 |
| 2-18 | $CH_3$ | H | H | $CH_2CH_3$ | $CF_3$ | $CH_3$ | O | O | N | 0 | 1 |
| 2-19 | $CH_3$ | H | H | H | Cl | $CH_3$ | O | O | N | 0 | 1 |
| 2-20 | $CH_3$ | H | H | H | $CClF_2$ | $CH_3$ | O | O | N | 0 | 1 |
| 2-21 | $CH_3$ | H | H | H | $CF_2CF_3$ | $CH_3$ | O | O | N | 0 | 1 |
| 2-22 | $CH_3$ | H | H | H | $CHF_2$ | $CH_3$ | O | O | N | 0 | 1 |
| 2-23 | $CH_3$ | H | H | H | $CF_3$ | $CH_2CH_3$ | O | O | N | 0 | 1 |
| 2-24 | $CH_3$ | H | H | H | $CF_3$ | $CH_2OCH_3$ | O | O | N | 0 | 1 |
| 2-25 | $CH_3$ | H | H | H | $CF_3$ | $CHF_2$ | O | O | N | 0 | 1 |
| 2-26 | $CH_3$ | H | H | H | $CF_3$ | $CH_3$ | O | $NCH_3$ | N | 0 | 1 |
| 2-27 | $CH_3$ | H | H | H | $CF_3$ | $CH_3$ | O | $NCH_2CH_3$ | N | 0 | 1 |
| 2-28 | $CH_3$ | H | H | H | $CF_3$ | $CH_3$ | O | $NCH_2CCH$ | N | 0 | 1 |
| 2-29 | $CH_3$ | H | H | H | $CF_3$ | $CH_3$ | O | $NOCH_2Ph$ | N | 0 | 1 |
| 2-30 | $CH_3$ | H | H | H | $CF_3$ | $CH_3$ | O | $NOCH_3$ | N | 0 | 1 |
| 2-31 | $CH_3$ | H | H | H | $CF_3$ | $CH_3$ | O | $NOCH_2CH_3$ | N | 0 | 1 |
| 2-32 | $CH_3$ | H | H | H | $CF_3$ | $CH_3$ | O | NH | N | 0 | 1 |
| 2-33 | $CH_3$ | H | H | H | $CF_3$ | $CH_3$ | O | NOH | N | 0 | 1 |
| 2-34 | $CH_3$ | H | H | H | $CF_3$ | $CH_3$ | O | $N(CH_3)CH_2CH_2O$ | N | 0 | 1 |
| 2-35 | $CH_3$ | H | H | H | $CF_3$ | $CH_3$ | O | $NCH_3$ | CH | 0 | 1 |
| 2-36 | $CH_3$ | H | H | H | $CF_3$ | $CH_3$ | O | $NCH_3$ | N | 0 | 2 |
| 2-37 | $CH_3$ | H | H | H | $CF_3$ | $CH_3$ | O | S | N | 0 | 1 |
| 2-38 | $CH_3$ | H | H | H | $CF_3$ | $CHF_2$ | O | S | N | 0 | 1 |
| 2-39 | $CH_3$ | H | H | H | $CF_3$ | $CH_3$ | O | SO | N | 0 | 1 |
| 2-40 | $CH_3$ | H | H | H | $CF_3$ | $CH_3$ | O | $SO_2$ | N | 0 | 1 |
| 2-41 | $CH_3$ | H | H | H | $CF_3$ | $CH_3$ | S | O | N | 0 | 1 |
| 2-42 | $CH_3$ | H | H | H | $CF_3$ | $CH_3$ | S | S | N | 0 | 1 |
| 2-43 | $CH_3$ | H | H | H | $CF_3$ | $CH_3$ | O | O | CH | 0 | 1 |
| 2-44 | $CH_3$ | H | H | H | $CF_3$ | $CH_3$ | O | O | $CCH_3$ | 0 | 1 |
| 2-45 | $CH_3$ | H | H | H | $CF_3$ | $CH_3$ | O | O | $CCF_3$ | 0 | 1 |
| 2-46 | $CH_3$ | H | H | H | $CF_3$ | $CH_3$ | O | O | $CHF_2$ | 0 | 1 |
| 2-47 | $CH_3$ | H | H | H | $CF_3$ | $CH_3$ | O | O | $CH_2F$ | 0 | 1 |
| 2-48 | $CH_3$ | H | H | H | $CF_3$ | $CH_3$ | O | O | $CCHCH_2$ | 0 | 1 |
| 2-49 | $CH_3$ | H | H | H | $CF_3$ | $CH_3$ | O | O | $C(CH_3)CH_2$ | 0 | 1 |
| 2-50 | $CH_3$ | H | H | H | $CF_3$ | $CH_3$ | O | O | $COCH_3$ | 0 | 1 |
| 2-51 | $CH_3$ | H | H | H | $CF_3$ | $CH_3$ | O | O | $COCH_2CF_3$ | 0 | 1 |
| 2-52 | $CH_3$ | H | H | H | $CF_3$ | $CH_3$ | O | O | $CSCH_3$ | 0 | 1 |
| 2-53 | $CH_3$ | H | H | H | $CF_3$ | $CH_3$ | O | O | $CSO_2CH_3$ | 0 | 1 |
| 2-54 | $CH_3$ | H | H | H | $CF_3$ | $CH_3$ | O | O | $CN(CH_3)_2$ | 0 | 1 |
| 2-55 | $CH_3$ | H | H | H | $CF_3$ | $CH_3$ | O | O | CCN | 0 | 1 |
| 2-56 | $CH_3$ | H | H | H | $CF_3$ | $CH_3$ | O | O | CCl | 0 | 1 |
| 2-57 | $CH_3$ | H | H | H | $CF_3$ | $CH_3$ | O | O | CBr | 0 | 1 |
| 2-58 | $CH_3$ | H | H | H | $CF_3$ | $CH_3$ | O | O | CI | 0 | 1 |
| 2-59 | $CH_3$ | H | H | H | $CF_3$ | $CH_3$ | O | O | N | 1 | 1 |
| 2-60 | $CH_2CH_3$ | H | H | H | $CF_3$ | $CH_3$ | O | O | N | 1 | 1 |
| 2-61 | $CH_2CH_2CH_3$ | H | H | H | $CF_3$ | $CH_3$ | O | O | N | 1 | 1 |

TABLE 2-continued

| Com. No | R₁ | R₂ | R₃ | R₄ | R₅ | R₆ | X | Y | Z | n | m |
|---|---|---|---|---|---|---|---|---|---|---|---|
| 2-62 | CHF₂ | H | H | H | CF₃ | CH₃ | O | O | N | 1 | 1 |
| 2-63 | CH₂CHCH₂ | H | H | H | CF₃ | CH₃ | O | O | N | 1 | 1 |
| 2-64 | CH₂CCH | H | H | H | CF₃ | CH₃ | O | O | N | 1 | 1 |
| 2-65 | CH₃ | CH₃ | H | H | CF₃ | CH₃ | O | O | N | 1 | 1 |
| 2-66 | CH₃ | CH₂CH₃ | H | H | CF₃ | CH₃ | O | O | N | 1 | 1 |
| 2-67 | CH₃ | COCH₃ | H | H | CF₃ | CH₃ | O | O | N | 1 | 1 |
| 2-68 | CH₃ | COPh | H | H | CF₃ | CH₃ | O | O | N | 1 | 1 |
| 2-69 | CH₃ | SO₂CH₃ | H | H | CF₃ | CH₃ | O | O | N | 1 | 1 |
| 2-70 | CH₃ | H | Cl | H | CF₃ | CH₃ | O | O | N | 1 | 1 |
| 2-71 | CH₃ | H | Br | H | CF₃ | CH₃ | O | O | N | 1 | 1 |
| 2-72 | CH₃ | H | CH₃ | H | CF₃ | CH₃ | O | O | N | 1 | 1 |
| 2-73 | CH₃ | H | CH₂CH₃ | H | CF₃ | CH₃ | O | O | N | 1 | 1 |
| 2-74 | CH₃ | H | H | CH₃ | CF₃ | CH₃ | O | O | N | 1 | 1 |
| 2-75 | CH₃ | H | H | CHCH₂ | CF₃ | CH₃ | O | O | N | 1 | 1 |
| 2-76 | CH₃ | H | H | CH₂CH₃ | CF₃ | CH₃ | O | O | N | 1 | 1 |
| 2-77 | CH₃ | H | H | H | Cl | CH₃ | O | O | N | 1 | 1 |
| 2-78 | CH₃ | H | H | H | CClF₂ | CH₃ | O | O | N | 1 | 1 |
| 2-79 | CH₃ | H | H | H | CClF₂ | CH₃ | O | NOCH₃ | N | 1 | 1 |
| 2-80 | CH₃ | H | H | H | CClF₂ | CH₃ | O | O | CH | 1 | 1 |
| 2-81 | CH₃ | H | H | H | CF₂CF₃ | CH₃ | O | O | N | 1 | 1 |
| 2-82 | CH₃ | H | H | H | CF₂CF₃ | CHF₂ | O | O | N | 1 | 1 |
| 2-83 | CH₃ | H | H | H | CF₂CF₃ | CH₃ | O | O | CH | 1 | 1 |
| 2-84 | CH₃ | H | H | H | CHF₂ | CH₃ | O | O | N | 1 | 1 |
| 2-85 | CH₃ | H | H | H | CHF₂ | CH₃ | O | O | CH | 1 | 1 |
| 2-86 | CH₃ | H | H | H | CHF₂ | CH₃ | O | NOCH₃ | N | 1 | 1 |
| 2-87 | CH₃ | H | H | H | CF₃ | CH₂CH₃ | O | O | N | 1 | 1 |
| 2-88 | CH₂CH₃ | H | H | H | CF₃ | CH₂CH₃ | O | O | N | 1 | 1 |
| 2-89 | CH₂CH₂CH₃ | H | H | H | CF₃ | CH₂CH₃ | O | O | N | 1 | 1 |
| 2-90 | CH₂CHCH₂ | H | H | H | CF₃ | CH₂CH₃ | O | O | N | 1 | 1 |
| 2-91 | CH₃ | H | H | H | CF₃ | CH₂OCH₃ | O | O | N | 1 | 1 |
| 2-92 | CH₃ | H | H | H | CF₃ | CHF₂ | O | O | N | 1 | 1 |
| 2-93 | CH₃ | H | H | H | CF₃ | CH₃ | O | NCH₃ | N | 1 | 1 |
| 2-94 | CH₃ | H | H | H | CF₃ | CH₃ | O | NCH₂CH₃ | N | 1 | 1 |
| 2-95 | CH₃ | H | H | H | CF₃ | CH₃ | O | NCH₂CCH | N | 1 | 1 |
| 2-96 | CH₃ | H | H | H | CF₃ | CH₃ | O | NOCH₂Ph | N | 1 | 1 |
| 2-97 | CH₃ | H | H | H | CF₃ | CH₃ | O | NOCH₃ | N | 1 | 1 |
| 2-98 | CH₃ | H | H | H | CF₃ | CH₃ | O | NOCH₂CH₃ | N | 1 | 1 |
| 2-99 | CH₃ | H | H | H | CF₃ | CH₃ | O | NH | N | 1 | 1 |
| 2-100 | CH₃ | H | H | H | CF₃ | CH₃ | O | NOH | N | 1 | 1 |
| 2-101 | CH₃ | H | H | H | CF₃ | CH₃ | O | N(CH₃)CH₂CH₂O | N | 1 | 1 |
| 2-102 | CH₃ | H | H | H | CF₃ | CH₃ | O | S | N | 1 | 1 |
| 2-103 | CH₃ | H | H | H | CF₃ | CH₃ | O | S | N | 1 | 0 |
| 2-104 | CH₃ | H | H | H | CF₃ | CH₃ | O | SO | N | 1 | 1 |
| 2-105 | CH₃ | H | H | H | CF₃ | CH₃ | O | SO₂ | N | 1 | 1 |
| 2-106 | CH₃ | H | H | H | CF₃ | CH₃ | S | O | N | 1 | 1 |
| 2-107 | CH₃ | H | H | H | CF₃ | CH₃ | S | S | N | 1 | 1 |
| 2-108 | CH₃ | H | H | H | CHF₂ | CH₃ | O | S | N | 1 | 1 |
| 2-109 | CH₃ | COPh | H | H | CF₃ | CH₃ | O | S | N | 1 | 1 |
| 2-110 | CH₃ | SO₂CH₃ | H | H | CF₃ | CH₃ | O | S | N | 1 | 1 |
| 2-111 | CH₃ | H | H | H | CHF₂ | CH₃ | O | SO | N | 1 | 1 |
| 2-112 | CH₃ | COPh | H | H | CHF₂ | CH₃ | O | S | N | 1 | 1 |
| 2-113 | CH₃ | H | H | H | CF₃ | CH₃ | O | O | CH | 1 | 1 |
| 2-114 | CH₂CH₂CH₃ | H | H | H | CF₃ | CH₃ | O | O | CH | 1 | 1 |
| 2-115 | CH₂CHCH₂ | H | H | H | CF₃ | CH₃ | O | O | CH | 1 | 1 |
| 2-116 | CH₃ | H | H | H | CF₃ | CH₃ | O | O | CCH₃ | 1 | 1 |
| 2-117 | CH₃ | H | H | H | CF₃ | CH₃ | S | O | CCH₃ | 1 | 1 |
| 2-118 | CH₃ | H | H | H | CF₃ | CH₃ | O | O | CCF₃ | 1 | 1 |
| 2-119 | CH₂CH₃ | H | H | H | CF₃ | CH₃ | O | O | CCF₃ | 1 | 1 |
| 2-120 | CH₂CH₂CH₃ | H | H | H | CF₃ | CH₃ | O | O | CCF₃ | 1 | 1 |
| 2-121 | CH₂CHCH₂ | H | H | H | CF₃ | CH₃ | O | O | CCF₃ | 1 | 1 |
| 2-122 | CH₂CCH | H | H | H | CF₃ | CH₃ | O | O | CCF₃ | 1 | 1 |

TABLE 2-continued

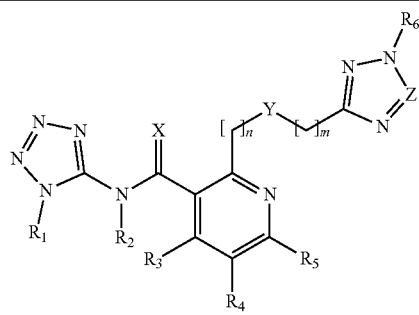

| Com. No | R₁ | R₂ | R₃ | R₄ | R₅ | R₆ | X | Y | Z | n | m |
|---|---|---|---|---|---|---|---|---|---|---|---|
| 2-123 | CH₃ | H | H | H | CF₃ | CH₃ | O | O | CHF₂ | 1 | 1 |
| 2-124 | CH₂CH₂CH₃ | H | H | H | CF₃ | CH₃ | O | O | CHF₂ | 1 | 1 |
| 2-125 | CH₂CHCH₂ | H | H | H | CF₃ | CH₃ | O | O | CHF₂ | 1 | 1 |
| 2-126 | CH₃ | H | H | H | CF₃ | CH₃ | O | O | CH₂F | 1 | 1 |
| 2-127 | CH₃ | H | H | H | CF₃ | CH₃ | O | O | CCHCH₂ | 1 | 1 |
| 2-128 | CH₃ | H | H | H | CF₃ | CH₃ | O | O | C(CH₃)CH₂ | 1 | 1 |
| 2-129 | CH₃ | H | H | H | CF₃ | CH₃ | O | O | COCH₃ | 1 | 1 |
| 2-130 | CH₃ | H | H | H | CF₃ | CH₃ | O | O | COCH₂CF₃ | 1 | 1 |
| 2-131 | CH₃ | H | H | H | CF₃ | CH₃ | O | O | CSCH₃ | 1 | 1 |
| 2-132 | CH₃ | H | H | H | CF₃ | CH₃ | O | O | CSO₂CH₃ | 1 | 1 |
| 2-133 | CH₃ | H | H | H | CF₃ | CH₃ | O | O | CN(CH₃)₂ | 1 | 1 |
| 2-134 | CH₃ | H | H | H | CF₃ | CH₃ | O | O | CCN | 1 | 1 |
| 2-135 | CH₃ | H | H | H | CF₃ | CH₃ | O | O | CCl | 1 | 1 |
| 2-136 | CH₃ | H | H | H | CF₃ | CH₃ | O | O | CBr | 1 | 1 |
| 2-137 | CH₃ | H | H | H | CF₃ | CH₃ | O | O | Cl | 1 | 1 |

TABLE 3

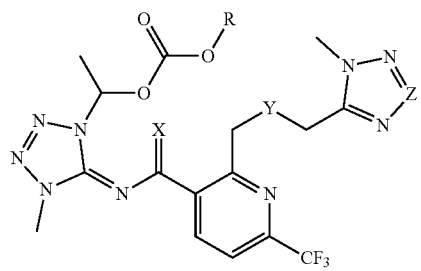

| Com. No | R | X | Y | Z |
|---|---|---|---|---|
| 3-1 | CH₃ | O | O | CH |
| 3-2 | CH₃ | S | O | N |
| 3-3 | CH₃ | O | S | N |
| 3-4 | CH₃ | O | O | N |
| 3-5 | CH₃ | S | S | N |
| 3-6 | CH₃ | O | SO | N |
| 3-7 | CH₃ | O | SO₂ | N |
| 3-8 | CH₂CH₃ | O | O | N |
| 3-9 | CH₂CH₃ | S | S | N |
| 3-10 | CH₂CH₃ | O | S | N |
| 3-11 | c-Hex | O | O | N |
| 3-12 | CH(CH₃)₂ | O | O | N |

TABLE 4

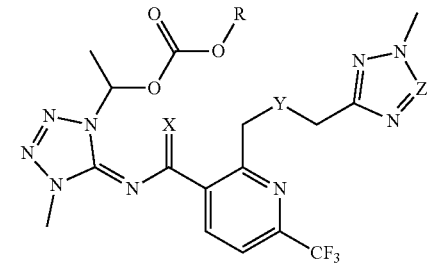

| Com. No | R | X | Y | Z |
|---|---|---|---|---|
| 4-1 | CH₃ | O | O | CH |
| 4-2 | CH₃ | S | O | N |
| 4-3 | CH₃ | O | S | N |
| 4-4 | CH₃ | O | O | N |
| 4-5 | CH₃ | S | S | N |
| 4-6 | CH₃ | O | SO | N |
| 4-7 | CH₃ | O | SO₂ | N |
| 4-8 | CH₂CH₃ | O | O | N |
| 4-9 | CH₂CH₃ | S | S | N |
| 4-10 | CH₂CH₃ | O | S | N |
| 4-11 | c-Hex | O | O | N |
| 4-12 | CH(CH₃)₂ | O | O | N |

The results of structural analysis of the compounds specified in Table 1-Table 4 are shown in Table 5 below.

TABLE 5

| Com. No. | NMR |
|---|---|
| 1-1 | $^1$H NMR (300 MHz, CDCl₃) δ 10.6 (brs, NH), 8.67 (d, J = 7.7 Hz, 1H), 7.58 (d, J = 7.7 Hz, 1H), 5.97 (s, 2H), 4.24 (s, 3H), 4.05 (s, 3H) |

TABLE 5-continued

| Com. No. | NMR |
|---|---|
| 1-4 | $^1$H NMR (300 MHz, MeOD) δ8.45 (d, J = 7.8 Hz, 1H), 8.15 (t, J = 55.0 Hz, 1H), 7.68 (d, J = 7.8 Hz, 1H), 5.98 (s, 2H), 4.22 (s, 3H) |
| 1-8 | $^1$H NMR (300 MHz, CDCl$_3$) δ 8.01 (brs, 1H), 7.78 (t, J = 57.1 Hz, 1H), 7.47 (brs, 1H), 5.91 (s, 2H), 4.00 (s, 3H), 3.51 (s, 3H) |
| 1-13 | $^1$H NMR (300 MHz, Acetone-d$_6$) δ 10.89 (brs, NH), 7.83 (s, 1H), 5.96 (s, 2H), 4.27 (s, 3H), 4.07 (s, 3H) |
| 1-14 | $^1$H NMR (300 MHz, CDCl$_3$) δ 11.10 (brs, NH), 7.31 (s, 1H), 5.83 (s, 2H), 4.16 (s, 3H), 4.09 (s, 3H), 2.55 (s, 3H) |
| 1-17 | $^1$H NMR (300 MHz, CDCl$_3$) δ 10.60 (brs, NH), 8.43 (s, 1H), 5.95 (s, 2H), 4.21 (s, 3H), 4.04 (s, 3H), 2.51 (s, 3H) |
| 1-18 | $^1$H NMR (300 MHz, MeOD) δ 8.69 (s, 1H), 7.06 (d, J = 1.3 Hz, 1H), 5.95 (d, J = 10.4 Hz, 3H), 5.55 (d, J = 26.7 Hz, 1H), 4.23 (s, 3H), 4.05 (s, 3H) |
| 1-19 | $^1$H NMR (300 MHz, MeOD) δ 8.41 (s, 1H), 5.91 (s, 2H), 4.23 (s, 3H), 4.05 (s, 3H), 2.86 (d, J = 7.0 Hz, 2H), 1.29 (t, J = 7.5 Hz, 3H) |
| 1-20 | $^1$H NMR (300 MHz, CDCl$_3$) δ 10.16 (brs, NH), 8.52 (d, J = 7.8 Hz, 1H), 7.27 (d, J = 7.8 Hz, 1H), 5.92 (s, 2H), 4.34 (s, 3H), 4.09 (s, 3H) |
| 1-26 | $^1$H NMR (300 MHz, CDCl$_3$) δ 10.3 (brs, NH), 8.78 (d, J = 7.6 Hz, 1H), 7.80 (t, J = 56.1 Hz, 1H), 7.63 (d, J = 7.6 Hz, 1H), 6.18 (s, 2H), 4.10 (s, 3H) |
| 1-27 | $^1$H NMR (300 MHz, DMSO-d$_6$) δ 12.1 (brs, NH) 8.15 (d, J = 7.7 Hz, 1H), 7.25 (d, J = 7.7 Hz, 1H), 5.00 (s, 2H), 4.07 (s, 3H), 3.97 (s, 3H) 3.18 (s, 3H) |
| 1-40 | $^1$H NMR (300 MHz, CDCl$_3$) δ 8.92 (brs, 1H), 7.66 (brs, 1H), 4.09 (brs, 2H), 3.99 (s, 3H) |
| 1-43 | $^1$H NMR (300 MHz, MeOD) δ 8.32 (d, J = 7.8 Hz, 1H), 7.59 (d, J = 7.8 Hz, 1H), 5.84 (s, 2H), 4.21 (s, 3H), 3.99 (s, 3H) |
| 1-45 | $^1$H NMR (300 MHz, MeOD) δ 8.50 (d, J = 7.8 Hz, 1H), 7.93 (s, 1H), 7.65 (d, J = 7.5 Hz. 1H), 5.78 (s, 2H), 4.06 (s, 3H), 4.05 (s, 3H) |
| 1-61 | $^1$H NMR (300 MHz, CDCl$_3$) δ 11.55 (brs, NH), 8.45 (d, J = 8.0 Hz, 1H), 7.85 (d, J = 8.0 Hz, 1H), 5.09 (s, 2H), 4.92 (s, 2H), 4.10 (s, 3H), 4.06 (s, 3H) |
| 1-85 | $^1$H NMR (300 MHz, DMSO-d$_6$) δ 11.96 (brs, NH), 8.50 (d, J = 8.0 Hz, 1H), 8.41 (t, J = 56.4 Hz, 1H), 8.14 (d, J = 8.0 Hz, 1H), 5.15 (s, 2H), 5.05 (s, 2H), 3.97 (s, 3H) |
| 1-86 | $^1$H NMR (300 MHz, CDCl$_3$) δ 13.25 (brs, NH), 8.42 (d, J = 8.0 Hz, 1H), 7.79 (d, J = 8.0 Hz, 1H), 4.26 (s, 2H), 4.12 (s, 2H), 4.11 (s, 3H), 4.06 (s, 3H), 2.66 (s, 3H) |
| 1-91 | $^1$H NMR (500 MHz, CDCl$_3$) δ 8.24 (d, J = 8.0 Hz, 1H), 7.76 (d, J = 8.0 Hz, 1H), 7.64 (s, 1H), 4.52 (s, 2H), 4.15 (s, 2H), 4.10 (s, 3H), 3.91 (s, 3H), 3.25 (s, 3H) |
| 1-97 | $^1$H NMR (300 MHz, MeOD) δ 8.80 (d, J = 9.9 Hz, 1H), 7.79 (d, J = 9.9 Hz, 1 H), 5.33 (brs, 2H), 3.96 (s, 3H), 3.90 (s, 3H) |
| 1-102 | $^1$H NMR (300 MHz, MeOD) δ8.32 (d, J = 7.9 Hz, 1H), 8.26 (s, 1H), 7.90 (d, J = 7.9 Hz, 2H), 4.98 (s, 2H), 4.58 (s, 2H), 4.00 (s, 3H), 3.77 (s, 3H) |
| 1-115 | $^1$H NMR (300 MHz, DMSO-d$_6$) δ 8.68 (d, J = 7.5 Hz, 1H), 7.89 (d, J = 8.4 Hz, 1H), 5.80 (d, J = 19.8 Hz. 2H), 3.85 (d, J = 23.7 Hz, 3H), 3.57 (s, 3H) |
| 2-1 | $^1$H NMR (300 MHz, CDCl$_3$) δ 10.70 (brs, NH), 8.79 (d, J = 7.8 Hz, 1H), 7.63 (s, 1H), 5.98 (s, 2H), 4.43 (s, 3H), 4.10 (s, 3H) |
| 2-26 | $^1$H NMR (300 MHz, CDCl$_3$) δ 11.34 (brs, NH), 8.35 (d, J = 7.8 Hz, 1H), 7.39 (d, J = 7.8 Hz, 1H), 5.41 (s, 2H), 4.31 (s, 3H), 4.10 (s, 3H), 3.19 (s, 3H) |
| 2-27 | $^1$H NMR (300 MHz, CDCl$_3$) δ 11.85 (brs, NH), 8.43 (d, J = 8.0 Hz, 1H), 7.48 (d, J = 8.0 Hz, 1H), 5.07 (s, 2H), 4.32 (s, 3H), 4.12 (s, 3H), 3.49 (q, J = 7.1 Hz, 2H) 1.22 (t, J = 7.1 Hz, 3H) |
| 2-28 | $^1$H NMR (300 MHz, CDCl$_3$) δ 11.73 (brs, NH) 8.48 (d, J = 8.0 Hz, 1H), 7.56 (d, J = 8.0 Hz, 1H), 5.11 (s, 2H), 4.33 (s, 3H), 4.14 (s, 2H) 4.12 (s, 3H), 2.31 (s, 1H) |
| 2-29 | $^1$H NMR (300 MHz, CDCl$_3$) δ 10.81 (brs, NH) 8.10 (d, J = 7.7 Hz, 1H), 7.39 (d, J = 7.7 Hz, 1H), 7.29-7.23 (m, 5H), 5.29 (s, 2H), 4.80 (s, 2H), 4.33 (s, 3H), 3.81 (s, 3H) |
| 2-30 | $^1$H NMR (300 MHz, CDCl$_3$) δ 10.80 (brs, NH) 8.07 (d, J = 8.0 Hz, 1H), 7.39 (d, J = 8.0 Hz, 1H), 5.42 (s, 2H), 4.34 (s, 3H), 4.12 (s, 3H), 3.65 (s, 3H) |
| 2-31 | $^1$H NMR (500 MHz, CDCl$_3$) δ 10.99 (brs, NH) 8.04 (d, J = 7.8 Hz, 1H), 7.35 (d, J = 7.8 Hz, 1H), 5.46 (s, 2H), 4.35 (s, 3H), 4.13 (s, 3H), 3.90 (q, J = 7.0 Hz, 2H), 1.07 (t, J = 7.0 Hz, 3H) |
| 2-32 | $^1$H NMR (300 MHz, DMSO-d$_6$) δ 10.0 (brs, NH) 8.44 (d, J = 7.6 Hz, 1H), 7.06 (d, J = 7.6 Hz, 1H), 4.90 (s, 2H), 4.31 (s, 3H), 3.77 (s, 3H) |
| 2-33 | $^1$H NMR (300 MHz, CDCl$_3$) δ 8.43 (d, J = 8.0 Hz, 1H) 6.87 (d, J = 8.0 Hz, 1H), 4.90 (s, 2H), 4.21 (s, 3H), 3.86 (s, 3H) |
| 2-34 | $^1$H NMR (300 MHz, CDCl$_3$) δ 11.0 (brs, NH) 8.33 (d, J = 7.8 Hz, 1H), 7.38 (d, J = 7.8 Hz, 1H), 4.73 (s, 2H), 4.22 (s, 3H), 4.04 (s, 3H), 3.85 (t, J = 4.6 Hz, 2H), 3.78 (t, J = 4.6 Hz, 2H), 3.08 (s, 3H) |
| 2-35 | $^1$H NMR (300 MHz, CDCl$_3$) δ 12.25 (brs, NH) 8.27 (d, J = 7.8 Hz, 1H), 7.96 (s, 1H), 7.30 (d, J = 7.8 Hz, 1H), 5.08 (s, 2H), 4.10 (s, 3H), 3.86 (s, 3H), 3.17 (s, 3H) |
| 2-36 | $^1$H NMR (500 MHz, CDCl$_3$) δ 11.52 (brs, NH) 8.23 (d, J = 7.7 Hz, 1H), 7.28 (d, J = 7.7 Hz, 1H), 4.24 (s, 3H), 4.11 (s, 3H), 4.01 (t, J = 3.4 Hz, 2H), 3.32 (t, J = 3.4 Hz, 2H), 3.22 (s, 3H) |
| 2-43 | $^1$H NMR (300 MHz, MeOD) δ8.56 (d, J = 9.0 Hz, 1H), 8.42 (s, 1H), 7.66 (d, J = 6.0 Hz, 1H), 5.70 (s, 2H), 4.02 (s, 3H), 3.93 (s, 3H) |
| 2-59 | $^1$H NMR (300 MHz, CDCl$_3$) δ 10.77 (brs, NH), 8.39 (d, J = 8.0 Hz, 1H), 7.85 (d, J = 8.0 Hz, 1H), 5.14 (s, 2H), 5.00 (s, 2H), 4.26 (s, 3H), 4.10 (s, 3H) |
| 2-67 | $^1$H NMR (300 MHz, MeOD) δ8.00 (d, J = 8.0 Hz, 1H), 7.67 (d, J = 8.0 Hz, 1H), 4.99 (s, 2H), 4.84 (s, 2H), 4.37 (s, 3H), 3.95 (s, 3H), 2.43 (s, 3H) |
| 2-68 | $^1$H NMR (300 MHz, MeOD) δ8.12 (s, J = 7.9 Hz, 1H), 7.71 (d, J = 7.9 Hz, 1H), 7.34-7.63 (m, 5H), 5.01 (s, 2H), 4.84 (s, 2H), 4.30 (s, 3H), 4.02 (s, 3H) |
| 2-69 | $^1$H NMR (300 MHz, MeOD) δ8.42 (d, J = 7.8 Hz, 1H), 7.62 (s, 1H), 5.24 (s, 2H), 4.85 (s, 3H), 4.22 (s, 2H), 3.87 (s, 3H), 2.72 (s, 3H) |

TABLE 5-continued

| Com. No. | NMR |
|---|---|
| 2-78 | ¹H NMR (300 MHz, MeOD) δ8.51 (d, J = 8.1 Hz, 1H), 7.71 (d, J = 8.1 Hz, 1H), 5.18 (s, 2H), 4.78 (s, 2H), 4.26 (s, 3H), 3.88 (s, 3H) |
| 2-79 | ¹H NMR (300 MHz, CDCl₃) δ 8.39 (d, J = 8.0 Hz, 1H), 7.79 (d, J = 8.0 Hz, 1H), 4.63 (s, 2H), 4.44 (s, 2H), 4.25 (s, 3H), 4.07 (s, 3H), 3.31 (s, 3H) |
| 2-80 | ¹H NMR (300 MHz, MeOD) δ 8.30 (d, J = 7.9 Hz, 1H), 8.27 (s, 1H), 7.88 (d, J = 7.9 Hz, 1H), 4.98 (s, 2H), 4.88 (s, 2H), 4.04 (s, 3H), 3.85 (s, 3H) |
| 2-81 | ¹H NMR (300 MHz, MeOD) δ8.58 (brs, NH), 7.83 (d, J = 7.9, 1H), 5.19 (br s, 2H), 4.79 (s, 2H), 4.29 (s, 3H), 3.83 (s, 3H) |
| 2-83 | ¹H NMR (300 MHz, MeOD) δ 8.34 (d, J = 8.1 Hz, 1H), 8.27 (s, 1H), 7.97 (d, J = 8.1 Hz, 1H), 4.99 (s, 2H), 4.60 (s, 2H), 4.04 (s, 3H), 3.84 (s, 3H) |
| 2-84 | ¹H NMR (300 MHz, MeOD) δ 8.54 (d, J = 7.9 Hz, 1H), 7.69 (d, J = 7.8 Hz, 1H), 6.76 (t, J = 55.2 Hz, 1H), 5.16 (s, 2H), 4.82 (t, J = 22.5 Hz, 2H), 4.31 (s, 3H), 3.91 (s, 3H) |
| 2-85 | ¹H NMR (300 MHz, MeOD) δ 8.28 (s, 1H), 8.27 (d, J = 7.8 Hz, 1H), 7.80 (d, J = 7.8 Hz, 1H), 4.99 (s, 2H), 4.61 (s, 2H), 4.04 (s, 3H), 3.85 (s, 3H) |
| 2-86 | ¹H NMR (500 MHz, CDCl₃) δ 11.74 (brs, NH) 8.41 (d, J = 8.1 Hz, 1H), 7.82 (d, J = 8.1 Hz, 1H), 6.73 (t, J = 55.0 Hz, 1H), 4.61 (s, 2H), 4.46 (s, 2H) 4.19 (s, 3H), 4.10 (s, 3H), 3.33 (s, 3H) |
| 2-87 | ¹H NMR (300 MHz, CDCl₃) δ 11.20 (brs, NH), 8.38 (d, J = 8.0 Hz, 1H), 7.81 (d, J = 8.0 Hz, 1H), 5.11 (s, 2H), 4.89 (s, 2H), 4.52 (q, J = 7.4 Hz, 2H), 4.07 (s, 3H), 1.54 (t, J = 7.4 Hz, 3H) |
| 2-88 | ¹H NMR (300 MHz, CDCl₃) δ 11.15 (brs, NH), 8.38 (d, J = 8.0 Hz, 1H), 7.80 (d, J = 8.0 Hz, 1H), 5.11 (s, 2H), 4.90 (s, 2H), 4.53 (q, J = 7.4 Hz, 2H), 4.40 (q, J = 7.3 Hz, 2H), 1.63-1.50 (m, 6H) |
| 2-89 | ¹H NMR (300 MHz, CDCl₃) δ 11.02 (brs, NH), 8.37 (d, J = 7.8 Hz, 1H), 7.80 (d, J = 7.8 Hz, 1H), 5.11 (s, 2H), 4.94 (s, 2H), 4.53 (q, J = 7.4 Hz, 2H), 4.33 (t, J = 7.3 Hz, 2H), 2.00 (q, J = 7.4 Hz, 2H), 1.54 (t, J = 7.4 Hz, 3H), 0.96 (t, J = 7.4 Hz, 3H) |
| 2-90 | ¹H NMR (300 MHz, CDCl₃) δ 8.36 (d, J = 7.9 Hz, 1H), 7.80 (d, J = 7.9 Hz, 1H), 5.98 (ddd, J = 16.4, 10.3, 6.0 Hz, 1H), 5.38-5.23 (m, 2H), 5.08 (d, J = 6.1 Hz, 4H), 4.89 (s, 2H), 4.53 (q, J = 7.4 Hz, 2H), 1.54 (t, J = 7.4 Hz, 3H) |
| 2-91 | ¹H NMR (400 MHz, CDCl₃) δ 8.39 (d, J = 7.9 Hz, 1H), 7.82 (d, J = 7.9 Hz, 1H), 5.71 (s, 2H), 5.14 (s, 2H), 4.96 (s, 2H), 4.07 (s, 3H), 3.39 (s, 3H) |
| 2-92 | ¹H NMR (300 MHz, CDCl₃) δ 11.84 (brs, NH), 8.57 (d, J = 8.0 Hz, 1H), 7.90 (t, J = 56.4 Hz, 1H), 7.92 (d, J = 8.0 Hz, 1H), 5.17 (s, 2H), 5.11 (s, 2H), 4.10 (s, 3H) |
| 2-93 | ¹H NMR (300 MHz, CDCl₃) δ 8.54 (d, J = 8.1 Hz, 1H), 7.83 (d, J = 8.1 Hz, 1H), 4.27 (s, 3H), 4.26 (s, 2H), 4.11 (s, 2H), 4.07 (s, 3H), 2.48 (s, 3H) |
| 2-94 | ¹H NMR (500 MHz, CDCl₃) δ 8.57 (d, J = 8.1 Hz, 1H), 7.84 (d, J = 8.1 Hz, 1H), 4.35 (s, 2H), 4.27 (s, 3H), 4.17 (s, 2H), 4.09 (s, 3H), 2.82 (q, J = 7.2 Hz, 2H), 1.22 (t, J = 7.2 Hz, 3H) |
| 2-96 | ¹H NMR (300 MHz, CDCl₃) δ 8.42 (d, J = 8.0 Hz, 1H), 7.84 (d, J = 8.0 Hz, 1H), 4.64 (s, 2H), 4.44 (s, 2H), 4.27 (s, 3H), 4.07 (s, 3H), 3.30 (s, 3H) |
| 2-102 | ¹H NMR (300 MHz, CDCl₃) δ 11.26 (brs, NH), 8.31 (d, J = 8.1 Hz, 1H), 7.71 (d, J = 8.1 Hz, 1H), 4.36 (s, 2H), 4.20 (s, 3H), 4.15 (s, 3H), 3.98 (s, 2H) |
| 2-104 | ¹H NMR (300 MHz, CDCl₃) δ 11.40 (brs, NH), 8.35 (d, J = 8.1 Hz, 1H), 7.83 (d, J = 8.1 Hz, 1H), 5.25 (d, J = 12.6 Hz, 1H), 4.83 (d, J = 14.0 Hz, 1H), 4.52 (d, J = 12.6 Hz, 1H), 4.38 (d, J = 14.0 Hz, 1H), 4.29 (s, 3H), 4.03 (s, 3H) |
| 2-105 | ¹H NMR (300 MHz, CDCl₃) δ 12.11 (brs, NH), 8.58 (d, J = 8.1 Hz, 1H), 8.22 (d, J = 8.1 Hz, 1H), 5.35 (s, 2H), 5.17 (s, 2H), 4.37 (s, 3H), 3.91 (s, 3H) |
| 2-106 | ¹H NMR (300 MHz, CDCl₃) δ8.41 (d, J = 5.8 Hz, 1H), 7.69 (s, 1H), 5.15 (s, 2H), 4.87 (s, 2H), 4.22 (s, 3H), 3.96 (s, 3H) |
| 2-107 | ¹H NMR (500 MHz, CDCl₃) δ 12.05 (brs, NH), 7.85-8.01 (m, 1H), 7.56 (d, J = 8.3 Hz, 1H), 4.30 (s, 2H), 4.20 (s, 2H), 4.18 (s, 3H), 4.13 (s, 2H) |
| 2-108 | ¹H NMR (300 MHz, MeOD) δ 8.46 (brs, NH), 7.68 (brs, 1H), 6.74 (t, J = 55.5 Hz, 1H), 4.34 (s, 2 H), 4.27 (s, 3H), 4.08 (s, 2H), 3.97 (s, 3H) |
| 2-109 | ¹H NMR (500 MHz, CDCl₃) δ 8.18 (d, J = 8.0 Hz, 1H), 7.72 (d, J = 7.8 Hz, 1H), 7.68 (d, J = 8.0 Hz, 1H), 7.60 (dd, J = 7.5, 7.5 Hz, 1H), 7.44 (dd, J = 7.8, 7.8 Hz, 1H), 4.31 (s, 3H), 4.28 (s, 3H), 4.03 (s, 3H), 4.02 (s, 2H) |
| 2-110 | ¹H NMR (500 MHz, CDCl₃) δ 7.80 (d, J = 8.0 Hz, 1H), 7.55 (d, J = 8.0 Hz, 1H), 4.30 (s, 3H), 4.26 (s, 2H), 4.19 (s, 3H), 4.04 (s, 2H), 3.70 (s, 3H) |
| 2-111 | ¹H NMR (500 MHz, Acetone-d₆) δ 8.46 (d, J = 7.0 Hz, 1H), 7.92 (d, J = 7.0 Hz, 1H), 6.97 (t, J = 54.8 Hz, 1H), 5.25 (d, J = 12.8 Hz, 1H), 4.89 (d, J = 14.0 Hz, 1H), 4.81 (d, J = 12.8 Hz, 1H), 4.63(d, J = 14.0 Hz, 1H), 4.32 (s, 3H), 4.07 (s, 3H) |
| 2-112 | ¹H NMR (500 MHz, MeOD) δ 8.37 (d, J = 8.1 Hz, 1H), 7.73 (d, J = 8.1 Hz, 2H), 7.68 (d, J = 8.1 Hz, 1H), 7.61(dd, J = 7.4, 7.4 Hz, 1H), 7.46 (dd, J = 8.1, 7.4 Hz, 2H), 6.74 (t, J = 55.0 Hz, 1H), 4.29 (s, 3H), 4.23 (s, 2H), 4.13 (s, 3H), 4.04 (s, 2H) |
| 2-113 | ¹H NMR (300 MHz, MeOD) δ8.53 (d, J = 7.9 Hz, 1H), 8.24 (s, 1H), 7.77 (d, J = 7.9 Hz, 1H), 5.20 (s, 2H), 4.60 (s, 2H), 3.89 (s, 3H), 3.81 (s, 3H) |
| 2-114 | ¹H NMR (300 MHz, CDCl₃) δ 11.35 (brs, NH), 8.32 (d, J = 8.0 Hz, 1H), 7.80 (s, 1H), 7.79 (d, J = 7.8 Hz, 1H), 5.06 (s, 2H), 4.85 (s, 2H), 4.34 (q, J = 7.4 Hz, 2H), 3.80 (s, 3H), 2.06-1.99 (m, 2H), 1.00 (t, J = 7.4 Hz, 3H) |
| 2-115 | ¹H NMR (300 MHz, CDCl₃) δ 11.46 (brs, NH), 8.30 (d, J = 8.1 Hz, 1H), 7.82 (s, 1H), 7.77 (d, J = 9.1 Hz, 1H), 6.11-5.87 (m, 1H), 5.45 (d, J = 10.2 Hz, 1H), 5.37 (d, J = 10.0 Hz, 1H), 5.12 (d, J = 6.0 Hz, 2H), 5.05 (s, 2H), 4.83 (s, 2H), 3.81 (s, 3H) |
| 2-116 | ¹H NMR (300 MHz, MeOD) δ 8.32 (d, J = 7.8 Hz, 1H), 7.94 (q, J = 7.6 Hz, 1H), 4.95 (d, J = 13.8 Hz, 2H), 4.56 (s, 2H), 4.05 (s, 3H), 3.76 (s, 3H), 2.42 (s, 3H) |
| 2-117 | ¹H NMR (300 MHz, MeOD) δ 8.53 (d, J = 8.0 Hz, 1H), 7.79 (d, J = 7.8 Hz, 1H), 5.13 (s, 2H), 4.54 (s, 2H), 3.88 (s, 3H), 3.74 (s, 3H), 2.36 (s, 3H) |
| 2-118 | ¹H NMR (400 MHz, CDCl₃) δ 8.38 (d, J = 8.1 Hz, 1H), 7.79 (d, J = 8.1 Hz, 1H), 5.10 (s, 2H), 4.78 (s, 2H), 4.09 (s, 3H), 3.93 (s, 3H) |

TABLE 5-continued

| Com. No. | NMR |
|---|---|
| 2-119 | ¹H NMR (400 MHz, CDCl₃) δ 8.34 (d, J = 8.2 Hz, 1H), 7.78 (d, J = 8.2 Hz, 1H), 5.09 (s, 2H), 4.81 (s, 2H), 4.41 (q, J = 6.2 Hz, 2H), 3.93 (s, 3H), 1.60 (t, J = 6.2 Hz, 3H) |
| 2-120 | ¹H NMR (400 MHz, CDCl₃) δ 8.35 (d, J = 7.6 Hz, 1H), 7.79 (d, J = 7.4 Hz, 1H), 5.10 (s, 2H), 4.83 (s, 2H), 4.34 (t, J = 6.7 Hz, 2H), 3.94 (s, 3H), 2.04-1.96 (m, 2H), 0.98 (t, J = 7.1 Hz, 3H) |
| 2-121 | ¹H NMR (300 MHz, CDCl₃) δ 11.01 (brs, NH), 8.32 (d, J = 7.9 Hz, 1H), 7.78 (d, J = 7.9 Hz, 1H), 5.97 (ddd, J = 16.4, 10.4, 5.9 Hz, 1H), 5.39-5.24 (m, 2H), 5.08 (d, J = 8.9 Hz, 4H), 4.80 (s, 2H), 3.94 (s, 3H) |
| 2-122 | ¹H NMR (400 MHz, CDCl₃) δ 11.03 (brs, NH), 8.40 (d, J = 7.4 Hz, 1H), 7.83 (d, J = 7.7 Hz, 1H), 5.33 (s, 2H), 5.13 (s, 2H), 4.91 (s, 2H), 3.96 (s, 3H), 2.46 (s, 1H) |
| 2-123 | ¹H NMR (400 MHz, CDCl₃) δ 8.34 (d, J = 8.0 Hz, 1H), 7.80 (d, J = 8.0 Hz, 1H), 6.70 (t, J = 52.4 Hz, 1H), 5.07 (s, 2H), 4.81 (s, 2H), 4.07 (s, 3H), 3.92 (s, 3H) |
| 2-124 | ¹H NMR (500 MHz, CDCl₃) δ 11.01 (brs, NH), 8.35 (d, J = 8.0 Hz, 1H), 7.80 (d, J = 8.0 Hz, 1H), 6.70 (t, J = 52.4 Hz, 1H), 5.07 (s, 2H), 4.81 (s, 2H), 4.32 (t, J = 7.3 Hz, 2H), 3.92 (s, 3H), 2.01 (d, J = 7.3, 6.9 Hz, 2H), 0.98 (t, J = 7.4 Hz, 3H) |
| 2-125 | ¹H NMR (400 MHz, CDCl₃) δ 11.11 (brs, NH), 8.32 (d, J = 8.0 Hz, 1H), 7.79 (d, J = 8.0 Hz, 1H), 6.72 (t, J = 52.4 Hz, 1H), 5.98 (ddt, J = 17.1, 10.3, 6.0 Hz, 1H), 5.39-5.24 (m, 2H), 5.10 (dt, J = 6.1, 1.5 Hz, 2H), 5.04 (s, 2H), 4.77 (s, 2H), 3.92 (s, 3H) |
| 2-126 | ¹H NMR (400 MHz, CDCl₃) δ 8.31 (d, J = 8.0 Hz, 1H), 7.78 (d, J = 8.0 Hz, 1H), 5.34 (d, J = 47.5 Hz, 2H), 5.05 (s, 2H), 4.77 (s, 2H), 4.06 (s, 3H), 3.84 (s, 3H) |
| 2-127 | ¹H NMR (400 MHz, CDCl₃) δ 11.44 (s, 1H), 8.24 (d, J = 8.2 Hz, 1H), 7.73 (d, J = 7.8 Hz, 1H), 6.43 (dd, J = 17.6, 10.9 Hz, 1H), 6.10 (d, J = 17.2 Hz, 1H), 5.65 (d, J = 10.8 Hz, 1H), 5.05 (s, 2H), 4.81 (s, 2H), 4.07 (s, 3H), 3.72 (t, J = 1.6 Hz, 3H) |
| 2-128 | ¹H NMR (400 MHz, CDCl₃) δ 11.50 (brs, NH), 8.25 (d, J = 8.1 Hz, 1H), 7.74 (d, J = 8.1 Hz, 1H), 5.54 (s, 1H), 5.24 (s, 1H), 5.07 (s, 2H), 4.81 (s, 2H), 3.77 (s, 3H), 2.01 (s, 3H) |
| 2-129 | ¹H NMR (300 MHz, MeOD) δ 8.50 (d, J = 7.9 Hz, 1H), 7.78 (d, J = 7.9 Hz, 1H), 5.15 (s, 2H), 4.48 (s, 2H), 4.01 (s, 6H), 3.50 (S, 3H) |
| 2-130 | ¹H NMR (300 MHz, MeOD) δ 8.37 (br s, 1H), 7.95 (br s, 1H), 5.19 (s, 2H), 4.85 (q, J = 8.2 Hz, 2H), 4.46 (s, 2H), 4.06 (s, 3H), 3.57 (s, 3H) |
| 2-131 | ¹H NMR (300 MHz, MeOD) δ 8.48 (d, J = 7.9 Hz, 1H), 7.76 (d, J = 7.9 Hz, 1H), 5.10 (s, 2H), 4.54 (s, 2H), 3.95 (s, 3H), 3.65 (s, 3H), 2.57 (s, 3H) |
| 2-132 | ¹H NMR (300 MHz, MeOD) δ 8.41 (d, J = 8.0 Hz, 1H), 8.08 (d, J = 8.0 Hz, 1H), 4.95 (s, 2H), 4.59 (s, 2H), 4.05 (s, 3H), 3.98 (s, 3H), 3.49 (s, 3H) |
| 2-133 | ¹H NMR (300 MHz, CDCl₃) δ 8.24 (s, 1H), 7.23 (s, 1H), 5.05 (s, 2 H), 4.64 (s, 2H), 4.11 (s, 3H), 3.76 (s, 3H), 2.75 (s, 6H) |
| 2-134 | ¹H NMR (300 MHz, MeOD) δ 8.55 (d, J = 7.8 Hz, 1H), 7.75 (d, J = 7.8 Hz, 1H), 5.23 (s, 2H), 4.56 (s, 2H), 4.10 (s, 3H), 3.86 (s, 3H) |
| 2-135 | ¹H NMR (300 MHz, MeOD) δ 8.29 (d, J = 7.3 Hz, 1H), 7.90 (d, J = 7.2 Hz, 1H), 4.86 (s, 2H), 4.51 (s, 2H), 4.03 (s, 3H), 3.76 (s, 3H) |
| 2-136 | ¹H NMR (300 MHz, CDCl₃) δ 10.9 (brs, NH), 8.36 (d, J = 8.0 Hz, 1H), 7.81 (d, J = 8.0 Hz, 1H), 5.08 (s, 2H), 4.79 (s, 2H), 4.10 (s, 3H), 3.75 (s, 3H) |
| 2-137 | ¹H NMR (400 MHz, CDCl₃) δ 11.00 (brs, NH), 8.35 (d, J = 8.1 Hz, 1H), 7.82 (d, J = 8.1 Hz, 1H), 5.07 (s, 2H), 4.83 (s, 2H), 4.11 (s, 3H), 3.80 (s, 3H) |
| 4-1 | ¹H NMR (300 MHz, MeOD) δ 8.47 (d, J = 1.9 Hz, 1H), 8.28 (s, 1H), 7.81 (d, J = 8.0 Hz, 1H), 6.97 (q, J = 6.2 Hz, 1H), 5.18 (d, J = 12.1 Hz, 1H), 5.06 (d, J = 12.1 Hz, 1H), 4.58 (s, 2H), 3.90 (s, 3H), 3.85 (s, 3H), 3.72 (s, 3H), 1.92 (d, J = 6.2 Hz, 3H) |
| 4-2 | ¹H NMR (500 MHz, CDCl₃) δ 8.29 (d, J = 8.0 Hz, 1H), 7.67 (d, J = 8.0 Hz, 1H), 6.93 (q, J = 6.3 Hz, 1H), 5.24 (d, J = 12.4 Hz, 1H), 5.18 (d, J = 12.4 Hz, 1H), 4.77 (s, 3H), 4.30 (s, 3H), 4.04 (s, 3H), 3.78 (s, 3H), 1.99 (d, J = 6.3 Hz, 3H) |
| 4-3 | ¹H NMR (300 MHz, CDCl₃) δ 8.56 (d, J = 8.0 Hz, 1H), 7.64 (d, J = 8.0 Hz, 1H), 7.02 (q, J = 6.2 Hz, 1H), 4.57 (d, J = 13.2 Hz, 1H), 4.52 (d, J = 13.2 Hz, 1H), 4.29 (s, 3H), 4.01 (s, 3H), 3.96 (s, 3H), 3.77 (s, 3H), 2.00 (d, J = 6.2 Hz, 3H) |
| 4-4 | ¹H NMR (300 MHz, MeOD) δ 8.49 (d, J = 4.8 Hz, 1H), 7.71 (d, J = 4.8 Hz, 1H), 6.99 (q, J = 3.7 Hz, 1H), 5.31 (d, J = 7.3 Hz, 1H), 5.22 (d, J = 7.3 Hz, 1H), 4.88 (s, 2H), 4.33 (s, 3H), 3.95 (s, 3H), 3.82 (s, 3H), 2.00 (d, J = 3.7 Hz, 3H) |
| 4-8 | ¹H NMR (300 MHz, CDCl₃) δ 8.47 (d, J = 8.0 Hz, 1H), 7.69 (d, J = 8.0 Hz, 1H), 6.96 (q, J = 6.2 Hz, 1H), 5.29 (d, J = 12.1 Hz, 1H), 5.19 (d, J = 12.1 Hz, 1H), 4.85 (s, 2H), 4.30 (s, 3H), 4.14-4.24 (m, 2H), 3.94 (s, 3H), 1.98 (d, J = 6.2 Hz, 3H), 1.27 (t, J = 7.2 Hz, 3H) |
| 4-9 | ¹H NMR (500 MHz, CDCl₃) δ 8.56 (d, J = 8.0 Hz, 1H), 7.63 (d, J = 8.0 Hz, 1H), 7.01 (q, J = 6.3 Hz, 1H), 4.57 (d, J = 13.2 Hz, 1H), 4.52 (d, J = 13.2 Hz, 1H), 4.29 (s, 3H), 4.13-4.22 (m, 2H), 4.00 (s, 2H), 3.96 (s, 3H), 1.99 (d, J = 6.3 Hz, 3H) 1.28 (t, J = 7.3 Hz, 3H) |
| 4-10 | ¹H NMR (500 MHz, CDCl₃) δ 8.56 (d, J = 8.0 Hz, 1H), 7.63 (d, J = 8.0 Hz, 1H), 7.01 (q, J = 6.3 Hz, 1H), 4.57 (d, J = 13.2 Hz, 1H), 4.52 (d, J = 13.2 Hz, 1H), 4.29 (s, 3H), 4.12-4.23 (s, 2H), 4.00 (s, 2H), 3.96 (s, 3H), 1.99 (d, J = 6.2 Hz, 3H), 1.27 (t, J = 7.3 Hz, 3H) |
| 4-11 | ¹H NMR (300 MHz, CDCl₃) δ 8.47 (d, J = 1.9 Hz, 1H), 7.68 (d, J = 1.9 Hz, 1H), 6.94 (q, J = 6.2 Hz, 1H), 5.28 (d, J = 12.4 Hz, 1H), 5.20 (d, J = 12.1 Hz, 1H), 4.85 (s, 2H), 4.53-4.61 (m, 1H), 4.30 (s, 3H), 3.94 (s, 3H), 1.97 (d, J = 6.2 Hz, 3H), 1.83-1.93 (m, 2H), 1.73-1.83 (m, 2H), 1.47-1.53 (m, 2H), 1.39-1.47 (m, 2H), 1.32-1.39 (m, 2H) |
| 4-12 | ¹H NMR (300 MHz, CDCl₃) δ 8.49 (d, J = 7.7 Hz, 1H), 7.70 (d, J = 7.7 Hz, 1H), 6.97 (q, J = 6.0 Hz, 1H), 5.30 (d, J = 11.9 Hz, 1H), 5.22 (d, J = 11.9 Hz, 1H), 4.84-4.89 (m, 3H), 4.32 (s, 3H), 3.96 (s, 3H), 1.99 (d, J = 6.0 Hz, 3H), 1.30 (d, J = 6.6 Hz, 3H) |

A typical synthesis method of the compounds specified in Table 1-Table 4 is as follows:

Example 1. Synthesis of N-(1-methyl-1H-tetrazol-5-yl)-2-((1-methyl-1H-tetrazol-5-yl)methoxy)-6-(trifluoromethyl)nicotinamide (Compound No. 1-1)

Step 1)methyl 2-((1-methyl-1H-tetrazol-5-yl)methoxy)-6-(trifluoromethyl)nicotinate To a stirred solution of (1-methyl-1H-tetrazol-5-yl)methanol (2.00 g, 17.5 mmol) in tetrahydrofuran (45 ml) was added sodium hydride (60% in oil) (0.95 g, 23.3 mmol) at 0° C. The reaction mixture was stirred at room temperature for 1 hour, followed by addition of methyl 2-bromo-6-(trifluoromethyl)nicotinate (3.30 g, 11.6 mmol) and stirred at room temperature for 18 hours. When the reaction was completed, the reaction mixture was diluted with ethyl acetate and washed with water. The obtained organic layer was dried over anhydrous magnesium sulfate, and concentrated under reduced pressure. The residue was purified by column chromatography to give the desired compound 2.2 g (57%).

$^1$H NMR (500 MHz, CDCl$_3$) δ 8.41 (d, J=7.7 Hz, 1H), 7.47 (d, J=7.7 Hz, 1H), 5.85 (s, 2H), 4.32 (s, 3H), 3.95 (s, 3H)

Step 2) 2-((1-methyl-1H-tetrazol-5-yl)methoxy)-6-(trifluoromethyl)nicotinic acid To a stirred solution of methyl 2-((1-methyl-1H-tetrazol-5-yl)methoxy)-6-(trifluoromethyl)nicotinate (2.10 g, 6.64 mmol) obtained above in tetrahydrofuran (20 ml) and water (10 ml) was added lithium hydroxide hydrate (0.42 g, 9.96 mmol). The reaction mixture was stirred at room temperature for 12 hours or longer, and when the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound 1.62 g (80%), which was used without further purification.

$^1$H NMR (300 MHz, Acetone-d$_6$) δ 8.55 (d, J=7.7 Hz, 1H), 7.67 (d, J=7.7 Hz, 1H), 5.91 (s, 2H), 4.32 (s, 3H)

Step 3) N-(1-methyl-1H-tetrazol-5-yl)-2-((1-methyl-1H-tetrazol-5-yl)methoxy)-6-(trifluoromethyl)nicotinamide To a stirred solution of 2-((1-methyl-1H-tetrazol-5-yl)methoxy)-6-(trifluoromethyl)nicotinic acid (200 mg, 0.66 mmol) obtained above in N,N-dimethylformamide (2 ml) were added 5-amino-1-methyl-1H-tetrazole (85 mg, 0.86 mmol), diisopropylamine (0.14 ml, 0.99 mmol), and O-(7-azabenzotriazol-1-yl)-N,N,N',N'-tetramethyluronium hexafluorophosphate (380 mg, 0.99 mmol). The reaction mixture was stirred at room temperature for 24 hours, and when the reaction was completed, the solvent was removed under reduced pressure. The remaining mixture was diluted with ethyl acetate and washed with water. The obtained organic layer was dried over anhydrous magnesium sulfate, and concentrated under reduced pressure. The residue was purified by column chromatography to give the desired compound 51 mg (20%).

$^1$H NMR (300 MHz, CDCl$_3$) δ 10.6 (br, NH), 8.67 (d, J=7.7 Hz, 1H), 7.58 (d, J=7.7 Hz, 1H), 5.97 (s, 2H), 4.24 (s, 3H), 4.05 (s, 3H)

Example 2. Synthesis of N-(1-(difluoromethyl)-1H-tetrazol-5-yl)-2-((1-methyl-1H-tetrazol-5-yl)methoxy)-6-(trifluoromethyl)nicotinamide (Compound No. 1-4)

To a stirred solution of 2-((1-methyl-1H-tetrazol-5-yl)methoxy)-6-(trifluoromethyl)nicotinic acid (303 mg, 1.0 mmol) in acetonitrile (3.0 ml) was added carbonyldiimidazole (243 mg, 1.5 mmol). The reaction mixture was stirred at room temperature for 1 hour, followed by addition of 1-(difluoromethyl)-1H-tetrazol-5-amine (199 mg, 2.0 mmol) and 1,8-diazabicyclo[5.4.0]undec-7-ene (456 mg, 3.0 mmol) and stirred at 50° C. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 239 mg (57%).

$^1$H NMR (300 MHz, MeOD) δ 8.45 (d, J=7.8 Hz, 1H), 8.15 (t, J=55.0 Hz, 1H), 7.68 (d, J=7.8 Hz, 1H), 5.98 (s, 2H), 4.22 (s, 3H)

Example 3. Synthesis of 2-((1-(difluoromethyl)-1H-tetrazol-5-yl)methoxy)-N-methyl-N-(1-methyl-1H-tetrazol-5-yl)-6-(trifluoromethyl)nicotinamide (Compound No. 1-8)

To a stirred solution of 2-((1-(difluoromethyl)-1H-tetrazol-5-yl)methoxy)-6-(trifluoromethyl)nicotinic acid (156 mg, 0.46 mmol) in N,N-dimethylformamide (2 ml) was added carbonyldiimidazole (149 mg, 0.92 mmol). The reaction mixture was stirred at room temperature for 1 hour, followed by addition of 1,8-diazabicyclo[5.4.0]undec-7-ene (0.21 ml, 1.38 mmol) and N,1-dimethyl-1H-tetrazol-5-amine (156 mg, 1.38 mmol) and stirred for 1 hour. When the reaction was completed, the reaction mixture was acidified to pH 3 with 1N hydrochloric acid aqueous solution, extracted with ethyl acetate, and the obtained organic layer was dried over anhydrous magnesium sulfate, and concentrated under reduced pressure. The residue was purified by column chromatography to give the desired compound 60 mg (30%).

$^1$H NMR (300 MHz, CDCl$_3$) δ 8.01 (brs, 1H), 7.78 (t, J=57.1 Hz, 1H), 7.47 (brs, 1H), 5.91 (s, 2H), 4.00 (s, 3H), 3.51 (s, 3H)

Example 4. Synthesis of 4-chloro-N-(1-methyl-1H-tetrazol-5-yl)-2-((1-methyl-1H-tetrazol-5-yl)methoxy)-6-(trifluoromethyl)nicotinamide (Compound No. 1-13)

Step 1)ethyl (Z)-3-(3-ethoxy-3-oxopropanamido)-4,4,4-trifluorobut-2-enoate

To a stirred solution of ethyl (Z)-3-amino-4,4,4-trifluorobut-2-enoate (10 ml, 67.98 mmol) in dichloromethane (200 ml) was added pyridine (6.60 ml, 81.58 mmol) at 5° C. under nitrogen atmosphere. Then, ethyl malonyl chloride (13.05 ml, 81.58 mmol) was slowly subdivided and added for 1 hour at 20° C. or lower. The obtained brown solution was stirred at 5° C. for 3 hours and then reacted at room temperature for 15 hours. After washing with 1N aqueous hydrochloric acid solution, the mixture was washed with saturated sodium hydrogen carbonate solution, and the obtained organic layer was dried over anhydrous sodium sulfate, and concentrated under reduced pressure to give the desired compound 18.65 g, which was used without further purification.

$^1$H NMR (300 MHz, CDCl$_3$) δ 10.81 (s, 1H), 5.97 (s, 1H), 4.27 (q, J=7.2 Hz, 4H), 3.48 (s, 2H), 1.28-1.35 (m, 6H)

Step 2) Ethyl 4-hydroxy-2-oxo-6-(trifluoromethyl)-1,2-dihydropyridin-3-carboxylate To a stirred solution of ethyl (Z)-3-(3-ethoxy-3-oxopropanamido)-4,4,4-trifluorobut-2-enoate (18.65 g, 67.96 mmol) obtained above in ethanol (200 ml) was slowly subdivided and added potassium t-butoxide (6.34 g, 61.16 mmol) at 40° C. under nitrogen atmosphere and the reaction mixture was stirred at 70° C. for 3 hours. Then, the reaction was completed after stirring at 80° C. for 1 hour. The reaction mixture was concentrated, dissolved in water, and citric acid was added to precipitate a solid, and filtered. The residue was diluted with ethyl acetate and washed with water. The organic layer was dried over anhydrous sodium sulfate, concentrated and precipitated with dichloromethane to give a total of 12.00 g (70%).

$^1$H NMR (300 MHz, DMSO-d$_6$) δ 12.02 (br s, 1H), 6.80 (s, 1H), 4.25 (q, J=7.1 Hz, 2H), 1.25 (t, J=7.1 Hz, 3H)

Step 3) Ethyl 2,4-dichloro-6-(trifluoromethyl)nicotinate

Ethyl 4-hydroxy-2-oxo-6-(trifluoromethyl)-1,2-dihydropyridin-3-carboxylate (1.00 g, 8.98 mmol) obtained above was slowly dissolved in phosphoryl chloride (1.6 ml) at 0° C. in a sealed tube. Then, the mixture was stirred at 150° C. for 15 hours, and when the reaction was completed, the reaction mixture was quenched with ice and water, diluted with ethyl acetate and the organic layer was washed with saturated sodium hydrogen carbonate aqueous solution, dried over anhydrous sodium sulfate, and concentrated under reduced pressure. The residue was purified by column chromatography to give the desired compound 247 mg (23%).

$^1$H NMR (300 MHz, CDCl$_3$) δ 7.73 (s, 1H), 4.54 (q, J=7.1 Hz, 2H), 1.46 (t, J=7.1 Hz, 3H)

Step 4) Ethyl 4-chloro-2-((1-methyl-1H-tetrazol-5-yl)methoxy)-6-(trifluoromethyl)nicotinate To a stirred solution of (1-methyl-1H-tetrazol-5-yl)methanol (559 mg, 4.90 mmol) in dried tetrahydrofuran (16 ml) was added sodium hydride (60% in oil) (588 mg, 4.90 mmol) under nitrogen atmosphere and the reaction mixture was stirred for 20 minutes. The ethyl 2,4-dichloro-6-(trifluoromethyl)nicotinate (1.32 g, 4.90 mmol) obtained above was dissolved in dried tetrahydrofuran (6 ml) and then slowly subdivided and added. The reaction mixture was stirred at room temperature for 2 hours. When the reaction was completed, the reaction mixture was filtered through celite, and the filtrate was concentrated under reduced pressure. The residue was purified by column chromatography to give the desired compound 451 mg (25%).

$^1$H NMR (300 MHz, CDCl$_3$) δ 7.45 (s, 1H), 5.77 (s, 2H), 4.43 (q, J=7.1 Hz, 2H), 4.17 (s, 3H), 1.36 (t, J=7.1 Hz, 3H)

Step 5) 4-chloro-2-((1-methyl-1H-tetrazol-5-yl)methoxy)-6-(trifluoromethyl)nicotinic acid To a stirred solution of ethyl 4-chloro-2-((1-methyl-1H-tetrazol-5-yl)methoxy)-6-(trifluoromethyl)nicotinate (500 mg, 1.37 mmol) obtained above in tetrahydrofuran (4 ml) and water (2 ml) was added lithium hydroxide hydrate (115 mg, 2.73 mmol). The reaction mixture was stirred under reflux and stirred for 1 hour or more, and when the reaction was completed, reaction mixture was acidified to pH 3 with 1N hydrochloric acid aqueous solution and extracted three times with ethyl acetate. The organic layer was dried over anhydrous sodium sulfate, and concentrated under reduced pressure to give the desired compound 300 mg (72%), which was used without further purification.

$^1$H NMR (300 MHz, MeOD) δ 7.67 (s, 1H), 5.82 (s, 2H), 4.19 (s, 3H)

Step 6) 4-chloro-N-(1-methyl-1H-tetrazol-5-yl)-2-((1-methyl-1H-tetrazol-5-yl)methoxy)-6-(trifluoromethyl)nicotinamide To a stirred solution of 4-chloro-2-((1-methyl-1H-tetrazol-5-yl)methoxy)-6-(trifluoromethyl)nicotinic acid (165 mg, 0.54 mmol) obtained above in N,N-dimethylformamide (3 ml) was added carbonyldiimidazole (353 mg, 2.18 mmol). The reaction mixture was stirred at 50° C. for 4 hours, followed by addition of 5-amino-1-methyl-1H-tetrazole (337 mg, 3.40 mmol) and 1,8-diazabicyclo[5.4.0]undec-7-ene (0.53 mL, 3.56 mmol) and stirred at 50° C. for 15 hours. When the reaction was completed, the reaction mixture was acidified to pH 3 with 1N hydrochloric acid aqueous solution, extracted with ethyl acetate, and the obtained organic layer was dried over anhydrous magnesium sulfate, and concentrated under reduced pressure. The residue was purified by column chromatography to give the desired compound 32 mg (14%).

$^1$H NMR (300 MHz, Acetone-d$_6$) δ 10.89 (brs, NH), 7.83 (s, 1H), 5.96 (s, 2H), 4.27 (s, 3H), 4.07 (s, 3H)

Example 5. Synthesis of 4-methyl-N-(1-methyl-1H-tetrazol-5-yl)-2-((1-methyl-1H-tetrazol-5-yl)methoxy)-6-(trifluoromethyl)nicotinamide (Compound No. 1-15)

Step 1) (E)-1,1,1-trifluoro-4-methoxypent-3-en-2-one

To a stirred solution of 4-dimethylaminopyridine (339 mg, 2.77 mmol) in dichloromethane were very slowly added trifluoroacetic anhydride (42 ml, 29.22 mmol) and a solution of 2-methoxypropene (20 g, 26.56 mmol) in dichloromethane at 0° C. The reaction mixture was warmed to room temperature and stirred for 16 hours. After completion of the reaction, the reaction mixture was diluted with dichloromethane and washed with saturated aqueous sodium carbonate solution. The obtained organic layer was dried over anhydrous magnesium sulfate, and concentrated under reduced pressure to give the desired compound 36 g (77%), which was used without further purification.

$^1$H NMR (500 MHz, CDCl$_3$) δ 5.69 (s, 1H), 3.80 (s, 3H), 2.42 (s, 3H)

Step 2) Ethyl 2-hydroxy-6-(trifluoromethyl)nicotinate

To a stirred solution of (E)-1,1,1-trifluoro-4-methoxypent-3-en-2-one (5 g, 29.74 mmol) obtained above in ethanol (20 ml) were added ethyl malonate monoamide (3.9 g, 29.74 mmol) and sodium ethoxide (21 wt % in ethanol solution) (12 ml, 32.71 mmol). The reaction mixture was stirred at 80° C. for 18 hours, and when the reaction was completed, the reaction mixture was neutralized with 15% aqueous hydrochloric acid solution and extracted three times with ethyl acetate. The obtained organic layer was dried over anhydrous magnesium sulfate, and concentrated under reduced pressure. The residue was purified by column chromatography to give the desired compound 2.2 g (30%).

$^1$H NMR (500 MHz, CDCl$_3$) δ 11.89 (brs, 1H), 7.10 (s, 1H), 4.52 (q, J=6.9 Hz, 2H), 2.65 (s, 3H), 1.47 (t, J=6.9 Hz, 3H)

Step 3) Ethyl 4-methyl-2-((1-methyl-1H-tetrazol-5-yl)methoxy-6-(trifluoromethyl)nicotinate To a stirred solution of ethyl 2-hydroxy-6-(trifluoromethyl)nicotinate (300 mg, 1.20 mmol) obtained above in dimethylformamide were added 5-(chloromethyl)-1-methyl-1H-tetrazole (192 mg, 1.45 mmol) and potassium carbonate (500 mg, 3.61 mmol). The reaction mixture was stirred at 55° C. for 3 hours. When the reaction was completed, the reaction mixture was diluted with ethyl acetate and washed with water. The obtained organic layer was dried over magnesium sulfate, and concentrated under reduced pressure. The residue was purified by column chromatography to give the desired compound 403 mg (97%).

$^1$H NMR (300 MHz, CDCl$_3$) δ 7.28 (s, 1H), 5.75 (s, 2H), 4.41 (q, J=7.2 Hz, 2H), 4.20 (s, 3H), 2.44 (s, 3H), 1.35 (t, J=7.2 Hz, 3H)

Step 4) 4-methyl-2-((1-methyl-1H-tetrazol-5-yl)methoxy)-6-(trifluoromethyl)nicotinic acid To a stirred solution of ethyl 4-methyl-2-((1-methyl-1H-tetrazol-5-yl)methoxy-6-(trifluoromethyl)nicotinate (403 mg, 1.17 mmol) in tetrahydrofuran was added lithium hydroxide hydrate (73 mg, 1.75 mmol). The reaction mixture was stirred for 1 hour at 50° C. After the reaction was completed, the reaction mixture was acidified to pH 3 with 1N hydrochloric acid aqueous solution, and extracted with ethyl acetate and the obtained organic layer was dried with magnesium sulfate and concentrated under reduced pressure to give the desired compound 363 mg (98%), which was used without further purification.

$^1$H NMR (500 MHz, Acetone-d$_6$) δ 7.50 (s, 1H), 5.83 (s, 2H), 4.25 (s, 3H), 2.49 (s, 3H)

Step 5) 4-methyl-N-(1-methyl-1H-tetrazol-5-yl)-2-((1-methyl-1H-tetrazol-5-yl)methoxy)-6-(trifluoromethyl)nicotinamide To a stirred solution of 4-methyl-2-((1-methyl-1H-tetrazol-5-yl)methoxy)-6-(trifluoromethyl)nicotinic acid (150 mg, 0.47 mmol) obtained above in acetonitrile was added carbonyldiimidazole (153 mg, 0.95 mmol). The reaction mixture was stirred at room temperature for 2 hours, followed by addition of 5-amino-1-methyl-1H-tetrazole (93 mg, 0.95 mmol) and 1,8-diazabicyclo[5.4.0]undec-7-ene (0.21 ml, 1.42 mmol) and stirred at 50° C. for 16 hours. After completion of the reaction, the reaction mixture was diluted with ethyl acetate and washed with 1N hydrochloric acid solution and the organic layer was dried over magnesium sulfate and concentrated under reduced pressure. The residue was purified by column chromatography to give the desired compound 181 mg (97%).

$^1$H NMR (300 MHz, CDCl$_3$) δ 11.10 (brs, NH), 7.31 (s, 1H), 5.83 (s, 2H), 4.16 (s, 3H), 4.09 (s, 3H), 2.55 (s, 3H)

Example 6. Synthesis of 5-methyl-N-(1-methyl-1H-tetrazol-5-yl)-2-((1-methyl-1H-tetrazol-5-yl)methoxy)-6-(trifluoromethyl)nicotinamide (Compound No. 1-17)

Step 1) methyl-5-methyl-2-(((1-methyl-1H-tetrazol-5-yl)methoxy)-6-(trifluoromethyl)nicotinate To a stirred solution of methyl 5-bromo-2-(((1-methyl-1H-tetrazol-5-yl)methoxy)-6-(trifluoromethyl)nicotinate (280 mg, 0.75 mmol) in 1,4-dioxane were added potassium carbonate (193 mg, 1.4 mmol), tetrakis(triphenylphosphine)palladium(0) (20 mg, 0.07 mmol), and trimethylboroxine (0.2 ml, 1.4 mmol) under nitrogen atmosphere and the reaction mixture was stirred at 50° C. Upon completion of the reaction, the solvent was removed under reduced pressure, and the remaining mixture was diluted with ethyl acetate and washed with water. The obtained organic layer was dried over anhydrous magnesium sulfate, and concentrated under reduced pressure. The residue was purified by column chromatography to give the desired compound 220 mg (88%).

$^1$H NMR (300 MHz, CDCl$_3$) δ 8.20 (s, 1H), 5.82 (s, 2H), 4.29 (s, 3H), 3.93 (s, 3H), 2.49-2.47 (m, 3H)

Step 2) 5-methyl-2-(((1-methyl-1H-tetrazol-5-yl)methoxy)-6-(trifluoromethyl)nicotinic acid To a stirred solution of methyl-5-methyl-2-(((1-methyl-1H-tetrazol-5-yl)methoxy)-6-(trifluoromethyl)nicotinate (200 mg, 0.72 mmol) obtained above in tetrahydrofuran/water (3:1, 2 ml) was added lithium hydroxide hydrate (46 mg, 1.08 mmol). After completion of the reaction, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound 150 mg (60%), which was used without further purification.

$^1$H NMR (300 MHz, MeOD) δ 8.31 (s, 1H), 5.82 (s, 2H), 4.26 (s, 3H), 2.49-2.47 (m, 3H)

Step 3) 5-methyl-N-(1-methyl-1H-tetrazol-5-yl)-2-((1-methyl-1H-tetrazol-5-yl)methoxy)-6-(trifluoromethyl)nicotinamide To a stirred solution of 5-methyl-2-(((1-methyl-1H-tetrazol-5-yl)methoxy)-6-(trifluoromethyl)nicotinic acid (130 mg, 0.41 mmol) in N,N-dimethylformamide (1.2 ml) was added carbonyldiimidazole (133 mg, 0.82 mmol). The reaction mixture was stirred at room temperature for 1 hour, followed by addition of ethyl 5-amino-1-methyl-1H-tetrazole (81 mg, 0.82 mmol) and 1,8-diazabicyclo[5.4.0]undec-7-ene (0.19 ml, 1.35 mmol) and stirred at 50° C. After completion of the reaction, the reaction mixture was acidified to pH 3 with 1N hydrochloric acid aqueous solution and extracted with ethyl acetate. The obtained organic layer was dried over anhydrous magnesium sulfate and concentrated under reduced pressure. The residue was purified by column chromatography to give the desired compound 130 mg (79%).

¹H NMR (300 MHz, CDCl₃) δ 10.60 (brs, NH), 8.43 (s, 1H), 5.95 (s, 2H), 4.21 (s, 3H), 4.04 (s, 3H), 2.51 (s, 3H)

Example 7. Synthesis of N-(1-methyl-1H-tetrazol-5-yl)-2-((1-methyl-1H-tetrazol-5-yl)methoxy)-6-(trifluoromethyl)-5-vinylnicotinamide (Compound No. 1-18)

To a stirred solution of 5-iodo-N-(1-methyl-1H-tetrazol-5-yl)-2-((1-methyl-1H-tetrazol-5-yl)methoxy)-6-(trifluoromethyl)nicotinamide (510 mg, 1.0 mmol) in ethanol/toluene (2 ml/5 ml) were added potassium vinyltrifluoroborate (266 mg, 2.0 mmol), tetrakis(triphenylphosphine)palladium (155 mg, 0.1 mmol), and potassium carbonate (276 mg, 2.0 mmol). The reaction mixture was stirred at 80° C. When the reaction was completed, the solvent was removed under reduced pressure, and the mixture was diluted with ethyl acetate and washed with aqueous ammonium chloride solution. The obtained organic layer was dried over anhydrous magnesium sulfate, and concentrated under reduced pressure. The residue was purified by column chromatography to give the desired compound 241 mg (59%).
¹H NMR (300 MHz, MeOD) δ 8.69 (s, 1H), 7.06 (d, J=1.3 Hz, 1H), 5.95 (d, J=10.4 Hz, 3H), 5.55 (d, J=26.7 Hz, 1H), 4.23 (s, 3H), 4.05 (s, 3H)

Example 8. Synthesis of 5-ethyl-N-(1-methyl-1H-tetrazol-5-yl)-2-((1-methyl-1H-tetrazol-5-yl)methoxy)-6-(trifluoromethyl)nicotinamide (Compound No. 1-19)

To a stirred solution of N-(1-methyl-1H-tetrazol-5-yl)-2-((1-methyl-1H-tetrazol-5-yl)methoxy)-6-(trifluoromethyl)-5-vinylnicotinamide (410 mg, 1.0 mmol) in methanol (10 ml) was added palladium/carbon (40 mg) and the reaction mixture was stirred under hydrogen gas balloon. When the reaction was completed, the reaction mixture was filtered through celite. The filtrate was concentrated under reduced pressure, and purified by column chromatography to give the desired compound 270 mg (69%).
¹H NMR (300 MHz, MeOD) δ 8.41 (s, 1H), 5.91 (s, 2H), 4.23 (s, 3H), 4.05 (s, 3H), 2.86 (d, J=7.0 Hz, 2H), 1.29 (t, J=7.5 Hz, 3H)

Example 9. Synthesis of 6-chloro-N-(1-methyl-1H-tetrazol-5-yl)-2-((1-methyl-1H-tetrazol-5-yl)methoxy)nicotinamide (Compound No. 1-20)

Step 1) methyl 6-chloro-2-((1-methyl-1H-tetrazol-5-yl)methoxy)nicotinate

To a stirred solution of (1-methyl-1H-tetrazol-5-yl)methanol (100 mg, 0.87 mmol) in tetrahydrofuran (5 ml) was added sodium hydride (60% in oil) (105 mg, 2.61 mmol) at 0° C. The reaction mixture was stirred for 5 minutes, followed by slow addition of a solution of methyl 2,6-dichloronicotinate (200 mg, 0.97 mmol) in tetrahydrofuran (5 ml) over 10 minutes and was stirred at 0° C. for 1 hour. When the reaction was completed, the reaction mixture was acidified to pH 3 with 1N hydrochloric acid aqueous solution, extracted with ethyl acetate, and the obtained organic layer was dried over anhydrous magnesium sulfate, and concentrated under reduced pressure. The residue was purified by column chromatography to give the desired compound 165 mg (60%).
¹H NMR (300 MHz, CDCl₃) δ 8.23 (d, J=7.9 Hz, 1H), 7.11 (d, J=7.9 Hz, 1H), 5.80 (s, 2H), 4.33 (s, 3H), 3.90 (s, 3H)

Step 2) 6-chloro-2-((1-methyl-1H-tetrazol-5-yl)methoxy)nicotinic acid

To a stirred solution of methyl 6-chloro-2-((1-methyl-1H-tetrazol-5-yl)methoxy)nicotinate (160 mg, 0.56 mmol) in tetrahydrofuran (5 ml) was added 1N-lithium hydroxide (0.56 ml, 0.84 mmol) and the reaction mixture was stirred at room temperature for 30 minutes. When the reaction was completed, the reaction mixture was acidified to pH 3 with 1N hydrochloric acid aqueous solution, extracted with ethyl acetate, and the obtained organic layer was dried over anhydrous magnesium sulfate, and concentrated under reduced pressure to afford 121 mg (80%) of the desired compound in a solid state.
¹H NMR (300 MHz, CDCl₃) δ 8.25 (d, J=7.9 Hz, 1H), 7.09 (d, J=7.9 Hz, 1H), 5.76 (s, 2H), 4.28 (s, 3H)

Step 3) 6-chloro-N-(1-methyl-1H-tetrazol-5-yl)-2-((1-methyl-1H-tetrazol-5-yl)methoxy)nicotinamide To a stirred solution of 6-chloro-2-((1-methyl-1H-tetrazol-5-yl)methoxy)nicotinic acid (100 mg, 0.371 mmol) in N,N-dimethylformamide (6 ml) was added carbonyldiimidazole (110 mg, 0.68 mmol). The reaction was stirred at room temperature for 1 hour, followed by addition of 5-amino-1-methyl-1H-tetrazole (68 mg, 0.68 mmol) and 1,8-diazabicyclo[5.4.0]undec-7-ene (0.12 ml, 0.68 mmol) and stirred at room temperature for 16 hours. When the reaction was completed, the reaction mixture was acidified to pH 3 with 1N hydrochloric acid aqueous solution, extracted with ethyl acetate, and the obtained organic layer was dried over anhydrous magnesium sulfate, and concentrated under reduced pressure. The residue was purified by column chromatography to give the desired compound 80 mg (61%).
¹H NMR (300 MHz, CDCl₃) δ 110.16 (brs, NH), 8.52 (d, J=7.8 Hz, 1H), 7.27 (d, J=7.8 Hz, 1H), 5.92 (s, 2H), 4.34 (s, 3H), 4.09 (s, 3H)

Example 10. Synthesis of 2-((1-(difluoromethyl)-1H-tetrazol-5-yl)methoxy)-N-(1-methyl-1H-tetrazol-5-yl)-6-(trifluoromethyl)nicotinamide (Compound No. 1-26)

To a stirred solution of 2-((1-(difluoromethyl)-1H-tetrazol-5-yl)methoxy)-6-(trifluoromethyl)nicotinic acid (150 mg, 0.44 mmol) in N,N-dimethylformamide (2 ml) was added carbonyldiimidazole (143 mg, 0.88 mmol). The reaction mixture was stirred at room temperature for 1 hour, followed by addition of 1,8-diazabicyclo[5.4.0]undec-7-ene (0.20 ml, 1.32 mmol) and 5-amino-1-methyl-1H-tetrazole (130 mg, 1.32 mmol) and was stirred for 1 hour. When the reaction was completed, the reaction mixture was acidified to pH 3 with 1N hydrochloric acid aqueous solution, extracted with ethyl acetate, and the obtained organic layer was dried over anhydrous magnesium sulfate, and concentrated under reduced pressure. The residue was purified by column chromatography to give the desired compound 55 mg (30%).
¹H NMR (300 MHz, CDCl₃) δ 10.3 (brs, NH), 8.78 (d, J=7.6 Hz, 1H), 7.80 (t, J=56.1 Hz, 1H), 7.63 (d, J=7.6 Hz, 1H), 6.18 (s, 2H), 4.10 (s, 3H)

Example 11. Synthesis of 2-(methyl((1-methyl-1H-tetrazol-5-yl)methyl)amino)-N-(1-methyl-1H-tetrazol-5-yl)-6-(trifluoromethyl)nicotinamide (Compound No. 1-27)

To a stirred solution of 2-bromo-N-(1-methyl-1H-tetrazol-5-yl)-6-(trifluoromethyl)nicotinamide (256 mg, 0.73 mmol) in N,N-dimethylformamide (2 ml) were added N-methyl-1-(1-methyl-1H-tetrazol-5-yl)methylamine (184 mg, 1.45 mmol) and potassium carbonate (302 mg, 2.19 mmol) and the reaction mixture was stirred at 70° C. for 24 hours. When the reaction was completed, the reaction mixture was acidified to pH 3 with 1N hydrochloric acid aqueous solution, extracted with ethyl acetate, and the obtained organic layer was dried over anhydrous magnesium sulfate, and concentrated under reduced pressure. The residue was purified by column chromatography to give the desired compound 40 mg (14%).

$^1$H NMR (300 MHz, DMSO-$d_6$) δ 12.1 (brs, NH) 8.15 (d, J=7.7 Hz, 1H), 7.25 (d, J=7.7 Hz, 1H), 5.00 (s, 2H), 4.07 (s, 3H), 3.97 (s, 3H) 3.18 (s, 3H)

Example 12. Synthesis of N-(1-methyl-1H-tetrazol-5-yl)-2-((1-methyl-1H-tetrazol-5-yl)thio)-6-(trifluoromethyl)nicotinamide (Compound No. 1-40)

To a stirred solution of 2-bromo-N-(1-methyl-1H-tetrazol-5-yl)-6-(trifluoromethyl)nicotinamide (349 mg, 1.0 mmol) and 1-methyl-1H-tetrazol-5-thiol (232 mg, 2.0 mmol) in N,N-dimethylformamide (2.0 ml) was added sodium hydride (60% in oil) (80 mg, 2.0 mmol) and the reaction mixture was stirred at room temperature. After completion of the reaction, the reaction mixture was neutralized with saturated aqueous ammonium chloride solution, extracted with ethyl acetate, and the obtained organic layer was dried over anhydrous magnesium sulfate, and concentrated under reduced pressure. The residue was purified by column chromatography to give the desired compound 280 mg (73%).

$^1$H NMR (300 MHz, CDCl$_3$) δ 8.92 (brs, 1H), 7.66 (brs, 1H), 4.09 (brs, 2H), 3.99 (s, 3H)

Example 13. Synthesis of N-(1-methyl-1H-tetrazol-5-yl)-2-((1-methyl-1H-tetrazol-5-yl)methoxy)-6-(trifluoromethyl)pyridin-3-carbothioamide (Compound No. 1-43)

To a stirred solution of N-(1-methyl-1H-tetrazol-5-yl)-2-((1-methyl-1H-tetrazol-5-yl)methoxy)-6-(trifluoromethyl)nicotinamide (414 mg, 1.0 mmol) in 1.2-dioxane (4.0 ml) was added Lawesson's reagent (606 mg, 1.5 mmol) and the reaction mixture was heated and stirred at 120° C. When the reaction was completed, the reaction mixture was cooled and diluted with water, extracted with ethyl acetate, and the obtained organic layer was dried over anhydrous magnesium sulfate, and concentrated under reduced pressure. The residue was purified by column chromatography to give the desired compound 270 mg (52%).

$^1$H NMR (300 MHz, MeOD) δ 8.32 (d, J=7.8 Hz, 1H), 7.59 (d, J=7.8 Hz, 1H), 5.84 (s, 2H), 4.21 (s, 3H), 3.99 (s, 3H)

Example 14. Synthesis of 2-((1-methyl-1H-1,2,4-triazol-5-yl)methoxy)-N-(1-methyl-1H-tetrazol-5-yl)-6-(trifluoromethyl)nicotinamide (Compound No. 1-45)

To a stirred solution of 2-bromo-N-(1-methyl-1H-tetrazol-5-yl)-6-(trifluoromethyl)nicotinamide (351 mg, 1.0 mmol) and (1-methyl-1H-1,2,4-triazol-5-yl)methanol (2.0 mmol) in N,N-dimethylformamide (2.0 ml) was added sodium hydride (60% in oil) (226 mg, 2.0 mmol) and the reaction mixture was stirred at room temperature. After completion of the reaction, the reaction mixture was neutralized with saturated aqueous ammonium chloride solution, diluted with water, extracted with ethyl acetate, and the obtained organic layer was dried over anhydrous magnesium sulfate, and concentrated under reduced pressure. The residue was purified by column chromatography to give the desired compound 230 mg (60%).

$^1$H NMR (300 MHz, MeOD) δ 8.50 (d, J=7.8 Hz, 1H), 7.93 (s, 1H), 7.65 (d, J=7.5 Hz. 1H), 5.78 (s, 2H), 4.06 (s, 3H), 4.05 (s, 3H)

Example 15. Synthesis of N-(1-methyl-1H-tetrazol-5-yl)-2-(((1-methyl-1H-tetrazol-5-yl)methoxy)methyl)-6-(trifluoromethyl)nicotinamide (Compound No. 1-61)

To a stirred solution of 2-(((1-methyl-1H-tetrazol-5-yl)methoxy)methyl)-6-(trifluoromethyl)nicotinic acid (50 mg, 0.157 mmol) in N,N-dimethylformamide (4 ml) was added carbonyldiimidazole (39 mg, 0.24 mmol). The reaction mixture was stirred at room temperature for 1 hour, followed by addition of 5-amino-1-methyl-1H-tetrazole (24 mg, 0.24 mmol) and 1,8-diazabicyclo[5.4.0]undec-7-ene (0.05 ml, 0.32 mmol) and stirred at room temperature for 16 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 33 mg (53%).

$^1$H NMR (300 MHz, CDCl$_3$) δ 11.55 (brs, NH), 8.45 (d, J=8.0 Hz, 1H), 7.85 (d, J=8.0 Hz, 1H), 5.09 (s, 2H), 4.92 (s, 2H), 4.10 (s, 3H), 4.06 (s, 3H)

Example 16. Synthesis of 2-(((1-(difluoromethyl)-1H-tetrazol-5-yl)methoxy)methyl)-N-(1-methyl-1H-tetrazol-5-yl)-6-(trifluoromethyl)nicotinamide (Compound No. 1-85)

Step 1) methyl 2-methyl-6-(trifluoromethyl)nicotinate

To a stirred solution of methyl acetoacetate (38.0 g, 0.326 mol) in acetic acid (150 ml) were added (E)-4-ethoxy-1,1,1-trifluorobut-3-en-2-one (50 g, 0.297 mol)) and ammonium acetate (80.1 g, 1.04 mol). The reaction mixture was stirred at 110° C. for 5 hours. When the reaction was completed, the reaction mixture was cooled and diluted with water, extracted with ethyl acetate, and the obtained organic layer was dried over anhydrous magnesium sulfate, and concentrated under reduced pressure. The residue was purified by column chromatography to give the desired compound 50.7 g (78%).

$^1$H NMR (300 MHz, CDCl$_3$) δ 8.36 (d, J=8.25 Hz, 1H), 7.60 (d, J=8.25 Hz, 1H), 3.97 (s, 3H), 2.90 (s, 3H)

Step 2) methyl 2-(bromomethyl)-6-(trifluoromethyl)nicotinate

To a stirred solution of methyl 2-methyl-6-(trifluoromethyl)nicotinate (20 g, 91.32 mmol) obtained above in 1,2-dichloroethane (150 ml) were added N-bromosuccinimide (19.5 g, 109.5 mmol) and 2,2'-azobis(2-methylpropionitrile) (4.5 g, 27.4 mmol). The reaction mixture was stirred at 90° C. for 5 hours. The reaction mixture was cooled to room temperature, diluted with 150 ml of a mixed solvent (n-hexane/ethyl acetate=10/1), stirred for 5 minutes, filtered to remove the precipitated solid, and the filtrate was concentrated under reduced pressure. The residue was purified by column chromatography to give the desired compound 19.0 g (70%).

$^1$H NMR (500 MHz, CDCl$_3$) δ 8.46 (d, J=8.0 Hz, 1H), 7.73 (d, J=8.0 Hz, 1H), 5.06 (s, 2H), 4.04 (s, 3H)

Step 3) methyl 2-(((1-(difluoromethyl)-1H-tetrazol-5-yl)methoxy)methyl)-6-(trifluoromethyl)nicotinate To a stirred solution of (1-(difluoromethyl)-1H-tetrazol-5-yl)methanol (130 mg, 0.87 mmol) in tetrahydrofuran (15 ml) was added sodium hydride (60% in oil) (80 mg, 2.0 mmol) at 0° C. The reaction mixture was stirred for 5 minutes, followed by addition of methyl 2-(bromomethyl)-6-(trifluoromethyl)nicotinate (200 mg, 0.67 mmol) and stirred at room temperature for 1 hour. When the reaction was completed, the reaction mixture was diluted with ethyl acetate and washed with water. The obtained organic layer was dried over anhydrous magnesium sulfate, and concentrated under reduced pressure. The residue was purified by column chromatography to give the desired compound 98 mg (40%).

$^1$H NMR (300 MHz, CDCl$_3$) δ 8.53 (d, J=8.0 Hz, 1H), 7.77 (d, J=8.0 Hz, 1H), 7.71 (t, J=56.5 Hz, 1H), 5.27 (s, 2H), 5.19 (s, 2H), 3.93 (s, 3H)

Step 4) 2-(((1-(difluoromethyl)-1H-tetrazol-5-yl)methoxy)methyl)-6-(trifluoromethyl)nicotinic acid To a stirred solution of methyl 2-(((1-(difluoromethyl)-1H-tetrazol-5-yl)methoxy)methyl)-6-(trifluoromethyl)nicotinate (98 mg, 0.277 mmol) in tetrahydrofuran (4 ml) was added 2N-sodium hydroxide solution (0.42 ml, 0.84 mmol) and the reaction mixture was stirred at room temperature for 2 hours. When the reaction was completed, the reaction mixture was acidified to pH 3 with 1N hydrochloric acid aqueous solution, extracted with ethyl acetate, and the obtained organic layer was dried over anhydrous magnesium sulfate, and concentrated under reduced pressure to give the desired compound 90 mg (95%), which was used without further purification.

$^1$H NMR (300 MHz, CDCl$_3$) δ 8.56 (d, J=8.0 Hz, 1H), 7.80 (d, J=8.0 Hz, 1H), 7.73 (t, J=56.5 Hz, 1H), 5.28 (s, 2H), 5.20 (s, 2H)

Step 5) 2-(((1-(difluoromethyl)-1H-tetrazol-5-yl)methoxy)methyl)-N-(1-methyl-1H-tetrazol-5-yl)-6-(trifluoromethyl)nicotinamide To a stirred solution of 2-(((1-(difluoromethyl)-1H-tetrazol-5-yl)methoxy)methyl)-6-(trifluoromethyl)nicotinic acid (70 mg, 0.20 mmol) in N,N-dimethylformamide (3 ml) was added carbonyldiimidazole (65 mg, 0.40 mmol). The reaction mixture was stirred at room temperature for 1 hour, followed by addition of 5-amino-1-methyl-1H-tetrazole (68 mg, 0.68 mmol) and 1,8-diazabicyclo[5.4.0]undec-7-ene (0.06 ml, 0.40 mmol) and stirred at room temperature for 16 hours. When the reaction was completed, the reaction mixture was acidified to pH 3 with 1N hydrochloric acid aqueous solution, extracted with ethyl acetate, and the obtained organic layer was dried over anhydrous magnesium sulfate, and concentrated under reduced pressure. The residue was purified by column chromatography to give the desired compound 32 mg (37%).

$^1$H NMR (300 MHz, DMSO-d$_6$) δ 11.96 (brs, NH), 8.50 (d, J=8.0 Hz, 1H), 8.41 (t, J=56.4 Hz, 1H), 8.14 (d, J=8.0 Hz, 1H), 5.15 (s, 2H), 5.05 (s, 2H), 3.97 (s, 3H)

Example 17. Synthesis of 2-((methyl((1-methyl-1H-tetrazol-5-yl)methyl)amino)-N-((1-methyl-1H-tetrazol-5-yl)-6-(trifluoromethyl)nicotinamide (Compound No. 1-86)

Step 1) methyl 2-((methyl((1-methyl-1H-tetrazol-5-yl)methyl)amino)methyl)-6-(trifluoromethyl)nicotinate To a stirred solution of N-methyl-1-(1-methyl-1H-tetrazol-5-yl)methanamine (61 mg, 0.48 mmol) in N,N-dimethylformamide (4 ml) were added potassium carbonate (180 mg, 1.31 mmol) and methyl 2-(bromomethyl)-6-(trifluoromethyl)nicotinate (130 mg, 0.436 mmol) and the reaction mixture was stirred at room temperature for 3 hours. When the reaction was completed, the reaction mixture was diluted with water, extracted with ethyl acetate, and the obtained organic layer was dried over anhydrous magnesium sulfate, and concentrated under reduced pressure. The residue was purified by column chromatography to give the desired compound 55 mg (36%).

$^1$H NMR (300 MHz, CDCl$_3$) δ 8.36 (d, J=8.1 Hz, 1H), 7.73 (d, J=8.1 Hz, 1H), 4.22 (s, 2H), 4.07 (s, 3H), 4.01 (s, 2H), 3.96 (s, 3H), 2.31 (s, 3H)

Step 2) 2-((methyl((1-methyl-1H-tetrazol-5-yl)methyl)amino)methyl)-6-(trifluoromethyl)nicotinic acid To a stirred solution of methyl 2-((methyl((1-methyl-1H-tetrazol-5-yl)methyl)amino)methyl)-6-(trifluoromethyl)nicotinate (55 mg, 0.16 mmol) in methanol (3 ml) and tetrahydrofuran (1 ml) was added 2N-sodium hydroxide solution (0.24 ml, 0.48 mmol) and the reaction mixture was stirred at room temperature for 1 hour. When the reaction was completed, the reaction mixture was acidified to pH 3 with 1N hydrochloric acid aqueous solution, and concentrated under reduced pressure. To the residue was added a solution of 20% methanol/dichloromethane (20 ml) and the reaction mixture was stirred for 10 minutes, and filtered to remove insoluble solid. The filtrate was concentrated under reduced pressure and dried to afford 50 mg (85%) of the desired compound.

$^1$H NMR (300 MHz, DMSO-d$_6$) δ 8.56 (d, J=8.1 Hz, 1H), 8.08 (d, J=8.1 Hz, 1H), 4.87 (s, 2H), 4.65 (s, 2H), 4.08 (s, 3H), 2.80 (s, 3H)

Step 3) 2-((methyl((1-methyl-1H-tetrazol-5-yl)methyl)amino)methyl)-N-(1-methyl-1H-tetrazol-5-yl)-6-(trifluoromethyl)nicotinamide To a stirred solution of 2-((methyl((1-methyl-1H-tetrazol-5-yl)methyl)amino)methyl)-6-(trifluoromethyl)nicotinic acid (60 mg, 0.16 mmol) in N,N-dimethylformamide (4 ml) was added carbonyldiimidazole (53 mg, 0.32 mmol). The reaction mixture was stirred at room temperature for 1 hour, followed by addition of 5-amino-1-methyl-1H-tetrazole (33 mg, 0.32 mmol) and 1,8-diazabicyclo[5.4.0]undec-7-ene (0.05 ml, 0.32 mmol) and stirred at room temperature for 16 hours. When the reaction was completed, the reaction mixture was acidified to pH 3 with 1N hydrochloric acid aqueous solution, extracted with ethyl acetate, and the obtained organic layer was dried over anhydrous magnesium sulfate, and concentrated under reduced pressure. The residue was purified by column chromatography to give the desired compound 30 mg (45%).

$^1$H NMR (300 MHz, CDCl$_3$) δ 13.25 (brs, NH), 8.42 (d, J=8.0 Hz, 1H), 7.79 (d, J=8.0 Hz, 1H), 4.26 (s, 2H), 4.12 (s, 2H), 4.11 (s, 3H), 4.06 (s, 3H), 2.66 (s, 3H)

Example 18. Synthesis of 2-((methoxy((1-methyl-1H-1,2,4-triazol-5-yl)methyl)amino)methyl)-N-(1-methyl-1H-tetrazol-5-yl)-6-(trifluoromethyl)nicotinamide (Compound No. 1-91)

Step 1) O-methyl-N-((4-methyl-4H-1,2,4-triazol-3-yl)methyl)hydroxylamine

To a stirred solution of 3-(chloromethyl)-4-methyl-4H-1,2,4-triazole (280 mg, 2.13 mmol) in 1,4-dioxane (4 ml)/water (2 ml) were added O-methylhydroxylamine hydrochloride (0.47 g, 5.7 mmol), potassium carbonate (1.0 g, 7.6 mmol), and sodium iodide (85 mg, 0.57 mmol). The mixture was stirred at 70° C. for 16 hours. When the reaction was completed, the reaction mixture was diluted with water, extracted with ethyl acetate, and the obtained organic layer was dried over anhydrous magnesium sulfate, and concentrated under reduced pressure. The residue was purified by column chromatography to give the desired compound 200 mg (66%).

$^1$H NMR (300 MHz, CDCl$_3$) δ 7.84 (s, 1H), 4.19 (s, 2H), 3.93 (s, 3H), 3.50 (s, 3H)

Step 2) methyl 2-(methoxy(1-methyl-1H-1,2,4-triazol-5-yl)methyl)amino)methyl)-6-(trifluoromethyl)nicotinate To a stirred solution of O-methyl-N-((4-methyl-4H-1,2,4-triazol-3-yl)methyl)hydroxylamine (95 mg, 0.67 mmol) obtained above in N,N-dimethylformamide (5 ml) were added potassium carbonate (319 mg, 2.31 mmol) and methyl 2-(bromomethyl)-6-(trifluoromethyl)nicotinate (230 mg, 0.77 mmol). The reaction mixture was stirred at 70° C. for 3 hours. When the reaction was completed, the reaction mixture was diluted with water, extracted with ethyl acetate, and the obtained organic layer was dried over anhydrous magnesium sulfate, and concentrated under reduced pressure. The residue was purified by column chromatography to give the desired compound 60 mg (25%).

$^1$H NMR (500 MHz, CDCl$_3$) δ 8.29 (d, J=8.2 Hz, 1H), 7.84 (s, 1H), 7.72 (d, J=8.2 Hz, 1H), 4.56 (s, 2H), 4.13 (s, 2H), 3.95 (s, 3H), 3.94 (s, 3H), 3.07 (s, 3H)

Step 3) 2-(methoxy(1-methyl-1H-1,2,4-triazol-5-yl)methyl)amino)methyl)-6-(trifluoromethyl)nicotinic acid To a stirred solution of methyl 2-(methoxy(1-methyl-1H-1,2,4-triazol-5-yl)methyl)amino)methyl)-6-(trifluoromethyl)nicotinate (60 mg, 0.167 mmol) in methanol (2 ml) and tetrahydrofuran (1 ml) was added 1N-lithium hydroxide solution (0.39 ml, 0.39 mmol) and the reaction mixture was stirred at room temperature for 2 hours. When the reaction was completed, the reaction mixture was acidified to pH 3 with 1N hydrochloric acid aqueous solution, extracted with ethyl acetate, and the obtained organic layer was dried over anhydrous magnesium sulfate, and concentrated under reduced pressure to give the desired compound 55 mg (95%), which was used without further purification.

$^1$H NMR (500 MHz, CDCl$_3$) δ 8.44 (d, J=8.2 Hz, 1H), 7.95 (s, 1H), 7.80 (d, J=8.2 Hz, 1H), 4.55 (s, 2H), 4.20 (s, 2H), 3.94 (s, 3H), 3.19 (s, 3H)

Step 4) 2-((methoxy((1-methyl-1H-1,2,4-triazol-5-yl)methyl)amino)methyl)-N-(1-methyl-1H-tetrazol-5-yl)-6-(trifluoromethyl)nicotinamide To a stirred solution of 2-(methoxy(1-methyl-1H-1,2,4-triazol-5-yl)methyl)amino)methyl)-6-(trifluoromethyl)nicotinic acid (50 mg, 0.15 mmol) in N,N-dimethylformamide (5 ml) was added carbonyldiimidazole (50 mg, 0.30 mmol). The reaction mixture was stirred at room temperature for 1 hour, followed by addition of 5-amino-1-methyl-1H-tetrazole (30 mg, 0.30 mmol) and 1,8-diazabicyclo[5.4.0]undec-7-ene (0.05 ml, 0.30 mmol). After stirring at room temperature for 16 hours, the reaction mixture was acidified to pH 3 with 1N hydrochloric acid aqueous solution, extracted with ethyl acetate, and the obtained organic layer was dried over anhydrous magnesium sulfate, and concentrated under reduced pressure. The residue was purified by column chromatography to give the desired compound 13 mg (21%).

$^1$H NMR (500 MHz, CDCl$_3$) δ 8.24 (d, J=8.0 Hz, 1H), 7.76 (d, J=8.0 Hz, 1H), 7.64 (s, 1H), 4.52 (s, 2H), 4.15 (s, 2H), 4.10 (s, 3H), 3.91 (s, 3H), 3.25 (s, 3H)

Example 19. Synthesis of N-(1-methyl-1H-tetrazol-5-yl)-2-(((1-methyl-1H-tetrazol-5-yl)thio)methyl)-6-(trifluoromethyl)nicotinamide (Compound No. 1-97)

Step 1) ethyl 2-(((1-methyl-1H-tetrazol-5-yl)thio)methyl)-6-(trifluoromethyl)nicotinate To a stirred solution of ethyl 2-(bromomethyl)-6-(trifluoromethyl)nicotinate (312 mg, 1.0 mmol) in N,N-dimethylformamide (3.0 ml) were added 1-methyl-1H-tetrazol-5-thiol (174 mg, 1.5 mmol), and potassium carbonate (276 mg, 2.0 mmol). The reaction mixture was heated to 60° C., and stirred. When the reaction was completed, the reaction mixture was diluted with water, extracted with ethyl acetate, and the obtained organic layer was dried over anhydrous magnesium sulfate, and concentrated under reduced pressure. The residue was purified by column chromatography to give the desired compound 305 mg (88%).

$^1$H NMR (300 MHz, MeOD) δ 8.51 (d, J=7.8 Hz, 1H), 7.76 (d, J=7.8 Hz, 1H), 5.18 (s, 2H), 4.05 (s, 3H), 3.98 (s, 3H)

Step 2) 2-(((1-methyl-1H-tetrazol-5-yl)thio)methyl)-6-(trifluoromethyl)nicotinic acid To a stirred solution of ethyl 2-(((1-methyl-1H-tetrazol-5-yl)thio)methyl)-6-(trifluoromethyl)nicotinate (347 mg, 1.0 mmol) in tetrahydrofuran/water (3:1, 4 ml) was added lithium hydroxide hydrate (84 mg, 2.0 mmol). The reaction mixture was stirred at room temperature. When the reaction was completed, tetrahydrofuran was removed under reduced pressure, and the remaining mixture was acidified to pH 3 with 1N aqueous hydrochloric acid solution, and extracted with ethyl acetate. The obtained organic layer was dried over anhydrous magnesium sulfate, and concentrated under reduced pressure to give the desired compound, which was used without further purification.

Step 3) N-(1-methyl-1H-tetrazol-5-yl)-2-(((1-methyl-1H-tetrazol-5-yl)thio)methyl)-6-(trifluoromethyl)nicotinamide To a stirred solution of 2-(((1-methyl-1H-tetrazol-5-yl)thio)methyl)-6-(trifluoromethyl)nicotinic acid (400 mg, 1.0 mmol) in acetonitrile (3.0 ml) was added carbonyldiimidazole (243 mg, 1.5 mmol). The reaction mixture was stirred at room temperature for 1 hour, followed by addition of 5-amino-1-methyl-1H-tetrazole (199 mg, 2.0 mmol) and 1,8-diazabicyclo[5.4.0]undec-7-ene (456 mg, 3.0 mmol) and stirred at 50° C. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 355 mg (89%).

$^1$H NMR (300 MHz, MeOD) δ 8.80 (d, J=9.9 Hz, 1H), 7.79 (d, J=9.9 Hz, 1H), 5.33 (brs, 2H), 3.96 (s, 3H), 3.90 (s, 3H)

Example 20. Synthesis of 2-(((1-methyl-1H-1,2,4-triazol-5-yl)methoxy)methyl)-N-(1-methyl-1H-tetrazol-5-yl)-6-(trifluoromethyl)nicotinamide (Compound No. 1-102)

Step 1) 2-(((1-methyl-1H-1,2,4-triazol-5-yl)methoxy)methyl)-6-(trifluoromethyl)nicotinic acid To a stirred solution of ethyl 2-(((1-methyl-1H-1,2,4-triazol-5-yl)methoxy)methyl)-6-(trifluoromethyl)nicotinate (344 mg, 1.0 mmol) in tetrahydrofuran/water (3:1, 4 ml) was added lithium hydroxide hydrate (82 mg, 2.0 mmol). When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound, which was used without further purification.

Step 2) 2-(((1-methyl-1H-1,2,4-triazol-5-yl)methoxy)methyl)-N-(1-methyl-1H-tetrazol-5-yl)-6-(trifluoromethyl)nicotinamide To a stirred solution of 2-(((1-methyl-1H-1,2,4-triazol-5-yl)methoxy)methyl)-6-(trifluoromethyl)nicotinic acid (316 mg, 1.0 mmol) in acetonitrile (3.0 ml) was added carbonyldiimidazole (243 mg, 1.5 mmol). The reaction mixture was stirred at room temperature for 1 hour, followed by addition of 5-amino-1-methyl-1H-tetrazole (199 mg, 2.0 mmol) and 1,8-diazabicyclo[5.4.0]undec-7-ene (456 mg, 3.0 mmol) and stirred at 50° C. When the reaction was completed, the reaction mixture was acidified to pH 3 with 1N hydrochloric acid aqueous solution, extracted with ethyl acetate, and the obtained organic layer was dried over anhydrous magnesium sulfate, and concentrated under reduced pressure. The residue was purified by column chromatography to give the desired compound 222 mg (56%).

$^1$H NMR (300 MHz, MeOD) δ8.32 (d, J=7.9 Hz, 1H), 8.26 (s, 1H), 7.90 (d, J=7.9 Hz, 2H), 4.98 (s, 2H), 4.58 (s, 2H), 4.00 (s, 3H), 3.77 (s, 3H)

Example 21. Synthesis of N-(1-methyl-1H-tetrazol-5-yl)-2-(((1-methyl-1H-tetrazol-5-yl)oxy)methyl)-6-(trifluoromethyl)nicotinamide (Compound No. 1-115)

Step 1) ethyl 2-(((1-methyl-1H-tetrazol-5-yl)oxy)methyl)-6-(trifluoromethyl)nicotinate To a stirred solution of ethyl 2-(bromomethyl)-6-(trifluoromethyl)nicotinate (624 mg, 2.0 mmol) in N,N-dimethylformamide (10 ml) were added 1-methyl-1H-tetrazol-5-ol (300 mg, 3.0 mmol) and potassium carbonate (552 mg, 4.0 mmol). The reaction mixture was heated to 60° C. and stirred. When the reaction was completed, the reaction mixture was diluted with water, extracted with ethyl acetate, and the obtained organic layer was dried over anhydrous magnesium sulfate, and concentrated under reduced pressure. The residue was purified by column chromatography to give the desired compound 489 mg (74%).

Step 2) 2-(((1-methyl-1H-tetrazol-5-yl)oxy)methyl)-6-(trifluoromethyl)nicotinic acid To a stirred solution of ethyl 2-(((1-methyl-1H-tetrazol-5-yl)oxy)methyl)-6-(trifluoromethyl)nicotinate (331 mg, 1.0 mmol) in tetrahydrofuran/water (3:1, 4 mL) was added lithium hydroxide hydrate (82 mg, 2.0 mmol). When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound, which was used without further purification.

Step 3) N-(1-methyl-1H-tetrazol-5-yl)-2-(((1-methyl-1H-tetrazol-5-yl)oxy)methyl)-6-(trifluoromethyl)nicotinamide To a stirred solution of 2-(((1-methyl-1H-tetrazol-5-yl)oxy)methyl)-6-(trifluoromethyl)nicotinic acid (384 mg, 1.0 mmol) in acetonitrile (2.0 ml) was added carbonyldiimidazole (243 mg, 1.5 mmol). The reaction mixture was stirred at room temperature for 1 hr, followed by addition of 5-amino-1-methyl-1H-tetrazole (199 mg, 2.0 mmol) and 1,8-diazabicyclo[5.4.0]undec-7-ene (456 mg, 3.0 mmol) and stirred at 50° C. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 249 mg (65%).

$^1$H NMR (300 MHz, DMSO-d$_6$) δ 8.68 (d, J=7.5 Hz, 1H), 7.89 (d, J=8.4 Hz, 1H), 5.80 (d, J=19.8 Hz. 2H), 3.85 (d, J=23.7, 3H), 3.57 (s, 3H)

Example 22. Synthesis of N-(1-methyl-1H-tetrazol-5-yl)-2-((2-methyl-2H-tetrazol-5-yl)methoxy)-6-(trifluoromethyl)nicotinamide (Compound No. 2-1)

Step 1) methyl 2-((2-methyl-2H-tetrazol-5-yl)methoxy)-6-(trifluoromethyl)nicotinate To a stirred solution of (2-methyl-2H-tetrazol-5-yl)methanol (340 mg, 3.0 mmol) in tetrahydrofuran was added sodium hydride (60% in oil) (120 mg, 3.0 mmol). The reaction mixture was stirred at 0° C. for 30 minutes. Thereafter, methyl-2-bromo-6-(trifluoromethyl)nicotinate (564 mg, 2 mmol) was added, followed by stirring at room temperature for 18 hours. When the reaction was completed, the reaction mixture was diluted with ethyl acetate and washed with water. The obtained organic layer was dried over anhydrous magnesium sulfate, and concentrated under reduced pressure to give the desired compound, which was used without further purification.

Step 2) 2-((2-methyl-2H-tetrazol-5-yl)methoxy)-6-(trifluoromethyl)nicotinic acid To a stirred solution of methyl 2-((2-methyl-2H-tetrazol-5-yl)methoxy)-6-(trifluoromethyl)nicotinate obtained above in tetrahydrofuran and water was added lithium hydroxide hydrate. The reaction mixture was stirred at room temperature for 12 hours or longer, and when the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound 134 mg, which was used without further purification.
$^1$H NMR (300 MHz, CDCl$_3$) δ 8.64 (d, J=7.8 Hz, 1H), 7.54 (d, J=7.8 Hz, 1H), 5.94 (s, 2H), 4.41 (s, 3H)

Step 3) N-(1-methyl-1H-tetrazol-5-yl)-2-((2-methyl-2H-tetrazol-5-yl)methoxy)-6-(trifluoromethyl)nicotinamide To a stirred solution of 2-((2-methyl-2H-tetrazol-5-yl)methoxy)-6-(trifluoromethyl)nicotinic acid (60 mg, 0.2 mmol) in N,N-dimethylformamide (1.5 ml) was added carbonyldiimidazole (65 mg, 0.4 mmol). The reaction mixture was stirred at room temperature for 3 hours, followed by addition of 5-amino-1-methyl-1H-tetrazole (40 mg, 0.4 mmol) and 1,8-diazabicyclo[5.4.0]undec-7-ene (0.9 ml, 0.6 mmol) and stirred at room temperature. When the reaction was completed, the reaction mixture was acidified to pH 3 with 1N hydrochloric acid aqueous solution, extracted with ethyl acetate, and the obtained organic layer was dried over anhydrous magnesium sulfate, and concentrated under reduced pressure. The residue was purified by column chromatography to give the desired compound 56 mg (73%).
$^1$H NMR (300 MHz, CDCl$_3$) δ 10.70 (brs, NH), 8.79 (d, J=7.8 Hz, 1H), 7.63 (s, 1H), 5.98 (s, 2H), 4.43 (s, 3H), 4.10 (s, 3H)

Example 23. Synthesis of 2-(methyl((2-methyl-2H-tetrazol-5-yl)methyl)amino)-N-(1-methyl-1H-tetrazol-5-yl)-6-(trifluoromethyl)nicotinamide (Compound No. 2-26)

To a stirred solution of 2-(methyl((2-methyl-2H-tetrazol-5-yl)methyl)amino)-N-(1-methyl-1H-tetrazol-5-yl)-6-(trifluoromethyl)nicotinic acid (126 mg, 0.40 mmol) in N,N-dimethylformamide (2 ml) was added carbonyldiimidazole (130 mg, 0.80 mmol). The reaction mixture was stirred at room temperature for 3 hours, followed by addition of 5-amino-1-methyl-1H-tetrazole (120 mg, 1.20 mmol) and 1,8-diazabicyclo[5.4.0]undec-7-ene (0.18 ml, 1.20 mmol) and stirred at room temperature for 24 hours. When the reaction was completed, the reaction mixture was acidified to pH 3 with 1N hydrochloric acid aqueous solution, extracted with ethyl acetate, and the obtained organic layer was dried over anhydrous magnesium sulfate, and concentrated under reduced pressure. The residue was purified by column chromatography to give the desired compound 40 mg (25%).
$^1$H NMR (300 MHz, CDCl$_3$) δ 11.34 (brs, NH), 8.35 (d, J=7.8 Hz, 1H), 7.39 (d, J=7.8 Hz, 1H), 5.41 (s, 2H), 4.31 (s, 3H), 4.10 (s, 3H), 3.19 (s, 3H)

Example 24. Synthesis of 2-(ethyl((2-methyl-2H-tetrazol-5-yl)methyl)amino)-N-(1-methyl-1H-tetrazol-5-yl)-6-(trifluoromethyl)nicotinamide (Compound No. 2-27)

To a stirred solution of 2-(ethyl((2-methyl-2H-tetrazol-5-yl)methyl)amino)-N-(1-methyl-1H-tetrazol-5-yl)-6-(trifluoromethyl)nicotinic acid (188 mg, 0.57 mmol) in N,N-dimethylformamide (2 ml) was added carbonyldiimidazole (185 mg, 1.14 mmol). The reaction mixture was stirred at room temperature for 3 hours, followed by addition of 5-amino-1-methyl-1H-tetrazole (113 mg, 1.14 mmol) and 1,8-diazabicyclo[5.4.0]undec-7-ene (0.26 ml, 1.71 mmol) and stirred at room temperature for 24 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 60 mg (26%).
$^1$H NMR (300 MHz, CDCl$_3$) δ 11.85 (brs, NH), 8.43 (d, J=8.0 Hz, 1H), 7.48 (d, J=8.0 Hz, 1H), 5.07 (s, 2H), 4.32 (s, 3H), 4.12 (s, 3H), 3.49 (q, J=7.1 Hz, 2H) 1.22 (t, J=7.1 Hz, 3H)

Example 25. Synthesis of N-(1-methyl-1H-tetrazol-5-yl)-2-(((2-methyl-2H-tetrazol-5-yl)methyl)(prop-2-yn-1-yl)amino)-6-(trifluoromethyl)nicotinamide (Compound No. 2-28)

Step 1)methyl 2-(((2-methyl-2H-tetrazol-5-yl)methyl)(prop-2-yn-1-yl)amino)-6-(trifluoromethyl)nicotinate To a stirred solution of methyl 2-bromo-6-(trifluoromethyl)nicotinate (2.33 g, 8.22 mmol) in N,N-dimethylformamide (10 ml) were added N-((2-methyl-2H-tetrazol-5-yl)methyl)prop-2-yn-1-amine (1.86 g, 12.3 mmol) and potassium carbonate (654 mg, 16.4 mmol). The reaction mixture was stirred at 70° C. for 24 hours, and when the reaction was completed, the mixture was diluted with ethyl acetate and washed with water. The organic layer was dried over anhydrous magnesium sulfate, and concentrated under reduced pressure. The residue was purified by column chromatography to give the desired compound 347 mg (12%).
$^1$H NMR (500 MHz, CDCl$_3$) δ 8.15 (d, J=7.7 Hz, 1H), 7.16 (d, J=7.7 Hz, 1H), 5.06 (s, 2H), 4.40 (s, 2H), 4.35 (s, 3H), 3.91 (s, 3H), 2.30 (s, 1H)

Step 2) 2-(((2-methyl-2H-tetrazol-5-yl)methyl)(prop-2-yn-1-yl)amino)-6-(trifluoromethyl)nicotinic acid To a stirred solution of methyl 2-(((2-methyl-2H-tetrazol-5-yl)methyl)(prop-2-yn-1-yl)amino)-6-(trifluoromethyl)

nicotinate (347 mg, 0.98 mmol) in tetrahydrofuran/water (2:1, 7.5 ml) was added lithium hydroxide hydrate (47 mg, 1.96 mmol). When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound 282 mg (85%), which was used without further purification.

$^1$H NMR (300 MHz, DMSO-d$_6$) δ 8.51 (d, J=7.9 Hz, 1H), 7.48 (d, J=7.9 Hz, 1H), 4.94 (s, 2H), 4.36 (s, 3H), 4.22 (s, 2H), 2.32 (s, 1H)

Step 3) N-(1-methyl-1H-tetrazol-5-yl)-2-(((2-methyl-2H-tetrazol-5-yl)methyl)(prop-2-yn-1-yl)amino)-6-(trifluoromethyl)nicotinamide To a stirred solution of 2-(((2-methyl-2H-tetrazol-5-yl)methyl)(prop-2-yn-1-yl)amino)-6-(trifluoromethyl)nicotinic acid (78 mg, 0.23 mmol) obtained above in N,N-dimethylformamide (1 ml) was added carbonyldiimidazole (75 mg, 0.46 mmol). The reaction mixture was stirred at room temperature for 3 hours, followed by addition of 5-amino-1-methyl-1H-tetrazole (46 mg, 0.46 mmol) and 1,8-diazabicyclo[5.4.0]undec-7-ene (0.10 ml, 0.69 mmol) and stirred at room temperature for 24 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 38 mg (39%).

$^1$H NMR (300 MHz, CDCl$_3$) a 11.73 (brs, NH) 8.48 (d, J=8.0 Hz, 1H), 7.56 (d, J=8.0 Hz, 1H), 5.11 (s, 2H), 4.33 (s, 3H), 4.14 (s, 2H) 4.12 (s, 3H), 2.31 (s, 1H)

Example 26. Synthesis of 2-((benzyloxy)((2-methyl-2H-tetrazol-5-yl)methyl)amino)-N-(1-methyl-1H-tetrazol-5-yl)-6-(trifluoromethyl)nicotinamide (Compound No. 2-29)

To a stirred solution of 2-(benzyloxy)(((2-methyl-2H-tetrazol-5-yl)methyl)amino)-6-(trifluoromethyl)nicotinic acid (151 mg, 0.37 mmol) in N,N-dimethylformamide (2 ml) was added carbonyldiimidazole (120 mg, 0.74 mmol). The reaction mixture was stirred at room temperature for 3 hours, followed by addition of 5-amino-1-methyl-1H-tetrazole (73 mg, 0.74 mmol) and 1,8-diazabicyclo[5.4.0]undec-7-ene (0.17 ml, 1.01 mmol) and stirred at room temperature for 24 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 30 mg (17%).

$^1$H NMR (300 MHz, CDCl$_3$) δ 10.81 (brs, NH) 8.10 (d, J=7.7 Hz, 1H), 7.39 (d, J=7.7 Hz, 1H), 7.29-7.23 (m, 5H), 5.29 (s, 2H), 4.80 (s, 2H), 4.33 (s, 3H), 3.81 (s, 3H)

Example 27. Synthesis of 2-(methoxy((2-methyl-2H-tetrazol-5-yl)methyl)amino)-N-(1-methyl-1H-tetrazol-5-yl)-6-(trifluoromethyl)nicotinamide (Compound No. 2-30)

To a stirred solution of 2-(methoxy((2-methyl-2H-tetrazol-5-yl)methyl)amino)-6-(trifluoromethyl)nicotinic acid (123 mg, 0.37 mmol) in N,N-dimethylformamide (2 ml) was added carbonyldiimidazole (120 mg, 0.74 mmol). The reaction mixture was stirred at room temperature for 3 hours, followed by addition of 5-amino-1-methyl-1H-tetrazole (73 mg, 0.74 mmol) and 1,8-diazabicyclo[5.4.0]undec-7-ene (0.17 ml, 1.01 mmol) and stirred at room temperature for 24 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 20 mg (13%).

$^1$H NMR (300 MHz, CDCl$_3$) δ 10.80 (brs, NH) 8.07 (d, J=8.0 Hz, 1H), 7.39 (d, J=8.0 Hz, 1H), 5.42 (s, 2H), 4.34 (s, 3H), 4.12 (s, 3H), 3.65 (s, 3H)

Example 28. Synthesis of 2-(ethoxy((2-methyl-2H-tetrazol-5-yl)methyl)amino)-N-(1-methyl-1H-tetrazol-5-yl)-6-(trifluoromethyl)nicotinamide (Compound No. 2-31)

To a stirred solution of 2-(ethoxy((2-methyl-2H-tetrazol-5-yl)methyl)amino)-6-(trifluoromethyl)nicotinic acid (381 mg, 1.10 mmol) in N,N-dimethylformamide (4 ml) was added carbonyldiimidazole (360 mg, 2.22 mmol). The reaction mixture was stirred at room temperature for 3 hours, followed by addition of 5-amino-1-methyl-1H-tetrazole (218 mg, 2.20 mmol) and 1,8-diazabicyclo[5.4.0]undec-7-ene (0.49 ml, 3.30 mmol) and stirred at room temperature for 24 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 47 mg (10%).

$^1$H NMR (500 MHz, CDCl$_3$) δ 10.99 (brs, NH) 8.04 (d, J=7.8 Hz, 1H), 7.35 (d, J=7.8 Hz, 1H), 5.46 (s, 2H), 4.35 (s, 3H), 4.13 (s, 3H), 3.90 (q, J=7.0 Hz, 2H), 1.07 (t, J=7.0 Hz, 3H)

Example 29. Synthesis of N-(1-methyl-1H-tetrazol-5-yl)-2-(((2-methyl-2H-tetrazol-5-yl)methyl)amino)-6-(trifluoromethyl)nicotinamide (Compound No. 2-32)

To a stirred solution of 2-bromo-N-(1-methyl-1H-tetrazol-5-yl)-6-(trifluoromethyl)nicotinamide (172 mg, 0.49 mmol) in N,N-dimethylformamide (2 ml) were added N-methyl-1-(1-methyl-1H-tetrazol-5-yl)methanamine (110 mg, 0.98 mmol) and potassium carbonate (203 mg, 1.47 mmol). The reaction mixture was stirred at 70° C. for 24 hours. When the reaction was completed, the reaction mixture was acidified to pH 3 with 1N hydrochloric acid aqueous solution, extracted with ethyl acetate, and the obtained organic layer was dried over anhydrous magnesium sulfate, and concentrated under reduced pressure. The residue was purified by column chromatography to give the desired compound 30 mg (16%).

$^1$H NMR (300 MHz, DMSO-d$_6$) δ 10.0 (brs, NH) 8.44 (d, J=7.6 Hz, 1H), 7.06 (d, J=7.6 Hz, 1H), 4.90 (s, 2H), 4.31 (s, 3H), 3.77 (s, 3H)

Example 30. Synthesis of 2-(hydroxy)((2-methyl-2H-tetrazol-5-yl)methyl)amino)-N-(1-methyl-1H-tetrazol-5-yl)-6-(trifluoromethyl)nicotinamide (Compound No. 2-33)

To a stirred solution of 2-((benzyloxy)((2-methyl-2H-tetrazol-5-yl)methyl)amino)-N-(1-methyl-1H-tetrazol-5-yl)-6-(trifluoromethyl)nicotinamide (64 mg, 0.13 mmol) in methanol (1 ml) and ethylacetate (1 ml) was added 1 drop of sulfuric acid, followed by addition of 10% palladium/carbon (6 mg) and 10% palladium hydroxide (6 mg). The reaction mixture was stirred under 50 psi pressure for 24 hours. When the reaction was completed, the reaction mixture was filtered through celite, and the filtrate was concentrated under reduced pressure. The residue was purified by column chromatography to give the desired compound 10 mg (19%).

$^1$H NMR (300 MHz, CDCl$_3$) δ 8.43 (d, J=8.0 Hz, 1H) 6.87 (d, J=8.0 Hz, 1H), 4.90 (s, 2H), 4.21 (s, 3H), 3.86 (s, 3H)

Example 31. Synthesis of 2-(methyl(2-((2-methyl-2H-tetrazol-5-yl)methoxy)ethyl)amino)-N-(1-methyl-1H-tetrazol-5-yl)-6-(trifluoromethyl)nicotinamide (Compound No. 2-34)

To a stirred solution of 2-bromo-N-(1-methyl-1H-tetrazol-5-yl)-6-(trifluoromethyl)nicotinamide (60 mg, 0.17 mmol) in N,N-dimethylformamide (1 ml) were added N-methyl-2-((2-methyl-2H-tetrazol-5-yl)methoxy)ethan-1-amine hydrochloric acid salt (71 mg, 0.34 mmol) and potassium carbonate (70 mg, 0.51 mmol). The reaction mixture was stirred at 70° C. for 24 hours, and when the reaction was completed, the reaction mixture was acidified to pH 3 with 1N hydrochloric acid aqueous solution, extracted with ethyl acetate, and the obtained organic layer was dried over anhydrous magnesium sulfate, and concentrated under reduced pressure. The residue was purified by column chromatography to give the desired compound 40 mg (55%).

$^1$H NMR (300 MHz, CDCl$_3$) δ 11.0 (brs, NH) 8.33 (d, J=7.8 Hz, 1H), 7.38 (d, J=7.8 Hz, 1H), 4.73 (s, 2H), 4.22 (s, 3H), 4.04 (s, 3H), 3.85 (t, J=4.6 Hz, 2H), 3.78 (t, J=4.6 Hz, 2H), 3.08 (s, 3H)

Example 32. Synthesis of 2-(methyl((1-methyl-1H-1,2,4-triazol-3-yl)methyl)amino)-N-(1-methyl-1H-tetrazol-5-yl)-6-(trifluoromethyl)nicotinamide (Compound No. 2-35)

To a stirred solution of 2-(methyl((1-methyl-1H-1,2,4-triazol-3-yl)methyl)amino)-6-(trifluoromethyl)nicotinic acid (100 mg, 0.32 mmol) in N,N-dimethylformamide (2 ml) was added carbonyldiimidazole (103 mg, 0.64 mmol). The reaction mixture was stirred at room temperature for 3 hours, followed by addition of 5-amino-1-methyl-1H-tetrazole (63 mg, 0.64 mmol) and 1,8-diazabicyclo[5.4.0]undec-7-ene (0.14 ml, 0.92 mmol) and stirred at room temperature for 24 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 53 mg (42%).

$^1$H NMR (300 MHz, CDCl$_3$) δ 12.25 (brs, NH), 8.27 (d, J=7.8 Hz, 1H), 7.96 (s, 1H), 7.30 (d, J=7.8 Hz, 1H), 5.08 (s, 2H), 4.10 (s, 3H), 3.86 (s, 3H), 3.17 (s, 3H)

Example 33. Synthesis of 2-(methyl(2-(2-methyl-2H-tetrazol-5-yl)ethyl)amino)-N-(1-methyl-1H-tetrazol-5-yl)-6-(trifluoromethyl)nicotinamide (Compound No. 2-36)

To a stirred solution of 2-bromo-N-(1-methyl-1H-tetrazol-5-yl)-6-(trifluoromethyl) nicotinamide (60 mg, 0.17 mmol) in N,N-dimethylformamide (1 ml) were added N-methyl-2-(2-methyl-2H-tetrazol-5-yl)ethan-1-amine (48 mg, 0.34 mmol) and potassium carbonate (70 mg, 0.51 mmol). The reaction mixture was stirred at 70° C. for 24 hours, and when the reaction was completed, the reaction mixture was acidified to pH 3 with 1N hydrochloric acid aqueous solution, extracted with ethyl acetate, and the obtained organic layer was dried over anhydrous magnesium sulfate, and concentrated under reduced pressure. The residue was purified by column chromatography to give the desired compound 20 mg (24%).

$^1$H NMR (500 MHz, CDCl$_3$) δ 11.52 (brs, NH) 8.23 (d, J=7.7 Hz, 1H), 7.28 (d, J=7.7 Hz, 1H), 4.24 (s, 3H), 4.11 (s, 3H), 4.01 (t, J=3.4 Hz, 2H), 3.32 (t, J=3.4 Hz, 2H), 3.22 (s, 3H)

Example 34. Synthesis of 2-((1-methyl-1H-1,2,4-triazol-3-yl)methoxy)-N-(1-methyl-1H-tetrazol-5-yl)-6-(trifluoromethyl)nicotinamide (Compound No. 2-43)

To a stirred solution of (1-methyl-1H-1,2,4-triazol-3-yl) methanol (226 mg, 2.0 mmol) in N,N-dimethylformamide (3.0 ml) was added sodium hydride (60% in oil) (80 mg, 2.0 mmol). The reaction mixture was stirred at room temperature for 20 minutes, followed by addition of 2-bromo-N-(1-methyl-1H-tetrazol-5-yl)-6-(trifluoromethyl)nicotinamide (351 mg, 1.0 mmol) and stirred at room temperature. When the reaction was completed, the reactant was neutralized with an aqueous ammonium chloride solution, extracted with ethyl acetate. The organic layer was dried over anhydrous magnesium sulfate, and concentrated under reduced pressure. The residue was purified by column chromatography to give the desired compound 306 mg (80%).

$^1$H NMR (300 MHz, MeOD) δ8.56 (d, J=9.0 Hz, 1H), 8.42 (s, 1H), 7.66 (d, J=6.0 Hz, 1H), 5.70 (s, 2H), 4.02 (s, 3H), 3.93 (s, 3H)

Example 35. Synthesis of N-(1-methyl-1H-tetrazol-5-yl)-2-(((2-methyl-2H-tetrazol-5-yl)methoxy)methyl)-6-(trifluoromethyl)nicotinamide (Compound No. 2-59)

Step 1) (E)-4-ethoxy-1,1,1-trifluorobut-3-en-2-one

A mixture of ethyl vinyl ether (75.2 ml, 0.785 mol) and pyridine (58 ml, 0.714 mol) was slowly added to trifluoroacetic acid anhydride (150 g, 0.714 mol) over 30 minutes at −10 to −15° C. At this time, when the solids started to precipitate after about half of the addition, diethyl ether (150 ml) was added. After adding all, diethyl ether (300 ml) was further added to dilute it, gradually raising to room temperature, and stirring for 3 hours. When the reaction was completed, the precipitated solid was removed by filtration while sufficiently washing with diethyl ether. The organic layer was washed with 0.1N-hydrochloric acid aqueous solution and water, dried over anhydrous magnesium sulfate, and concentrated under reduced pressure to give the desired compound 116 g (97%, which was used without further purification.

$^1$H NMR (300 MHz, CDCl$_3$) δ 7.91 (d, J=12.5 Hz, 1H), 5.87 (d, J=12.5 Hz, 1H), 4.11 (q, J=7.0 Hz, 2H), 1.41 (t, J=7.0 Hz, 3H)

Step 2) ethyl 4-((2-methyl-2H-tetrazol-5-yl)methoxy)-3-oxobutanoate

To a stirred solution of (2-methyl-2H-tetrazol-5-yl)methanol (16.3 g, 0.143 mol) in anhydrous tetrahydrofuran (550 ml) was added sodium hydride (60% in oil) (17.2 g, 0.43 mol) at 0° C. The reaction mixture was stirred at 0° C. for 15 minutes, followed by slow addition of a solution of ethyl chloroacetoacetate (23.4 ml, 0.172 mol) in anhydrous tetrahydrofuran (100 ml) over 30 minutes. The reaction mixture was stirred at room temperature for 3 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 29.4 g (85%).

$^1$H NMR (300 MHz, CDCl$_3$) 4.89 (s, 2H), 4.39 (s, 3H), 4.33 (s, 2H), 4.22 (q, J=7.2 Hz, 2H), 3.56 (s, 2H), 1.29 (t, J=7.2 Hz, 3H)

Step 3) ethyl 2-(((2-methyl-2H-tetrazol-5-yl)methoxy)methyl)-6-(trifluoromethyl)nicotinate To a stirred solution of ethyl 4-((2-methyl-2H-tetrazol-5-yl)methoxy)-3-oxobutanoate (8.4 g, 34.7 mmol) obtained above in acetic acid (50 ml) were added (E)-4-ethoxy-1,1,1-trifluorobut-3-en-2-one (7.6 g, 45.1 mmol) and ammonium acetate (10.7 g, 138.8 mmol). The reaction mixture was stirred at 110° C. for 4 hours. When the reaction was completed, the reaction mixture was diluted with water, extracted with ethyl acetate. The obtained organic layer was dried over anhydrous magnesium sulfate, and concentrated under reduced pressure. The residue was purified by column chromatography to give the desired compound 9.2 g (76%).

$^1$H NMR (300 MHz, CDCl$_3$) δ 8.33 (d, J=8.3 Hz, 1H), 7.72 (d, J=8.3 Hz, 1H), 5.16 (s, 2H), 4.94 (s, 2H), 4.43 (q, J=7.1 Hz, 2H), 4.37 (s, 3H), 1.42 (t, J=7.1 Hz, 3H)

Step 4) 2-(((2-methyl-2H-tetrazol-5-yl)methoxy)methyl)-6-(trifluoromethyl)nicotinic acid To a stirred solution of ethyl 2-(((2-methyl-2H-tetrazol-5-yl)methoxy)methyl)-6-(trifluoromethyl)nicotinate (9.5 g, 27.5 mmol) obtained above in methanol (80 ml) and tetrahydrofuran (30 ml) was added 2N aqueous sodium hydroxide solution (27.5 ml, 55.0 mmol). The reaction mixture was stirred at room temperature for 1 hour, and when the reaction was completed, the solvent was removed under reduced pressure, and the remaining mixture was acidified to pH 3 with 1N aqueous hydrochloric acid solution, and extracted with ethyl acetate. The obtained organic layer was dried over anhydrous magnesium sulfate, and concentrated under reduced pressure to give the desired compound 7.0 g (80%), which was used without further purification.

$^1$H NMR (300 MHz, CDCl$_3$) δ 8.42 (d, J=8.0 Hz, 1H), 7.75 (d, J=8.0 Hz, 1H), 5.19 (s, 2H), 4.98 (s, 2H), 4.35 (s, 3H)

Step 5) N-(1-methyl-1H-tetrazol-5-yl)-2-(((2-methyl-2H-tetrazol-5-yl)methoxy)methyl)-6-(trifluoromethyl)nicotinamide To a stirred solution of 2-(((2-methyl-2H-tetrazol-5-yl)methoxy)methyl)-6-(trifluoromethyl) nicotinic acid (10 g, 31.54 mmol) obtained above in acetonitrile (300 ml) was added carbonyldiimidazole (10.2 g, 63.1 mmol). The reaction mixture was stirred at room temperature for 1 hour, followed by addition of 5-amino-1-methyl-1H-tetrazole (6.25 g, 63.1 mmol) and 1,8-diazabicyclo[5.4.0]undec-7-ene (16.5 ml, 110.3 mmol) and stirred at 50° C. for 2 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 12.3 g (98%).

$^1$H NMR (300 MHz, CDCl$_3$) δ 10.77 (brs, NH), 8.39 (d, J=8.0 Hz, 1H), 7.85 (d, J=8.0 Hz, 1H), 5.14 (s, 2H), 5.00 (s, 2H), 4.26 (s, 3H), 4.10 (s, 3H)

Example 36. Synthesis of N-acetyl-N-(1-methyl-1H-tetrazol-5-yl)-2-(((2-methyl-2H-tetrazol-5-yl)methoxy)methyl)-6-(trifluoromethyl)nicotinamide (Compound No. 2-67)

To a stirred solution of N-(1-methyl-1H-tetrazol-5-yl)-2-(((2-methyl-2H-tetrazol-5-yl)methoxy)methyl)-6-(trifluoromethyl)nicotinamide (398 mg, 1.0 mmol) in tetrahydrofuran (4 ml) was added sodium hydride (60% in oil) (200 mg, 5.0 mmol). The reaction mixture was stirred at room temperature for 20 minutes, followed by addition of acetyl chloride (390 mg, 5.0 mmol) and stirred at room temperature. When the reaction was completed, the reaction mixture was neutralized with an aqueous ammonium chloride solution, extracted with ethyl acetate and water. The organic layer was dried over anhydrous magnesium sulfate, and concentrated under reduced pressure. The residue was purified by column chromatography to give the desired compound 220 mg (50%).

$^1$H NMR (300 MHz, MeOD) δ 8.00 (d, J=8.0 Hz, 1H), 7.67 (d, J=8.0 Hz, 1H), 4.99 (s, 2H), 4.84 (s, 2H), 4.37 (s, 3H), 3.95 (s, 3H), 2.43 (s, 3H)

Example 37. Synthesis of N-benzoyl-N-(1-methyl-1H-tetrazol-5-yl)-2-(((2-methyl-2H-tetrazol-5-yl)methoxy)methyl)-6-(trifluoromethyl)nicotinamide (Compound No. 2-68)

To a stirred solution of N-(1-methyl-1H-tetrazol-5-yl)-2-(((2-methyl-2H-tetrazol-5-yl)methoxy)methyl)-6-(trifluoromethyl)nicotinamide (398 mg, 1.0 mmol) in tetrahydrofuran (5 ml) was added sodium hydride (60% in oil) (200 mg, 5.0 mmol). The reaction mixture was stirred at room temperature for 20 minutes, followed by addition of benzoyl chloride (702 mg, 5.0 mmol) and stirred at room temperature. When the reaction was completed, the reaction mixture was diluted with water, extracted with ethyl acetate, and the obtained organic layer was dried over anhydrous magnesium sulfate, and concentrated under reduced pressure. The residue was purified by column chromatography to give the desired compound 160 mg (32%).

$^1$H NMR (300 MHz, MeOD) δ 8.12 (s, J=7.9 Hz, 1H), 7.71 (d, J=7.9 Hz, 1H), 7.34-7.63 (m, 5H), 5.01 (s, 2H), 4.84 (s, 2H), 4.30 (s, 3H), 4.02 (s, 3H)

Example 38. Synthesis of N-(1-methyl-1H-tetrazol-5-yl)-2-(((2-methyl-2H-tetrazol-5-yl)methoxy) methyl)-N-(methylsulfonyl)-6-(trifluoromethyl)nicotinamide (Compound No. 2-69)

To a stirred solution of N-(1-methyl-1H-tetrazol-5-yl)-2-(((2-methyl-2H-tetrazol-5-yl)methoxy)methyl)-6-(trifluoromethyl)nicotinamide (398 mg, 1.0 mmol) in tetrahydrofuran (4 ml) was added sodium hydride (60% in oil) (200 mg, 5.0 mmol). The reaction mixture was stirred at room temperature for 20 minutes, followed by addition of methanesulfonyl chloride (570 mg, 5.0 mmol) and stirred at room temperature. When the reaction was completed, the reaction mixture was neutralized with an aqueous ammonium chloride solution, extracted with ethyl acetate and water. The organic layer was dried over anhydrous magnesium sulfate, and concentrated under reduced pressure. The residue was purified by column chromatography to give the desired compound 333 mg (70%).
$^1$H NMR (300 MHz, MeOD) δ8.42 (d, J=7.8 Hz, 1H), 7.62 (s, 1H), 5.24 (s, 2H), 4.85 (s, 3H), 4.22 (s, 2H), 3.87 (s, 3H), 2.72 (s, 3H)

Example 39. Synthesis of 6-(chlorodifluoromethyl)-N-(1-methyl-1H-tetrazol-5-yl)-2-(((2-methyl-2H-tetrazol-5-yl)methoxy)methyl)nicotinamide (Compound No. 2-78)

Step 1) ethyl 6-(chlorodifluoromethyl)-2-(((2-methyl-2H-tetrazol-5-yl)methoxy)methyl)nicotinate To a stirred solution of ethyl 4-((2-methyl-2H-tetrazol-5-yl)methoxy)-3-oxobutanoate (242 mg, 1.0 mmol) in toluene (5 ml) were added (Z)-4-amino-1-chloro-1,1-difluorobut-3-en-2-one (310 mg, 2.0 mmol) and trifluoroacetic acid (228 mg, 2.0 mmol). The reaction mixture was stirred at 80° C., and when the reaction was completed, the reaction mixture was cooled and diluted with ethyl acetate and washed with water. The obtained organic layer was dried over anhydrous magnesium sulfate, and concentrated under reduced pressure. The residue was purified by column chromatography to give the desired compound 187 mg (52%).

Step 2) 6-(chlorodifluoromethyl)-2-(((2-methyl-2H-tetrazol-5-yl)methoxy)methyl)nicotinic acid To a stirred solution of ethyl 6-(chlorodifluoromethyl)-2 (((2-methyl-2H-tetrazol-5-yl)methoxy)methyl)nicotinate (361 mg, 1.0 mmol) obtained above in tetrahydrofuran/water (3:1, 4 ml) was added lithium hydroxide hydrate (82 mg, 2.0 mmol). When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, concentrated under reduced pressure to give the desired compound, which was used without further purification.

Step 3) 6-(chlorodifluoromethyl)-N-(1-methyl-1H-tetrazol-5-yl)-2-(((2-methyl-2H-tetrazol-5-yl) methoxy)methyl)nicotinamide To a stirred solution of 6-(chlorodifluoromethyl)-2-(((2-methyl-2H-tetrazol-5-yl)methoxy)methyl)nicotinic acid (333 mg, 1.0 mmol) obtained above in acetonitrile (5 ml), was added carbonyldiimidazole (243 mg, 1.5 mmol). The reaction mixture was stirred at room temperature for 1 hour, followed by addition of 5-amino-1-methyl-1H-tetrazole (199 mg, 2.0 mmol) and 1,8-diazabicyclo[5.4.0]undec-7-ene (456 mg, 3.0 mmol) and stirred at 50° C. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 281 mg (68%).
$^1$H NMR (300 MHz, MeOD) δ 8.51 (d, J=8.1 Hz, 1H), 7.71 (d, J=8.1 Hz, 1H), 5.18 (s, 2H), 4.78 (s, 2H), 4.26 (s, 3H), 3.88 (s, 3H)

Example 40. Synthesis of 6-(chlorodifluoromethyl)-2-((methoxy((2-methyl-2H-tetrazol-5-yl)methyl) amino)methyl)-N-(1-methyl-1H-tetrazol-5-yl)nicotinamide (Compound No. 2-79)

To a stirred solution of 6-(chlorodifluoromethyl)-2-((methoxy((2-methyl-2H-tetrazol-5-yl)methyl)amino) methyl)nicotinic acid (200 mg, 0.55 mmol) in N,N-dimethylformamide (2 ml) was added carbonyldiimidazole (270 mg, 1.65 mmol). The reaction mixture was stirred at room temperature for 3 hours, followed by addition of 5-amino-1-methyl-1H-tetrazole (191 mg, 1.93 mmol) and 1,8-diazabicyclo[5.4.0]undec-7-ene (0.29 ml, 1.93 mmol) and stirred at room temperature for 24 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 34 mg (14%).
$^1$H NMR (300 MHz, CDCl$_3$) δ 8.39 (d, J=8.0 Hz, 1H), 7.79 (d, J=8.0 Hz, 1H), 4.63 (s, 2H), 4.44 (s, 2H), 4.25 (s, 3H), 4.07 (s, 3H), 3.31 (s, 3H)

Example 41. Synthesis of 6-(chlorodifluoromethyl)-2-(((1-methyl-1H-1,2,4-triazol-3-yl)methoxy) methyl)-N-(1-methyl-1H-tetrazol-5-yl)nicotinamide (Compound No. 2-80)

Step 1) ethyl 6-(chlorodifluoromethyl)-2-(((1-methyl-1H-1,2,4-triazol-3-yl)methoxy)methyl)nicotinate To a stirred solution of ethyl 4-((1-methyl-1H-1,2,4-triazol-3-yl)methoxy)-3-oxobutanoate (241 mg, 1.0 mmol) in toluene (5 ml) were added (Z)-4-amino-1-chloro-1,1-difluorobut-3-en-2-one (310 mg, 2.0 mmol) and trifluoroacetic acid (228 mg, 2.0 mmol). The reaction mixture was stirred at 80° C., and when the reaction was completed, the reaction mixture was cooled and diluted with ethyl acetate and washed with water. The obtained organic layer was dried over anhydrous magnesium sulfate, and concentrated under reduced pressure. The residue was purified by column chromatography to give the desired compound 180 mg (50%).

Step 2) 6-(chlorodifluoromethyl)-2(((1-methyl-1H-1,2,4-triazol-3-yl)methoxy)methyl)nicotinic acid To a stirred solution of ethyl 6-(chlorodifluoromethyl)-2 (((1-methyl-1H-1,2,4-triazol-3-yl)methoxy)methyl)nicotinate (360 mg, 1.0 mmol) obtained above in tetrahydrofuran/water (3:1, 4 ml) was added lithium hydroxide hydrate (82 mg, 2.0 mmol). When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound, which was used without further purification.

Step 3) 6-(chlorodifluoromethyl)-2-(((1-methyl-1H-1,2,4-triazol-3-yl)methoxy)methyl)-N-(1-methyl-1H-tetrazol-5-yl)nicotinamide To a stirred solution of 6-(chlorodifluoromethyl)-2-(((1-methyl-1H-1,2,4-triazol-3-yl)methoxy)methyl)nicotinic acid (332 mg, 1.0 mmol) obtained above in acetonitrile (3 ml), was added carbonyldiimidazole (243 mg, 1.5 mmol). The reaction mixture was stirred at room temperature for 1 hour, followed by addition of 5-amino-1-methyl-1H-tetrazole (199 mg, 2.0 mmol) and 1,8-diazabicyclo[5.4.0]undec-7-ene (456 mg, 3.0 mmol) and stirred at 50° C. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 232 mg (56%).

$^1$H NMR (300 MHz, MeOD) δ 8.30 (d, J=7.9 Hz, 1H), 8.27 (s, 1H), 7.88 (d, J=7.9 Hz, 1H), 4.98 (s, 2H), 4.88 (s, 2H), 4.04 (s, 3H), 3.85 (s, 3H)

Example 42. Synthesis of N-(1-methyl-1H-tetrazol-5-yl)-2-(((2-methyl-2H-tetrazol-5-yl)methoxy)methyl)-6-(perfluoroethyl)nicotinamide (Compound No. 2-81)

Step 1)ethyl 2-(((2-methyl-2H-tetrazol-5-yl)methoxy)methyl)-6-(perfluoroethyl)nicotinate To a stirred solution of ethyl 4-((2-methyl-2H-tetrazol-5-yl)methoxy)-3-oxobutanoate (484 mg, 2.0 mmol) in toluene were added (Z)-1-amino-4,4,5,5,5-pentafluoropent-1-en-3-one (567 mg, 3.0 mmol) and trifluoroacetic acid (342 mg, 3.0 mmol). The reaction mixture was stirred at 80° C., and when the reaction was completed, the reaction mixture was cooled and diluted with ethyl acetate and washed with water. The obtained organic layer was dried over anhydrous magnesium sulfate, and concentrated under reduced pressure. The residue was purified by column chromatography to give the desired compound 177 mg (45%).

Step 2) 2-(((2-methyl-2H-tetrazol-5-yl)methoxy)methyl)-6-(perfluoroethyl)nicotinic acid To a stirred solution of ethyl 2-(((2-methyl-2H-tetrazol-5-yl)methoxy)methyl)-6-(perfluoroethyl)nicotinate (395 mg, 1.0 mmol) in tetrahydrofuran/water (3:1, 4 ml) was added lithium hydroxide hydrate (82 mg, 2.0 mmol). The reaction mixture was stirred at room temperature. When the reaction was completed, the reaction mixture was concentrated under reduced pressure, acidified to pH 3 with 1N aqueous hydrochloric acid solution and extracted with ethyl acetate. The obtained organic layer was dried over anhydrous magnesium sulfate, and concentrated under reduced pressure to give the desired compound, which was used without further purification.

Step 3) N-(1-methyl-1H-tetrazol-5-yl)-2-(((2-methyl-2H-tetrazol-5-yl)methoxy)methyl)-6-(perfluoroethyl)nicotinamide To a stirred solution of 2-(((2-methyl-2H-tetrazol-5-yl)methoxy)methyl)-6-(perfluoroethyl)nicotinic acid (367 mg, 1.0 mmol) obtained above in acetonitrile (4 ml) was added carbonyldiimidazole (243 mg, 1.5 mmol). The reaction mixture was stirred at room temperature for 1 hour, followed by addition of 5-amino-1-methyl-1H-tetrazole (199 mg, 2.0 mmol) and 1,8-diazabicyclo[5.4.0]undec-7-ene (456 mg, 3.0 mmol) and stirred at 50° C. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 237 mg (53%).

$^1$H NMR (300 MHz, MeOD) δ 8.58 (brs, NH), 7.83 (d, J=7.9, 1H), 5.19 (br s, 2H), 4.79 (s, 2H), 4.29 (s, 3H), 3.83 (s, 3H)

Example 43. Synthesis of 2-(((1-methyl-1H-1,2,4-triazol-3-yl)methoxy)methyl)-N-(1-methyl-1H-tetrazol-5-yl)-6-(perfluoroethyl)nicotinamide (Compound No. 2-83)

Step 1)ethyl 2-(((1-methyl-1H-1,2,4-triazol-3-yl)methoxy)methyl)-6-(perfluoroethyl)nicotinate To a stirred solution of ethyl 4-((1-methyl-1H-1,2,4-triazol-3-yl)methoxy)-3-oxobutanoate (241 mg, 1.0 mmol) in toluene (5 ml) were added (Z)-1-amino-4,4,5,5,5-pentafluoropent-1-en-3-one (378 mg, 2.0 mmol) and trifluoroacetic acid (228 mg, 2.0 mmol). The reaction mixture was stirred at 80° C., and when the reaction was completed, the reaction mixture was cooled and diluted with ethyl acetate and washed with water. The obtained organic layer was dried over anhydrous magnesium sulfate, and concentrated under reduced pressure. The residue was purified by column chromatography to give the desired compound 216 mg (55%).

Step 2) 2-(((1-methyl-1H-1,2,4-triazol-3-yl)methoxy)methyl)-6-(perfluoroethyl)nicotinic acid To a stirred solution of ethyl 2-(((1-methyl-1H-1,2,4-triazol-3-yl)methoxy)methyl)-6-(perfluoroethyl)nicotinate (394 mg, 1.0 mmol) obtained above in tetrahydrofuran/water (3:1, 4 ml) was added lithium hydroxide hydrate (82 mg, 2.0 mmol). When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, concentrated under reduced pressure to give the desired compound, which was used without further purification.

Step 3) 2-(((1-methyl-1H-1,2,4-triazol-3-yl)methoxy)methyl)-N-(1-methyl-1H-tetrazol-5-yl)-6-(perfluoroethyl)nicotinamide To a stirred solution of 2-(((1-methyl-1H-1,2,4-triazol-3-yl)methoxy)methyl)-6-(perfluoroethyl) nicotinic acid (366 mg, 1.0 mmol) obtained above in acetonitrile (4.0 ml) was added carbonyldiimidazole (243 mg, 1.5 mmol). The reaction mixture was stirred at room temperature for 1 hour, followed by addition of 5-amino-1-methyl-1H-tetrazole (199 mg, 2.0 mmol) and 1,8-diazabicyclo[5.4.0]undec-7-ene (456 mg, 3.0 mmol) and stirred at 50° C. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 303 mg (67%).

$^1$H NMR (300 MHz, MeOD) δ 8.34 (d, J=8.1 Hz, 1H), 8.27 (s, 1H), 7.97 (d, J=8.1 Hz, 1H), 4.99 (s, 2H), 4.60 (s, 2H), 4.04 (s, 3H), 3.84 (s, 3H)

Example 44. Synthesis of 6-(difluoromethyl)-N-(1-methyl-1H-tetrazol-5-yl)-2-(((2-methyl-2H-tetrazol-5-yl)methoxy)methyl)nicotinamide (Compound No. 2-84)

To a stirred solution of 6-(chlorodifluoromethyl)-N-(1-methyl-1H-tetrazol-5-yl)-2-(((2-methyl-2H-tetrazol-5-yl)methoxy)methyl)nicotinamide (414 mg, 1.0 mmol) in methanol (10 ml) was added palladium/carbon (41 mg). The mixture was stirred at room temperature for 24 hours using a hydrogen gas balloon. When the reaction was completed, the reaction mixture was filtered through celite, and the filtrate was concentrated under reduced pressure. The residue was purified by column chromatography to give the desired compound 174 mg (46%).

$^1$H NMR (300 MHz, MeOD) δ 8.54 (d, J=7.9 Hz, 1H), 7.69 (d, J=7.8 Hz, 1H), 6.76 (t, J=55.2 Hz, 1H), 5.16 (s, 2H), 4.82 (t, J=22.5 Hz, 2H), 4.31 (s, 3H), 3.91 (s, 3H)

Example 45. 6-(difluoromethyl)-2-(((1-methyl-1H-1,2,4-triazol-3-yl)methoxy)methyl)-N-((1-methyl-1H-tetrazol-5-yl)nicotinamide (Compound No. 2-85)

To a stirred solution of 6-(chlorodifluoromethyl)-2-(((1-methyl-1H-1,2,4-triazol-3-yl)methoxy)methyl)-N-((1-methyl-1H-tetrazol-5-yl)nicotinamide (413 mg, 1.0 mmol) in methanol (10 ml) was added palladium/carbon (41 mg). The mixture was stirred at room temperature for 24 hours using a hydrogen gas balloon. When the reaction was completed, the reaction mixture was filtered through celite, and the filtrate was concentrated under reduced pressure. The residue was purified by column chromatography to give the desired compound 288 mg (76%).

$^1$H NMR (300 MHz, MeOD) δ 8.28 (s, 1H), 8.27 (d, J=7.8 Hz, 1H), 7.80 (d, J=7.8 Hz, 1H), 4.99 (s, 2H), 4.61 (s, 2H), 4.04 (s, 3H), 3.85 (s, 3H)

Example 46. Synthesis of 6-(difluoromethyl)-2-((methoxy((2-methyl-2H-tetrazol-5-yl)methyl)amino)methyl)-N-(1-methyl-1H-tetrazol-5-yl)nicotinamide (Compound No. 2-86)

To a stirred solution of 6-(chlorodifluoromethyl)-2-((methoxy((2-methyl-2H-tetrazol-5-yl)methyl)amino)methyl)-N-(1-methyl-1H-tetrazol-5-yl)nicotinamide (34 mg, 0.077 mmol) in ethanol (1.5 ml) was added palladium/carbon (4 mg). The mixture was stirred at room temperature for 24 hours using a hydrogen gas balloon. When the reaction was completed, the reaction mixture was filtered through celite, and the filtrate was concentrated under reduced pressure. The residue was purified by column chromatography to give the desired compound 10 mg (32%).

$^1$H NMR (500 MHz, CDCl$_3$) δ 11.74 (brs, NH) 8.41 (d, J=8.1 Hz, 1H), 7.82 (d, J=8.1 Hz, 1H), 6.73 (t, J=55.0 Hz, 1H), 4.61 (s, 2H), 4.46 (s, 2H) 4.19 (s, 3H), 4.10 (s, 3H), 3.33 (s, 3H)

Example 47. Synthesis of 2-(((2-ethyl-2H-tetrazol-5-yl)methoxy)methyl)-N-(1-methyl-1H-tetrazol-5-yl)-6-(trifluoromethyl)nicotinamide (Compound No. 2-87)

Step 1) methyl 2-((2-ethyl-2H-tetrazol-5-yl)methoxy)methyl)-6-(trifluoromethyl)nicotinate To a stirred solution of (2-ethyl-2H-tetrazol-5-yl)methanol (374 mg, 2.93 mmol) in anhydrous tetrahydrofuran (5 ml) was added sodium hydride (60% in oil) (140 mg, 3.51 mmol) at 0° C. The reaction mixture was stirred at 35° C. for 1 hour, followed by addition of methyl 2-(bromomethyl)-6-(trifluoromethyl)nicotinate (1.05 g, 3.51 mmol) at 0° C. and stirred at 30° C. for 1 hour 30 minutes. When the reaction was completed, the reaction mixture was diluted with ethyl acetate and washed with saturated aqueous ammonium chloride solution. The obtained organic layer was dried over anhydrous magnesium sulfate, and concentrated under reduced pressure. The residue was purified by column chromatography to give the desired compound 980 mg (50%).

$^1$H NMR (400 MHz, CDCl$_3$) δ 8.31 (d, J=7.9 Hz, 1H), 7.71 (d, J=8.0 Hz, 1H), 5.14 (s, 2H), 4.92 (s, 2H), 4.66 (q, J=7.3 Hz, 2H), 3.96 (s, 3H), 1.65 (t, J=7.2 Hz, 3H)

Step 2) 2-(((2-ethyl-2H-tetrazol-5-yl)methoxy)methyl)-6-(trifluoromethyl)nicotinic acid To a stirred solution of methyl 2-((2-ethyl-2H-tetrazol-5-yl)methoxy)methyl)-6-(trifluoromethyl)nicotinate (780 mg, 2.84 mmol) obtained above in tetrahydrofuran (6 ml) and water (2 ml) was added lithium hydroxide hydrate (357 mg, 8.51 mmol). The reaction mixture was stirred at room temperature for 1 hour. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound 900 mg (95%), which was used without further purification.

$^1$H NMR (300 MHz, CDCl$_3$) δ 8.40 (d, J=8.1 Hz, 1H), 7.73 (d, J=8.0 Hz, 1H), 5.18 (s, 2H), 4.97 (s, 2H), 4.65 (q, J=7.4 Hz, 2H), 1.63 (t, J=7.4 Hz, 3H)

Step 3) 2-(((2-ethyl-2H-tetrazol-5-yl)methoxy)methyl)-N-(1-methyl-1H-tetrazol-5-yl)-6-(trifluoromethyl)nicotinamide To a stirred solution of 2-(((2-ethyl-2H-tetrazol-5-yl)methoxy)methyl)-6-(trifluoromethyl) nicotinic acid (100 mg, 0.3 mmol) obtained above in anhydrous acetonitrile (5 ml) was added carbonyldiimidazole (98 mg, 0.6 mmol). The reaction mixture was stirred at room temperature for 1 hour, followed by addition of 5-amino-1-methyl-1H-tetrazole (59 mg, 0.6 mmol) and 1,8-diazabicyclo[5,4,0]undec-7-ene (0.13 ml, 0.9 mmol) and stirred at 50° C. for 18 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 99.7 mg (80%).

$^1$H NMR (300 MHz, CDCl$_3$) δ 11.20 (s, 1H), 8.38 (d, J=8.0 Hz, 1H), 7.81 (d, J=8.0 Hz, 1H), 5.11 (s, 2H), 4.89 (s, 2H), 4.52 (q, J=7.4 Hz, 2H), 4.07 (s, 3H), 1.54 (t, J=7.4 Hz, 3H)

Example 48. Synthesis of N-(1-ethyl-1H-tetrazol-5-yl)-2-(((2-ethyl-2H-tetrazol-5-yl)methoxy)methyl)-6-(trifluoromethyl)nicotinamide (Compound No. 2-88)

To a stirred solution of 2-(((2-ethyl-2H-tetrazol-5-yl)methoxy)methyl)-6-(trifluoromethyl) nicotinic acid (100 mg, 0.3 mmol) in anhydrous acetonitrile (5 ml) was added carbonyldiimidazole (98 mg, 0.6 mmol). The reaction mixture was stirred at room temperature for 1 hour, followed by addition of 5-amino-1-ethyl-1H-tetrazole (68 mg, 0.6 mmol) and 1,8-diazabicyclo[5,4,0]undec-7-ene (0.13 ml, 0.9 mmol) and stirred at 50° C. for 18 hours and 30 minutes. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 101.5 mg (79%).

$^1$H NMR (300 MHz, CDCl$_3$) δ 11.15 (brs, NH), 8.38 (d, J=8.0 Hz, 1H), 7.80 (d, J=8.0 Hz, 1H), 5.11 (s, 2H), 4.90 (s, 2H), 4.53 (q, J=7.4 Hz, 2H), 4.40 (q, J=7.3 Hz, 2H), 1.63-1.50 (m, 6H).

Example 49. Synthesis of 2-(((2-ethyl-2H-tetrazol-5-yl)methoxy)methyl)-N-(1-propyl-1H-tetrazol-5-yl)-6-(trifluoromethyl)nicotinamide (Compound No. 2-89)

To a stirred solution of 2-(((2-ethyl-2H-tetrazol-5-yl)methoxy)methyl)-6-(trifluoromethyl) nicotinic acid (100 mg, 0.3 mmol) in anhydrous acetonitrile (5 ml) was added carbonyldiimidazole (100 mg, 0.6 mmol). The reaction mixture was stirred at room temperature for 1 hour, followed by addition of 5-amino-1-propyl-1H-tetrazole (76 mg, 0.6 mmol) and 1,8-diazabicyclo[5,4,0]undec-7-ene (0.13 ml, 0.9 mmol) and stirred at 50° C. for 17 hours and 30 minutes. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 112.8 mg (85%).

$^1$H NMR (300 MHz, CDCl$_3$) δ 11.02 (brs, NH), 8.37 (d, J=7.8 Hz, 1H), 7.80 (d, J=7.8 Hz, 1H), 5.11 (s, 2H), 4.94 (s, 2H), 4.53 (q, J=7.4 Hz, 2H), 4.33 (t, J=7.3 Hz, 2H), 2.00 (q, J=7.4 Hz, 2H), 1.54 (t, J=7.4 Hz, 3H), 0.96 (t, J=7.4 Hz, 3H)

Example 50. Synthesis of N-(1-allyl-1H-tetrazol-5-yl)-2-(((2-ethyl-2H-tetrazol-5-yl)methoxy)methyl)-6-(trifluoromethyl)nicotinamide (Compound No. 2-90)

To a stirred solution of 2-(((2-ethyl-2H-tetrazol-5-yl)methoxy)methyl)-6-(trifluoromethyl) nicotinic acid (100 mg, 0.3 mmol) in anhydrous acetonitrile (5 ml) was added carbonyldiimidazole (100 mg, 0.6 mmol). The reaction mixture was stirred at room temperature for 1 hour, followed by addition of 5-amino-1-allyl-1H-tetrazole (75 mg, 0.6 mmol) and 1,8-diazabicyclo[5,4,0]undec-7-ene (0.13 ml, 0.9 mmol) and stirred at 50° C. for 18 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 115.9 mg (87.8%).

$^1$H NMR (300 MHz, CDCl$_3$) δ 8.36 (d, J=7.9 Hz, 1H), 7.80 (d, J=7.9 Hz, 1H), 5.98 (ddd, J=16.4, 10.3, 6.0 Hz, 1H), 5.38-5.23 (m, 2H), 5.08 (d, J=6.1 Hz, 4H), 4.89 (s, 2H), 4.53 (q, J=7.4 Hz, 2H), 1.54 (t, J=7.4 Hz, 3H)

Example 51. Synthesis of 2-(((2-(methoxymethyl)-2H-tetrazol-5-yl)methoxy)methyl)-N-(1-methyl-1H-tetrazol-5-yl)-6-(trifluoromethyl)nicotinamide (Compound No. 2-91)

Step 1) methyl 2-(((2-(methoxymethyl)-2H-tetrazol-5-yl)methoxy)methyl)-6-(trifluoromethyl)nicotinate To a stirred solution of (2-(methoxymethyl)-2H-tetrazol-5-yl)methanol (742 mg, 5.15 mmol) in anhydrous tetrahydrofuran (10 ml) was added sodium hydride (60% in oil) (246.8 mg, 6.17 mmol) at 0° C. The reaction mixture was stirred at 35° C. for 1 hour, followed by addition of methyl 2-(bromomethyl)-6-(trifluoromethyl)nicotinate (1.8 g, 6.17 mmol) at 0° C. and stirred for 2 hours at 30° C. When the reaction was completed, the reaction mixture was quenched with water, extracted with ethyl acetate. The obtained organic layer was dried over anhydrous magnesium sulfate, and concentrated under reduced pressure. The residue was purified by column chromatography to give the desired compound 493.4 mg (26.5%).

$^1$H NMR (400 MHz, CDCl$_3$) δ 8.32 (d, J=8.0 Hz, 1H), 7.71 (d, J=8.0 Hz, 1H), 5.85 (s, 2H), 5.16 (s, 2H), 4.96 (s, 2H), 3.95 (s, 3H), 3.48 (s, 3H)

Step 2) 2-(((2-(methoxymethyl)-2H-tetrazol-5-yl)methoxy)methyl)-6-(trifluoromethyl)nicotinic acid To a stirred solution of methyl 2-(((2-(methoxymethyl)-2H-tetrazol-5-yl)methoxy)methyl)-6-(trifluoromethyl)nicotinate (594.3 mg, 1.64 mmol) obtained above in tetrahydrofuran (6 ml) and water (2 ml) was added lithium hydroxide hydrate (207 mg, 4.93 mmol). The reaction mixture was stirred at room temperature for 2 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound 516.8 mg (90.8%), which was used without further purification.

$^1$H NMR (300 MHz, CDCl$_3$) δ 8.37 (d, J=9.8 Hz, 1H), 7.69 (d, J=6.2 Hz, 1H), 5.79 (s, 2H), 5.17 (s, 2H), 4.96 (s, 2H), 3.44 (s, 3H)

Step 3) 2-(((2-(methoxymethyl)-2H-tetrazol-5-yl)methoxy)methyl)-N-(1-methyl-1H-tetrazol-5-yl)-6-(trifluoromethyl)nicotinamide To a stirred solution of 2-(((2-(methoxymethyl)-2H-tetrazol-5-yl)methoxy)methyl)-6-(trifluoromethyl)nicotinic acid (100 mg, 0.28 mmol) obtained above in anhydrous acetonitrile (5 ml) was added carbonyldiimidazole (94 mg, 0.58 mmol). The reaction mixture was stirred at room temperature for 1 hour, followed by addition of 5-amino-1-methyl-1H-tetrazole (57 mg, 0.58 mmol) and 1,8-diazabicyclo[5,4,0]undec-7-ene (0.12 ml, 0.84 mmol) and stirred at 50° C. for 15 hours and 30 minutes. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 84.3 mg (70%).

$^1$H NMR (400 MHz, CDCl$_3$) δ 8.39 (d, J=7.9 Hz, 1H), 7.82 (d, J=7.9 Hz, 1H), 5.71 (s, 2H), 5.14 (s, 2H), 4.96 (s, 2H), 4.07 (s, 3H), 3.39 (s, 3H)

Example 52. Synthesis of 2-(((2-(difluoromethyl)-2H-tetrazol-5-yl)methoxy)methyl)-N-(1-methyl-1H-tetrazol-5-yl)-6-(trifluoromethyl)nicotinamide (Compound No. 2-92)

To a stirred solution of 2-(((2-(difluoromethyl)-2H-tetrazol-5-yl)methoxy)methyl)-6-(trifluoromethyl)nicotinic acid (50 mg, 0.141 mmol) in N,N-dimethylformamide (4 ml) was added carbonyldiimidazole (39 mg, 0.24 mmol). The reaction mixture was stirred at room temperature for 1 hour, followed by addition of 5-amino-1-methyl-1H-tetrazole (24 mg, 0.24 mmol) and 1,8-diazabicyclo[5.4.0]undec-7-ene (0.05 ml, 0.32 mmol) and stirred at room temperature for 16 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 30 mg (51%).

$^1$H NMR (300 MHz, CDCl$_3$) δ 11.84 (brs, NH), 8.57 (d, J=8.0 Hz, 1H), 7.90 (t, J=56.4 Hz, 1H), 7.92 (d, J=8.0 Hz, 1H), 5.17 (s, 2H), 5.11 (s, 2H), 4.10 (s, 3H)

Example 53. Synthesis of 2-((methyl((2-methyl-2H-tetrazol-5-yl)methyl)amino)methyl)-N-(1-methyl-1H-tetrazol-5-yl)-6-(trifluoromethyl)nicotinamide (Compound No. 2-93)

Step 1) methyl 2-((methyl((2-methyl-2H-tetrazol-5-yl)methyl)amino)methyl)-6-(trifluoromethyl)nicotinate To a stirred solution of methyl 2-(bromomethyl)-6-(trifluoromethyl)nicotinate (300 mg, 1.01 mmol) in N,N-dimethylformamide (4 ml) were added potassium carbonate (420 mg, 3.04 mmol) and N-((2-methyl-2H-tetrazol-5-yl)methyl)methanamine (193 mg, 1.52 mmol). The reaction mixture was stirred at room temperature for 3 hours, and when the reaction was completed, the reaction mixture was diluted with water, extracted with ethyl acetate, and the obtained organic layer was dried over anhydrous magnesium sulfate, and concentrated under reduced pressure. The residue was purified by column chromatography to give the desired compound 210 mg (60%).

$^1$H NMR (300 MHz, CDCl$_3$) δ 8.13 (d, J=7.9 Hz, 1H), 7.64 (d, J=7.9 Hz, 1H), 4.34 (s, 3H), 4.14 (s, 2H), 4.01 (s, 2H), 3.95 (s, 3H), 2.24 (s, 3H)

Step 2) 2-((methyl((2-methyl-2H-tetrazol-5-yl)methyl)amino)methyl)-6-(trifluoromethyl)nicotinic acid To a stirred solution of methyl 2-((methyl((2-methyl-2H-tetrazol-5-yl)methyl)amino)methyl)-6-(trifluoromethyl)nicotinate (210 mg, 0.61 mmol) obtained above in tetrahydrofuran/methanol (4 ml, 1/1) was added 2N-sodium hydroxide (50 mg, 1.22 mmol). The reaction mixture was stirred at room temperature for 1 hour, and when the reaction was completed, the solvent was removed under reduced pressure, and the remaining mixture was acidified to pH 3 with 1N aqueous hydrochloric acid solution, and extracted with ethyl acetate. The obtained organic layer was dried over anhydrous magnesium sulfate, and concentrated under reduced pressure to give the desired compound 200 mg (100%), which was used without further purification.

$^1$H NMR (500 MHz, CDCl$_3$) δ 8.66 (d, J=8.0 Hz, 1H), 7.83 (d, J=8.0 Hz, 1H), 4.41 (s, 3H), 4.27 (s, 2H), 4.20 (s, 2H), 3.51 (s, 3H)

Step 3) 2-((methyl((2-methyl-2H-tetrazol-5-yl)methyl)amino)methyl)-N-(1-methyl-1H-tetrazol-5-yl)-6-(trifluoromethyl)nicotinamide To a stirred solution of 2-((methyl((2-methyl-2H-tetrazol-5-yl)methyl)amino)methyl)-6-(trifluoromethyl)nicotinic acid (220 mg, 0.66 mmol) obtained above in N,N-dimethylformamide (2 ml) was added carbonyldiimidazole (214 mg, 1.32 mmol). The reaction mixture was stirred at room temperature for 3 hours, followed by addition of 5-amino-1-methyl-1H-tetrazole (34 mg, 0.34 mmol) and 1,8-diazabicyclo[5.4.0]undec-7-ene (0.30 ml, 1.98 mmol) and stirred at room temperature for 24 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 100 mg (36%).

$^1$H NMR (300 MHz, CDCl$_3$) δ 8.54 (d, J=8.1 Hz, 1H), 7.83 (d, J=8.1 Hz, 1H), 4.27 (s, 3H), 4.26 (s, 2H), 4.11 (s, 2H), 4.07 (s, 3H), 2.48 (s, 3H)

Example 54. Synthesis of 2-((ethyl((2-methyl-2H-tetrazol-5-yl)methyl)amino)methyl)-N-(1-methyl-1H-tetrazol-5-yl)-6-(trifluoromethyl)nicotinamide (Compound No. 2-94)

Step 1) methyl 2-((ethyl((2-methyl-2H-tetrazol-5-yl)methyl)amino)methyl)-6-(trifluoromethyl)nicotinate To a stirred solution of methyl 2-(bromomethyl)-6-(trifluoromethyl)nicotinate (370 mg, 1.23 mmol) in N,N-dimethylformamide (4 ml) were added potassium carbonate (340 mg, 2.46 mmol) and N-((2-ethyl-2H-tetrazol-5-yl)methyl)ethanamine (260 mg, 1.85 mmol). The reaction mixture was stirred at 65° C. for 3 hours, and when the reaction was completed, the reaction mixture was diluted with water, extracted with ethyl acetate. The obtained organic layer was dried over anhydrous magnesium sulfate, and concentrated under reduced pressure. The residue was purified by column chromatography to give the desired compound 259 mg (59%).

$^1$H NMR (500 MHz, CDCl$_3$) δ 8.08 (d, J=7.9 Hz, 1H), 7.64 (d, J=7.9 Hz, 1H), 4.35 (s, 3H), 4.19 (s, 2H), 4.07 (s, 2H), 4.07 (s, 2H), 3.96 (s, 3H) 2.49 (q, J=7.0 Hz, 2H), 1.03 (t, J=7.0 Hz, 3H)

Step 2) 2-((ethyl((2-methyl-2H-tetrazol-5-yl)methyl)amino)methyl)-6-(trifluoromethyl)nicotinic acid To a stirred solution of methyl 2-((ethyl((2-methyl-2H-tetrazol-5-yl)methyl)amino)methyl)-6-(trifluoromethyl)nicotinate (260 mg, 0.72 mmol) obtained above in tetrahydrofuran/methanol (4 ml, 1/1) was added 2N-sodium hydroxide (86 mg, 2.16 mmol). The reaction mixture was stirred at room temperature for 1 hour, and when the reaction was completed, the solvent was removed under reduced pressure, and the remaining mixture was acidified to pH 3 with 1N aqueous hydrochloric acid solution, and extracted with ethyl acetate. The obtained organic layer was dried over anhydrous magnesium sulfate, and concentrated under reduced pressure to give the desired compound 220 mg (89%), which was used without further purification.

$^1$H NMR (300 MHz, CDCl$_3$) δ 8.44 (d, J=7.9 Hz, 1H), 7.99 (d, J=7.9 Hz, 1H), 4.51 (s, 2H), 4.39 (s, 2H), 4.35 (s, 3H), 2.85 (q, J=6.7 Hz, 2H), 1.45 (t, J=6.7 Hz, 3H)

Step 3) 2-((ethyl((2-methyl-2H-tetrazol-5-yl)methyl)amino)methyl)-N-(1-methyl-1H-tetrazol-5-yl)-6-(trifluoromethyl)nicotinamide To a stirred solution of 2-((ethyl((2-methyl-2H-tetrazol-5-yl)methyl)amino)methyl)-6-(trifluoromethyl)nicotinic acid (100 mg, 0.28 mmol) obtained above in N,N-dimethylformamide (1 ml) was added carbonyldiimidazole (90 mg, 0.56 mmol). The reaction mixture was stirred at room temperature for 3 hours, followed by addition of 5-amino-1-methyl-1H-tetrazole (55 mg, 0.56 mmol) and 1,8-diazabicyclo[5.4.0]undec-7-ene (0.13 ml, 0.87 mmol) and stirred at room temperature for 24 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 40 mg (39%).

$^1$H NMR (500 MHz, CDCl$_3$) δ 8.57 (d, J=8.1 Hz, 1H), 7.84 (d, J=8.1 Hz, 1H), 4.35 (s, 2H), 4.27 (s, 3H), 4.17 (s, 2H), 4.09 (s, 3H), 2.82 (q, J=7.2 Hz, 2H), 1.22 (t, J=7.2 Hz, 3H)

Example 55. Synthesis of 2-((methoxy((2-methyl-2H-tetrazol-5-yl)methyl)amino)methyl)-N-(1-methyl-1H-tetrazol-5-yl)-6-(trifluoromethyl)nicotinamide (Compound No. 2-97)

Step 1) methyl 2-((methoxy((2-methyl-2H-tetrazol-5-yl)methyl)amino)methyl)-6-(trifluoromethyl)nicotinate To a stirred solution of methyl 2-(bromomethyl)-6-(trifluoromethyl)nicotinate (200 mg, 0.68 mmol) in N,N-dimethylformamide (2 ml) were added potassium carbonate (200 mg, 1.40 mmol) and O-methyl-N-((2-methyl-2H-tetrazol-5-yl)methyl)hydroxylamine (150 mg, 1.05 mmol). The reaction mixture was stirred at 65° C. for 3 hours, and when the reaction was completed, the reaction mixture was diluted with water, extracted with ethyl acetate, and the obtained organic layer was dried over anhydrous magnesium sulfate, and concentrated under reduced pressure. The residue was purified by column chromatography to give the desired compound 78 mg (37%).

$^1$H NMR (300 MHz, CDCl$_3$) δ 8.19 (d, J=8.0 Hz, 1H), 7.67 (d, J=8.0 Hz, 1H), 4.52 (s, 2H), 4.34 (s, 3H), 4.22 (s, 2H), 3.92 (s, 3H), 3.14 (s, 3H)

Step 2) 2-((methoxy((2-methyl-2H-tetrazol-5-yl)methyl)amino)methyl)-6-(trifluoromethyl)nicotinic acid To a stirred solution of methyl 2-((methoxy((2-methyl-2H-tetrazol-5-yl)methyl)amino)methyl)-6-(trifluoromethyl)nicotinate (80 mg, 0.22 mmol) obtained above in tetrahydrofuran/methanol (1 ml, 1/1) was added 2N-sodium hydroxide aqueous solution (0.33 ml, 0.66 mmol). When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound 76 mg (90%), which was used without further purification.

$^1$H NMR (500 MHz, CDCl$_3$) δ 8.45 (d, J=8.0 Hz, 1H), 7.78 (d, J=8.0 Hz, 1H), 4.57 (s, 2H), 4.39 (s, 3H), 4.38 (s, 2H), 3.31 (s, 3H)

Step 3) 2-((methoxy((2-methyl-2H-tetrazol-5-yl)methyl)amino)methyl)-N-(1-methyl-1H-tetrazol-5-yl)-6-(trifluoromethyl)nicotinamide To a stirred solution of 2-((methoxy((2-methyl-2H-tetrazol-5-yl)methyl)amino)methyl)-6-(trifluoromethyl)nicotinic acid (60 mg, 0.17 mmol) obtained above in N,N-dimethylformamide (1 ml) was added carbonyldiimidazole (55 mg, 0.34 mmol). The reaction mixture was stirred at room temperature for 3 hours, followed by addition of 5-amino-1-methyl-1H-tetrazole (34 mg, 0.34 mmol) and 1,8-diazabicyclo[5.4.0]undec-7-ene (0.08 ml, 0.51 mmol) and stirred at room temperature for 24 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 20 mg (28%).

$^1$H NMR (300 MHz, CDCl$_3$) δ 8.42 (d, J=8.0 Hz, 1H), 7.84 (d, J=8.0 Hz, 1H), 4.64 (s, 2H), 4.44 (s, 2H), 4.27 (s, 3H), 4.07 (s, 3H), 3.30 (s, 3H)

Example 56. Synthesis of N-(1-methyl-1H-tetrazol-5-yl)-2-((((2-methyl-2H-tetrazol-5-yl)methyl)thio)methyl)-6-(trifluoromethyl)nicotinamide (Compound No. 2-102)

Step 1) S-((2-methyl-2H-tetrazol-5-yl)methyl) ethanthioate

To a stirred solution of 5-(chloromethyl)-2-methyl-2H-tetrazole (300 mg, 2.26 mmol) in acetone (10 ml) was added potassium thioacetic acid (387 mg, 3.39 mmol). The reaction mixture was stirred at 60° C. for 1 hour, and when the reaction was completed, the solvent was removed under reduced pressure, and the remaining mixture was diluted ethyl acetate and washed with water. The obtained organic layer was dried over anhydrous magnesium sulfate, and concentrated under reduced pressure. The residue was purified by column chromatography to give the desired compound 353 mg (91%).

$^1$H NMR (300 MHz, CDCl$_3$) δ 4.37 (s, 2H), 4.32 (s, 3H), 2.40 (s, 3H)

Step 2) (2-methyl-2H-tetrazol-5-yl)methanethiol

To a stirred solution of S-((2-methyl-2H-tetrazol-5-yl)methyl) ethanthioate (350 mg, 2.03 mmol) in methanol (8 ml) was added 2M-potassium carbonate (2 ml, 4.06 mmol). The reaction mixture was stirred at room temperature for 2 hours, and when the reaction was completed, the solvent was removed under reduced pressure, and the remaining mixture was acidified to pH 3 with 1N aqueous hydrochloric acid solution, and extracted with ethyl acetate. The obtained organic layer was dried over anhydrous magnesium sulfate, and concentrated under reduced pressure. The residue was purified by column chromatography to give the desired compound 224 mg (85%).

$^1$H NMR (300 MHz, CDCl$_3$) δ 4.35 (s, 3H), 3.97 (s, 2H), 2.14 (s, 1H, SH)

Step 3) methyl 2-((((2-methyl-2H-tetrazol-5-yl)methyl)thio)methyl)-6-(trifluoromethyl)nicotinate To a stirred solution of (2-methyl-2H-tetrazol-5-yl)methanethiol (220 mg, 1.69 mmol) obtained above in N,N-dimethylformamide (6 ml) were added potassium carbonate (700 mg, 5.07 mmol) and methyl 2-(bromomethyl)-6-(trifluoromethyl)nicotinate (602 mg, 2.02 mmol). The reaction mixture was stirred at room temperature for 3 hours, and when the reaction was completed, the reaction mixture was diluted with water, extracted with ethyl acetate, and the obtained organic layer was dried over anhydrous magnesium sulfate, and concentrated under reduced pressure. The residue was purified by column chromatography to give the desired compound 580 mg (95%).

$^1$H NMR (500 MHz, CDCl$_3$) δ 8.44 (d, J=8.2 Hz, 1H), 7.68 (d, J=8.2 Hz, 1H), 4.43 (s, 2H), 4.33 (s, 3H), 4.02 (s, 2H), 3.98 (s, 3H)

Step 4) 2-((((2-methyl-2H-tetrazol-5-yl)methyl)thio)methyl)-6-(trifluoromethyl)nicotinic acid To a stirred solution of methyl 2-((((2-methyl-2H-tetrazol-5-yl)methyl)thio)methyl)-6-(trifluoromethyl)nicotinate (580 mg, 1.60 mmol) obtained above in tetrahydrofuran/methanol (6 ml, 1/1) was added aqueous solution of 2N-sodium hydroxide (1.6 ml, 3.20 mmol). The reaction mixture was stirred at room temperature for 2 hours, and when the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound 530 mg (95%), which was used without further purification.

$^1$H NMR (500 MHz, CDCl$_3$) δ 8.53 (d, J=8.1 Hz, 1H), 7.71 (d, J=8.1 Hz, 1H), 4.47 (s, 2H), 4.33 (s, 3H), 4.06 (s, 2H)

Step 5) N-(1-methyl-1H-tetrazol-5-yl)-2-((((2-methyl-2H-tetrazol-5-yl)methyl)thio)methyl)-6-(trifluoromethyl)nicotinamide To a stirred solution of 2-((((2-methyl-2H-tetrazol-5-yl)methyl)thio)methyl)-6-(trifluoromethyl) nicotinic acid (620 mg, 1.78 mmol) obtained above in acetonitrile (20 ml) was added carbonyldiimidazole (576 mg, 3.56 mmol). The reaction mixture was stirred at room temperature for 1 hour, followed by addition of 5-amino-1-methyl-1H-tetrazole (352 mg, 3.56 mmol) and 1,8-diazabicyclo[5.4.0]undec-7-ene (0.93 ml, 6.23 mmol) and stirred at 50° C. for 2 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 724 mg (95%).

$^1$H NMR (300 MHz, CDCl$_3$) δ 11.26 (brs, NH), 8.31 (d, J=8.1 Hz, 1H), 7.71 (d, J=8.1 Hz, 1H), 4.36 (s, 2H), 4.20 (s, 3H), 4.15 (s, 3H), 3.98 (s, 2H)

Example 57. Synthesis of N-(1-methyl-1H-tetrazol-5-yl)-2-((((2-methyl-2H-tetrazol-5-yl)methyl)sulfinyl)methyl)-6-(trifluoromethyl)nicotinamide (Compound No. 2-104)

To a stirred solution of N-(1-methyl-1H-tetrazol-5-yl)-2-((((2-methyl-2H-tetrazol-5-yl)methyl)thio)methyl)-6-(trifluoromethyl)nicotinamide (50 mg, 0.117 mmol) in tetrahydrofuran/methanol/water (4 ml, 2/1/1) was added oxone (52 mg, 0.17 mmol). The reaction mixture was stirred at room temperature for 1 hour, and when the reaction was completed, the solvent was removed under reduced pressure, and the remaining mixture was diluted with ethyl acetate and washed with water. The obtained organic layer was dried over anhydrous magnesium sulfate, and concentrated under reduced pressure. The residue was purified by column chromatography to give the desired compound 36 mg (69%).

$^1$H NMR (300 MHz, CDCl$_3$) δ 11.40 (brs, NH), 8.35 (d, J=8.1 Hz, 1H), 7.83 (d, J=8.1 Hz, 1H), 5.25 (d, J=12.6 Hz, 1H), 4.83 (d, J=14.0 Hz, 1H), 4.52 (d, J=12.6 Hz, 1H), 4.38 (d, J=14.0 Hz, 1H), 4.29 (s, 3H), 4.03 (s, 3H)

Example 58. Synthesis of N-(1-methyl-1H-tetrazol-5-yl)-2-((((2-methyl-2H-tetrazol-5-yl)methyl)sulfonyl)methyl)-6-(trifluoromethyl)nicotinamide (Compound No. 2-105)

To a stirred solution of N-(1-methyl-1H-tetrazol-5-yl)-2-((((2-methyl-2H-tetrazol-5-yl)methyl)thio)methyl)-6-(trifluoromethyl)nicotinamide (50 mg, 0.117 mmol) in tetrahydrofuran/methanol/water (4 ml, 2/1/1) was added oxone (287 mg, 0.47 mmol). The reaction mixture was stirred at 50° C. for 3 hours, and when the reaction was completed, the solvent was removed under reduced pressure, diluted with ethyl acetate and washed with water. The obtained organic layer was dried over anhydrous magnesium sulfate, and concentrated under reduced pressure. The residue was purified by column chromatography to give the desired compound 40 mg (74%).

$^1$H NMR (300 MHz, CDCl$_3$) δ 12.11 (brs, NH), 8.58 (d, J=8.1 Hz, 1H), 8.22 (d, J=8.1 Hz, 1H), 5.35 (s, 2H), 5.17 (s, 2H), 4.37 (s, 3H), 3.91 (s, 3H)

Example 59. Synthesis of N-(1-methyl-1H-tetrazol-5-yl)-2-(((2-methyl-2H-tetrazol-5-yl)methoxy) methyl)-6-(trifluoromethyl)pyridin-3-carbothioamide (Compound No. 2-106)

To a stirred solution of N-(1-methyl-1H-tetrazol-5-yl)-2-(((2-methyl-2H-tetrazol-5-yl)methoxy)methyl)-6-(trifluoromethyl)nicotinamide (398 mg, 1.0 mmol) in 1,2-dioxane (4 ml) were added Lawesson's reagent (1.01 g, 2.5 mmol) and triethylamine (202 mg, 2.0 mmol). The reaction mixture was stirred at 120° C., and when the reaction was completed, the solvent was removed under reduced pressure, diluted with ethyl acetate and washed with water. The obtained organic layer was dried over anhydrous magnesium sulfate, and concentrated under reduced pressure. The residue was purified by column chromatography to give the desired compound 150 mg (37%).

$^1$H NMR (300 MHz, CDCl$_3$) δ 8.41 (d, J=5.8 Hz, 1H), 7.69 (s, 1H), 5.15 (s, 2H), 4.87 (s, 2H), 4.22 (s, 3H), 3.96 (s, 3H)

Example 60. Synthesis of N-(1-methyl-1H-tetrazol-5-yl)-2-((((2-methyl-2H-tetrazol-5-yl)methyl)thio) methyl)-6-(trifluoromethyl)pyridin-3-carbothioamide (Compound No. 2-107)

To a stirred solution of N-(1-methyl-1H-tetrazol-5-yl)-2-(((2-methyl-2H-tetrazol-5-yl)methyl)thio)methyl)-6-(trifluoromethyl)nicotinamide (151 mg, 0.36 mmol) in toluene (5 ml) was added Lawesson's reagent (221 mg, 0.55 mmol). The reaction mixture was stirred at 110° C. for 15 hours, and when the reaction was completed, the solvent was removed under reduced pressure. The residue was purified by column chromatography to give the desired compound 155 mg (99%).

$^1$H NMR (500 MHz, CDCl$_3$) δ 12.05 (brs, NH), 7.85-8.01 (m, 1H), 7.56 (d, J=8.3 Hz, 1H), 4.30 (s, 2H), 4.20 (s, 2H), 4.18 (s, 3H), 4.13 (s, 2H)

Example 61. Synthesis of 6-(difluoromethyl)-N-(1-methyl-1H-tetrazol-5-yl)-2-((((2-methyl-2H-tetrazol-5-yl)methyl)thio)methyl)nicotinamide (Compound No. 2-108)

Step 1) ethyl 6-(difluoromethyl)-2-((((2-methyl-2H-tetrazol-5-yl)methyl)thio)methyl)nicotinate To a stirred solution of ethyl 4-(((2-methyl-2H-tetrazol-5-yl)methyl)thio)-3-oxobutanoate (242 mg, 1.0 mmol) in toluene (5 ml) were added (Z)-4-amino-1,1,-difluorobut-3-en-2-one (242 mg, 2.0 mmol) and trifluoroacetic acid (228 mg, 2.0 mmol). The reaction mixture was stirred at 80° C., and when the reaction was completed, the reaction mixture was cooled and diluted with ethyl acetate and washed with water. The obtained organic layer was dried over anhydrous magnesium sulfate, and concentrated under reduced pressure. The residue was purified by column chromatography to give the desired compound 109 mg (33%).

Step 2) 6-(difluoromethyl)-2-((((2-methyl-2H-tetrazol-5-yl)methyl)thio)methyl)nicotinic acid To a stirred solution of ethyl 6-(difluoromethyl)-2-((((2-methyl-2H-tetrazol-5-yl)methyl)thio)methyl)nicotinate (343 mg, 1.0 mmol) obtained above in tetrahydrofuran/water (3:1, 4 ml) was added lithium hydroxide hydrate (82 mg, 2.0 mmol). When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound, which was used without further purification.

Step 3) 6-(difluoromethyl)-N-(1-methyl-1H-tetrazol-5-yl)-2-((((2-methyl-2H-tetrazol-5-yl)methyl)thio)methyl) nicotinamide To a stirred solution of 6-(difluoromethyl)-2-((((2-methyl-2H-tetrazol-5-yl)methyl)thio)methyl)nicotinic acid (315 mg, 1.0 mmol) obtained above in acetonitrile (3.0 ml) was added carbonyldiimidazole (243 mg, 1.5 mmol). The reaction mixture was stirred at room temperature for 1 hour, followed by addition of 5-amino-1-methyl-1H-tetrazole (199 mg, 2.0 mmol) and 1,8-diazabicyclo[5.4.0]undec-7-ene (456 mg, 3.0 mmol) and stirred at 50° C. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 138 mg (35%).

$^1$H NMR (300 MHz, MeOD) δ 8.46 (brs, NH), 7.68 (brs, 1H), 6.74 (t, J=55.5 Hz, 1H), 4.34 (s, 2H), 4.27 (s, 3H), 4.08 (s, 2H), 3.97 (s, 3H)

Example 62. Synthesis of N-benzoyl-N-(1-methyl-1H-tetrazol-5-yl)-2-((((2-methyl-2H-tetrazol-5-yl) methyl)thio)methyl)-6-(trifluoromethyl)nicotinamide (Compound No. 2-109)

To a stirred solution of N-(1-methyl-1H-tetrazol-5-yl)-2-((((2-methyl-2H-tetrazol-5-yl)methyl)thio)methyl)-6-(trifluoromethyl)nicotinamide (100 mg, 0.24 mmol) in tetrahydrofuran (3 ml) was added sodium hydride (60% in oil) (29 mg, 0.72 mmol). The reaction mixture was stirred at room temperature for 20 minutes, followed by addition of benzoyl chloride (0.03 ml, 0.48 mmol) and stirred at room temperature for 5 hours. When the reaction was completed, the reaction mixture was filtered through celite, and the filtrate was concentrated under reduced pressure. The residue was purified by column chromatography to give the desired compound 88 mg (71%).

$^1$H NMR (500 MHz, CDCl$_3$) δ 8.18 (d, J=8.0 Hz, 1H), 7.72 (d, J=7.8 Hz, 1H), 7.68 (d, J=8.0 Hz, 1H), 7.60 (dd, J=7.5, 7.5 Hz, 1H), 7.44 (dd, J=7.8, 7.8 Hz, 1H), 4.31 (s, 3H), 4.28 (s, 3H), 4.03 (s, 3H), 4.02 (s, 2H)

Example 63. Synthesis of N-(1-methyl-1H-tetrazol-5-yl)-2-((((2-methyl-2H-tetrazol-5-yl)methyl)thio) methyl)-N-(methylsulfonyl)-6-(trifluoromethyl)nicotinamide (Compound No. 2-110)

To a stirred solution of N-(1-methyl-1H-tetrazol-5-yl)-2-((((2-methyl-2H-tetrazol-5-yl)methyl)thio)methyl)-6-(trifluoromethyl)nicotinamide (230 mg, 0.56 mmol) in tetrahydrofuran (3 ml) was added sodium hydride (60% in oil) (67 mg, 1.68 mmol). The reaction mixture was stirred at room temperature for 20 minutes, followed by addition of methanesulfonyl chloride (0.09 ml, 1.12 mmol) and stirred at room temperature for 5 hours. When the reaction was completed, the reaction mixture was filtered through celite, and the filtrate was concentrated under reduced pressure.

The residue was purified by column chromatography to give the desired compound 133 mg (48%).

$^1$H NMR (500 MHz, CDCl$_3$) δ 7.80 (d, J=8.0 Hz, 1H), 7.55 (d, J=8.0 Hz, 1H), 4.30 (s, 3H), 4.26 (s, 2H), 4.19 (s, 3H), 4.04 (s, 2H), 3.70 (s, 3H)

Example 64. Synthesis of 6-(difluoromethyl)-N-(1-methyl-1H-tetrazol-1-yl)-2-((((2-methyl-2H-tetrazol-5-yl)methyl)sulfinyl)methyl)nicotinamide (Compound No. 2-111)

Step 1) (E)-4-ethoxy-1,1-difluorobu-3-ten-2-one

To a stirred solution of ethyl vinyl ether (2.2 ml, 22.98 mmol) in dichloromethane (6 ml) was added pyridine (2.04 ml, 25.28 mmol). A solution of difluoroacetic acid (13.05 ml, 81.58 mmol) in dichloromethane (7 ml) was slowly added to the reaction mixture at −10° C. or lower. The reaction temperature was slowly raised from 5° C. to room temperature, and the mixture was stirred for 3 hours. When the reaction was completed, the reaction mixture was diluted with ethyl acetate and washed water. The obtained organic layer was dried over anhydrous magnesium sulfate, and concentrated under reduced pressure to give the desired compound 3.33 g (96%), which was used without further purification.

$^1$H NMR (500 MHz, CDCl$_3$) δ 7.85 (d, J=12.5 Hz, 1H), 5.88 (d, J=12.5 Hz, 1H), 5.77 (t, J=55.0 Hz, 1H), 4.07 (q, J=7.1 Hz, 2H), 1.40 (t, J=7.1 Hz, 3H)

Step 2) ethyl 6-(difluoromethyl)-2-((((2-methyl-2H-tetrazol-5-yl)methyl)thio)methyl)nicotinate To a stirred solution of (E)-4-ethoxy-1,1-difluorobu-3-ten-2-one (2.14 g, 14.26 mmol) obtained above in acetic acid (4 ml) were added ethyl 4-(((2-methyl-2H-tetrazol-5-yl)methyl)thio)-3-oxobutanoate (1.84 g, 7.28 mmol) and ammonium acetate (2.24 g, 29.12 mmol). The reaction mixture was stirred at 60° C. for 15 hours. When the reaction was completed, the reaction mixture was diluted with water, extracted with ethyl acetate, and the obtained organic layer was dried over anhydrous magnesium sulfate, and concentrated under reduced pressure. The residue was purified by column chromatography to give the desired compound 1.80 g (66%).

$^1$H NMR (500 MHz, CDCl$_3$) δ 8.38 (d, J=8.1 Hz, 1H), 7.61 (d, J=8.1 Hz, 1H), 6.61 (t, J=55.2 Hz, 1H), 4.45-4.36 (m, 4H), 4.30 (s, 3H), 3.98 (s, 2H), 1.41 (t, J=7.1 Hz, 3H)

Step 3) 6-(difluoromethyl)-2-((((2-methyl-2H-tetrazol-5-yl)methyl)thio)methyl)nicotinic acid To a stirred solution of ethyl 6-(difluoromethyl)-2-((((2-methyl-2H-tetrazol-5-yl)methyl)thio)methyl)nicotinate (1.80 g, 5.10 mmol) obtained above in ethanol (12 ml) and tetrahydrofuran (4 ml) was added 2N aqueous sodium hydroxide solution (5.11 ml, 10.19 mmol). The reaction mixture was stirred at room temperature for 4 hours, and when the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound 1.46 g (85%), which was used without further purification.

$^1$H NMR (300 MHz, CDCl$_3$) δ 8.49 (d, J=8.1 Hz, 1H), 7.65 (d, J=8.1 Hz, 1H), 6.63 (t, J=55.1 Hz, 1H), 4.43 (s, 2H), 4.30 (s, 3H), 4.02 (s, 2H).

Step 4) 6-(difluoromethyl)-N-(1-methyl-1H-tetrazol-5-yl)-2-((((2-methyl-2H-tetrazol-5-yl)methyl)thio)methyl)nicotinamide To a stirred solution of 6-(difluoromethyl)-2-((((2-methyl-2H-tetrazol-5-yl)methyl)thio)methyl)nicotinic acid (2.13 g, 6.76 mmol) obtained above in acetonitrile (3 ml) was added carbonyldiimidazole (2.19 g, 13.51 mmol). The reaction mixture was stirred at room temperature for 4 hours, followed by addition of 5-amino-1-methyl-1H-tetrazole (2.01 g, 20.28 mmol) and 1,8-diazabicyclo[5.4.0]undec-7-ene (3.33 ml, 22.31 mmol) and stirred at 45° C. for 4 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 1.11 g (41%).

$^1$H NMR (500 MHz, Acetone-d$_6$) δ 8.69 (d, J=8.0 Hz, 1H), 7.61 (d, J=8.1 Hz, 1H), 6.79 (t, J=55.4 Hz, 1H), 4.56 (s, 2H), 4.30 (s, 3H), 4.02 (s, 2H), 3.90 (s, 3H)

Step 5) 6-(difluoromethyl)-N-(1-methyl-1H-tetrazol-1-yl)-2-((((2-methyl-2H-tetrazol-5-yl)methyl)sulfinyl)methyl)nicotinamide To a stirred solution of 6-(difluoromethyl)-N-(1-methyl-1H-tetrazol-5-yl)-2-((((2-methyl-2H-tetrazol-5-yl)methyl)thio)methyl)nicotinamide (15 mg, 0.04 mmol) obtained above in tetrahydrofuran (3 ml) was added oxone (9 mg, 0.03 mmol) at 0° C. The reaction mixture was stirred at room temperature, and when the reaction was completed, the solvent was removed under reduced pressure, and the remaining mixture was diluted with ethyl acetate and washed with water. The obtained organic layer was dried over anhydrous magnesium sulfate, and concentrated under reduced pressure. The residue was purified by column chromatography to give the desired compound 7 mg (44%).

$^1$H NMR (500 MHz, Acetone-d$_6$) δ 8.46 (d, J=7.0 Hz, 1H), 7.92 (d, J=7.0 Hz, 1H), 6.97 (t, J=54.8 Hz, 1H), 5.25 (d, J=12.8 Hz, 1H), 4.89 (d, J=14.0 Hz, 1H), 4.81 (d, J=12.8 Hz, 1H), 4.63 (d, J=14.0 Hz, 1H), 4.32 (s, 3H), 4.07 (s, 3H)

Example 65. Synthesis of N-benzoyl-6-(difluoromethyl)-N-(1-methyl-1H-tetrazol-5-yl)-2-((((2-methyl-2H-tetrazol-5-yl)methyl)thio)methyl)nicotinamide (Compound No. 2-112)

To a stirred solution of (difluoromethyl)-N-(1-methyl-1H-tetrazol-5-yl)-2-((((2-methyl-2H-tetrazol-5-yl)methyl)thio)methyl)nicotinamide (41 mg, 0.10 mmol) in anhydrous tetrahydrofuran (3 ml) was added sodium hydride (60% in oil) (12 mg, 0.30 mmol). The reaction mixture was stirred at room temperature for 20 minutes, followed by addition of benzoyl chloride (0.02 ml, 0.21 mmol) and stirred at room temperature for 5 hours. When the reaction was completed, the reaction mixture was filtered through celite, and the filtrate was concentrated under reduced pressure. The residue was purified by column chromatography to give the desired compound 88 mg (71%).

¹H NMR (500 MHz, MeOD) δ 8.37 (d, J=8.1 Hz, 1H), 7.73 (d, J=8.1 Hz, 2H), 7.68 (d, J=8.1 Hz, 1H), 7.61 (dd, J=7.4, 7.4 Hz, 1H), 7.46 (dd, J=8.1, 7.4 Hz, 2H), 6.74 (t, J=55.0 Hz, 1H), 4.29 (s, 3H), 4.23 (s, 2H), 4.13 (s, 3H), 4.04 (s, 2H)

Example 66. Synthesis of 2-(((1-methyl-1H-1,2,4-triazol-3-yl)methoxy)methyl)-N-(1-methyl-1H-tetrazol-5-yl)-6-(trifluoromethyl)nicotinamide (Compound No. 2-113)

Step 1)ethyl 2-(((1-methyl-1H-1,2,4-triazol-3-yl)methoxy)methyl)-6-(trifluoromethyl)nicotinate To a stirred solution of ethyl 4-((1-methyl-1H-1,2,4-triazol-3-yl)methoxy)-3-oxobutanoate (241 mg, 1.0 mmol) in toluene were added (Z)-4-amino-1,1,1-trifluorobut-3-en-2-one (278 mg, 2.0 mmol) and trifluoroacetic acid (228 mg, 2.0 mmol). The reaction mixture was stirred at 80° C., and when the reaction was completed, the reaction mixture was cooled and diluted with ethyl acetate and washed with water. The obtained organic layer was dried over anhydrous magnesium sulfate, and concentrated under reduced pressure. The residue was purified by column chromatography to give the desired compound 206 mg (60%).

Step 2) 2-(((1-methyl-1H-1,2,4-triazol-3-yl)methoxy)methyl)-6-(trifluoromethyl)nicotinic acid To a stirred solution of ethyl 4-((1-methyl-1H-1,2,4-triazol-3-yl)methoxy)-3-oxobutanoate (344 mg, 1.0 mmol) obtained above in tetrahydrofuran/water (3:1, 4 ml) was added lithium hydroxide hydrate (82 mg, 2.0 mmol). When the reaction was completed, the solvent was removed under reduced pressure, and the remaining mixture was diluted with water, acidified to pH 3 with 1N aqueous hydrochloric acid, and extracted with ethyl acetate. The obtained organic layer was dried over anhydrous magnesium sulfate, and concentrated under reduced pressure to give the desired compound, which was used without further purification.

Step 3) 2-(((1-methyl-1H-1,2,4-triazol-3-yl)methoxy)methyl)-N-(1-methyl-1H-tetrazol-5-yl)-6-(trifluoromethyl)nicotinamide To a stirred solution of 2-(((1-methyl-1H-1,2,4-triazol-3-yl)methoxy)methyl)-6-(trifluoromethyl)nicotinic acid (316 mg, 1.0 mmol) obtained above in acetonitrile (3 ml) was added carbonyldiimidazole (243 mg, 1.5 mmol). The reaction mixture was stirred at room temperature for 1 hour, followed by addition of 5-amino-1-methyl-1H-tetrazole (199 mg, 2.0 mmol) and 1,8-diazabicyclo[5.4.0]undec-7-ene (456 mg, 3.0 mmol) and stirred at 50° C. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 258 mg (65%).

¹H NMR (300 MHz, MeOD) δ 8.53 (d, J=7.9 Hz, 1H), 8.24 (s, 1H), 7.77 (d, J=7.9 Hz, 1H), 5.20 (s, 2H), 4.60 (s, 2H), 3.89 (s, 3H), 3.81 (s, 3H)

Example 67. Synthesis of 2-(((1-methyl-1H-1,2,4-triazol-3-yl)methoxy)methyl)-N-(1-propyl-1H-tetrazol-5-yl)-6-(trifluoromethyl)nicotinamide (Compound No. 2-114)

To a stirred solution of 2-(((1-methyl-1H-1,2,4-triazol-3-yl)methoxy)methyl)-6-(trifluoromethyl)nicotinic acid (300 mg, 0.95 mmol) in acetonitrile (3 ml) was added carbonyldiimidazole (308 mg, 1.90 mmol). The reaction mixture was stirred at room temperature for 1 hour, followed by addition of 1-propyl-1H-tetrazol-5-ylamine (241 mg, 1.90 mmol) and 1,8-diazabicyclo[5.4.0]undec-7-ene (0.50 ml, 3.32 mmol) and stirred at room temperature. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 396 mg (98%).

¹H NMR (300 MHz, CDCl₃) δ 11.20 (brs, NH), 8.38 (d, J=8.0 Hz, 1H), 7.81 (d, J=8.0 Hz, 1H), 5.11 (s, 2H), 4.89 (s, 2H), 4.52 (q, J=7.4 Hz, 2H), 4.07 (s, 3H), 1.54 (t, J=7.4 Hz, 3H)

Example 68. Synthesis of N-(1-allyl-1H-tetrazol-5-yl)-2-(((1-methyl-1H-1,2,4-triazol-3-yl)methoxy)methyl)-6-(trifluoromethyl)nicotinamide (Compound No. 2-115)

To a stirred solution of 2-(((1-methyl-1H-1,2,4-triazol-3-yl)methoxy)methyl)-6-(trifluoromethyl)nicotinic acid (300 mg, 0.95 mmol) in acetonitrile (3 ml) was added carbonyldiimidazole (308 mg, 1.90 mmol). The reaction mixture was stirred at room temperature for 1 hour, followed by addition of 1-allyl-1H-tetrazol-5-ylamine (238 mg, 1.90 mmol) and 1,8-diazabicyclo[5.4.0]undec-7-ene (0.50 ml, 3.32 mmol) and stirred at room temperature. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 463 mg.

¹H NMR (300 MHz, CDCl₃) δ 11.46 (brs, NH), 8.30 (d, J=8.1 Hz, 1H), 7.82 (s, 1H), 7.77 (d, J=9.1 Hz, 1H), 6.11-5.87 (m, 1H), 5.45 (d, J=10.2 Hz, 1H), 5.37 (d, J=10.0 Hz, 1H), 5.12 (d, J=6.0 Hz, 2H), 5.05 (s, 2H), 4.83 (s, 2H), 3.81 (s, 3H)

Example 69. Synthesis of 2-(((1,5-dimethyl-1H-1,2,4-triazol-3-yl)methoxy)methyl)-N-(1-methyl-1H-tetrazol-5-yl)-6-(trifluoromethyl)nicotinamide (Compound No. 2-116)

Step 1)ethyl 2-(((1,5-dimethyl-1H-1,2,4-triazol-3-yl)methoxy)methyl)-6-(trifluoromethyl)nicotinate To a stirred solution of ethyl 4-((1,5-dimethyl-1H-1,2,4-triazol-3-yl)methoxy)-3-oxobutanoate (255 mg, 1.0 mmol) in toluene (5.0 ml) were added (Z)-4-amino-1,1,1-trifluorobut-3-en-2-one (278 mg, 2.0 mmol) and trifluoroacetic acid (228 mg, 2.0 mmol). The reaction mixture was stirred at 80° C. When the reaction was completed, the solvent was removed under reduced pressure, and the remaining mixture was diluted with ethyl acetate and washed with water. The obtained organic layer was dried over anhydrous magnesium sulfate, and concentrated under reduced pressure. The residue was purified by column chromatography to give the desired compound 214 mg (60%).

Step 2) 2-(((1,5-dimethyl-1H-1,2,4-triazol-3-yl)methoxy)methyl)-6-(trifluoromethyl)nicotinic acid To a stirred solution of ethyl ethyl 2-(((1,5-dimethyl-1H-1,2,4-triazol-3-yl)methoxy)methyl)-6-(trifluoromethyl) nicotinate (358 mg, 1.0 mmol) obtained above in tetrahydrofuran/water (3:1, 4 ml) was added lithium hydroxide hydrate (82 mg, 2.0 mmol). When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound, which was used without further purification.

Step 3) 2-(((1,5-dimethyl-1H-1,2,4-triazol-3-yl)methoxy)methyl)-N-(1-methyl-1H-tetrazol-5-yl)-6-(trifluoromethyl)nicotinamide To a stirred solution of 2-(((1,5-dimethyl-1H-1,2,4-triazol-3-yl)methoxy)methyl)-6-(trifluoromethyl)nicotinic acid (330 mg, 1.0 mmol) in acetonitrile (4.0 ml) was added carbonyldiimidazole (243 mg, 1.5 mmol). The reaction mixture was stirred at room temperature for 1 hour, followed by addition of 5-amino-2-methyl-1H-tetrazole (199 mg, 2.0 mmol) and 1,8-diazabicyclo[5.4.0]undec-7-ene (456 mg, 3.0 mmol) and stirred at 50° C. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, concentrated under reduced pressure. The residue was purified by column chromatography to give the desired compound 304 mg (74%).

$^1$H NMR (300 MHz, MeOD) δ 8.32 (d, J=7.8 Hz, 1H), 7.94 (q, J=6.0 Hz, 1H), 4.95 (d, J=13.8 Hz, 2H), 4.56 (s, 2H), 4.05 (s, 3H), 3.76 (s, 3H), 2.42 (s, 3H)

Example 70. Synthesis of 22-(((1,5-dimethyl-1H-1,2,4-triazol-3-yl)methoxy)methyl)-N-(1-methyl-1H-tetrazol-5-yl)-6-(trifluoromethyl)pyridin-3-carbothioamide (Compound No. 2-117)

To a stirred solution of 2-(((1,5-dimethyl-1H-1,2,4-triazol-3-yl)methoxy)methyl)-N-(1-methyl-1H-tetrazol-5-yl)-6-(trifluoromethyl)nicotinamide (411 mg, 1.0 mmol) in tetrahydrofuran (10 ml) was added Lawesson's reagent (1.01 g, 2.5 mmol). The reaction mixture was stirred at 70° C. When the reaction was completed, the reaction mixture was diluted with ethyl acetate and washed with water, and the obtained organic layer was dried over anhydrous magnesium sulfate, and concentrated under reduced pressure. The residue was purified by column chromatography to give the desired compound 94 mg (22%).

$^1$H NMR (300 MHz, MeOD) δ 8.53 (br d, J=24.0 Hz, 1H), 7.79 (d, J=7.8 Hz, 1H), 5.13 (brs, 2H), 4.54 (s, 2H), 3.88 (s, 3H), 3.74 (s, 3H), 2.36 (s, 3H)

Example 71. Synthesis of N-(1-methyl-1H-tetrazol-5-yl)-2-(((1-methyl-5-(trifluoromethyl)-1H-1,2,4-triazol-3-yl)methoxy)methyl)-6-(trifluoromethyl) nicotinamide (Compound No. 2-118)

Step 1) methyl 2-(((1-methyl-5-(trifluoromethyl)-1H-1,2,4-triazol-3-yl)methoxy)methyl)-6-(trifluoromethyl)nicotinate To a stirred solution of 2-(((5-iodo-1-methyl-1H-1,2,5-triazol-3-yl)methoxy)methyl)-6-(trifluoromethyl)nicotinate (200 mg, 0.44 mmol) in N,N-dimethylformamide (5 ml) were added copper iodide (84 mg, 0.44 mmol) and methyl fluorosulfonyldifluoroacetate (0.28 ml, 2.2 mmol). The reaction mixture was stirred at 50° C. for 5 hours. When the reaction was completed, the reaction mixture was filtered through celite, the filtrate was concentrated under reduced pressure, diluted with ethyl acetate and washed with water. The the organic layer obtained was dried over anhydrous magnesium sulfate, and concentrated under reduced pressure. The residue was purified by column chromatography to give the desired compound 88.4 mg (50.5%).

$^1$H NMR (300 MHz, CDCl$_3$) δ 8.29 (d, J=8.1 Hz, 1H), 7.69 (d, J=8.1 Hz, 1H), 5.12 (s, 2H), 4.72 (s, 2H), 4.03 (s, 3H), 3.97 (s, 3H)

Step 2) 2-(((1-methyl-5-(trifluoromethyl)-1H-1,2,4-triazol-3-yl)methoxy)methyl)-6-(trifluoromethyl) nicotinic acid To a stirred solution of methyl 2-(((1-methyl-5-(trifluoromethyl)-1H-1,2,4-triazol-3-yl)methoxy)methyl)-6-(trifluoromethyl)nicotinate (365 mg, 0.79 mmol) obtained above in tetrahydrofuran (3 ml) and water (1 ml) was added lithium hydroxide hydrate (101 mg, 2.4 mmol). When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound 288 mg (95%), which was used without further purification.

$^1$H NMR (300 MHz, CDCl$_3$) δ 8.32 (d, J=6.5 Hz, 1H), 7.60 (d, J=5.1 Hz, 1H), 5.13 (s, 2H), 4.70 (s, 2H), 3.95 (s, 3H)

Step 3) N-(1-methyl-1H-tetrazol-5-yl)-2-(((1-methyl-5-(trifluoromethyl)-1H-1,2,4-triazol-3-yl)methoxy)methyl)-6-(trifluoromethyl)nicotinamide To a stirred solution of 2-(((1-methyl-5-(trifluoromethyl)-1H-1,2,4-triazol-3-yl)methoxy)methyl)-6-(trifluoromethyl) nicotinic acid (288 mg, 0.75 mmol) obtained above in anhydrous acetonitrile (5 ml) was added carbonyldiimidazole (243 mg, 1.5 mmol). The reaction mixture was stirred at room temperature for 1 hour, followed by addition of 5-amino-1-methyl-1H-tetrazole (149 mg, 1.5 mmol) and 1,8-diazabicyclo[5,4,0]undec-7-ene (0.34 ml, 2.25 mmol) and stirred at 50° C. for 23 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 186.4 mg (53%).

¹H NMR (400 MHz, CDCl₃) δ 8.41 (s, 1H), 7.79 (s, 1H), 5.10 (s, 2H), 4.78 (s, 2H), 4.09 (s, 3H), 3.93 (s, 3H)

Example 72. Synthesis of N-(1-ethyl-1H-tetrazol-5-yl)-2-(((1-methyl-5-(trifluoromethyl)-1H-1,2,4-triazol-3-yl)methoxy)methyl)-6-(trifluoromethyl)nicotinamide (Compound No. 2-119)

To a stirred solution of 2-(((1-methyl-5-(trifluoromethyl)-1H-1,2,4-triazol-3-yl)methoxy)methyl)-6-(trifluoromethyl) nicotinic acid (100 mg, 0.26 mmol) in anhydrous acetonitrile (3 ml) was added carbonyldiimidazole (84 mg, 0.52 mmol). The reaction mixture was stirred at room temperature for 1 hour, followed by addition of 5-amino-1-ethyl-1H-tetrazole (59 mg, 0.52 mmol) and 1,8-diazabicyclo[5,4,0]undec-7-ene (0.12 ml, 0.78 mmol) and stirred at 50° C. for 20 hours and 30 minutes. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 108.1 mg (86%).
¹H NMR (400 MHz, CDCl₃) δ 8.34 (s, 1H), 7.78 (s, 1H), 5.09 (s, 2H), 4.81 (s, 2H), 4.41 (q, J=6.2 Hz, 2H), 3.93 (s, 3H), 1.60 (s, 3H)

Example 73. Synthesis of 2-(((1-methyl-5-(trifluoromethyl)-1H-1,2,4-triazol-3-yl)methoxy)methyl)-N-(1-propyl-1H-tetrazol-5-yl)-6-(trifluoromethyl)nicotinamide (Compound No. 2-120)

To a stirred solution of 2-(((1-methyl-5-(trifluoromethyl)-1H-1,2,4-triazol-3-yl)methoxy)methyl)-6-(trifluoromethyl) nicotinic acid (132 mg, 0.34 mmol) in anhydrous acetonitrile (3 ml) was added carbonyldiimidazole (112 mg, 0.69 mmol). The reaction mixture was stirred at room temperature for 1 hour, followed by addition of 5-amino-1-propyl-1H-tetrazole (88 mg, 0.69 mmol) and 1,8-diazabicyclo[5,4,0]undec-7-ene (0.15 ml, 1.02 mmol) and stirred at 50° C. for 20 hours and 30 minutes. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 158.2 mg (94%).
¹H NMR (400 MHz, CDCl₃) δ 8.35 (d, J=7.6 Hz, 1H), 7.79 (d, J=7.4 Hz, 1H), 5.10 (s, 2H), 4.83 (s, 2H), 4.34 (t, J=6.7 Hz, 2H), 3.94 (s, 3H), 2.04-1.96 (m, 2H), 0.98 (t, J=7.1 Hz, 3H)

Example 74. Synthesis of N-(1-allyl-1H-tetrazol-5-yl)-2-(((1-methyl-5-(trifluoromethyl)-1H-1,2,4-triazol-3-yl)methoxy)methyl)-6-(trifluoromethyl)nicotinamide (Compound No. 2-121)

To a stirred solution of 2-(((1-methyl-5-(trifluoromethyl)-1H-1,2,4-triazol-3-yl)methoxy)methyl)-6-(trifluoromethyl) nicotinic acid (100 mg, 0.26 mmol) in anhydrous acetonitrile (3 ml) was added carbonyldiimidazole (84 mg, 0.52 mmol). The reaction mixture was stirred at room temperature for 1 hour, followed by addition of 5-amino-1-allyl-1H-tetrazole (65 mg, 0.52 mmol) and 1,8-diazabicyclo[5,4,0]undec-7-ene (0.11 ml, 0.72 mmol) and stirred at 50° C. for 23 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 132 mg (100%).
¹H NMR (300 MHz, CDCl₃) δ 11.01 (brs, NH), 8.32 (d, J=7.9 Hz, 1H), 7.78 (d, J=7.9 Hz, 1H), 5.97 (ddd, J=16.4, 10.4, 5.9 Hz, 1H), 5.39-5.24 (m, 2H), 5.08 (d, J=8.9 Hz, 4H), 4.80 (s, 2H), 3.94 (s, 3H)

Example 75. Synthesis of 2-(((1-methyl-5-(trifluoromethyl)-1H-1,2,4-triazol-3-yl)methoxy)methyl)-N-(1-prop-2-yn-1-yl)-1H-tetrazol-5-yl)-6-(trifluoromethyl)nicotinamide (Compound No. 2-122)

To a stirred solution of 2-(((1-methyl-5-(trifluoromethyl)-1H-1,2,4-triazol-3-yl)methoxy)methyl)-6-(trifluoromethyl) nicotinic acid (116 mg, 0.30 mmol) in anhydrous acetonitrile (4 ml) was added carbonyldiimidazole (97 mg, 0.60 mmol). The reaction mixture was stirred at room temperature for 1 hr, followed by addition of 1-(prop-2-yn-1-yl)-1H-tetrazole-5-amine and 1,8-diazabicyclo[5,4,0]undec-7-ene (0.13 ml, 0.90 mmol) and stirred at 50° C. for 15 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 106 mg (72%).
¹H NMR (400 MHz, CDCl₃) δ 11.03 (brs, NH), 8.40 (d, J=7.4 Hz, 1H), 7.83 (d, J=7.7 Hz, 1H), 5.33 (s, 2H), 5.13 (s, 2H), 4.91 (s, 2H), 3.96 (s, 3H), 2.46 (s, 1H)

Example 76. Synthesis of 2-(((5-(difluoromethyl)-1-methyl-1H-1,2,4-triazol-3-yl)methoxy)methyl)-N-(1-methyl-1H-tetrazol-5-yl)-6-trifluoromethyl)nicotinamide (Compound No. 2-123)

Step 1) 3-(((t-butyldiphenylsilyl)oxy)methyl)-1-methyl-1H-1,2,4-triazol-5-carbaldehyde To a stirred solution of 3-(((t-butyldiphenylsilyl)oxy)methyl)-1-methyl-1H-1,2,4-triazole (10 g, 28.4 mmol) in anhydrous tetrahydrofuran (100 ml) was added 2.5 M n-butyllithium in hexane (12.48 ml, 31.2 mmol) at −78° C. The reaction mixture was stirred at −30° C. for 1 hour, followed by slow addition of N,N-dimethylformamide (3.29 ml, 42.6 mmol) at −78° C. The reaction mixture was stirred at room temperature for 2 hours, and when the reaction was completed, a 20% aqueous ammonium chloride solution was added to quench the reaction, followed by workup procedure with an aqueous sodium thiosulfate solution and ethyl acetate. The obtained organic layer was dried over anhydrous magnesium sulfate, and concentrated under reduced pressure to give the desired compound 7.65 g (71.5%), which was used without further purification.
¹H NMR (500 MHz, CDCl₃) δ 9.96 (s, 1H), 7.74 (d, J=7.0 Hz, 4H), 7.40 (dt, J=14.4, 7.2 Hz, 6H), 4.81 (s, 2H), 4.15 (s, 3H), 1.08 (s, 9H)

Step 2) 3-(((t-butyldiphenylsilyl)oxy)methyl)-5-(difluoromethyl)-1-methyl-1H-1,2,4-triazole To a stirred solution of 3-(((t-butyldiphenylsilyl)oxy) methyl)-1-methyl-1H-1,2,4-triazol-5-carbaldehyde (3.5 g, 9.22 mmol) obtained above in dichloromethane (30 ml) was added (diethylamino)sulfur trifluoride (8 ml, 23 mmol) at 0° C. The reaction mixture was stirred at room temperature for 1 hour. When the reaction was completed, the reaction mixture was quenched by slow addition of water and saturated sodium hydrogen carbonate aqueous solution at 0° C., followed by extraction with ethyl acetate. The obtained organic layer was dried over anhydrous magnesium sulfate, concentrated under reduced pressure, and purified by column chromatography to obtain 2.73 g (73.7%) of the desired compound.

$^1$H NMR (400 MHz, CDCl$_3$) δ 7.72 (d, J=6.9 Hz, 4H), 7.41 (dd, J=17.9, 7.0 Hz, 6H), 6.80 (t, J=52.6 Hz, 1H), 4.74 (s, 2H), 3.98 (s, 3H), 1.07 (d, J=2.6 Hz, 9H)

Step 3) (5-(difluoromethyl)-1-methyl-1H-1,2,4-triazol-3-yl)methanol

To a stirred solution of 3-(((t-butyldiphenylsilyl)oxy)methyl)-5-(difluoromethyl)-1-methyl-1H-1,2,4-triazole (1 g, 2.49 mmol) obtained above in tetrahydrofuran (10 ml) was added 1 M tetra-n-butylammonium fluoride in tetrahydrofuran (7.47 ml, 7.47 mmol) at 0° C. The reaction mixture was stirred at room temperature for 2 hours. When the reaction was completed, the reaction mixture was concentrated under reduced pressure and purified by column chromatography to obtain 436.2 mg (71.4%) of the desired compound.

$^1$H NMR (500 MHz, CDCl$_3$) δ 6.86 (t, J=52.4 Hz, 1H), 4.72 (s, 2H), 4.31 (s, 1H), 4.02 (s, 3H)

Step 4) methyl 2-(((5-(difluoromethyl)-1-methyl-1H-1,2,4-triazol-3-yl)methoxy)-6-(trifluoromethyl)nicotinate To a stirred solution of (5-(difluoromethyl)-1-methyl-1H-1,2,4-triazol-3-yl)methanol (232.6 mg, 1.43 mmol) obtained above in anhydrous tetrahydrofuran (3 ml) was added sodium hydride (60% in oil) (69 mg, 1.72 mmol) at 0° C. The reaction mixture was stirred at 35° C. for 1 hour, followed by addition of methyl 2-(bromomethyl)-6-(trifluoromethyl)nicotinate (513 mg, 1.72 mmol) at 0° C. and stirred at 30° C. for 2 hours. When the reaction was completed, workup procedure was performed using saturated aqueous ammonium chloride solution and ethyl acetate, and the obtained organic layer was dried over anhydrous magnesium sulfate, concentrated under reduced pressure. The residue was purified by column chromatography to give the desired compound 230 mg (42%).

$^1$H NMR (500 MHz, CDCl$_3$) δ 8.31 (s, 1H), 7.69 (d, J=8.0 Hz, 1H), 6.80 (t, J=52.5 Hz, 1H), 5.11 (s, 2H), 4.70 (s, 2H), 4.02 (s, 3H), 3.96 (s, 3H)

Step 5) 2-(((5-(difluoromethyl)-1-methyl-1H-1,2,4-triazol-3-yl)methoxy)methyl)-6-(trifluoromethyl)nicotinic acid To a stirred solution of methyl 2-(((5-(difluoromethyl)-1-methyl-1H-1,2,4-triazol-3-yl)methoxy)-6-(trifluoromethyl)nicotinate (230 mg, 0.6 mmol) obtained above in tetrahydrofuran (3 ml) and water (1 ml) was added lithium hydroxide hydrate (76 mg, 1.81 mmol). When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound 170 mg (77.6%), which was used without further purification.

$^1$H NMR (500 MHz, CDCl$_3$) δ 8.34 (d, J=8.1 Hz, 1H), 7.71 (d, J=8.2 Hz, 1H), 6.89 (t, J=52.2 Hz, 2H), 5.15 (s, 2H), 4.76 (s, 2H), 4.02 (s, 3H)

Step 6) 2-(((5-(difluoromethyl)-1-methyl-1H-1,2,4-triazol-3-yl)methoxy)methyl)-N-(1-methyl-1H-tetrazol-5-yl)-6-trifluoromethyl)nicotinamide To a stirred solution of 2-(((5-(difluoromethyl)-1-methyl-1H-1,2,4-triazol-3-yl)methoxy)methyl)-6-(trifluoromethyl)nicotinic acid (100 mg, 0.27 mmol) obtained above in anhydroud acetonitrile (5 ml) was added carbonyldiimidazole (89 mg, 0.55 mmol). The reaction mixture was stirred at room temperature for 1 hour, followed by addition of 5-amino-1-methyl-1H-tetrazole (55 mg, 0.55 mmol) and 1,8-diazabicyclo[5,4,0]undec-7-ene (0.12 ml, 0.81 mmol) and stirred at 50° C. for 18 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 78.9 mg (65.7%).

$^1$H NMR (400 MHz, CDCl$_3$) δ 8.34 (d, J=8.0 Hz, 1H), 7.80 (d, J=8.0 Hz, 1H), 6.70 (t, J=52.4 Hz, 1H), 5.07 (s, 2H), 4.81 (s, 2H), 4.07 (s, 3H), 3.92 (s, 3H)

Example 77. Synthesis of 2-(((5-(difluoromethyl)-1-methyl-1H-1,2,4-triazol-3-yl)-methoxy)-N-(1-propyl-1H-tetrazol-5-yl)-6-(trifluoromethyl)nicotinamide (Compound No. 2-124)

To a stirred solution of 2-(((5-(difluoromethyl)-1-methyl-1H-1,2,4-triazol-3-yl)methoxy)methyl)-6-(trifluoromethyl)nicotinic acid (100 mg, 0.27 mmol) in anhydrous acetonitrile (5 ml) was added carbonyldiimidazole (87 mg, 0.54 mmol). The reaction mixture was stirred at room temperature for 1 hour, followed by addition of 5-amino-1-propyl-1H-tetrazole (68 mg, 0.54 mmol) and 1,8-diazabicyclo[5,4,0]undec-7-ene (0.12 ml, 0.81 mmol) and stirred at 50° C. for 16 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 112.2 mg (87.6%).

$^1$H NMR (500 MHz, CDCl$_3$) δ 11.01 (brs, NH), 8.35 (d, J=8.0 Hz, 1H), 7.80 (d, J=8.0 Hz, 1H), 6.70 (t, J=52.4 Hz, 1H), 5.07 (s, 2H), 4.81 (s, 2H), 4.32 (t, J=7.3 Hz, 2H), 3.92 (s, 3H), 2.05-1.98 (m, 2H), 0.98 (t, J=7.4 Hz, 3H)

Example 78. Synthesis of N-(1-allyl-1H-tetrazol-5-yl)-2-(((5-(difluoromethyl)-1-methyl-1H-1,2,4-triazol-3-yl)methoxy)methyl)-6-(trifluoromethyl)nicotinamide (Compound No. 2-125)

To a stirred solution of 2-(((5-(difluoromethyl)-1-methyl-1H-1,2,4-triazol-3-yl)methoxy)methyl)-6-(trifluoromethyl)nicotinic acid (100 mg, 0.27 mmol) in anhydrous acetonitrile (5 ml) was added carbonyldiimidazole (87 mg, 0.54 mmol). The reaction mixture was stirred at room temperature for 1 hour, followed by addition of 5-amino-1-allyl-1H-tetrazole (67 mg, 0.54 mmol) and 1,8-diazabicyclo[5,4,0]undec-7-ene (0.12 ml, 0.81 mmol) and stirred at 50° C. for 16 hours and 30 minutes. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 119.4 mg (93%).

$^1$H NMR (400 MHz, CDCl$_3$) δ 11.11 (brs, NH), 8.32 (d, J=8.0 Hz, 1H), 7.79 (d, J=8.0 Hz, 1H), 6.72 (t, J=52.4 Hz, 1H), 5.98 (ddt, J=17.1, 10.3, 6.0 Hz, 1H), 5.39-5.24 (m, 2H), 5.10 (dt, J=6.1, 1.5 Hz, 2H), 5.04 (s, 2H), 4.77 (s, 2H), 3.92 (s, 3H)

Example 79. Synthesis of 2-(((5-(fluoromethyl)-1-methyl-1H-1,2,4-triazol-3-yl)methoxy)methyl)-N-(1-methyl-1H-tetrazol-5-yl)-6-(trifluoromethyl)nicotinamide (Compound No. 2-126)

Step 1) (3-(((t-butyldiphenylsilyl)oxy)methyl)-1-methyl-1H-1,2,4-triazol-5-yl)methanol To a stirred solution of 3-(((t-butyldiphenylsilyl)oxy)methyl)-1-methyl-1H-1,2,4-triazol-5-carbaldehyde (9.26 g, 24.2 mmol) in methanol (90 ml) was added sodium borohydride (923 mg, 24.4 mmol) at 0° C. The reaction mixture was stirred at room temperature for 1 hour and 20 minutes. When the reaction was completed, the reaction mixture was concentrated under reduced pressure and purified by column chromatography to obtain 9.24 g (99%) of the desired compound.

$^1$H NMR (400 MHz, CDCl$_3$) δ 7.72 (dt, J=6.5, 1.7 Hz, 4H), 7.44-7.34 (m, 6H), 4.69 (s, 2H), 3.80 (s, 3H), 1.06 (s, 9H)

Step 2) 3-(((t-butyldiphenylsilyl)oxy)methyl)-1-methyl-5-(trityloxy)methyl)-1H-1,2,4-triazole To a stirred solution of (3-(((t-butyldiphenylsilyl)oxy)methyl)-1-methyl-1H-1,2,4-triazol-5-yl)methanol (4.64 g, 12 mmol) obtained above in dichloromethane (50 ml) were added trityl chloride (3.68 g, 1.32 mmo), triethylamine (2.94 ml, 21.2 mmol) and 4-dimethylaminopyridine (586 mg, 4.8 mmol). The reaction mixture was stirred at room temperature for 20 hours and 30 minutes. When the reaction was completed, the mixture was diluted with ethyl acetate, washed with water. The obtained organic layer was dried over anhydrous magnesium sulfate, and concentrated under reduced pressure. The residue was purified by column chromatography to give the desired compound 2.68 g (35.8%).

$^1$H NMR (400 MHz, CDCl$_3$) δ 7.83-7.78 (m, 4H), 7.56-7.51 (m, 6H), 7.47-7.27 (m, 15H), 4.79 (s, 2H), 4.33 (s, 2H), 3.74 (s, 3H), 1.12 (s, 9H)

Step 3) (1-methyl-5-((trityloxy)methyl)-1H-1,2,4-triazol-3-yl)methanol

To a stirred solution of 3-(((t-butyldiphenylsilyl)oxy)methyl)-1-methyl-5-(trityloxy)methyl)-1H-1,2,4-triazole (2.68 g, 4.29 mmol) in anhydrous tetrahydrofuran (30 ml) was added 1 M tetra-n-butylammonium fluoride in tetrahydrofuran (12.88 ml, 12.88 mmol) at 0° C. The reaction mixture was stirred at room temperature for 2 hours and 30 minutes. When the reaction was completed, the reaction mixture was concentrated under reduced pressure and purified by column chromatography to give 1.65 g (100%) of the desired compound.

$^1$H NMR (400 MHz, CDCl$_3$) δ 7.52-7.23 (m, 15H), 4.70 (s, 2H), 4.30 (s, 2H), 3.72 (s, 3H)

Step 4) methyl 2-(((1-methyl-5-((trityloxy)methyl)-1H-1,2,4-triazol-3-yl)methoxy)methyl)-6-(trifluoromethyl)nicotinate To a stirred solution of (1-methyl-5-((trityloxy)methyl)-1H-1,2,4-triazol-3-yl)methanol (1.65 g, 4.29 mmol) obtained above in anhydrous tetrahydrofuran (15 ml) was added sodium hydride (60% in oil) (206 mg, 5.15 mmol) at 0° C. The reaction mixture was stirred at 35° C. for 1 hour, followed by addition of methyl 2-(bromomethyl)-6-(trifluoromethyl)nicotinate (1.53 g, 5.15 mmol) at 0° C. and stirred at 30° C. for 20 minutes. When the reaction was completed, the reaction mixture was diluted with ethyl acetate, washed with saturated aqueous ammonium chloride solution. The obtained organic layer was dried over anhydrous magnesium sulfate, and concentrated under reduced pressure. The residue was purified by column chromatography to give the desired compound 760 mg (29.4%).

$^1$H NMR (400 MHz, CDCl$_3$) δ 8.25 (d, J=8.0 Hz, 1H), 7.66 (d, J=8.0 Hz, 1H), 7.49-7.45 (m, 6H), 7.32 (t, J=7.4 Hz, 7H), 7.26 (t, J=7.2 Hz, 4H), 5.09 (s, 2H), 4.66 (s, 2H), 4.30 (s, 2H), 3.94 (s, 3H), 3.71 (s, 3H)

Step 5) methyl 2-(((5-(hydroxymethyl)-1-methyl-1H-1,2,4-triazol-3-yl)methoxy)methyl)-6-(trifluoromethyl)nicotinate To a stirred solution of ethyl 2-(((1-methyl-5-((trityloxy)methyl)-1H-1,2,4-triazol-3-yl)methoxy)methyl)-6-(trifluoromethyl)nicotinate (290 mg, 0.48 mmol) obtained above in methanol (3 ml), was added p-toluenesulfonic acid (2 ml). The reaction mixture was stirred at room temperature for 4 days. When the reaction was completed, the mixture was diluted with ethyl acetate, washed with saturated sodium bicarbonate aqueous solution. The obtained organic layer was dried over anhydrous magnesium sulfate, and concentrated under reduced pressure. The residue was purified by column chromatography to give the desired compound 153.9 mg (89%).

$^1$H NMR (400 MHz, CDCl$_3$) δ 8.29 (d, J=8.0 Hz, 1H), 7.69 (d, J=8.0 Hz, 1H), 5.08 (s, 2H), 4.64 (s, 2H), 3.95 (s, 3H), 3.88 (s, 3H)

Step 6) methyl 2-(((5-(fluoromethyl)-1-methyl-1H-1,2,4-triazol-3-yl)methoxy)methyl)-6-(trifluoromethyl)nicotinate To a stirred solution of methyl 2-(((5-(hydroxymethyl)-1-methyl-1H-1,2,4-triazol-3-yl)methoxy)methyl)-6-(trifluoromethyl)nicotinate (153.9 mg, 0.43 mmol) obtained above in dichloromethane (5 ml) was added (diethylamino)sulfurtrifluoride (0.14 ml, 1.06 mmol) at 0° C. The reaction mixture was stirred at room temperature for 1 hour. When the reaction was completed, the reaction mixture was quenched by slow addition of water and saturated sodium bicarbonate aqueous solution at 0° C., followed by extraction with ethyl acetate. The obtained organic layer was dried over anhydrous magnesium sulfate, concentrated under reduced pressure, and purified by column chromatography to obtain 36.1 mg (22%) of the desired compound.

¹H NMR (400 MHz, CDCl₃) δ 8.29 (s, 1H), 7.68 (d, J=8.0 Hz, 1H), 7.26 (s, 1H), 5.56 (s, 1H), 5.44 (s, 1H), 5.10 (s, 2H), 4.68 (s, 2H), 3.96 (s, 3H), 3.94 (d, J=1.5 Hz, 3H)

Step 7) 2-(((5-(fluoromethyl)-1-methyl-1H-1,2,4-triazol-3-yl)methoxy)methyl)-6-(trifluoromethyl)nicotinic acid To a stirred solution of methyl 2-(((5-(fluoromethyl)-1-methyl-1H-1,2,4-triazol-3-yl)methoxy)methyl)-6-(trifluoromethyl)nicotinate (92.8 mg, 0.26 mmol) obtained above in tetrahydrofuran (3 ml) and water (1 ml) was added lithium hydroxide hydrate (32 mg, 0.768 mmol). The reaction mixture was stirred at room temperature for 12 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound 83.5 mg (92.7%), which was used without further purification.

¹H NMR (300 MHz, CDCl₃) δ 8.28 (d, J=8.2 Hz, 1H), 7.69 (d, J=7.8 Hz, 1H), 5.59 (s, 1H), 5.43 (s, 1H), 5.11 (s, 2H), 4.74 (s, 2H), 3.94 (s, 3H)

Step 8) 2-(((5-(fluoromethyl)-1-methyl-1H-1,2,4-triazol-3-yl)methoxy)methyl)-N-(1-methyl-1H-tetrazol-5-yl)-6-(trifluoromethyl)nicotinamide To a stirred solution of 2-(((5-(fluoromethyl)-1-methyl-1H-1,2,4-triazol-3-yl)methoxy)methyl)-6-(trifluoromethyl)nicotinic acid (83.5 mg, 0.24 mmol) obtained above in anhydrous acetonitrile (5 ml) was added carbonyldiimidazole (77.8 mg, 0.48 mmol). The reaction mixture was stirred at room temperature for 1 hour, followed by addition of 5-amino-1-methyl-1H-tetrazole (47.5 mg, 0.48 mmol) and 1,8-diazabicyclo[5,4,0]undec-7-ene (0.1 ml, 0.72 mmol) and stirred at 50° C. for 21 hours and 30 minutes. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 94.8 mg (92%).

¹H NMR (400 MHz, CDCl₃) δ 8.31 (d, J=8.0 Hz, 1H), 7.78 (d, J=8.0 Hz, 1H), 5.34 (d, J=47.5 Hz, 2H), 5.05 (s, 2H), 4.77 (s, 2H), 4.06 (s, 3H), 3.84 (s, 3H)

Example 80. Synthesis of N-(1-methyl-1H-tetrazol-5-yl)-2-(((1-methyl-5-vinyl-1H-1,2,4-triazol-3-yl)methoxy)methyl)-6-(trifluoromethyl)nicotinamide (Compound No. 2-127)

Step 1) 3-(((t-butyldiphenylsilyl)oxy)methyl)-1-methyl-1H-1,2,4-triazole

To a stirred solution of (1-methyl-1H-1,2,4-triazol-3-yl)methanol (10 g, 88.45 mmol) in N,N-dimethylformamide (70 ml) were added t-butyl (chloro)diphenylsilane (25 ml, 97.3 mmol) and imidazole (12 g, 177 mmol) at 0° C. When the reaction was completed, the mixture was diluted with water, extracted with diethyl ether, and the obtained organic layer was dried over anhydrous magnesium sulfate, and concentrated under reduced pressure. The residue was purified by column chromatography to give the desired compound 29.69 g (95.7%).

¹H NMR (300 MHz, CDCl₃) δ 7.98 (s, 1H), 7.82-7.75 (m, 4H), 7.49-7.37 (m, 6H), 4.79 (s, 2H), 3.88 (s, 3H), 1.10 (s, 9H)

Step 2) 3-(((t-butyldiphenylsilyl)oxy)methyl)-5-iodo-1-methyl-1H-1,2,4-triazole

To a stirred solution of 3-(((t-butyldiphenylsilyl)oxy)methyl)-1-methyl-1H-1,2,4-triazole (18.6 g, 55.8 mmol) obtained above in anhydrous tetrahydrofuran (60 ml) was added 2.5 M n-butyllithium in hexane (26.8 ml, 66.9 mmol) at −78° C. The reaction mixture was stirred at −30° C. for 1 hour, followed by slow addition of a solution of iodine (42.5 g, 167.4 mmol) in anhydrous tetrahydrofuran (120 ml) at −78° C. The reaction mixture was stirred at room temperature for 2 hours and 30 minutes. When the reaction was completed, the reaction mixture was quenched by addition of a 20% aqueous ammonium chloride solution, extracted with ethyl acetate. The organic layer was washed with an aqueous sodium thiosulfate solution. The obtained organic layer was dried using anhydrous magnesium sulfate, and concentrated under reduced pressure to give the desired compound 25 g (100%), which was used without further purification.

¹H NMR (400 MHz, CDCl₃) δ 7.72 (d, J=7.0 Hz, 4H), 7.38 (q, J=7.7, 6.0 Hz, 6H), 4.73 (s, 2H), 3.84 (s, 3H), 1.06 (s, 9H)

Step 3) (5-iodo-1-methyl-1H-1,2,4-triazol-3-yl)methanol

To a stirred solution of 3-(((t-butyldiphenylsilyl)oxy)methyl)-5-iodo-1-methyl-1H-1,2,4-triazole (25 g, 52.4 mmol) obtained above in methanol (250 ml) was added tetrabromomethane (13.8 g, 42 mmol). The reaction mixture was stirred at 70° C. for 19 hours. When the reaction was completed, the solvent was removed under reduced pressure, and the remaining mixture was solidified with dichloromethane and filtered to give the desired compound 8.65 g (69.2%), which was used without further purification.

¹H NMR (500 MHz, MeOD) δ 4.60 (s, 2H), 3.93 (d, J=1.0 Hz, 3H)

Step 4) methyl 2-(((5-iodo-1-methyl-1H-1,2,5-triazol-3-yl)methoxy)methyl)-6-(trifluoromethyl)nicotinate To a stirred solution of (5-iodo-1-methyl-1H-1,2,4-triazol-3-yl)methanol (8.65 g, 36.2 mmol) obtained above in anhydrous tetrahydrofuran (70 ml) was added sodium hydride (60% in oil) (1.74 g, 43.4 mmol) at 0° C. The reaction mixture was stirred at 35° C. for 1 hour, followed by addition of methyl 2-(bromomethyl)-6-(trifluoromethyl)nicotinate (12.9 g, 43.4 mmol) at 0° C. and stirred at 30° C. for 15 hours. When the reaction was completed, the mixture was diluted with ethyl acetate, and washed with saturated aqueous ammonium chloride solution. The obtained organic layer was dried over anhydrous magnesium sulfate, and concentrated under reduced pressure. The residue was purified by column chromatography to give the desired compound 6.5 g (39%).

¹H NMR (400 MHz, CDCl₃) δ 8.27 (d, J=8.0 Hz, 1H), 7.68 (d, J=8.0 Hz, 1H), 5.09 (s, 2H), 4.67 (s, 2H), 3.96 (s, 3H), 3.89 (s, 3H)

Step 5) methyl 2-(((1-methyl-5-vinyl-1H-1,2,4-triazol-3-yl)methoxy)methyl)-6-(trifluoromethyl)nicotinate To a stirred solution of methyl 2-(((5-iodo-1-methyl-1H-1,2,5-triazol-3-yl)methoxy)methyl)-6-(trifluoromethyl)nicotinate (725 mg, 1.59 mmol) obtained above in ethanol (10 ml) were added potassium vinyl trifluoroborate (1.064 g, 7.95 mmol) and triethylamine (1.1 ml, 7.95 mmol), followed by addition of [1,1'-bis(diphenylphosphino)ferrosine]palladium(II) dichloride (26 mg, 0.32 mmol) under argon atmosphere. The reaction mixture was stirred at 80° C. for 3 days. When the reaction was completed, the reaction mixture was filtered through celite, and the filtrate was concentrated under reduced pressure, and then diluted with ethyl acetate and washed with water. The obtained organic layer was dried over anhydrous magnesium sulfate, concentrated under reduced pressure, and then purified by column chromatography to obtain 566 mg (28%) of the desired compound.

$^1$H NMR (400 MHz, CDCl$_3$) δ 8.25 (d, J=8.1 Hz, 1H), 7.67 (d, J=8.0 Hz, 1H), 6.66-6.52 (m, 1H), 6.34 (d, J=17.2 Hz, 1H), 5.67 (d, J=11.1 Hz, 1H), 5.10 (s, 2H), 4.67 (s, 2H), 3.96 (s, 3H), 3.86 (s, 3H)

Step 6) 2-(((1-methyl-5-vinyl-1H-1,2,4-triazol-3-yl)methoxy)methyl)-6-(trifluoromethyl)nicotinic acid To a stirred solution of ethyl 2-(((1-methyl-5-vinyl-1H-1,2,4-triazol-3-yl)methoxy)methyl)-6-(trifluoromethyl)nicotinate (406.2 mg, 1.14 mmol) obtained above in tetrahydrofuran (3 ml) and water (1 ml) was added lithium hydroxide hydrate (72 mg, 1.7 mmol). The reaction mixture was stirred at room temperature for 2 hours and 30 minutes. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound 370 mg (94.8%), which was used without further purification.

$^1$H NMR (300 MHz, CDCl$_3$) δ 8.20 (d, J=8.0 Hz, 1H), 7.65 (d, J=7.9 Hz, 1H), 6.57 (d, J=12.4 Hz, 2H), 5.87 (d, J=9.5 Hz, 1H), 5.11 (s, 2H), 4.81 (s, 2H), 3.88 (s, 3H)

Step 7) N-(1-methyl-1H-tetrazol-5-yl)-2-(((1-methyl-5-vinyl-1H-1,2,4-triazol-3-yl)methoxy)methyl)-6-(trifluoromethyl)nicotinate To a stirred solution of 2-(((1-methyl-5-vinyl-1H-1,2,4-triazol-3-yl)methoxy)methyl)-6-(trifluoromethyl)nicotinic acid (370 mg, 1.1 mmol) obtained above in anhydrous acetonitrile (5 ml) was added carbonyldiimidazole (351 mg, 2.2 mmol). The reaction mixture was stirred at room temperature for 1 hour, followed by addition of 5-amino-1-methyl-1H-tetrazole (218 mg, 2.2 mmol) and 1,8-diazabicyclo[5,4,0]undec-7-ene (0.5 ml, 3.3 mmol) and stirred at 50° C. for 20 hours and 30 minutes. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 363.2 mg (75.2%).

$^1$H NMR (400 MHz, CDCl$_3$) δ 11.44 (s, 1H), 8.24 (d, J=8.2 Hz, 1H), 7.73 (d, J=7.8 Hz, 1H), 6.43 (dd, J=17.6, 10.9 Hz, 1H), 6.10 (d, J=17.2 Hz, 1H), 5.65 (d, J=10.8 Hz, 1H), 5.05 (s, 2H), 4.81 (s, 2H), 4.07 (s, 3H), 3.72 (t, J=1.6 Hz, 3H)

Example 81. Synthesis of N-(1-methyl-1H-tetrazol-5-yl)-2-(((1-methyl-5-(prop-1-en-2-yl)-1H-1,2,4-triazol-3-yl)methoxy)methyl)-6-(trifluoromethyl)nicotinamide (Compound No. 2-128)

Step 1) methyl 2-(((1-methyl-5-(prop-1-en-2-yl)-1H-1,2,4-triazol-3-yl)methoxy)methyl)-6-(trifluoromethyl)nicotinate To a stirred solution of methyl 2-(((5-iodo-1-methyl-1H-1,2,5-triazol-3-yl)methoxy)methyl)-6-(trifluoromethyl)nicotinate (200 mg, 0.44 mmol) in ethanol (5 ml) were added potassium trifluoro(1-methylethenyl)borate (326 mg, 2.2 mmol) and triethylamine (0.3 ml, 2.2 mmol), followed by addition of [1,1'-bis(diphenylphosphino)ferrocene]palladium(II) dichloride (71.9 mg, 0.088 mmol) under argon atmosphere. The reaction mixture was stirred at 80° C. for 65 hours. When the reaction was completed, the reaction mixture was filtered through celite, and the filtrate was concentrated under reduced pressure, and then diluted with ethyl acetate and washed with water. The obtained organic layer was dried over anhydrous magnesium sulfate, and concentrated under reduced pressure, and then purified by column chromatography to obtain 37.4 mg (23%) of the desired compound.

$^1$H NMR (400 MHz, CDCl$_3$) δ 8.25 (d, J=8.0 Hz, 1H), 7.67 (d, J=8.4 Hz, 1H), 5.56 (s, 1H), 5.35 (s, 1H), 5.10 (s, 2H), 4.67 (s, 2H), 3.96 (s, 3H), 3.91 (s, 3H), 2.19 (s, 3H)

Step 2) 2-(((1-methyl-5-vinyl-1H-1,2,4-triazol-3-yl)methoxy)methyl)-6-(trifluoromethyl)nicotinic acid To a stirred solution of ethyl 2-(((1-methyl-5-(prop-1-en-2-yl)-1H-1,2,4-triazol-3-yl)methoxy)methyl)-6-(trifluoromethyl)nicotinate (510.6 mg, 1.38 mmol) obtained above in tetrahydrofuran (3 ml) and water (1 ml) was added lithium hydroxide hydrate (174 mg, 4.14 mmol). The reaction mixture was stirred at room temperature for 4 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound 350.3 mg (71.2%), which was used without further purification.

$^1$H NMR (400 MHz, CDCl$_3$) δ 8.22 (d, J=7.9 Hz, 1H), 7.67 (d, J=8.0 Hz, 1H), 6.57 (dd, J=17.1, 11.1 Hz, 1H), 6.34 (d, J=17.4 Hz, 1H), 5.76 (d, J=10.9 Hz, 1H), 5.12 (s, 2H), 4.78 (s, 2H), 3.85 (s, 3H)

Step 3) N-(1-methyl-1H-tetrazol-5-yl)-2-(((1-methyl-5-vinyl-1H-1,24-triazol-3-yl)methoxy)methyl)-6-(trifluoromethyl)nicotinamide To a stirred solution of 2-(((1-methyl-5-vinyl-1H-1,2,4-triazol-3-yl)methoxy)methyl)-6-(trifluoromethyl)nicotinic acid (350.3 mg, 0.98 mmol) obtained above in anhydrous acetonitrile (5 ml) was added carbonyldiimidazole (319 mg, 1.97 mmol). The reaction mixture was stirred at room temperature for 1 hour, followed by addition of 5-amino-1-methyl-1H-tetrazole (195 mg, 1.97 mmol) and 1,8-diazabicyclo[5,4,0]undec-7-ene (0.47 ml, 2.94 mmol) and stirred at 50° C. for 17 hours. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 239.1 mg (56%).

$^1$H NMR (400 MHz, CDCl$_3$) δ 8.25 (s, 1H), 7.74 (s, 1H), 5.54 (s, 1H), 5.24 (s, 1H), 5.07 (s, 2H), 4.81 (s, 2H), 3.77 (s, 3H), 2.01 (s, 3H)

Example 82. Synthesis of 2-(((5-methoxy-1-methyl-1H-1,2,4-triazol-3-yl)methoxy)methyl)-N-(1-methyl-1H-tetrazol-5-yl)-6-(trifluoromethyl)nicotinamide (Compound No. 2-129)

To a stirred solution of 2-(((5-bromo-1-methyl-1H-1,2,4-triazol-3-yl)methoxy)methyl)-N-(1-methyl-1H-tetrazol-5-yl)-6-(trifluoromethyl)nicotinamide (476 mg, 1.0 mmol) in methanol (5 ml) was added sodium methoxide (25% in methanol solution) (5.0 ml) at 0° C. The reaction mixture was stirred at 80° C. When the reaction was completed, the reaction mixture was concentrated under reduced pressure, followed by addition of saturated aqueous ammonium chloride solution, and extracted with ethyl acetate. The organic layer was dried over anhydrous magnesium sulfate, and concentrated under reduced pressure. The residue was purified by column chromatography to give the desired compound 264 mg (62%).

$^1$H NMR (300 MHz, MeOD) δ 8.50 (d, J=7.9 Hz, 1H), 7.78 (d, J=7.9 Hz, 1H), 5.15 (s, 2H), 4.48 (s, 2H), 4.01 (s, 6H), 3.50 (S, 3H)

Example 83. Synthesis of N-(1-methyl-1H-tetrazol-5-yl)-2-(((1-methyl-5-(2,2,2-trifluoroethoxy)-1H-1,2,4-triazol-3-yl)methoxy)methyl)-6-(trifluoromethyl)nicotinamide (Compound No. 2-130)

To a stirred solution of 2-(((5-bromo-1-methyl-1H-1,2,4-triazol-3-yl)methoxy)methyl)-N-(1-methyl-1H-tetrazol-5-yl)-6-(trifluoromethyl)nicotinamide (47.6 mg, 0.1 mmol) in 2,2,2-trifluoroethanol (3.0 ml) was added sodium hydride (60% in oil) (120 mg, 3.0 mmol). The reaction mixture was stirred at 80° C. for 48 hours, and when the reaction was completed, the mixture was neutralized with an aqueous ammonium chloride solution, extracted with ethyl acetate and water, dried over anhydrous magnesium sulfate. The solvent was removed under reduced pressure, and purified by column chromatography to obtain 7 mg (14%) of the desired compound.

$^1$H NMR (300 MHz, MeOD) δ 8.37 (br s, 1H), 7.95 (br s, 1H), 5.19 (s, 2H), 4.85 (q, J=8.2 Hz, 2H), 4.46 (s, 2H), 4.06 (s, 3H), 3.57 (s, 3H)

Example 84. Synthesis of N-(1-methyl-1H-tetrazol-5-yl)-2-(((1-methyl-5-(methylthio)-1H-1,2,4-triazol-3-yl)methoxy)methyl)-6-(trifluoromethyl)nicotinamide (Compound No. 2-131)

To a stirred solution of 2-(((5-bromo-1-methyl-1H-1,2,4-triazol-3-yl)methoxy)methyl)-N-(1-methyl-1H-tetrazol-5-yl)-6-(trifluoromethyl)nicotinamide (476 mg, 1.0 mmol) in N,N-dimethylformamide was added sodium thiomethoxide (210 mg, 3.0 mmol). The reaction mixture was stirred at room temperature for 12 hours. When the reaction was completed, the reaction mixture was neutralized with an aqueous ammonium chloride solution, extracted with ethyl acetate and water, and dried over anhydrous magnesium sulfate. The solvent was removed under reduced pressure, and purified by column chromatography to obtain 230 mg (52%) of the desired compound.

$^1$H NMR (300 MHz, MeOD) δ 8.48 (d, J=7.9 Hz, 1H), 7.76 (d, J=7.9 Hz, 1H), 5.10 (s, 2H), 4.54 (s, 2H), 3.95 (s, 3H), 3.65 (s, 3H), 2.57 (s, 3H)

Example 85. Synthesis of N-(1-methyl-1H-tetrazol-5-yl)-2-(((1-methyl-5-(methylsulfonyl)-1H-1,2,4-triazol-3-yl)methoxy)methyl)-6-(trifluoromethyl) nicotinamide (Compound No. 2-132)

To a stirred solution of N-(1-methyl-1H-tetrazol-5-yl)-2-(((1-methyl-5-(methylthio)-1H-1,2,4-triazol-3-yl)methoxy)methyl)-6-(trifluoromethyl)nicotinamide (443 mg, 1.0 mmol) in tetrahydrofuran, methanol, and water was added oxone (456 mg, 3.0 mmol). The reaction mixture was stirred at room temperature, and when the reaction was completed, the solvent was removed under reduced pressure, and the remaining mixture was diluted with ethyl acetate and washed with water. The obtained organic layer was dried over anhydrous magnesium sulfate, and concentrated under reduced pressure. The residue was purified by column chromatography to give the desired compound 309 mg (65%).

$^1$H NMR (300 MHz, MeOD) δ 8.41 (d, J=8.0 Hz, 1H), 8.08 (d, J=8.0 Hz, 1H), 4.95 (s, 2H), 4.59 (s, 2H), 4.05 (s, 3H), 3.98 (s, 3H), 3.49 (s, 3H)

Example 86. Synthesis of 2-(((5-(dimethylamino)-1-methyl-1H-1,2,4-triazol-3-yl)methoxy)methyl)-N-(1-methyl-1H-tetrazol-5-yl)-6-(trifluoromethyl)nicotinamide (Compound No. 2-133)

To a stirred solution of 2-(((5-bromo-1-methyl-1H-1,2,4-triazol-3-yl)methoxy)methyl)-N-(1-methyl-1H-tetrazol-5-yl)-6-(trifluoromethyl)nicotinamide (475 mg, 1.0 mmol) in N,N-dimethylformamide (4 ml) was added dimethylamine (219 mg, 3.0 mmol). The reaction mixture was stirred at 80° C. for 48 hours, and when the reaction was completed, the mixture was cooled to room temperature and concentrated under reduced pressure. The residue was purified by column chromatography to give the desired compound 43 mg (10%).

$^1$H NMR (300 MHz, CDCl$_3$) δ 8.24 (s, 1H), 7.23 (s, 1H), 5.05 (s, 2H), 4.64 (s, 2H), 4.11 (s, 3H), 3.76 (s, 3H), 2.75 (s, 6H)

Example 87. Synthesis of 2-(((5-cyano-1-methyl-1H-1,2,4-triazol-3-yl)methoxy)methyl)-N-(1-methyl-1H-tetrazol-5-yl)-6-(trifluoromethyl)nicotinamide (Compound No. 2-134)

To a stirred solution of 2-(((5-bromo-1-methyl-1H-1,2,4-triazol-3-yl)methoxy)methyl)-N-(1-methyl-1H-tetrazol-5-yl)-6-(trifluoromethyl)nicotinamide (476 mg, 1.0 mmol) in N,N-dimethylformamide (5 ml) and water (1 ml) was added potassium cyanide (650 mg, 10 mmol). The reaction mixture was stirred at 150° C., and when the reaction was completed, the mixture was cooled to room temperature, neutralized with an aqueous ammonium chloride solution, and extracted with ethyl acetate and washed with water. The obtained organic layer was dried over anhydrous magnesium sulfate, and concentrated under reduced pressure. The residue was purified by column chromatography to give the desired compound 215 mg (51%).

$^1$H NMR (300 MHz, MeOD) δ 8.55 (d, J=7.8 Hz, 1H), 7.75 (d, J=7.8 Hz, 1H), 5.23 (s, 2H), 4.56 (s, 2H), 4.10 (s, 3H), 3.86 (s, 3H)

Example 88. Synthesis of 2-(((5-chloro-1-methyl-1H-1,2,4-triazol-3-yl)methoxy)methyl)-N-(1-methyl-1H-tetrazol-5-yl)-6-(trifluoromethyl)nicotinamide (Compound No. 2-135)

2-(((5-bromo-1-methyl-1H-1,2,4-triazol-3-yl)methoxy) methyl)-N-(1-methyl-1H-tetrazol-5-yl)-6-(trifluoromethyl) nicotinamide (475 mg) was dissolved in methanol. After bubbling hydrogen chloride gas for 10 minutes, the mixture was stirred at room temperature for 2 days. When the reaction was completed, the solvent was removed under reduced pressure, and diethyl ether was added and solidified to obtain the desired compound (85%).
$^1$H NMR (300 MHz, MeOD) δ 8.29 (d, J=7.3 Hz, 1H), 7.90 (d, J=7.2 Hz, 1H), 4.86 (s, 2H), 4.51 (s, 2H), 4.03 (s, 3H), 3.76 (s, 3H)

Example 89. Synthesis of 2-(((5-bromo-1-methyl-1H-1,2,4-triazol-3-yl)methoxy)methyl)-N-(1-methyl-1H-tetrazol-5-yl)-6-(trifluoromethyl)nicotinamide (Compound No. 2-136)

Step 1)ethyl 2-(((5-bromo-1-methyl-1H-1,2,4-triazol-3-yl)methoxy)methyl)-6-(trifluoromethyl)nicotinate To a stirred solution of ethyl 4-((5-bromo-1-methyl-1H-1,2,4-triazol-3-yl)methoxy)-3-oxobutanoate (320 mg, 1.0 mmol) in toluene (5 ml) were added (Z)-4-amino-1,1,1-trifluorobuy-3-en-2-one (278 mg, 2.0 mmol) and trifluoroacetic acid (228 mg, 2.0 mmol). The reaction mixture was stirred at 80° C. When the reaction was completed, the reaction mixture was cooled and diluted with ethyl acetate, washed with water. The obtained organic layer was dried over anhydrous magnesium sulfate, and concentrated under reduced pressure. The residue was purified by column chromatography to give the desired compound 231 mg (49%).

Step 2) 2-(((5-bromo-1-methyl-1H-1,2,4-triazol-3-yl)methoxy)methyl)-6-(trifluoromethyl)nicotinic acid To a stirred solution of ethyl 2-(((5-bromo-1-methyl-1H-1,2,4-triazol-3-yl)methoxy)methyl)-6-(trifluoromethyl) nicotinate (472 mg, 1.0 mmol) obtained above in tetrahydrofuran/water (3:1, 4 ml) was added lithium hydroxide hydrate (82 mg, 2.0 mmol). When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound, which was used without further purification.

Step 3) 2-(((5-bromo-1-methyl-1H-1,2,4-triazol-3-yl)methoxy)methyl)-N-(1-methyl-1H-tetrazol-5-yl)-6-(trifluoromethyl)nicotinamide To a stirred solution of 2-(((5-bromo-1-methyl-1H-1,2,4-triazol-3-yl)methoxy)methyl)-6-(trifluoromethyl)nicotinic acid (444 mg, 1.0 mmol) obtained above in acetonitrile (5 ml) was added carbonyldiimidazole (243 mg, 1.5 mmol). The reaction mixture was stirred at room temperature for 1 hour, followed by addition of 5-amino-1-methyl-1H-tetrazole (199 mg, 2.0 mmol) and 1,8-diazabicyclo[5.4.0]undec-7-ene (456 mg, 3.0 mmol) and stirred at 50° C. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 308 mg (65%).
$^1$H NMR (300 MHz, CDCl$_3$) δ 10.9 (brs, NH), 8.36 (d, J=8.0 Hz, 1H), 7.81 (d, J=8.0 Hz, 1H), 5.08 (s, 2H), 4.79 (s, 2H), 4.10 (s, 3H), 3.75 (s, 3H)

Example 90. Synthesis of 2-(((5-iodo-1-methyl-1H-1,2,4-triazol-3-yl)methoxy)methyl-N-(1-methyl-1H-tetrazol-5-yl)-6-(trifluoromethyl)nicotinamide (Compound No. 2-137)

Step 1)methyl 2-(((5-iodo-1-methyl-1H-1,2,4-triazol-3-yl)methoxy)methyl-6-(trifluoromethyl)nicotinate To a stirred solution of (5-iodo-1-methyl-1H-1,2,4-triazol-3-yl)methanol (160 mg, 0.67 mmol) in tetrahydrofuran (10 ml) was added sodium hydride (60% in oil) (80 mg, 2.01 mmol) at 0° C. The reaction mixture was stirred for 5 minutes, followed by addition of methyl 2-(bromomethyl)-6-(trifluoromethyl)nicotinate (260 mg, 0.87 mmol) and stirrd at room temperature for 1 hour. Upon completion of the reaction, the mixture was diluted with water, extracted with ethyl acetate, and the obtained organic layer was dried over anhydrous magnesium sulfate, and concentrated under reduced pressure. The residue was purified by column chromatography to give the desired compound 140 mg (45%).
$^1$H NMR (400 MHz, CDCl$_3$) δ 8.29 (d, J=8.1 Hz, 1H), 7.70 (d, J=8.1 Hz, 1H), 5.10 (s, 2H), 4.68 (s, 2H), 3.97 (s, 3H), 3.90 (s, 3H)

Step 2) 2-(((5-iodo-1-methyl-1H-1,2,4-triazol-3-yl) methoxy)methyl-6-(trifluoromethyl)nicotinic acid To a stirred solution of methyl 2-(((5-iodo-1-methyl-1H-1,2,4-triazol-3-yl)methoxy)methyl-6-(trifluoromethyl)nicotinate (200 mg, 0.43 mmol) obtained above in tetrahydrofuran/methanol (1:2, 6 ml) was added a solution of 2N-sodium hydroxide (0.7 ml, 1.31 mmol). The reaction mixture was stirred at room temperature for 1 hour. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure to give the desired compound 169 mg (87%), which was used without further purification.
$^1$H NMR (400 MHz, CDCl$_3$) δ 13.83 (brs, CO$_2$H), 8.42 (d, J=8.1 Hz, 1H), 7.98 (d, J=8.1 Hz, 1H), 4.94 (s, 2H), 4.52 (s, 3H), 3.82 (s, 3H)

Step 3) 2-(((5-iodo-1-methyl-1H-1,2,4-triazol-3-yl) methoxy)methyl-N-(1-methyl-1H-tetrazol-5-yl)-6-(trifluoromethyl)nicotinamide To a stirred solution of 2-(((5-iodo-1-methyl-1H-1,2,4-triazol-3-yl)methoxy)methyl-6-(trifluoromethyl)nicotinic acid (70 mg, 0.158 mmol) obtained above in acetonitrile (5 ml) was added carbonyldiimidazole (51 mg, 0.31 mmol). The reaction mixture was stirred at room temperature for 1 hour, followed by addition of 5-amino-1-methyl-1H-tetrazole (199 mg, 2.0 mmol) and 1,8-diazabicyclo[5.4.0]undec-7-ene (0.1 ml, 0.55 mmol) and stirred at 50° C. When the reaction was completed, the solvent was removed under reduced pressure, and the remaining mixture was acidified to pH 3 with 1N aqueous hydrochloric acid solution and extracted with ethyl acetate. The obtained organic layer was dried over anhydrous magnesium sulfate, and concentrated under reduced pressure. The residue was purified by column chromatography to give the desired compound 59 mg (71%).

$^1$H NMR (400 MHz, CDCl$_3$) δ 11.00 (brs, NH), 8.35 (d, J=8.1 Hz, 1H), 7.82 (d, J=8.1 Hz, 1H), 5.07 (s, 2H), 4.83 (s, 2H), 4.11 (s, 3H), 3.80 (s, 3H)

Example 91. Synthesis of methyl(1-(2-(((1-methyl-1H-1,2,4-triazol-3-yl)methoxy)methyl)-N-(1-methyl-1H-tetrazol-5-yl)-6-(trifluoromethyl)nicotinamido)ethyl)carbonate (Compound No. 4-1)

To a stirred solution of 2-(((1-methyl-1H-1,2,4-triazol-3-yl)methoxy)methyl)-N-(1-methyl-1H-tetrazol-5-yl)-6-(trifluoromethyl)nicotinamide (397 mg, 1.0 mmol) in acetonitrile (5 ml) were added 1-chloroethyl methyl carbonate (276 mg, 2.0 mmol), tetrabutylammonium iodide (161 mg, 0.5 mmol) and potassium carbonate (276 mg, 2.0 mmol). The reaction mixture was stirred at 60° C., and when the reaction was completed, the mixture was neutralized with an aqueous ammonium chloride solution, extracted with ethyl acetate, and the obtained organic layer was dried over anhydrous magnesium sulfate, and concentrated under reduced pressure. The residue was purified by column chromatography to give the desired compound 214 mg (43%).

$^1$H NMR (300 MHz, MeOD) δ 8.47 (d, J=7.9 Hz, 1H), 8.28 (s, 1H), 7.81 (d, J=8.0 Hz, 1H), 6.97 (q, J=6.2 Hz, 1H), 5.18 (d, J=12.1 Hz, 1H), 5.06 (d, J=12.1 Hz, 1H), 4.58 (s, 2H), 3.90 (s, 3H), 3.85 (s, 3H), 3.72 (s, 3H), 1.92 (d, J=6.2 Hz, 3H)

Example 92. Synthesis of methyl(1-(N-(1-methyl-1H-tetrazol-5-yl)-2-(((2-methyl-2H-tetrazol-5-yl)methoxy)methyl)-6-(trifluoromethyl)pyridin-3-carbothioamido)ethyl)carbonate (Compound No. 4-2)

To a stirred solution of N-(1-methyl-1H-tetrazol-5-yl)-2-(((2-methyl-2H-tetrazol-5-yl)methoxy)methyl)-6-(trifluoromethyl)pyridin-3-carbothioamide (123 mg, 0.30 mmol) in N,N-dimethylformamide (3 ml) were added 1-chloroethyl methyl carbonate (165 mg, 1.19 mmol), potassium carbonate (124 mg, 0.90 mmol), and tetrabutylammonium bromide (48 mg, 0.15 mmol). The reaction mixture was stirred at 60° C. for 15 hours. When the reaction was completed, the reaction mixture was diluted with water, extracted with ethyl acetate, and the obtained organic layer was dried over anhydrous magnesium sulfate, and concentrated under reduced pressure. The residue was purified by column chromatography to give the desired compound 9 mg (6%).

$^1$H NMR (500 MHz, CDCl$_3$) δ 8.29 (d, J=8.0 Hz, 1H), 7.67 (d, J=8.0 Hz, 1H), 6.93 (q, J=6.3 Hz, 1H), 5.24 (d, J=12.4 Hz, 1H), 5.18 (d, J=12.4 Hz, 1H), 4.77 (s, 3H), 4.30 (s, 3H), 4.04 (s, 3H), 3.78 (s, 3H), 1.99 (d, J=6.3 Hz, 3H)

Example 93. Synthesis of methyl(1-(N-(1-methyl-1H-tetrazol-5-yl)-2-((((2-methyl-2H-tetrazol-5-yl)methyl)thio)methyl)-6-(trifluoromethyl)nicotinamido)ethyl)carbonate (Compound No. 4-3)

To a stirred solution of N-(1-methyl-1H-tetrazol-5-yl)-2-(((2-methyl-2H-tetrazol-5-yl)methyl)thio)methyl)-6-(trifluoromethyl)nicotinamide (154 mg, 0.37 mmol) in N,N-dimethylformamide (3 ml) were added 1-chloroethyl methyl carbonate (206 mg, 1.49 mmol), potassium carbonate (153 mg, 1.11 mmol), and tetrabutylammonium bromide (60 mg, 0.19 mmol). The reaction mixture was stirred at 60° C. for 15 hours. When the reaction was completed, the reaction mixture was diluted with water, extracted with ethyl acetate, and the obtained organic layer was dried over anhydrous magnesium sulfate, and concentrated under reduced pressure. The residue was purified by column chromatography to give the desired compound 54 mg (28%).

$^1$H NMR (300 MHz, CDCl$_3$) δ 8.56 (d, J=8.0 Hz, 1H), 7.64 (d, J=8.0 Hz, 1H), 7.02 (q, J=6.2 Hz, 1H), 4.57 (d, J=13.2 Hz, 1H), 4.52 (d, J=13.2 Hz, 1H), 4.29 (s, 3H), 4.01 (s, 3H), 3.96 (s, 3H), 3.77 (s, 3H), 2.00 (d, J=6.2 Hz, 3H)

Example 94. Synthesis of methyl(1-(N-(1-methyl-1H-tetrazol-5-yl)-2-(((2-methyl-2H-tetrazol-5-yl)methoxy)methyl)-6-(trifluoromethyl)nicotinamido)ethyl)carbonate (Compound No. 4-4)

To a stirred solution of N-(1-methyl-1H-tetrazol-5-yl)-2-(((2-methyl-2H-tetrazol-5-yl)methoxy)methyl)-6-(trifluoromethyl)nicotinamide (398 mg, 1.0 mmol) in acetonitrile (5 ml) were added 1-chloroethyl methyl carbonate (276 mg, 2.0 mmol), tetrabutylammonium iodide (161 mg, 0.5 mmol) and potassium carbonate (276 mg, 2.0 mmol). The reaction mixture was stirred at 60° C., and when the reaction was completed, the mixture was neutralized with an aqueous ammonium chloride solution, extracted with ethyl acetate, and the obtained organic layer was dried over anhydrous magnesium sulfate, and concentrated under reduced pressure. The residue was purified by column chromatography to give the desired compound 210 mg.

$^1$H NMR (300 MHz, MeOD) δ 8.49 (d, J=4.8 Hz, 1H), 7.71 (d, J=4.8 Hz, 1H), 6.99 (q, J=3.7 Hz, 1H), 5.31 (d, J=7.3 Hz, 1H), 5.22 (d, J=7.3 Hz, 1H), 4.88 (s, 2H), 4.33 (s, 3H), 3.95 (s, 3H), 3.82 (s, 3H), 2.00 (d, J=3.7 Hz, 3H)

Example 95. Synthesis of ethyl(1-(N-(1-methyl-1H-tetrazol-5-yl)-2-(((2-methyl-2H-tetrazol-5-yl)methoxy)methyl)-6-(trifluoromethyl)nicotinamido)ethyl)carbonate (Compound No. 4-8)

To a stirred solution of N-(1-methyl-1H-tetrazol-5-yl)-2-(((2-methyl-2H-tetrazol-5-yl)methoxy)methyl)-6-(trifluoromethyl)nicotinamide (178 mg, 0.45 mmol) in N,N-dimethylformamide (3 ml) were added 1-chloroethyl ethyl carbonate (0.24 ml, 1.79 mmol), potassium carbonate (187 mg, 1.35 mmol) and tetrabutylammonium bromide (73 mg, 0.23 mmol). The reaction mixture was stirred at 80° C. for 15 hours. When the reaction was completed, the reaction mixture was diluted with water, extracted with ethyl acetate, and the obtained organic layer was dried over anhydrous magnesium sulfate, and concentrated under reduced pressure. The residue was purified by column chromatography to give the desired compound 110 mg (48%).

$^1$H NMR (300 MHz, CDCl$_3$) δ 8.47 (d, J=8.0 Hz, 1H), 7.69 (d, J=8.0 Hz, 1H), 6.96 (q, J=6.2 Hz, 1H), 5.29 (d, J=12.1 Hz, 1H), 5.19 (d, J=12.1 Hz, 1H), 4.85 (s, 2H), 4.30 (s, 3H), 4.14-4.24 (m, 2H), 3.94 (s, 3H), 1.98 (d, J=6.2 Hz, 3H), 1.27 (t, J=7.2 Hz, 3H)

Example 96. Synthesis of ethyl (1-(N-(1-methyl-1H-tetrazol-5-yl)-2-((((2-methyl-2H-tetrazol-5-yl)methyl)thio)methyl)-6-(trifluoromethyl)pyridin-3-carbothioamido)ethyl)carbonate (Compound No. 4-9)

To a stirred solution of N-(1-methyl-1H-tetrazol-5-yl)-2-((((2-methyl-2H-tetrazol-5-yl)methyl)thio)methyl)-6-(trifluoromethyl)pyridin-3-carbothioamide (53 mg, 0.12 mmol) in N,N-dimethylformamide (3 ml) were added 1-chloroethyl ethyl carbonate (0.07 ml, 0.49 mmol), potassium carbonate (50 mg, 0.36 mmol) and tetrabutylammonium bromide (19 mg, 0.06 mmol). The reaction mixture was stirred at 80° C. for 15 hours. When the reaction was completed, the reaction mixture was diluted with water, extracted with ethyl acetate, and the obtained organic layer was dried over anhydrous magnesium sulfate, and concentrated under reduced pressure. The residue was purified by column chromatography to give the desired compound 6 mg (9%).

$^1$H NMR (500 MHz, CDCl$_3$) δ 8.56 (d, J=8.0 Hz, 1H), 7.63 (d, J=8.0 Hz, 1H), 7.01 (q, J=6.3 Hz, 1H), 4.57 (d, J=13.2 Hz, 1H), 4.52 (d, J=13.2 Hz, 1H), 4.29 (s, 3H), 4.13-4.22 (m, 2H), 4.00 (s, 2H), 3.96 (s, 3H), 1.99 (d, J=6.3 Hz, 3H) 1.28 (t, J=7.3 Hz, 3H)

Example 97. Synthesis of ethyl (1-(4-methyl-5-((2-((((2-methyl-2H-tetrazol-5-yl)methyl)thio)methyl)-6-(trifluoromethyl)nicotinoyl)imino)-4,5-dihydro-1H-tetrazol-1-yl)ethyl)carbonate (Compound No. 4-10)

To a stirred solution of N-(1-methyl-1H-tetrazol-5-yl)-2-(((2-methyl-2H-tetrazol-5-yl)methyl)thio)methyl)-6-(trifluoromethyl)nicotinamide (150 mg, 0.36 mmol) in N,N-dimethylformamide (3 ml) were added 1-chloroethyl ethyl carbonate (0.19 ml, 1.49 mmol), potassium carbonate (149 mg, 1.08 mmol) and tetrabutylammonium bromide (58 mg, 0.18 mmol). The reaction mixture was stirred at 60° C. for 15 hours, and when the reaction was completed, the reaction mixture was diluted with water, extracted with ethyl acetate, and the obtained organic layer was dried over anhydrous magnesium sulfate, and concentrated under reduced pressure. The residue was purified by column chromatography to give the desired compound 93 mg (49%).

$^1$H NMR (500 MHz, CDCl$_3$) δ 8.56 (d, J=8.0 Hz, 1H), 7.63 (d, J=8.0 Hz, 1H), 7.01 (q, J=6.3 Hz, 1H), 4.57 (d, J=13.2 Hz, 1H), 4.52 (d, J=13.2 Hz, 1H), 4.29 (s, 3H), 4.12-4.23 (s, 2H), 4.00 (s, 2H), 3.96 (s, 3H), 1.99 (d, J=6.2 Hz, 3H), 1.27 (t, J=7.3 Hz, 3H)

Example 98. Synthesis of cyclohexyl(1-(N-(1-methyl-1H-tetrazol-5-yl)-2-(((2-methyl-2H-tetrazol-5-yl)methoxy)methyl)-6-(trifluoromethyl)nicotinamido)ethyl)carbonate (Compound No. 4-11)

To a stirred solution of N-(1-methyl-1H-tetrazol-5-yl)-2-(((2-methyl-2H-tetrazol-5-yl)methoxy)methyl)-6-(trifluoromethyl)nicotinamide (100 mg, 0.25 mmol) in N,N-dimethylformamide (3 ml) were added 1-chloroethyl cyclohexyl carbonate (0.18 ml, 1.00 mmol), potassium carbonate (104 mg, 0.75 mmol) and tetrabutylammonium bromide (40 mg, 0.13 mmol). The reaction mixture was stirred at 60° C. for 15 hours. When the reaction was completed, the reaction mixture was diluted with water, extracted with ethyl acetate, and the obtained organic layer was dried over anhydrous magnesium sulfate, and concentrated under reduced pressure. The residue was purified by column chromatography to give the desired compound 76 mg (54%).

$^1$H NMR (300 MHz, CDCl$_3$) δ 8.47 (d, J=7.9 Hz, 1H), 7.68 (d, J=7.9 Hz, 1H), 6.94 (q, J=6.2 Hz, 1H), 5.28 (d, J=12.4 Hz, 1H), 5.20 (d, J=12.1 Hz, 1H), 4.85 (s, 2H), 4.53-4.61 (m, 1H), 4.30 (s, 3H), 3.94 (s, 3H), 1.97 (d, J=6.2 Hz, 3H), 1.83-1.93 (m, 2H), 1.73-1.83 (m, 2H), 1.47-1.53 (m, 2H), 1.39-1.47 (m, 2H), 1.32-1.39 (m, 2H)

Example 99. Synthesis of isopropyl(1-(N-(1-methyl-1H-tetrazol-5-yl)-2-(((2-methyl-2H-tetrazol-5-yl)methoxy)methyl)-6-(trifluoromethyl)nicotinamido)ethyl)carbonate (Compound No. 4-12)

To a stirred solution of N-(1-methyl-1H-tetrazol-5-yl)-2-(((2-methyl-2H-tetrazol-5-yl)methoxy)methyl)-6-(trifluoromethyl)nicotinamide (100 mg, 0.25 mmol) in N,N-dimethylformamide (3 ml) were added 1-chloroethyl isopropyl carbonate (0.15 ml, 1.00 mmol), potassium carbonate (104 mg, 0.75 mmol) and tetrabutylammonium bromide (40 mg, 0.13 mmol). The reaction mixture was stirred at 80° C. for 4 hours. When the reaction was completed, the reaction mixture was diluted with water, extracted with ethyl acetate, and the obtained organic layer was dried over anhydrous magnesium sulfate, and concentrated under reduced pressure. The residue was purified by column chromatography to give the desired compound 90 mg (68%).

$^1$H NMR (300 MHz, CDCl$_3$) δ 8.49 (d, J=7.7 Hz, 1H), 7.70 (d, J=7.7 Hz, 1H), 6.97 (q, J=6.0 Hz, 1H), 5.30 (d, J=11.9 Hz, 1H), 5.22 (d, J=11.9 Hz, 1H), 4.84-4.89 (m, 3H), 4.32 (s, 3H), 3.96 (s, 3H), 1.99 (d, J=6.0 Hz, 3H), 1.30 (d, J=6.6 Hz, 3H)

[Formulation]

The nicotinamide represented by Chemical Formula 1 of the present invention can be usefully used as a herbicide. When used as a herbicide, carriers, surfactants, dispersants, adjuvants, etc. commonly used in the formulation of agricultural preparations are mixed with the compound of Chemical Formula 1 by blending, thereby it can be formulated and used in various forms such as a wettable powder, an emulsion, a powder, a suspension, and a soluble concentrate. These formulations can be used directly or processed by dilution in an appropriate medium.

The spray volume can be from several hundred liters to several thousand liters per hectare (ha).

The herbicide composition of the present invention comprises 0.1% to 99.9% by weight of at least one active ingredient selected from the group consisting of a nicotinamide compound represented by Chemical Formula 1 and an agrochemically acceptable salt thereof, and 0.1% to 99.9% by weight of one or more additives selected from surfactants, and solid or liquid diluents.

The herbicide composition may comprise an active ingredient in the range of 0.1% to 99.9% by weight, and there may be a difference in the content of the active ingredient depending on the form of the formulation. In addition, the herbicide composition may comprise an additive in the range of 0.1% to 99.9% by weight. The additive may be a surfactant, a solid diluent or a liquid diluent, the surfactant may be comprised in the range of about 0.1% to 20% by weight, and the solid or liquid diluent may be comprised in the range of 0% to 99.9% by weight.

Table 6 below summarizes the contents of the active ingredient, surfactant, and diluent for each formulation type.

TABLE 6

| Formulation | Content (Unit: weight %) | | |
| --- | --- | --- | --- |
| Type | Active Ingredient | Surfactant | Diluent |
| Wettable powder | 10~90 | 1~10 | 0~80 |
| Suspension | 3~50 | 0~15 | 40~95 |
| Emulsifiable/Soluble Concentrate | 3~50 | 0~15 | 40~95 |
| Granule | 0.1~95 | 1~15 | 5~99.5 |

The surfactant is a material having a high surface activity, and may be an amphiphilic material having both hydrophilic and lipophilic moieties in a molecule. These surfactants are excellent in detergency, dispersibility, emulsifying ability, solubilizing ability, wetting ability, sterilizing ability, foaming ability and penetrating ability, etc., so that they are included in the composition and act to wet, disintegrate, disperse, or emulsify so as to facilitate effective action of the herbicide. The surfactants may be an anionic surfactant including sodium or calcium salts of sulfonates such as ($C_8$~$C_{12}$alkyl)benzenesulfonate, ($C_3$~$C_6$alkyl)naphthalenesulfonate, di($C_3$~$C_6$alkyl)naphthalenesulfonate, di($C_8$~$C_{12}$alkyl)sulfosuccinate, lignin sulfonate, naphthalenesulfosuccinate formalin condensate, ($C_8$~$C_{12}$alkyl)naphthalenesulfonate formalin condensate, and polyoxyethylene ($C_8$~$C_{12}$alkyl) phenylsulfonate; sodium or calcium salts of sulfates such as ($C_8$~$C_{12}$alkyl)sulfate, polyoxyethylene ($C_8$~$C_{12}$alkyl)sulfate, and polyoxyethylene($C_8$~$C_{12}$alkyl) phenylsulfate; sodium or calcium salt of succinate such as polyoxyalkylene succinate; and the like. In addition, the surfactant may be a nonionic surfactant such as polyoxyethylene($C_8$~$C_{12}$alkyl)ether, polyoxyethylene($C_8$~$C_{12}$alkyl) phenylether, and polyoxyethylene($C_8$~$C_{12}$alkyl)phenyl polymer. The above surfactants may be used alone or in combination of two or more, and the surfactants that can be used in the present invention are not limited to the compounds exemplified above.

The content of the active ingredient may be adjusted according to the use, and it may be necessary to use a surfactant in a larger amount than the active ingredient, and it may be added at the time of formulation or used as a tank mixing.

The diluents comprised in the herbicide composition of the present invention can be classified into solid diluents and liquid diluents according to their properties. As a solid diluent, a highly absorbent diluent is particularly good for making wettable powders. As a liquid diluent or solvent, one which is stable without causing phase separation even at 0° C. would be better. A liquid diluent that can be used may include water, toluene, xylene, petroleum ether, vegetable oil, acetone, methyl ethyl ketone, cyclohexanone, acid anhydride, acetonitrile, acetophenone, amyl acetate, 2-butanone, butylene carbonate, chlorobenzene, cyclohexane, cyclohexanol, alkyl ester of acetic acid, 1,2-dichloropropane, diethanolamine, p-diethylbenzene, diethylene glycol, diethylene glycol abietate, diethylene glycol butyl ether, diethylene glycol ethyl ether, diethylene glycol methyl ether, N,N-dimethylformamide, dimethyl sulfoxide, 1,4-dioxane, dipropylene glycol, dipropylene glycol methyl ether, dipropylene glycol dibenzoate, diproxitol, alkylpyrrolidone, ethyl acetate, 2-ethyl hexanol, ethylene carbonate, 1,1,1-trichloroethane, 2-heptanone, alpha-pinene, d-limonene, ethyl lactate, ethylene glycol, ethylene glycol butyl ether, ethylene glycol methyl ether, gamma-butyrolactone, glycerol, glycerol acetate, glycerol diacetate, glycerol triacetate, hexadecane, hexylene glycol, isoamyl acetate, isobornyl acetate, isooctane, isophorone, isopropylbenzene, isopropyl myristate, lactic acid, laurylamine, mesityl oxide, methoxypropanol, methyl isoamyl ketone, methyl isobutyl ketone, methyl laurate, methyl octanoate, methyl oleate, methylene chloride, m-xylene, n-hexane, n-octylamine, octadecanoic acid, octylamine acetate, oleic acid, oleylamine, o-xylene, phenol, polyethylene glycol (PEG 400), propionic acid, propyl lactate, propylene carbonate, propylene glycol, propylene glycol methyl ether, p-xylene, toluene, triethyl phosphate, triethylene glycol, xylene sulfonic acid, paraffin, mineral oil, trichloroethylene, perchloroethylene, ethyl acetate, amyl acetate, butyl acetate, propylene glycol methyl ether, diethylene glycol methyl ether, methanol, ethanol, isopropanol, and high molecular weight alcohols such as amyl alcohol, tetrahydrofurfuryl alcohol, hexanol, octanol, ethylene glycol, propylene glycol, glycerol,N-methyl-2-pyrrolidone, and the like. A solid diluent that can be used may include talc, titanium dioxide, pyrophyllite clay, silica, attapulgite clay, diatomaceous earth, limestone, calcium carbonate, bentonite, calcium montmorillonite, cotton seed husk, wheatmeal, soybean flour, pumice, wood flour, walnut husk, lignin and the like.

In addition, when formulating the herbicide composition of the present invention, a small amount of other additives may be added to prevent foaming, caking, corrosion, and microbial propagation.

The method of making the herbicide composition of the present invention is carried out by a conventional method. In the case of a soluble concentrate formulation, the components need to only be mixed, and the fine solid composition can be mixed and pulverized in a hammer or flow mill. In the case of suspension, it is made by mixing in a wet mill, and granules can be prepared by spraying the active substance onto the granulation carrier.

An example of preparing a representative formulation using the compound according to the present invention is as follows:

Formulation 1: Wettable Powder

The following components were thoroughly mixed and a liquid surfactant was mixed while spraying onto the solid ingredients. It was pulverized in a hammer mill so that the particle size was 100 μm or less.

Active compound 20% by weight
Dodecylphenol polyethylene glycol ether 2% by weight
Sodium lignin sulfonate 4% by weight
Sodium silicon aluminate 6% by weight
Montmorillonite 68% by weight Formulation 2: Wettable Powder The following components were mixed and pulverized in a hammer mill until the particle size became 25 μm or less, and then packaged.

Active compound 80% by weight
Sodium alkyl naphthalene sulfonate 2% by weight
Sodium lignin Sulfonate 2% by weight
Synthetic amorphous silica 3% by weight
Kaolinite 13% by weight Formulation 3: Emulsifiable Concentrate The following ingredients were mixed and dissolved uniformly to obtain an emulsifiable concentrate.

Active compound 30% by weight
Cyclohexanone 20% by weight
Polyoxyethylene alkylaryl ether 11% by weight
Calcium alkylbenzenesulfonate 4% by weight
Methylnaphthalene 35% by weight Formulation 4: Granules After uniformly mixing and pulverizing the following components, 20 parts by weight of water was added to 100 parts by weight of the mixture, mixed, processed into 14 to 32 mesh granules using an extruder, and dried to prepare granules.

Active compound 5% by weight
Sodium lauryl alcohol sulfate ester salt 2% by weight
Sodium lignin sulfonate 5% by weight
Carboxymethyl cellulose 2% by weight
Potassium sulfate 16% by weight
Gypsum 70% by weight In actual use, the formulation of the present invention was diluted to an appropriate concentration and applied.

[Use]

The nicotinamide compound according to the present invention is excellent in controlling various weeds. Specifically, the nicotinamide compound according to the present invention exhibited excellent control effect of undesirable weeds when foliar treatment or soil treatment was performed. The nicotinamide compound according to the present invention exhibits high safety against wheat or corn when foliar treatment or soil treatment is performed, and has an excellent effect of controlling grassy weeds, sedge weeds or broadleaf weeds. In particular, grassy weeds like sorghum, barnyard grass, quack grass, fall *panicum*, and crabgrass; sedge weeds like galingale; and broadleaf weeds like black nightshade, cocklebur, indian jointvetch, velvetleaf, and bindweed can be effectively controlled. Therefore, herbicides comprising a nicotinamide compound as an active ingredient are suitable for upland field farming.

The herbicide of the present invention can be used up to 10 g to 1 kg per hectare (ha) as an active ingredient, preferably about 10 g to 400 g. The choice of dosage is determined by factors such as the amount of weed occurrence, growth stage, and formulation.

Further, the compound of the present invention may be used alone, and it is also useful to use it in combination with one or more herbicidal active compounds selected from the group consisting of acetylCoA carboxylase inhibitor, acetolactate synthase inhibitor, microtubule assembly inhibitor, auxin mimic herbicide, photosynthetic photosystem II inhibitor, EPSP synthase inhibitor, glutamine synthetase inhibitor, PDS inhibitor, DOXP synthase inhibitor, PPO inhibitor, VLCFAs inhibitor, DHP inhibitor, auxin transport inhibitor, photosystem I electron diversion inhibitor, microtubule assembly inhibitor, uncoupler herbicide, HPPD inhibitor, cellulose synthesis inhibitor, fatty acid thioesterase inhibitor, serine threonine protein kinase inhibitor, solanesyl diphosphate synthase inhibitor, homogentisate solanesyl transferase inhibitor, lycopene cyclase inhibitor and the like.

The acetylCoA carboxylase inhibitor may include cyclohexanedione chemical class like clethodim, cycloxydim, profoxydim, sethoxydim, tepraloxydim, tralkoxydim, etc.; aryloxyphenoxy-propionate chemical class like clodinafop-propargyl, cyhalofop-butyl, diclofop-methyl, fenoxaprop-ethyl, fenoxaprop-p-ethyl, fenthiaprop, fluazifop-butyl, fluazifop-p-butyl, haloxyfop-methyl, haloxyfop-ethoxyethyl, haloxyfop-p-methyl, metamifop, quizalofop-ethyl, quizalofop-p-ethyl, quizalofop-tefuryl, etc.; and pinoxaden which does not belong to any chemical class.

The acetolactate synthase inhibitor may include imidazolinone chemical class like imazamethabenz-methyl, imazamox, imazapic, imazapyr, imazaquin, imazethapyr, etc.; pyrimidinyl benzoate chemical class like bispyribac-sodium, pyribenzoxim, pyriftalid, pyriminobac-methyl, pyrithiobac-sodium, etc.; sulfoylurea chemical class like amidosulfuron, azimsulfuron, bensulfuron-methyl, chlorimuron-ethyl, chlorsulfuron, cinsulfuron, cyclosulfamuron, ethametsulfuron-methyl, ethoxysulfuron, flazasulfuron, flucetosulfuron, flupyrsulfuron-methyl-sodium, foramsulfuron, halosulfuron-methyl, imazosulfuron, iodosulfuron-methyl-sodium, mesosulfuron-methyl, metazosulfuron, metsulfuron-methyl, nicosulfuron, orthosulfamuron, primisulfuron-methyl, propyrisulfuron, prosulfuron, pyrazosulfuron-ethyl, rimsulfuron, sulfometuron-methyl, sulfosulfuron, triasulfuron, tribenuron-methyl, thifensulfuron-methyl, trifloxysulfuron-sodium, triflusulfuron-methyl, tritosulfuron, etc.; sulfonanilide chemical class like pyrimisulfan, triafamone, etc.; triazolinone species like flucarbazone-sodium, propoxycarbazone-sodium, thiencarbazone-methyl, etc.; and triazolopyrimidine chemical class like cloransulam-methyl, diclosulam, florasulam, flumetsulam, metosulam, penoxsulam, pyroxsulam, etc.

The microtubule assembly inhibitor may include dinitroaniline chemical class like benefin, benfluralin, butralin, ethalfluralin, oryzalin, prodiamine, pendimethalin, trifluralin, etc.; phosphoroamidate chemical class like butamifos, DMPA, etc.; pyridine species like dithiopyr, thiazopyr, etc.; and chlortaldi-methyl, and propyzamide (pronamide), which do not belong to a specific chemical class.

The auxin-mimic herbicide may include benzoate chemical class like chloramben, dicamba, etc.; phenoxy-carboxylate chemical class like 2,4,5-T, 2,4-D, 2,4-DB, clomeprop, dichlorprop, MPA, MPB, mecoprop, etc.; pyridin-carboxylate chemical class like aminopyralid, clopyralid, florpyrauxifen (chlorpyrauxifen-benzyl), halauxifen, picloram, etc.; pyridyloxy-carboxylate chemical class like fluroxypyr, triclopyr, etc.; quinoline-carboxylate chemical class quinclorac, quinmerac, etc.; and aminocyclopyrachlor, benazolin-ethyl, etc., which do not belong to a specific chemical class.

The photosynthetic photosystem II inhibitor may include amide chemical class like chloranocryl (dicryl), propanil, etc.; phenylcarbamate chemical class like desmedipham, phenmedipham, etc.; triazine chemical class like ametrine, atrazine, cyanazine, dimethamethrin, prometone, permethrin, propazine, simazine, terbuthylazine, terbutryn, etc.; triazinone chemical class like hexazinone, metamitron, metribuzin, etc.; uracil chemical class bromacil, lenacil, terbacil, etc.; urea chemical class like chlorotoluron, diuron, flumeturon, isoproturon, linuron, metobromuron, methabenzthiazuron, monuron, tebuthiuron, etc.; nitrile chemical class like bromoxynil, ioxynil, etc.; and amicarbazone, chloridazon (pirazone), bentazone, pyridate, etc., which do not belong to a specific chemical class.

The EPSP synthase inhibitor may include glyphosate, etc.

The glutamine synthetase inhibitor may include phosphinic acid chemical class like vianafos (vialafos), glufosinate-ammonium, etc.

The PDS inhibitor may include diphenyl heterocycle chemical class like fluridone, flutamon, etc.; en-phenyl heterocycle chemical class like flurochloridone, norflurazon, etc.; and phenyl ether chemical class like beflubutamid, diflufenican, picolinafen, etc.

The DOXP synthase inhibitor may include isoxazolidinone chemical class like bixlozone, clomazone, etc.

The PPO inhibitor may include diphenyl ether chemical class like acifluorofen, bifenox, fomesafen, lactofen, oxyfluorofen, etc.; en-phenyl-imide chemical class like butafenacil, cinidon-ethyl, flumiclorac-pentyl, flumioxazin, fluthiacet-methyl, pentoxazone, saflufenacil, tiafenacil, trifludimoxazin, etc.; en-phenyl-oxadiazolone chemical class like oxadiargyl, oxadiazon, etc.; en-phenyl-triazolinone chemical class like azafenidin, carfentrazone-ethyl, sulfentrazone, etc.; and pyraflufen-ethyl, pyraclonil, etc., which do not belong to a specific chemical class.

The VLCFAs inhibitor may include alpha-chloroacetamide chemical class like acetochlor, alachlor, butachlor, dimethachlor, dimethenamid, metazachlor, metolachlor, pethoxamid, pretilachlor, propachlor, tenicor, propisochlor, etc.; alpha-thioacetamide chemical class like anilofos, piperophos, etc.; alpha-oxyacetamide chemical class like mephenacet, flufenacet, etc.; azolyl-carboxamide chemical class like cafenstrole, fentrazamide, ipfencarbazone, etc.; benzofuran chemical class like benfuresate, ethofumesate, etc.; isoxazoline chemical class like phenoxasulfone, pyroxasulfone, etc.; oxylan chemical class like indanophan, tridiphane, etc.; and thiocarbamate chemical class like cycloate, dimepiperate, EPTC, sprocarb, molinate, orbencarb, prosulfocarb, thiobencarb (benthiocarb), tri-alate, bernolate, etc.

The DHP inhibitor may include asulam, etc.

The auxin transport inhibitor may include aryl-carboxylate chemical class like diflufenzopyr, naptalam, etc.

The photosystem I electron diversion inhibitor may include pyridinium chemical class like diquat, paraquat, etc.

The microtubule assembly inhibitor may include carbamate chemical class like barban, carbetamide, chlorpropham, etc.

The uncoupler herbicide may include dinitrophenol chemical class like dinocep, DNOC, etc.

The HPPD inhibitor may include pyrazole chemical class like benzophenap, pyrasulfotole, pyrazolinate, pyrazoxyfen, tolpyralate, topramezone, etc.; triketone chemical class like benzobicyclon, bicyclopyrone, fenquinotrione, mesotrione, sulcotrione, tembotrione, tefuryltrione, etc.; and isoxaflutole, which does not belong to a specific chemical class.

The cellulose synthesis inhibitor may include alkylazine chemical class like indaziflam, triaziflam, etc.; nitrile chemical class like chlortiamide, dichlobenil, etc.; and flupoxam, isoxaben, etc., which do not belong to a specific chemical class.

The fatty acid thioesterase inhibitor may include benzyl ether chemical class like cinmethylin, methiozolin, etc.

The serine threonine protein kinase inhibitor may include endothal, etc.

The solanesyl diphosphate synthase inhibitor may include aclonifen, etc.

The homogentisate solanesyl transferase inhibitor may include cyclopyrimorate, etc.

The lycopene cyclase inhibitor may include amitrol, etc.

Examples of other herbicides may include bensulide, bromobutide, cumyluron, difenzoquat, pyributicarb, DSMA, MSMA, dimron (dimuron), ethobenzanide, flamprop-M, phosphamine, oxaziclomefone, pelargonic acid, diphenamid, maproanilide, napropamide, etc.

The compounds according to the invention have herbicidal activity against weeds. The weeds are unwanted plants that occur in agricultural crops and refer to plants that need control. The number of weeds is very large, and the classification method is very diverse.

As a general weed classification method, depending on the type, it is classified into grassy weed, sedge weed or broadleaf weed. The grassy weeds include sorghum, barnyard grass, quack grass, fall *panicum*, crabgrass, smooth crabgrass, goosegrass, green foxtail, giant green foxtail, giant foxtail, Asian sprangletop, multi-stem lovegrass, Indian lovegrass, *Setaria viridis* (L) Beauv var major (Gaudin) Pospichal, hard bluegrass, Kentucky bluegrass, etc. The sedge weeds include Asian flatsedge, three-square bulrush, coco grass, tidal-marsh flatsedge, needle spikerush, slender spikerush, river bulrush, etc. The broadleaf weeds include sheathed *monochoria*, black nightshade, cocklebur, indian jointvetch, velvetleaf, bindweed, etc.

Also, depending on the number of leaves of weeds, it is classified as monocotyledonous or dicotyledonous weed. The monocotyledonous weeds include grassy weeds like crabgrass, quack grass, early barnyard grass, fall *panicum*, smooth crabgrass, goosegrass, green foxtail, giant green foxtail, giant foxtail, Asian sprangletop, multi-stem lovegrass, Indian lovegrass, *Setaria viridis* (L) Beauv var major (Gaudin) Pospichal, hard bluegrass, Kentucky bluegrass, etc. The dicotyledonous weeds include Compositae weeds like false daisy, *Sigesbeckia pubescens*, spreading sneezeweed, groundsel, mugwort, *Bidens frondosa* (devil's beggarticks), dandelion, annual fleabane, *Conyza Canadensis* (horseweed), *Galinsoga ciliate* (hairy *galinsoga*), lyre-shape hemistepta, *Youngia japonica*(Asiatic hawksbeard), redstem wormwood, Spanish needles, *Sigesbeckia glabrescens*, giant ragweed, *Ixeris dentate* (toothed ixeridium), sowthistle-leaved hawksbeard, Indian lettuce, frost aster, *Breea segeta*, dandelion, ragweed, *Helianthus tuberosus* (Canada potato), *Erechtites hieracifolia*, etc.; Labiatae weeds like *Elsholtzia ciliata* (Thunb.) Hylander, hairless woundwort, purplish field mosla, motherwort, etc.; Euphorbiaceae weeds like Asian copperleaf, eyebane, supina, etc.; Scrophulariaceae weeds like Asian *mazus*, prostrate false pimpernel, etc.; Solanaceae weeds like nightshade, American black nightshade, etc.; Amaranthaceae weeds like livid amaranth, Speen amaranth, etc.; Oxalidaceae weeds like wood sorrel, Yellow wood sorrel, etc.; Geraniaceae weeds like *Erodium moschatum* (L.) LHer. ex Ait, cranesbill, etc.; Malvaceae weeds like bladder ketmie, velvetleaf, etc.; Cannabinaceae weeds like Japanese hop, hemp, etc.; Onagraceae weeds like climbing seedbox, common evening primrose, etc.; Portulacaceae weeds like purslane, etc.; Equisetaceae weeds like horsetail, etc.; Araceae weeds like crow dipper, etc.; Umbelliferae weeds like erect hedge parsley, etc.; Aizoaceae weeds like five-leaf carpetweed, etc.; Commelinaceae weeds like day-flower, etc.; Crassulaceae weeds like gold moss stonecrop, etc.; Papaveraceae weeds like great(er) celandine, etc.; Asclepiadaceae weeds like rough potato, etc.; Violaceae weeds like Manchurian violet, etc.; Caryophyllaceae weeds like water chickweed, etc.; Urticaceae weeds like Mongolian clearweed, etc.; Borraginaceae weeds like common Asian trigonotis, etc.; Plantaginaceae weeds like Asiatic plantain, etc.; Rosaceae weeds like *Potentilla supina*, etc.; and Pontederiaceae weeds like sheathed *monochoria*, etc.

EXPERIMENTAL EXAMPLES

The followings are examples of testing the weed control effect exhibited by the compounds of the present invention.

Experimental Example 1: Herbicidal Activity Test Against Upland Field Weeds (Foliar Treatment Test)

Foliar treatment was performed as follows: After filling a square plastic pot having a surface area of 350 cm$^2$ with horticultural soil, seeds (10~15 grains) or rootstocks (2 pieces) of 5 kinds of grassy weeds of sorghum, barnyard grass, quack grass, crabgrass, fall *panicum*, and 5 kinds of broadleaf weeds of black nightshade, indian jointvetch, velvetleaf, cocklebur, bindweed, which had been stored in a low temperature (6° C.), were sown. After growing for a certain period in greenhouse conditions (average temperature 30±5° C., light/dark=14/10 hours), test compound solutions were made by diluting with a preparation solution (including 50% acetone, 0.1% Tween-20) so that the final treatment amount of the test compounds was 50 or 75 g a.i./ha. The prepared test compound solution was used for treating foliage by hand-spraying 14 mL per pot in a fume hood. After the treatment, it was managed under the same greenhouse conditions as above, and after 14 days (after 21 days if necessary), the external symptoms and efficacy were investigated according to the scale of 0 (no control) to 100 (complete control). The results of Table 7 were obtained by evaluating weed control value to the untreated control by conducting visual assessment.

TABLE 7

Foliar treatment herbicidal activity test

| Compound No. | Treatment Amount (g ai/ha) | Sorghum | barnyard grass | quack grass | Crabgrass | Fall panicum | black nightshade | Indian jointvetch | velvet leaf | Cocklebur | Bindweed |
|---|---|---|---|---|---|---|---|---|---|---|---|
| 1-1 | 50 | 70BC | 98BC | 0 | 100 | 95BCN | 100 | 30BI | 98BC | 100 | X |
| 1-4 | 50 | 0 | 0 | 0 | 0 | 0 | 80BC | 20 | 20 | 60BI | 20 |
| 1-8 | 50 | 0 | 0 | X | 0 | 0 | 98BC | 70BC | 20 | 20 | 40BI |
| 1-13 | 50 | 0 | 0 | 0 | 0 | 0 | 60BC | 0 | 0 | 20 | 0 |
| 1-17 | 50 | 0 | 0 | 0 | 20 | 20 | 100 | 0 | 30BC | 40BI | 20 |
| 1-18 | 50 | 0 | 0 | 0 | 0 | 0 | 80BC | 0 | 20 | 0 | 20 |
| 1-19 | 50 | 0 | 0 | 0 | 0 | 0 | 90BC | 0 | 20 | 0 | 0 |
| 1-20 | 50 | 0 | 0 | 0 | 0 | 0 | 50BC | 0 | 0 | 20 | 0 |
| 1-26 | 50 | 70BC | 95BCN | 0 | 98BCN | 98BCN | 100 | 70BC | 50BC | 70BC | 60BC |
| 1-27 | 50 | 80BC | 100 | 30C | 100 | 80BCN | X | 100 | 100 | 100 | 100 |
| 1-43 | 50 | 60BC | 95BCN | 30N | 95BCN | 95BCN | 100 | 30BC | 90BI | 90BC | 70BC |
| 1-45 | 50 | 50BC | 95BCN | 40N | 95BCN | 95BCN | 100 | 70BC | 80BC | 95BC | 98BC |
| 1-61 | 50 | 20 | 95BCN | 0 | 95BCN | 70BCN | 100 | 100 | 100 | 98BC | 70BC |
| 1-85 | 50 | 0 | 0 | 0 | 0 | 40BC | X | 40BI | 20 | 90BI | 40N |
| 1-86 | 50 | 20 | 95BCN | 0 | 95BCN | 40BCN | 100 | 70BC | 100 | 98BC | 70BN |
| 1-91 | 50 | 50BC | 98BC | 0 | 98BC | 90BCN | 98BC | 90BC | 100 | 100 | 80BC |
| 1-102 | 50 | 50BCN | 80BCN | 0 | 70BCN | 70BCN | 95BCN | 80BCN | 80BC | 80BC | 60BN |
| 1-115 | 50 | 0 | 30BI | 0 | 0 | 0 | 95BC | 40BC | 40BC | 80BC | 80BI |
| 2-1 | 50 | 0 | 98BCN | 0 | 95BCN | 70BCN | 100 | 60BN | 30BC | 60BCI | 60BN |
| 2-26 | 75 | 10 | 98BCN | 0 | 95BN | 70BN | 100 | 90BC | 98BC | 98BC | 95BC |
| 2-27 | 75 | 40BC | 80BCN | 0 | 20 | 70BC | 100 | 70BC | 100 | 98BC | 40BC |
| 2-28 | 50 | 0 | 70BCN | 0 | 30BN | 0 | 90BC | 40BI | 40BC | 80BC | 40BCI |
| 2-29 | 50 | 0 | 0 | 0 | 0 | 0 | 20 | 0 | 0 | 0 | 0 |
| 2-30 | 50 | 20 | 95BCN | 0 | 95BCN | 60BCN | 100 | 100 | 100 | 98BC | 60BN |
| 2-31 | 50 | 0 | 90BC | 0 | 60BCN | 40BC | 100 | 40BI | 70BI | 70BC | 0 |
| 2-32 | 50 | 0 | 0 | 0 | 0 | 0 | 40BN | 0 | 0 | 0 | 0 |
| 2-34 | 75 | 20 | 70BN | 0 | 60BN | 40BN | 95BCN | 60BN | 50BI | 40BC | 50BIN |
| 2-35 | 75 | 70BCN | 80BCN | 0 | 70BCN | 80BCN | 100 | 80BC | 90BC | 90BC | 70BIN |
| 2-36 | 75 | 20 | 90BCN | 0 | 60BCN | 50BCN | 95BC | 60BN | 50BI | 70BC | 70BCN |
| 2-43 | 50 | 20 | 60BI | 0 | 30BN | 50BI | 95BCN | 20 | 40BC | 20 | 30I |
| 2-59 | 50 | 98BC | 100 | 0 | 98BC | 95BC | 100 | 98BC | 98BC | 98BC | 90BC |
| 2-67 | 50 | 40BN | 70BCN | 0 | 70BCN | 60BCN | 95BCN | 80BCN | 80BC | 95BCN | 40N |
| 2-68 | 50 | 80BC | 100 | 0 | 98BC | 98BC | 100 | 98BC | 100 | 100 | 100 |
| 2-69 | 50 | 40BN | 70BCN | 0 | 70BCN | 60BCN | 95BCN | 80BCN | 80BC | 95BCN | 40N |
| 2-78 | 50 | 30N | 70BCN | 0 | 70BCN | 70BCN | 95BCN | 80BCN | 60BC | 60BCN | 40BN |
| 2-79 | 50 | 20 | 80BCN | 0 | 70BCN | 50BCN | 98BC | 70BN | 80BC | 60BI | 40N |
| 2-80 | 50 | 20 | 80BC | 0 | 40BCN | 60BCN | 98BC | 70BC | 98BC | 40BC | 40BN |
| 2-81 | 50 | 40BCN | 80BCN | 0 | 70BCN | 70BCN | 95BCN | 80BCN | 90BC | 95BCN | 60BCN |
| 2-83 | 50 | 20 | 90BCN | 0 | 70BCN | 70BCN | 98BC | 70BN | 70BC | 60BC | 40BI |
| 2-84 | 50 | 90BCN | 95BC | 0 | 95BC | 90BC | 100 | 70BCN | 98BC | 95BC | 60BCN |
| 2-85 | 50 | 5 | 99 | X | 60 | 84 | 100 | 97 | 100 | 97 | 99 |
| 2-86 | 50 | 30BC | 95BCN | 0 | 70BCN | 50BCN | 95BC | 80BN | 98BC | 80BC | 40BC |
| 2-87 | 50 | 0 | 10 | 0 | 0 | 40BCN | 98BC | 20 | 70BCN | 60BI | 80BIN |
| 2-88 | 50 | 0 | 0 | 0 | 20 | 40BCN | 100 | 60BC | 70BCN | 70BI | 70BCN |
| 2-89 | 50 | 50BCN | 95BCN | 0 | 60BCN | 90BCN | 100 | 40BN | 50BC | 90BCN | 70BN |
| 2-90 | 50 | 20 | 98BC | 0 | 70BCN | 60BCN | 100 | 80BCN | 98BC | 70BC | 70BCN |
| 2-91 | 50 | 50BN | 80BCN | 0 | 90BCN | 70BCN | 100 | 95BCN | 98BC | 98BC | 70BC |
| 2-92 | 50 | 0 | 0 | 0 | 20 | 40BC | 100 | 70BI | 80BC | 70BI | 70BN |
| 2-93 | 50 | 20 | 20 | 0 | 40N | 30BC | 100 | 70BI | 80BC | 95BCN | 50BN |
| 2-94 | 50 | 0 | 0 | 0 | 0 | 0 | 100 | 60BI | 60BI | 60BI | 30N |
| 2-97 | 50 | 50BC | 95BCN | 0 | 95BCN | 95BCN | 100 | 95BN | 95BC | 95BC | 80BI |
| 2-102 | 50 | 70BCN | 95BCN | 0 | 100 | 80BC | 100 | 98BC | 80BC | 100 | 100 |
| 2-104 | 50 | 80BCN | 98BCN | 30N | 100 | 98BCN | 100 | 100 | 100 | 100 | 100 |
| 2-105 | 50 | 20 | 0 | 0 | 30BC | 50BCN | 100 | 95BCN | 90BC | 98BC | 80BC |
| 2-106 | 50 | 70BCN | 80BCN | 0 | 70BCN | 70BCN | 95BCN | 80BCN | 95BC | 95BCN | 40N |
| 2-107 | 50 | 70BCN | 70BCN | 0 | 95BCN | 60BCN | 100 | 98BC | 70BC | 98BC | 98BC |
| 2-108 | 50 | 70BC | 60BC | 0 | 60BCN | 50BCN | 100 | 80BC | 30BC | 98BC | 90BC |
| 2-109 | 50 | 80BC | 100 | 0 | 100 | 95BCN | 100 | 98BC | 80BC | 100 | 98BC |
| 2-110 | 50 | 20 | 20 | 0 | 70BCN | 70BCN | 100 | 95BC | 80BC | 95BC | 98BC |
| 2-111 | 50 | 70BC | 100 | 0 | 98BC | 95BCN | 100 | 95BC | 80BC | 100 | 98BC |
| 2-112 | 50 | 50BC | 100 | 0 | 90BC | 70BC | 100 | 95BC | 90BC | 98BC | 98BC |
| 2-114 | 50 | 0 | 60BCN | 10 | 0 | 40BN | 95BCN | 20 | 70BCN | 90BC | 80BC |
| 2-115 | 50 | 10 | 0 | 0 | 20 | 50BCN | 100 | 0 | 50BCN | 90BI | 80BC |
| 2-116 | 50 | 40BC | 98BC | 0 | 80BCN | 80BC | 100 | 40BI | 90BC | 98BC | 90BCN |
| 2-117 | 50 | 40BC | 98BC | 0 | 95BCN | 40BCN | 100 | 40BI | 90BC | 90BC | 70BN |

TABLE 7-continued

Foliar treatment herbicidal activity test

| Compound No. | Treatment Amount (g ai/ha) | Sorghum | barnyard grass | quack grass | Crabgrass | Fall panicum | black nightshade | Indian jointvetch | velvet leaf | Cocklebur | Bindweed |
|---|---|---|---|---|---|---|---|---|---|---|---|
| 2-118 | 50 | 40BCN | 95BCN | 0 | 90BCN | 95BCN | 100 | 50BCI | 90BC | 90BCI | 95BC |
| 2-119 | 50 | 20 | 95BCN | 30 | 95BCN | 90BCN | 98BC | 60BN | 50BC | 90BC | 80BC |
| 2-120 | 50 | 10 | 80BCN | 10 | 95BCN | 90BCN | 100 | 60BC | 80BC | 90BC | 50N |
| 2-121 | 50 | 10 | 20 | 0 | 30 | 50BCN | 95BCN | 30 | 40BN | 70BI | 40N |
| 2-122 | 50 | 0 | 50BCN | 30 | 20 | 40BCN | 95BCN | 70BN | 50BN | 80BI | 70BN |
| 2-123 | 50 | 70BCN | 95BCN | 40BCN | 95BCN | 95BCN | 98BC | 70BCN | 70BC | 90BIN | 80BC |
| 2-124 | 50 | 40BCN | 90BCN | 20 | 95BCN | 90BCN | 95BCN | 60BIN | 60BCN | 80BCI | 70BIN |
| 2-125 | 50 | 30 | 60BCN | 40BN | 95BCN | 90BCN | 95BC | 60BIN | 40BCN | 80BCI | 95BC |
| 2-126 | 50 | 60BCN | 80BCN | 0 | 90BCN | 80BCN | 100 | 50BN | 80BC | 90BCN | 20 |
| 2-127 | 50 | 30BC | 60BCN | 0 | 60BN | 40B | 80BN | 20 | 30BN | 60BI | 50N |
| 2-128 | 50 | 20 | 60BCN | 0 | 60BN | 70BC | 90BN | 0 | 70BN | 50BI | 40N |
| 2-129 | 50 | 40BC | 90BCN | 0 | 70BCN | 50BCN | 100 | 60BC | 70BC | 70BC | 40N |
| 2-130 | 50 | 30BC | 95BCN | 0 | 90BCN | 70BCN | 98BC | 60BI | 50BC | 60BC | 70BN |
| 2-131 | 50 | 40BC | 98BC | 10 | 100 | 70BCN | 100 | 70BC | 100 | 80BC | . |
| 2-132 | 50 | 30BI | 98BC | 0 | 98BC | 50BCN | 100 | 20 | 98BC | 98BC | 70BC |
| 2-133 | 50 | 20 | 90BCN | 0 | 98BCN | 80BC | 100 | 95BC | 80BC | 95BC | 90BC |
| 2-134 | 50 | 10 | 98BC | 10 | 80BCN | 50BCN | 100 | 70BC | 60BC | 50BC | 98BC |
| 2-135 | 50 | 30BN | 98BC | 0 | 70BCN | 50BCN | 98BC | 95BC | 40BC | 95BC | 70BN |
| 2-136 | 50 | 20 | 70BC | 0 | 60BCN | 50BCN | 95BC | 20 | 40BC | 95BC | 50N |
| 2-137 | 50 | 60BC | 95BCN | 0 | 95BCN | 50BCN | 100 | 100 | 100 | 98BC | 70BC |
| 4-3 | 50 | 80BCN | 98BCN | 0 | 98BCN | 80BCN | 100 | 100 | 98BC | 98BC | 100 |
| 4-4 | 50 | 100 | 100 | 0 | 98BCN | 98BCN | 100 | 100 | 100 | 98BC | 100 |
| 4-8 | 50 | 70BCN | 98BCN | 0 | 98BCN | 80BCN | 100 | 100 | 100 | 100 | 100 |
| 4-9 | 50 | 70BCN | 100 | 0 | 98BC | 90BCN | 98BC | 98BC | 98BC | 100 | 100 |
| 4-10 | 50 | 100 | 98BC | 0 | 100 | 95BCN | 100 | 98BC | 100 | 100 | 100 |
| 4-11 | 50 | 60BCN | 98BC | 0 | 98BC | 95BCN | 100 | 98BC | 100 | 98BCN | 100 |
| 4-12 | 50 | 70BCN | 100 | 0 | 95BCN | 98BC | 100 | 98BC | 100 | 98BC | 100 |

(X: Not evaluated due to an experimental error)
Abbreviation:
B; Stunting, C; Desiccation, I; Chlorosis, N; Bleaching.

Experimental Example 2: Herbicidal Activity Test Against Upland Field Weeds (Soil Treatment Test)

Soil treatment was performed as follows: After filling a square plastic pot having a surface area of 350 cm² with sandy loam mixed with 1 g per pot (350 cm²) of horticultural mixed fertilizer (N:P:K=11:10:11), seeds (10~15 grains) or rootstocks (2 pieces) of 5 kinds of grassy weeds of sorghum, barnyard grass, quack grass, crabgrass, fall *panicum*, and 5 kinds of broadleaf weeds of black nightshade, indian jointvetch, velvetleaf, cocklebur, bindweed, which had been stored in a low temperature (6° C.), were sown. The day after sowing, test compound solutions were made by diluting with a preparation solution (including 50% acetone, 0.1% Tween-20) so that the final treatment amount of the test compounds was 50 or 75 g a.i./ha. The prepared test compound solution was used for treating soil surface by hand-spraying 14 mL per pot in a fume hood. After the treatment, it was managed under the same greenhouse conditions (average temperature 30±5° C., light/dark=14/10 hours), and after 14 days (after 21 days if necessary), the external symptoms and efficacy were investigated according to the scale of 0 (no control) to 100 (complete control). The results of Table 8 were obtained by evaluating weed control value to the untreated control by conducting visual assessment.

TABLE 8

Soil treatment herbicidal activity test

| Compound No. | Treatment Amount (g ai/ha) | Sorghum | barnyard grass | quack grass | Crabgrass | Fall panicum | black nightshade | Indian jointvetch | velvet leaf | Cocklebur | Bindweed |
|---|---|---|---|---|---|---|---|---|---|---|---|
| 1-1 | 50 | 0 | 95BN | 0 | 98BC | 98BC | 100 | 0 | 100 | 0 | 0 |
| 1-8 | 50 | 0 | 0 | 0 | 30BC | 0 | 0 | 100 | 100 | X | 50BI |
| 1-17 | 50 | 0 | 0 | 0 | 20 | 20 | 100 | 0 | 30BC | 40BC | 20 |
| 1-18 | 50 | 0 | 0 | 0 | 0 | 0 | 80BC | 0 | 20 | 0 | 20 |
| 1-19 | 50 | 0 | 0 | 0 | 0 | 0 | 98BC | 0 | 20 | 0 | 0 |
| 1-26 | 50 | 30BC | 100 | 0 | 1000 | 60BC | 100 | 70BC | 100 | 0 | 0 |
| 1-27 | 50 | 100 | 100 | 20 | 100 | 100 | 100 | 100 | 100 | X | 80BC |
| 1-43 | 50 | 0 | 0 | 0 | 20 | 0 | 0 | 0 | 90BC | 0 | 0 |
| 1-45 | 50 | 0 | 98BC | 0 | 100 | 98BC | 100 | 0 | 100 | 0 | 0 |
| 1-61 | 50 | 0 | 20 | 0 | 40BI | 95BC | 98BC | 100 | 90BC | 0 | 0 |
| 1-91 | 50 | 0 | 0 | 0 | 0 | 0 | 98BC | 98BC | 100 | 0 | X |
| 1-102 | 50 | 0 | 20 | 0 | 20 | 70BN | X | 20 | 40BC | 0 | 0 |
| 2-1 | 50 | 0 | 0 | 0 | 0 | 0 | 90BCN | 0 | 0 | 0 | 0 |
| 2-26 | 75 | 20 | 100 | 0 | 98BN | 100 | 100 | 100 | 100 | 98BC | 100 |

TABLE 8-continued

Soil treatment herbicidal activity test

| Compound No. | Treatment Amount (g ai/ha) | Sorghum | barnyard grass | quack grass | Crabgrass | Fall panicum | black nightshade | Indian jointvetch | velvet leaf | Cocklebur | Bindweed |
|---|---|---|---|---|---|---|---|---|---|---|---|
| 2-27 | 75 | 50IN | 100 | 0 | X | 100 | 100 | 100 | 100 | 100 | 98BN |
| 2-28 | 50 | 0 | 70BN | 0 | 90BN | 70BC | 100 | 70BI | 100 | 0 | 0 |
| 2-29 | 50 | 0 | 0 | 0 | 0 | 0 | 20 | 0 | 0 | 0 | 0 |
| 2-30 | 50 | 50BCN | 100 | 0 | 100 | 100 | 100 | 100 | 100 | 90BC | 70BI |
| 2-31 | 50 | 0 | 100 | 0 | 98BN | 95BN | 100 | 98BC | 100 | 30I | 0 |
| 2-34 | 75 | 0 | 60BCN | 0 | 70BC | 80BCN | 95BC | 70BC | 60BCN | 0 | 0 |
| 2-35 | 75 | 90BC | 100 | 0 | X | 100 | 100 | 100 | 100 | 95BC | 70BC |
| 2-36 | 75 | 20 | 100 | 10 | 100 | 98BCN | 100 | 100 | 100 | 90BCN | 70BN |
| 2-43 | 50 | 0 | 0 | 0 | 0 | 0 | X | 20 | 30BC | X | 0 |
| 2-59 | 50 | 100 | 100 | 20 | 98BN | 100 | 100 | 100 | 100 | 20 | 90BC |
| 2-67 | 50 | 50N | 100 | 0 | 100 | 90BN | X | 100 | 100 | 100 | 70BN |
| 2-68 | 50 | 40N | 98BN | 0 | 100 | 90BN | X | 100 | 100 | 0 | 0 |
| 2-69 | 50 | 70BN | 1000 | 0 | 98BN | 98BN | X | 100 | 100 | 0 | 70BN |
| 2-78 | 50 | 50N | 100 | 0 | 100 | 90BN | X | 95BC | 100 | 70B | 40B |
| 2-79 | 50 | 30BC | 100 | 0 | 95BC | 98BC | 100 | 100 | 100 | 0 | X |
| 2-80 | 50 | 0 | 0 | 0 | 0 | 0 | 98BC | 40BI | 98BC | 0 | X |
| 2-81 | 50 | 50N | 100 | 0 | 100 | 98BN | X | 100 | 100 | 100 | 70BN |
| 2-83 | 50 | 0 | 0 | 0 | 70BC | 60BCN | 100 | 80BI | 100 | X | 40B |
| 2-84 | 50 | 20 | 70BN | 0 | 80BC | 20 | 100 | 98BC | 100 | 0 | 40BN |
| 2-85 | 50 | 0 | 0 | X | 0 | 20 | 93 | 55 | 20 | 25 | 35 |
| 2-86 | 50 | 0 | 98BC | 0 | 0 | 20 | 100 | 100 | 100 | 0 | X |
| 2-192 | 50 | 0 | 0 | 0 | 0 | 0 | 95BC | 100 | 100 | X | 0 |
| 2-197 | 50 | 0 | 40BC | 0 | 95BN | 98BC | 100 | 95BC | 100 | 0 | 0 |
| 2-102 | 50 | 20 | 98BC | 0 | 100 | 100 | 100 | X | 100 | X | X |
| 2-104 | 50 | 0 | 0 | 0 | 0 | 0 | 98BC | 0 | 100 | 0 | 0 |
| 2-105 | 50 | 0 | 0 | 0 | 0 | 0 | 60BC | 90BI | 100 | 98BC | 30BI |
| 2-106 | 50 | 70BCN | 100 | 0 | 100 | 100 | X | 100 | 100 | 100 | 98BCN |
| 2-107 | 50 | 20 | 0 | 0 | 0 | 0 | 70BN | 0 | 100 | X | 40BI |
| 2-108 | 50 | 0 | 0 | 0 | 0 | 0 | 30B | 0 | 0 | 0 | 0 |
| 2-109 | 50 | 0 | 0 | 0 | 0 | 0 | 100 | 0 | 100 | 0 | 0 |
| 2-111 | 50 | 0 | 0 | 0 | 0 | 0 | 90BC | 0 | 0 | 0 | 0 |
| 2-112 | 50 | 0 | 0 | 0 | 0 | 0 | 90BC | 100 | 100 | 0 | 0 |
| 2-129 | 50 | 0 | 0 | 0 | 0 | 0 | 100 | 0 | X | X | X |
| 2-131 | 50 | 0 | 0 | 0 | 0 | X | 98BCN | 100 | 98BC | 0 | X |
| 2-135 | 50 | 0 | 0 | 0 | 0 | 0 | 60BN | 0 | 0 | 0 | X |
| 4-3 | 50 | 0 | 0 | 0 | 98BC | 0 | 100 | 0 | 50BI | X | 0 |
| 4-4 | 50 | 0 | 0 | 0 | 0 | X | 100 | X | 100 | 0 | 0 |
| 4-8 | 50 | 70BC | 100 | 0 | 100 | 0 | 100 | 100 | 100 | 0 | 0 |
| 4-9 | 50 | 0 | 0 | 0 | 0 | 0 | 100 | 100 | 100 | X | X |
| 4-10 | 50 | 40BI | 100 | 0 | 100 | 40BC | 100 | 95BI | 100 | X | 40BI |
| 4-11 | 50 | 0 | 100 | 0 | 100 | 60BC | 100 | 40BI | 100 | X | 0 |
| 4-12 | 50 | 20 | 100 | 0 | 100 | 90BC | 100 | 40BI | 100 | X | 98BC |

(X: Not evaluated due to an experimental error)
Abbreviation:
B; Stunting, C; Desiccation, I; Chlorosis, N; Bleaching.

Experimental Example 3: Phytotoxicity Test for Upland Field Crops (Foliar Treatment Test)

Foliar treatment was performed for grown crops and weeds in a square plastic pot having a surface area of 50 cm$^2$ filled with horticultural soil. As a fertilizer per pot, 0.5 g of horticultural mixed fertilizer (N:P:K=17:21:17) was treated by mixing in the upper soil. Five kinds of crops such as rice, wheat, corn, soybean, and cotton were sown in each pot, and after growing for a certain period in greenhouse conditions (average temperature 30±5° C., light/dark=14/10 hours), test compound solutions were made by diluting with the diluent (33% acetone, 0.1% Tween-20) so that the final treatment amount of the test compounds was 19~300 g a.i./ha. The prepared test compound solutions were treated using a spray booth (SB6-016) at a treatment amount of 100 ml per 1 m$^2$ of treatment area. The treated plants were managed under the same greenhouse conditions as above, and external symptoms and phytotoxicity were investigated 7 and 14 days after treatment (after 21 days if necessary). In the evaluation of the phytotoxicity for the crop, the grade of 0 (no harm) to 9 (complete withered) was used. The results of Table 9 were obtained by evaluating crop phytotoxicity value to the untreated control.

TABLE 9

Foliar treatment phytotoxicity test

| Compound No. | Treatment Amount (g ai/ha) | Rice | | Wheat | | Corn | | Soybean | | Cotton | |
|---|---|---|---|---|---|---|---|---|---|---|---|
| 1-1 | 50 | 4 | 8 | 1 | 1 | 2 | 2 | 7 | 0 | 3 | 0 |
|  | 100 | 6 | 9 | 3 | 2 | 4 | 4 | 8 | 9 | 3 | 7 |
| 1-26 | 50 | 3 | 6 | 0 | 0 | 1 | 0 | 5 | 5 | 2 | 6 |
|  | 100 | 4 | 7 | 1 | 2 | 2 | 2 | 5 | 5 | 4 | 9 |
| 1-40 | 50 | 0 | 0 | 0 | 0 | 0 | 0 | 6 | 5 | 2 | 3 |
|  | 100 | 0 | 1 | 1 | 0 | 0 | 0 | 6 | 5 | 3 | 4 |
| 1-44 | 50 | 6 | 9 | 0 | 0 | 5 | 3 | 6 | 7 | 4 | 9 |
|  | 100 | 6 | 9 | 0 | 0 | 5 | 3 | 6 | 7 | 5 | 9 |

TABLE 9-continued

Foliar treatment phytotoxicity test

| Compound No. | Treatment Amount (g ai/ha) | Rice | Wheat | Corn | Soybean | Cotton | | | | |
|---|---|---|---|---|---|---|---|---|---|---|
| 1-45 | 50 | 6 | 9 | 0 | 0 | 1 | 0 | 6 | 7.5 | 5 | 9 |
| | 100 | 6 | 9 | 0 | 0 | 3 | 2 | 7 | 9 | 5 | 9 |
| 1-61 | 50 | 4 | 6 | 4 | 3 | 0 | 0 | 6 | 9 | 3 | 6 |
| | 100 | 5 | 6 | 0 | 6 | 0 | 0 | 0 | 9 | 0 | 7 |
| 1-86 | 50 | 3 | 6 | 3 | 3 | 0 | 0 | 5 | 7 | 3 | 6 |
| | 100 | 5 | 7 | 0 | 3 | 0 | 0 | 0 | 8 | 0 | 7 |
| 1-102 | 50 | 6 | 8 | 2 | 2 | 6 | 6 | 5 | 8 | 4 | 8 |
| | 100 | 7 | 9 | 3 | 3 | 6 | 8 | 6 | 9 | 5 | 9 |
| 2-1 | 50 | 4 | 3 | 0 | 0 | 2 | 1 | 5 | 6 | 6 | 8 |
| | 100 | 5 | 4 | 0 | 0 | 2 | 2 | 6 | 6 | 6 | 9 |
| 2-26 | 50 | X | X | 1 | 0 | 0 | 0 | 3 | 9 | 1 | 4 |
| | 100 | X | X | 1 | 0 | 0 | 0 | 4 | 9 | 2 | 4 |
| 2-30 | 50 | 3 | 5 | 2 | 1 | 0 | 0 | 0 | 0 | 0 | 0 |
| | 100 | 5 | 7 | 3 | 3 | 1 | 1 | 6 | 6 | 3 | 8 |
| 2-59 | 50 | 3 | 4 | 0 | 0 | 2 | 5 | 7 | 3 | 8 | |
| | 100 | 3 | 6 | 0 | 0 | 3 | 4 | 5 | 7 | 3 | 9 |
| 2-68 | 50 | 6 | 5 | 0 | 0 | 4 | 4 | 5 | 5 | 4 | 9 |
| | 100 | 6 | 8 | 1 | 0 | 6 | 6 | 6 | 7 | 5 | 9 |
| 2-69 | 50 | 6 | 7 | 0 | 0 | 4 | 3 | 6 | 6 | 4 | 9 |
| 2-78 | 50 | 5 | 4 | 0 | 0 | 2 | 1 | 5 | 5 | 5 | 9 |
| | 100 | 6 | 5 | 0 | 0 | 3 | 1 | 6 | 6 | 6 | 9 |
| 2-81 | 50 | 5 | 3 | 0 | 0 | 2 | 1 | 5 | 6 | 4 | 9 |
| | 100 | 6 | 5 | 0 | 0 | 2 | 1 | 6 | 7 | 4 | 9 |
| 2-84 | 50 | 6 | 7 | 0 | 0 | 2 | 1 | 6 | 7 | 5 | 9 |
| | 100 | 6 | 9 | 0 | 0 | 3 | 4 | 6 | 8 | 5 | 9 |
| 2-85 | 50 | 7 | 7 | 0 | 0 | 0 | 4 | 6 | 7 | 7 | |
| | 100 | 8 | 1 | 2 | 0 | 0 | 0 | 6 | 7 | 8 | 9 |
| 2-87 | 50 | NT | NT | 0 | 0 | 0 | 0 | NT | NT | NT | NT |
| | 100 | NT | NT | 0 | 0 | 0 | 0 | NT | NT | NT | NT |
| 2-88 | 50 | NT | NT | 0 | 0 | 0 | 0 | NT | NT | NT | NT |
| | 100 | NT | NT | 0 | 0 | 0 | 0 | NT | NT | NT | NT |
| 2-89 | 50 | NT | NT | 0 | 0 | 0 | 0 | NT | NT | NT | NT |
| | 100 | NT | NT | 0 | 0 | 0 | 0 | NT | NT | NT | NT |
| 2-90 | 50 | NT | NT | 0 | 0 | 0 | 0 | NT | NT | NT | NT |
| | 100 | NT | NT | 0 | 0 | 0 | 0 | NT | NT | NT | NT |
| 2-91 | 50 | NT | NT | 0 | 0 | 2 | 1 | NT | NT | NT | NT |
| | 100 | NT | NT | 0 | 0 | 3 | 3 | NT | NT | NT | NT |
| 2-97 | 50 | 6 | 8 | 0 | 0 | 0 | 0 | 5 | 6 | 5 | 9 |
| | 100 | 6 | 9 | 0 | 0 | 2 | 1 | 7 | 9 | 6 | 9 |
| 2-102 | 50 | 3 | 3 | 0 | 0 | 0 | 0 | 0 | 0 | 0 | 0 |
| | 100 | 4 | 4 | 0 | 1 | 0 | 0 | 0 | 0 | 0 | 0 |
| 2-105 | 50 | NT | NT | 3 | 4 | 0 | 0 | NT | NT | NT | NT |
| | 100 | NT | NT | 4 | 4 | 0 | 0 | NT | NT | NT | NT |
| 2-106 | 50 | 6 | 7 | 0 | 0 | 5 | 4 | 5 | 8 | 5 | 9 |
| | 100 | 6 | 8 | 0 | 0 | 6 | 7 | 6 | 8 | 5 | 9 |
| 2-107 | 50 | NT | NT | 3 | 3 | 1 | 0 | NT | NT | NT | NT |
| | 100 | NT | NT | 4 | 4 | 2 | 0 | NT | NT | NT | NT |
| 2-108 | 50 | NT | NT | 3 | 3 | 0 | 0 | NT | NT | NT | NT |
| | 100 | NT | NT | 4 | 4 | 0 | 0 | NT | NT | NT | NT |
| 2-109 | 50 | NT | NT | 2 | 2 | 0 | 0 | NT | NT | NT | NT |
| | 100 | NT | NT | 3 | 3 | 0 | 0 | NT | NT | NT | NT |
| 2-110 | 50 | NT | NT | 0 | 0 | 0 | 0 | NT | NT | NT | NT |
| | 100 | NT | NT | 0 | 0 | 0 | 0 | NT | NT | NT | NT |
| 2-114 | 50 | NT | NT | 1 | 0 | 1 | 0 | NT | NT | NT | NT |
| | 100 | NT | NT | 2 | 1 | 2 | 0 | NT | NT | NT | NT |
| 2-115 | 50 | NT | NT | 0 | 0 | 0 | 0 | NT | NT | NT | NT |
| | 100 | NT | NT | 0 | 0 | 0 | 0 | NT | NT | NT | NT |
| 2-116 | 50 | 4 | 5 | 0 | 0 | 1 | 0 | 2 | 3 | 2 | 1 |
| | 100 | 4 | 5 | 0 | 0 | 2 | 2 | 3 | 5 | 3 | 2 |
| 2-117 | 50 | 3 | 6 | 0 | 0 | 1 | 1 | 3 | 5 | 3 | 2 |
| | 100 | 4 | 5 | 1 | 0 | 3 | 2 | 4 | 6 | 4 | 2 |
| 2-118 | 50 | NT | NT | 0 | 0 | 0 | 0 | NT | NT | NT | NT |
| | 100 | NT | NT | 0 | 0 | 0 | 0 | NT | NT | NT | NT |
| 2-119 | 50 | NT | NT | 0 | 0 | 0 | 0 | NT | NT | NT | NT |
| | 100 | NT | NT | 0 | 0 | 0 | 0 | NT | NT | NT | NT |
| 2-120 | 50 | NT | NT | 0 | 0 | 0 | 0 | NT | NT | NT | NT |
| | 100 | NT | NT | 0 | 0 | 0 | 0 | NT | NT | NT | NT |
| 2-121 | 50 | NT | NT | 0 | 0 | 0 | 0 | NT | NT | NT | NT |
| | 100 | NT | NT | 0 | 0 | 0 | 0 | NT | NT | NT | NT |
| 2-122 | 50 | NT | NT | 0 | 0 | 0 | 0 | NT | NT | NT | NT |
| | 100 | NT | NT | 0 | 0 | 0 | 0 | NT | NT | NT | NT |
| 2-123 | 50 | NT | NT | 0 | 0 | 3 | 2 | NT | NT | NT | NT |
| | 100 | NT | NT | 0 | 0 | 4 | 4 | NT | NT | NT | NT |
| 2-124 | 50 | NT | NT | 0 | 1 | 2 | 1 | NT | NT | NT | NT |
| | 100 | NT | NT | 1 | 1 | 3 | 2 | NT | NT | NT | NT |
| 2-125 | 50 | NT | NT | 0 | 0 | 0 | 0 | NT | NT | NT | NT |
| | 100 | NT | NT | 0 | 0 | 1 | 1 | NT | NT | NT | NT |
| 2-126 | 50 | NT | NT | 0 | 0 | 1 | 1 | NT | NT | NT | NT |
| | 100 | NT | NT | 0 | 0 | 3 | 2 | NT | NT | NT | NT |
| 2-127 | 50 | NT | NT | 0 | 0 | 0 | 0 | NT | NT | NT | NT |
| | 100 | NT | NT | 0 | 0 | 0 | 0 | NT | NT | NT | NT |
| 2-128 | 50 | NT | NT | 0 | 0 | 1 | 0 | NT | NT | NT | NT |
| | 100 | NT | NT | 0 | 0 | 2 | 0 | NT | NT | NT | NT |
| 2-129 | 50 | NT | NT | 1 | 1 | 0 | 0 | NT | NT | NT | NT |
| | 100 | NT | NT | 2 | 2 | 0 | 0 | NT | NT | NT | NT |
| 2-132 | 50 | NT | NT | 3 | 2 | 0 | 0 | NT | NT | NT | NT |
| | 100 | NT | NT | 3 | 2 | 0 | 0 | NT | NT | NT | NT |
| 2-134 | 50 | 3 | 6 | 0 | 0 | 0 | 0 | 4 | 6 | 3 | 2 |
| | 100 | 3 | 7 | 0 | 0 | 0 | 0 | 4 | 8 | 3 | 8 |
| 2-135 | 50 | 3 | 6 | 0 | 0 | 0 | 0 | 4 | 6 | 3 | 7 |
| | 100 | 4 | 6 | 0 | 0 | 0 | 0 | 4 | 7 | 3 | 7 |
| 2-136 | 50 | 4 | 6 | 0 | 0 | 0 | 0 | 4 | 6 | 3 | 6 |
| | 100 | 5 | 7 | 0 | 0 | 2 | 3 | 4 | 6 | 3 | 8 |
| 2-137 | 50 | NT | NT | 0 | 0 | 0 | 0 | NT | NT | NT | NT |
| | 100 | NT | NT | 0 | 0 | 0 | 0 | NT | NT | NT | NT |
| 4-1 | 50 | 2 | 6 | 0 | 0 | 0 | 0 | 4 | 6 | 3 | 8 |
| | 100 | 3 | 7 | 0 | 0 | 0 | 0 | 4 | 8 | 3 | 8 |
| 4-3 | 50 | NT | NT | 0 | 0 | 0 | 0 | NT | NT | NT | NT |
| | 100 | NT | NT | 0 | 0 | 1 | 0 | NT | NT | NT | NT |
| 4-4 | 50 | 4 | 4 | 1 | 0 | 0 | 0 | 0 | 0 | 0 | 0 |
| | 100 | 4 | 4 | 2 | 2 | 0 | 0 | 0 | 0 | 0 | 0 |
| 4-8 | 50 | 0 | 0 | 2 | 1 | 0 | 0 | 0 | 0 | 0 | 0 |
| | 100 | 0 | 0 | 2 | 2 | 0 | 0 | 0 | 0 | 0 | 0 |
| 4-10 | 50 | NT | NT | 0 | 0 | 2 | 1 | NT | NT | NT | NT |
| | 100 | NT | NT | 0 | 0 | 3 | 1 | NT | NT | NT | NT |

(X: Not evaluated due to an experimental error, NT: No experiment)

Experimental Example 4: Phytotoxicity Test for Field Crops (Soil Treatment Test)

Soil treatment was performed for sown crops and weeds in a square plastic pot having a surface area of 50 cm$^2$ filled with sterilized horticultural soil (pH 6.1, organic material 1.0%, clay 21%, silt 17%, sand 52%). As a fertilizer per pot, 0.5 g of horticultural mixed fertilizer (N:P:K=17:21:17) was treated by mixing with soil. Five kinds of crops such as rice, wheat, corn, soybean, and cotton were sown in each pot. One day after sowing, test compound solutions were made by diluting with the diluent (33% acetone, 0.1% Tween-20) so that the final treatment amount of the test compounds was 19~300 g a.i./ha. The prepared test compound solutions were treated using a spray booth (SB6-016) at a treatment amount of 100 ml per 1 m$^2$ of treatment area. The treated crops were managed in greenhouse conditions (average temperature 30±5° C., light/dark=14/10 hours). External symptoms and phytotoxicity were visually investigated 10 and 20 days after treatment. In the evaluation of the phytotoxicity for the crop, the grade of 0 (no harm) to 9 (complete withered) was used. The results of Table 10 were obtained by evaluating phytotoxicity value to the untreated control.

TABLE 10

| Compound No. | Treatment Amount (g ai/ha) | Soil treatment phytotoxicity test - Crop ||||||||||
|---|---|---|---|---|---|---|---|---|---|---|---|
| | | Rice || Wheat || Corn || Soybean || Cotton ||
| 1-1 | 50 | 1 | 7 | 0 | 0 | 0 | 0 | 3 | 5 | 2 | 6 |
| | 100 | 3 | 9 | 0 | 1 | 0 | 0 | 3 | 7 | 2 | 7 |
| 1-26 | 50 | 1 | 8 | 0 | 0 | 0 | 0 | 0 | X | 1 | 0 |
| | 100 | 3 | 9 | 0 | 0 | 1 | 1 | 0 | 4 | 1 | 1 |
| 1-40 | 50 | 0 | 0 | 0 | 0 | 0 | 0 | 0 | 0 | 1 | 0 |
| | 100 | 0 | 0 | 0 | 0 | 0 | 0 | 0 | 0 | 3 | 0 |
| 1-43 | 50 | 5 | 5 | 0 | 0 | 0 | 0 | 0 | 0 | 0 | 1 |
| | 100 | 7 | 9 | 3 | 3 | 1 | 0 | 0 | 0 | 1 | 2 |
| 1-45 | 50 | 9 | 9 | 0 | 0 | 0 | 0 | 0 | 0 | 1 | 4 |
| | 100 | 9 | 9 | 0 | 0 | 1 | 0 | 0 | 0 | 3 | 5 |
| 1-61 | 50 | 0 | 1 | 0 | 0 | 0 | 0 | 0 | X | 1 | 1 |
| | 100 | 1 | 6 | 0 | 0 | 0 | 0 | 3 | 6 | 2 | 2 |
| 1-86 | 50 | 0 | 1 | 0 | 0 | 0 | 0 | 0 | 4 | 0 | 0 |
| | 100 | 1 | 6 | 0 | 0 | 0 | 0 | 0 | 4 | 1 | 2 |
| 1-102 | 50 | 5 | 5 | 0 | X | 0 | 0 | 0 | 0 | 0 | 0 |
| | 100 | 5 | 6 | 0 | 0 | 0 | 0 | 0 | 0 | 1 | 2 |
| 2-1 | 50 | 3 | 3 | 0 | 0 | 0 | 0 | X | X | 1 | 2 |
| | 100 | 5 | 5 | 0 | 0 | 0 | 0 | X | X | 4 | 7 |
| 2-26 | 50 | 3 | 9 | 0 | 0 | 0 | 0 | 6 | 4 | 1 | 4 |
| | 100 | 6 | 9 | 0 | 0 | 0 | 0 | 7 | 7 | 1 | 4 |
| 2-30 | 50 | 4 | 9 | 0 | 1 | 0 | 0 | 7 | 7 | 2 | 9 |
| | 100 | 6 | 9 | 0 | 1 | 0 | 0 | 7 | 7 | 2 | 9 |
| 2-59 | 50 | 6 | 8 | 0 | 0 | 0 | 0 | 2 | 5 | 1 | 6 |
| | 100 | 8 | 8 | 0 | 0 | 0 | 0 | 3 | 6 | 3 | 9 |
| 2-68 | 50 | 6 | 7 | 0 | 0 | 0 | 0 | 0 | 0 | 1 | 5 |
| | 100 | 8 | 9 | 0 | 0 | 0 | 0 | 0 | 0 | 3 | 9 |
| 2-69 | 50 | 7 | 8 | 0 | 1 | 0 | 0 | 0 | 0 | 1 | 5 |
| 2-78 | 50 | 6 | 6 | 0 | 0 | 0 | 0 | 0 | 0 | 2 | 6.5 |
| | 100 | 9 | 9 | 0 | 0 | 1 | 0 | 0 | 0 | 3 | 9 |
| 2-81 | 50 | 6 | 7 | 0 | 0 | 0 | 0 | 0 | 0 | 0 | 4 |
| | 100 | 8 | 8 | 0 | 0 | 1 | 0 | 0 | 0 | 1 | 6 |
| 2-84 | 50 | 5 | 3 | 0 | 0 | 0 | 0 | 0 | 0 | 0 | 6 |
| | 100 | 6 | 7 | 0 | X | 1 | 0 | 0 | 0 | 3 | 7 |
| 2-85 | 50 | 0 | 0 | 0 | 0 | 0 | 0 | 2 | 0 | 0 | 0 |
| | 100 | 1 | 0 | 0 | 0 | 0 | 0 | 3 | 0 | 2 | 0 |
| 2-97 | 50 | 7 | 9 | 0 | 0 | 0 | 0 | 0 | 0 | 1 | 7 |
| | 100 | 9 | 9 | 0 | X | 1 | 0 | 0 | 0 | 4 | 8 |
| 2-106 | 50 | 8 | 8 | 0 | X | 0 | 0 | 0 | 0 | 4 | 6.5 |
| | 100 | 9 | 9 | 0 | 1 | 0 | 0 | 0 | 0 | 5 | 8 |
| 2-108 | 50 | 0 | 0 | 0 | 0 | 0 | 0 | X | 0 | 0 | 1 |
| | 100 | 0 | 0 | 0 | 0 | 0 | 0 | X | 3 | 0 | 3 |
| 2-109 | 50 | 0 | 0 | 0 | 0 | 0 | 0 | X | 1 | 0 | 0 |
| | 100 | 0 | 0 | 0 | 0 | 1 | 0 | X | 0 | 0 | 1 |
| 2-110 | 50 | 0 | 0 | 0 | 0 | 0 | 0 | X | 0 | 0 | 0 |
| | 100 | 0 | 0 | 0 | 0 | 0 | 0 | X | 0 | 0 | 0 |
| 2-116 | 50 | 0 | 3 | 0 | 2 | 1 | 4 | X | X | 1 | 3 |
| | 100 | 0 | 2 | 0 | 0 | 1 | 3 | X | X | 1 | 2 |
| 2-117 | 50 | 0 | 2 | 0 | 0 | 1 | 3 | X | X | 0 | 9 |
| | 100 | 0 | 3 | 0 | 0 | 2 | 2 | X | X | 0 | 9 |
| 2-129 | 50 | 5 | 6 | 0 | 0 | 0 | 0 | 0 | 0 | 0 | 0 |
| | 100 | 5 | 7 | 0 | 0 | 0 | 0 | X | X | 1 | 5 |
| 2-134 | 50 | 1 | 1 | 0 | 0 | 0 | 0 | 0 | 0 | 0 | 1 |
| | 100 | 5 | 4 | 0 | 0 | 0 | 0 | 0 | 0 | 0 | 2 |
| 2-135 | 50 | 6 | 8 | 0 | 0 | 0 | 0 | 0 | 0 | 1 | 3 |
| | 100 | 7 | 8 | 0 | 0 | 0 | 0 | 2 | 3 | 1 | 4 |
| 2-136 | 50 | 3 | 4 | 0 | 0 | 0 | 0 | 0 | 0 | 0 | 0 |
| | 100 | 4 | 7 | 0 | 0 | 0 | 0 | X | X | 1 | 0 |
| 4-10 | 50 | 0 | 0 | 0 | 0 | 0 | 0 | X | 1 | 0 | 1 |
| | 100 | 0 | 0 | 0 | 0 | 0 | 0 | X | 3 | 0 | 2 |

(X: Not evaluated due to an experimental error)

The invention claimed is:

1. A nicotinamide compound of Chemical Formula 1 or an agrochemically acceptable salts thereof:

[Chemical Formula 1]

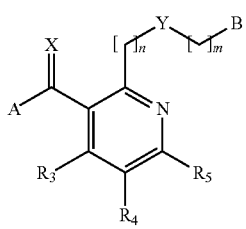

in the Chemical Formula 1,

A is

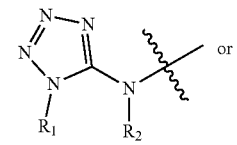

(A-1)

or

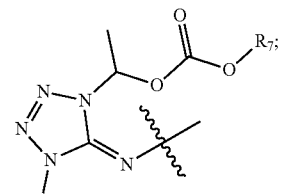

(A-2)

B is

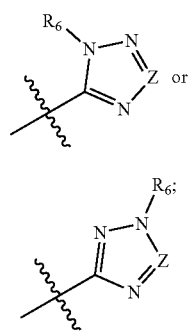

(B-1)

or (B-2)

X is O or S;
Y is O, S, SO, $SO_2$, NH, N—($C_1$-$C_6$)-alkyl, N—($C_2$-$C_6$)-alkenyl, N—($C_2$-$C_6$)-alkynyl, N—O—($C_1$-$C_6$)-alkyl, N—S—($C_1$-$C_6$)-alkyl, N—S(O)—($C_1$-$C_6$)-alkyl, N—$SO_2$—($C_1$-$C_6$)-alkyl, N—O—($C_1$-$C_3$)-alkyl-aryl or hydroxylamino;
Z is N or C—$R_8$;
$R_1$ is ($C_1$-$C_6$)-alkyl, ($C_1$-$C_6$)-haloalkyl, ($C_2$-$C_6$)-alkenyl, ($C_2$-$C_6$)-haloalkenyl, ($C_2$-$C_6$)-alkynyl, ($C_2$-$C_6$)-haloalkynyl, ($C_3$-$C_6$)-cycloalkyl or ($C_3$-$C_6$)-halocycloalkyl;
$R_2$ is hydrogen, ($C_1$-$C_6$)-alkyl, ($C_1$-$C_6$)-haloalkyl, ($C_2$-$C_6$)-alkenyl, ($C_2$-$C_6$)-haloalkenyl, ($C_2$-$C_6$)-alkynyl, ($C_2$-$C_6$)-haloalkynyl, C(O)—($C_1$-$C_6$)-alkyl, C(O) aryl, C(O) heteroaryl or $SO_2$—($C_1$-$C_6$)-alkyl;

$R_3$ or $R_4$ is each independently hydrogen, halogen, ($C_1$-$C_6$)-alkyl, ($C_2$-$C_6$)-alkenyl or ($C_3$-$C_6$)-cycloalkyl;

$R_5$ is halogen, ($C_1$-$C_3$)-alkyl or ($C_1$-$C_3$)-haloalkyl;

$R_6$ is ($C_1$-$C_6$)-alkyl, ($C_1$-$C_6$)-haloalkyl, ($C_2$-$C_6$)-alkenyl, ($C_2$-$C_6$)-haloalkenyl, ($C_2$-$C_6$)-alkynyl, ($C_2$-$C_6$)-haloalkynyl, ($C_3$-$C_6$)-cycloalkyl, ($C_3$-$C_6$)-halocycloalkyl, ($C_1$-$C_3$)-alkyl-O—($C_1$-$C_3$)-alkyl or ($C_1$-$C_3$)-alkyl-S—($C_1$-$C_3$)-alkyl;

$R_7$ is ($C_1$-$C_6$)-alkyl, ($C_1$-$C_6$)-haloalkyl, ($C_3$-$C_6$)-cycloalkyl or ($C_3$-$C_6$)-halocycloalkyl;

$R_8$ is hydrogen, ($C_1$-$C_6$)-alkyl, ($C_1$-$C_6$)-haloalkyl, ($C_2$-$C_6$)-alkenyl, ($C_2$-$C_6$)-haloalkenyl, ($C_2$-$C_6$)-alkynyl, ($C_2$-$C_6$)-haloalkynyl, ($C_3$-$C_6$)-cycloalkyl, ($C_3$-$C_6$)-halocycloalkyl, ($C_1$-$C_6$)-alkoxy, ($C_1$-$C_6$)-haloalkoxy, ($C_1$-$C_6$)-alkylthio, ($C_1$-$C_6$)-haloalkylthio, S(O)—($C_1$-$C_6$)-alkyl, S(O)—($C_1$-$C_6$)-haloalkyl, $SO_2$—($C_1$-$C_6$)-alkyl, $SO_2$—($C_1$-$C_6$)-haloalkyl, $NR_9R_{10}$, cyano or halogen;

$R_9$ or $R_{10}$ is each independently hydrogen, ($C_1$-$C_3$)-alkyl or ($C_1$-$C_3$)-haloalkyl; and n and m are each independently 0, 1 or 2.

2. The nicotinamide compound or agrochemically acceptable salts thereof of claim 1, wherein A is

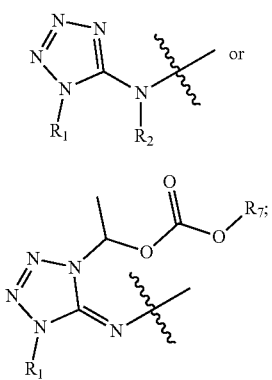

(A-1)

(A-2)

B is

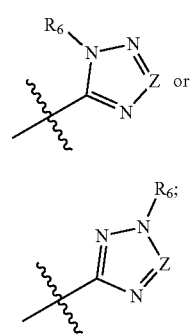

(B-1)

(B-2)

X is O or S;

Y is O, S, SO, $SO_2$, NH, N—($C_1$-$C_3$)-alkyl, N—($C_2$-$C_6$)-alkynyl, N—O—($C_1$-$C_3$)-alkyl, N—O—($C_1$-$C_3$)-alkyl-aryl or hydroxylamino;

Z is N or C—$R_8$;

$R_1$ is ($C_1$-$C_6$)-alkyl, ($C_1$-$C_6$)-haloalkyl, ($C_2$-$C_6$)-alkenyl or ($C_2$-$C_6$)-alkynyl;

$R_2$ is hydrogen, ($C_1$-$C_3$)-alkyl, ($C_1$-$C_3$)-haloalkyl, C(O)—($C_1$-$C_6$)-alkyl, C(O) aryl, or $SO_2$—($C_1$-$C_3$)-alkyl;

$R_3$ or $R_4$ is each independently hydrogen, halogen, ($C_1$-$C_6$)-alkyl or ($C_2$-$C_6$)-alkenyl;

$R_5$ is halogen or ($C_1$-$C_3$)-haloalkyl;

$R_6$ is ($C_1$-$C_6$)-alkyl, ($C_1$-$C_6$)-haloalkyl or ($C_1$-$C_3$)-alkyl-O—($C_1$-$C_3$)-alkyl;

$R_7$ is ($C_1$-$C_6$)-alkyl or ($C_3$-$C_6$)-cycloalkyl;

$R_8$ is hydrogen, ($C_1$-$C_3$)-alkyl, ($C_1$-$C_6$)-haloalkyl, ($C_2$-$C_6$)-alkenyl, ($C_1$-$C_3$)-alkoxy, ($C_1$-$C_3$)-haloalkoxy, ($C_1$-$C_3$)-alkylthio, $SO_2$—($C_1$-$C_3$)-alkyl, $NR_9R_{10}$, cyano or halogen;

$R_9$ or $R_{10}$ is each independently hydrogen or ($C_1$-$C_3$)-alkyl;

n is 0 or 1; and m is 0, 1 or 2.

3. The nicotinamide compound or agrochemically acceptable salts thereof of claim 1, wherein A is

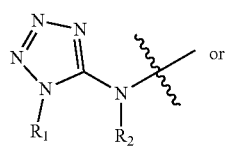

(A-1)

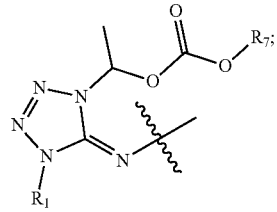

(A-2)

B is

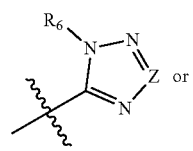

(B-1)

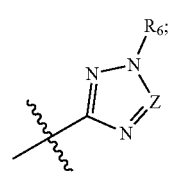

(B-2)

X is O or S;

Y is O, S, SO, $SO_2$, NH, methylamino, ethylamino, propargylamino, benzylhydroxyamino, methoxyamino, ethoxyamino or hydroxylamino;

Z is N or C—$R_8$;

$R_1$ is methyl, ethyl, propyl, difluoromethyl, allyl or propargyl;

$R_2$ is hydrogen, methyl, acetyl, benzoyl, or methanesulfonyl;

R₃ or R₄ is each independently hydrogen, chlorine, bromine, iodine, methyl, ethyl or vinyl;

R₅ is chlorine, difluoromethyl, trifluoromethyl, chlorodifluoromethyl or perfluoroethyl;

R₆ is methyl, ethyl, difluoromethyl or methoxymethyl;

R₇ is methyl, ethyl, isopropyl or cyclohexyl;

R₈ is hydrogen, methyl, fluoromethyl, difluoromethyl, trifluoromethyl, ethenyl, methylethenyl, methoxy, trifluoroethoxy, methylthio, methanesulfonyl, dimethylamino, cyano, chlorine, bromine or iodine;

n is 0 or 1; and m is 0, 1 or 2.

4. The nicotinamide compound or agrochemically acceptable salts thereof of claim 1, wherein the compound is selected from the group consisting of:

N-(1-methyl-1H-tetrazol-5-yl)-2-((1-methyl-1H-tetrazol-5-yl)methoxy)-6-(trifluoromethyl)nicotinamide (Compound No. 1-1);

N-(1-(difluoromethyl)-1H-tetrazol-5-yl)-2-((1-methyl-1H-tetrazol-5-yl)methoxy)-6-(trifluoromethyl)nicotinamide (Compound No. 1-4);

2-((1-(difluoromethyl)-1H-tetrazol-5-yl)methoxy)-N-methyl-N-(1-methyl-1H-tetrazol-5-yl)-6-(trifluoromethyl)nicotinamide (Compound No. 1-8);

4-chloro-N-(1-methyl-1H-tetrazol-5-yl)-2-((1-methyl-1H-tetrazol-5-yl)methoxy)-6-(trifluoromethyl)nicotinamide (Compound No. 1-13);

4-methyl-N-(1-methyl-1H-tetrazol-5-yl)-2-((1-methyl-1H-tetrazol-5-yl)methoxy)-6-(trifluoromethyl)nicotinamide (Compound No. 1-15);

5-methyl-N-(1-methyl-1H-tetrazol-5-yl)-2-((1-methyl-1H-tetrazol-5-yl)methoxy)-6-(trifluoromethyl)nicotinamide (Compound No. 1-17);

N-(1-methyl-1H-tetrazol-5-yl)-2-((1-methyl-1H-tetrazol-5-yl)methoxy)-6-(trifluoromethyl)-5-vinylnicotinamide (Compound No. 1-18);

5-ethyl-N-(1-methyl-1H-tetrazol-5-yl)-2-((1-methyl-1H-tetrazol-5-yl)methoxy)-6-(trifluoromethyl)nicotinamide (Compound No. 1-19);

6-chloro-N-(1-methyl-1H-tetrazol-5-yl)-2-((1-methyl-1H-tetrazol-5-yl)methoxy)nicotinamide (Compound No. 1-20);

2-((1-(difluoromethyl)-1H-tetrazol-5-yl)methoxy)-N-(1-methyl-1H-tetrazol-5-yl)-6-(trifluoromethyl)nicotinamide (Compound No. 1-26);

2-(methyl((1-methyl-1H-tetrazol-5-yl)methyl)amino)-N-(1-methyl-1H-tetrazol-5-yl)-6-(trifluoromethyl)nicotinamide (Compound No. 1-27);

N-(1-methyl-1H-tetrazol-5-yl)-2-((1-methyl-1H-tetrazol-5-yl)thio)-6-(trifluoromethyl)nicotinamide (Compound No. 1-40);

N-(1-methyl-1H-tetrazol-5-yl)-2-((1-methyl-1H-tetrazol-5-yl)methoxy)-6-(trifluoromethyl)pyridin-3-carbothioamide (Compound No. 1-43);

2-((1-methyl-1H-1,2,4-triazol-5-yl)methoxy)-N-(1-methyl-1H-tetrazol-5-yl)-6-(trifluoromethyl)nicotinamide (Compound No. 1-45);

N-(1-methyl-1H-tetrazol-5-yl)-2-(((1-methyl-1H-tetrazol-5-yl)methoxy)methyl)-6-(trifluoromethyl)nicotinamide (Compound No. 1-61);

2-(((1-(difluoromethyl)-1H-tetrazol-5-yl)methoxy)methyl)-N-(1-methyl-1H-tetrazol-5-yl)-6-(trifluoromethyl)nicotinamide (Compound No. 1-85);

2-((methyl((1-methyl-1H-tetrazol-5-yl)methyl)amino)-N-((1-methyl-1H-tetrazol-5-yl)-6-(trifluoromethyl)nicotinamide (Compound No. 1-86);

2-((methoxy((1-methyl-1H-1,2,4-triazol-5-yl)methyl)amino)methyl)-N-(1-methyl-1H-tetrazol-5-yl)-6-(trifluoromethyl)nicotinamide (Compound No. 1-91);

N-(1-methyl-1H-tetrazol-5-yl)-2-(((1-methyl-1H-tetrazol-5-yl)thio)methyl)-6-(trifluoromethyl)nicotinamide (Compound No. 1-97);

2-(((1-methyl-1H-1,2,4-triazol-5-yl)methoxy)methyl)-N-(1-methyl-1H-tetrazol-5-yl)-6-(trifluoromethyl)nicotinamide (Compound No. 1-102);

N-(1-methyl-1H-tetrazol-5-yl)-2-(((1-methyl-1H-tetrazol-5-yl)oxy)methyl)-6-(trifluoromethyl)nicotinamide (Compound No. 1-103);

N-(1-methyl-1H-tetrazol-5-yl)-2-((2-methyl-2H-tetrazol-5-yl)methoxy)-6-(trifluoromethyl)nicotinamide (Compound No. 2-1);

2-(methyl((2-methyl-2H-tetrazol-5-yl)methyl)amino)-N-(1-methyl-1H-tetrazol-5-yl)-6-(trifluoromethyl)nicotinamide (Compound No. 2-26);

2-(ethyl((2-methyl-2H-tetrazol-5-yl)methyl)amino)-N-(1-methyl-1H-tetrazol-5-yl)-6-(trifluoromethyl)nicotinamide (Compound No. 2-27);

N-(1-methyl-1H-tetrazol-5-yl)-2-(((2-methyl-2H-tetrazol-5-yl)methyl)(prop-2-yn-1-yl)amino)-6-(trifluoromethyl)nicotinamide (Compound No. 2-28);

2-((benzyloxy)((2-methyl-2H-tetrazol-5-yl)methyl)amino)-N-(1-methyl-1H-tetrazol-5-yl)-6-(trifluoromethyl)nicotinamide (Compound No. 2-29);

2-(methoxy((2-methyl-2H-tetrazol-5-yl)methyl)amino)-N-(1-methyl-1H-tetrazol-5-yl)-6-(trifluoromethyl)nicotinamide (Compound No. 2-30);

2-(ethoxy ((2-methyl-2H-tetrazol-5-yl)methyl)amino)-N-(1-methyl-1H-tetrazol-5-yl)-6-(trifluoromethyl)nicotinamide (Compound No. 2-31);

N-(1-methyl-1H-tetrazol-5-yl)-2-(((2-methyl-2H-tetrazol-5-yl)methyl)amino)-6-(trifluoromethyl)nicotinamide (Compound No. 2-32);

2-(hydroxy)((2-methyl-2H-tetrazol-5-yl)methyl)amino)-N-(1-methyl-1H-tetrazol-5-yl)-6-(trifluoromethyl)nicotinamide (Compound No. 2-33);

2-(methyl(2-((2-methyl-2H-tetrazol-5-yl)methoxy)ethyl)amino)-N-(1-methyl-1H-tetrazol-5-yl)-6-(trifluoromethyl)nicotinamide (Compound No. 2-34);

2-(methyl((1-methyl-1H-1,2,4-triazol-3-yl)methyl)amino)-N-(1-methyl-1H-tetrazol-5-yl)-6-(trifluoromethyl)nicotinamide (Compound No. 2-35);

2-(methyl(2-(2-methyl-2H-tetrazol-5-yl)ethyl)amino)-N-(1-methyl-1H-tetrazol-5-yl)-6-(trifluoromethyl)nicotinamide (Compound No. 2-36);

2-((1-methyl-1H-1,2,4-triazol-3-yl)methoxy)-N-(1-methyl-1H-tetrazol-5-yl)-6-(trifluoromethyl)nicotinamide (Compound No. 2-43);

N-(1-methyl-1H-tetrazol-5-yl)-2-(((2-methyl-2H-tetrazol-5-yl)methoxy)methyl)-6-(trifluoromethyl)nicotinamide (Compound No. 2-59);

N-acetyl-N-(1-methyl-1H-tetrazol-5-yl)-2-(((2-methyl-2H-tetrazol-5-yl)methoxy)methyl)-6-(trifluoromethyl)nicotinamide (Compound No. 2-67);

N-benzoyl-N-(1-methyl-1H-tetrazol-5-yl)-2-(((2-methyl-2H-tetrazol-5-yl)methoxy)methyl)-6-(trifluoromethyl)nicotinamide (Compound No. 2-68);

N-(1-methyl-1H-tetrazol-5-yl)-2-(((2-methyl-2H-tetrazol-5-yl)methoxy)methyl)-N-(methylsulfonyl)-6-(trifluoromethyl)nicotinamide (Compound No. 2-69);

6-(chlorodifluoromethyl)-N-(1-methyl-1H-tetrazol-5-yl)-2-(((2-methyl-2H-tetrazol-5-yl)methoxy)methyl)nicotinamide (Compound No. 2-78);

6-(chlorodifluoromethyl)-2-((methoxy((2-methyl-2H-tetrazol-5-yl)methyl)amino)methyl)-N-(1-methyl-1H-tetrazol-5-yl)nicotinamide (Compound No. 2-79);

6-(chlorodifluoromethyl)-2-(((1-methyl-1H-1,2,4-triazol-3-yl)methoxy)methyl)-N-(1-methyl-1H-tetrazol-5-yl) nicotinamide (Compound No. 2-80);

N-(1-methyl-1H-tetrazol-5-yl)-2-(((2-methyl-2H-tetrazol-5-yl)methoxy)methyl)-6-(perfluoroethyl)nicotinamide (Compound No. 2-81);

2-(((1-methyl-1H-1,2,4-triazol-3-yl)methoxy)methyl)-N-(1-methyl-1H-tetrazol-5-yl)-6-(perfluoroethyl)nicotinamide (Compound No. 2-83);

6-(difluoromethyl)-N-(1-methyl-1H-tetrazol-5-yl)-2-(((2-methyl-2H-tetrazol-5-yl)methoxy)methyl)nicotinamide (Compound No. 2-84);

6-(difluoromethyl)-2-(((1-methyl-1H-1,2,4-triazol-3-yl)methoxy)methyl)-N-((1-methyl-1H-tetrazol-5-yl)nicotinamide (Compound No. 2-85);

6-(difluoromethyl)-2-((methoxy((2-methyl-2H-tetrazol-5-yl)methyl)amino)methyl)-N-(1-methyl-1H-tetrazol-5-yl)nicotinamide (Compound No. 2-86);

2-(((2-ethyl-2H-tetrazol-5-yl)methoxy)methyl)-N-(1-methyl-1H-tetrazol-5-yl)-6-(trifluoromethyl)nicotinamide (Compound No. 2-87);

N-(1-ethyl-1H-tetrazol-5-yl)-2-(((2-ethyl-2H-tetrazol-5-yl)methoxy)methyl)-6-(trifluoromethyl)nicotinamide (Compound No. 2-88);

2-(((2-ethyl-2H-tetrazol-5-yl)methoxy)methyl)-N-(1-propyl-1H-tetrazol-5-yl)-6-(trifluoromethyl)nicotinamide (Compound No. 2-89);

N-(1-allyl-1H-tetrazol-5-yl)-2-(((2-ethyl-2H-tetrazol-5-yl)methoxy)methyl)-6-(trifluoromethyl)nicotinamide (Compound No. 2-90);

2-(((2-(methoxymethyl)-2H-tetrazol-5-yl)methoxy)methyl)-N-(1-methyl-1H-tetrazol-5-yl)-6-(trifluoromethyl)nicotinamide (Compound No. 2-91);

2-(((2-(difluoromethyl)-2H-tetrazol-5-yl)methoxy)methyl)-N-(1-methyl-1H-tetrazol-5-yl)-6-(trifluoromethyl)nicotinamide (Compound No. 2-92);

2-((methyl((2-methyl-2H-tetrazol-5-yl)methyl)amino)methyl)-N-(1-methyl-1H-tetrazol-5-yl)-6-(trifluoromethyl)nicotinamide (Compound No. 2-93);

2-((ethyl((2-methyl-2H-tetrazol-5-yl)methyl)amino)methyl)-N-(1-methyl-1H-tetrazol-5-yl)-6-(trifluoromethyl)nicotinamide (Compound No. 2-94);

2-((methoxy((2-methyl-2H-tetrazol-5-yl)methyl)amino)methyl)-N-(1-methyl-1H-tetrazol-5-yl)-6-(trifluoromethyl)nicotinamide (Compound No. 2-97);

N-(1-methyl-1H-tetrazol-5-yl)-2-((((2-methyl-2H-tetrazol-5-yl)methyl)thio)methyl)-6-(trifluoromethyl)nicotinamide (Compound No. 2-102);

N-(1-methyl-1H-tetrazol-5-yl)-2-((((2-methyl-2H-tetrazol-5-yl)methyl)sulfinyl)methyl)-6-(trifluoromethyl)nicotinamide (Compound No. 2-104);

N-(1-methyl-1H-tetrazol-5-yl)-2-((((2-methyl-2H-tetrazol-5-yl)methyl) sulfonyl)methyl)-6-(trifluoromethyl)nicotinamide (Compound No. 2-105);

N-(1-methyl-1H-tetrazol-5-yl)-2-(((2-methyl-2H-tetrazol-5-yl)methoxy)methyl)-6-(trifluoromethyl)pyridin-3-carbothioamide (Compound No. 2-106);

N-(1-methyl-1H-tetrazol-5-yl)-2-((((2-methyl-2H-tetrazol-5-yl)methyl)thio)methyl)-6-(trifluoromethyl)pyridin-3-carbothioamide (Compound No. 2-107);

6-(difluoromethyl)-N-(1-methyl-1H-tetrazol-5-yl)-2-((((2-methyl-2H-tetrazol-5-yl)methyl)thio)methyl) nicotinamide (Compound No. 2-108);

N-benzoyl-N-(1-methyl-1H-tetrazol-5-yl)-2-((((2-methyl-2H-tetrazol-5-yl)methyl)thio)methyl)-6-(trifluoromethyl)nicotinamide (Compound No. 2-109);

N-(1-methyl-1H-tetrazol-5-yl)-2-((((2-methyl-2H-tetrazol-5-yl)methyl)thio)methyl)-N-(methylsulfonyl)-6-(trifluoromethyl)nicotinamide (Compound No. 2-110);

6-(difluoromethyl)-N-(1-methyl-1H-tetrazol-1-yl)-2-((((2-methyl-2H-tetrazol-5-yl)methyl)sulfinyl)methyl) nicotinamide (Compound No. 2-111);

N-benzoyl-6-(difluoromethyl)-N-(1-methyl-1H-tetrazol-5-yl)-2-((((2-methyl-2H-tetrazol-5-yl)methyl)thio) methyl)nicotinamide (Compound No. 2-112);

2-(((1-methyl-1H-1,2,4-triazol-3-yl)methoxy)methyl)-N-(1-methyl-1H-tetrazol-5-yl)-6-(trifluoromethyl)nicotinamide (Compound No. 2-113);

2-(((1-methyl-1H-1,2,4-triazol-3-yl)methoxy)methyl)-N-(1-propyl-1H-tetrazol-5-yl)-6-(trifluoromethyl)nicotinamide (Compound No. 2-114);

N-(1-allyl-1H-tetrazol-5-yl)-2-(((1-methyl-1H-1,2,4-triazol-3-yl)methoxy)methyl)-6-(trifluoromethyl)nicotinamide (Compound No. 2-115);

2-(((1,5-dimethyl-1H-1,2,4-triazol-3-yl)methoxy)methyl)-N-(1-methyl-1H-tetrazol-5-yl)-6-(trifluoromethyl)nicotinamide (Compound No. 2-116);

2-(((1,5-dimethyl-1H-1,2,4-triazol-3-yl)methoxy)methyl)-N-(1-methyl-1H-tetrazol-5-yl)-6-(trifluoromethyl)pyridin-3-carbothioamide (Compound No. 2-117);

N-(1-methyl-1H-tetrazol-5-yl)-2-(((1-methyl-5-(trifluoromethyl)-1H-1,2,4-triazol-3-yl)methoxy)methyl)-6-(trifluoromethyl)nicotinamide (Compound No. 2-118);

N-(1-ethyl-1H-tetrazol-5-yl)-2-(((1-methyl-5-(trifluoromethyl)-1H-1,2,4-triazol-3-yl)methoxy)methyl)-6-(trifluoromethyl)nicotinamide (Compound No. 2-119);

2-(((1-methyl-5-(trifluoromethyl)-1H-1,2,4-triazol-3-yl)methoxy)methyl)-N-(1-propyl-1H-tetrazol-5-yl)-6-(trifluoromethyl)nicotinamide (Compound No. 2-120);

N-(1-allyl-1H-tetrazol-5-yl)-2-(((1-methyl-5-(trifluoromethyl)-1H-1,2,4-triazol-3-yl)methoxy)methyl)-6-(trifluoromethyl)nicotinamide (Compound No. 2-121);

2-(((1-methyl-5-(trifluoromethyl)-1H-1,2,4-triazol-3-yl)methoxy)methyl)-N-(1-prop-2-yn-1-yl)-1H-tetrazol-5-yl)-6-(trifluoromethyl)nicotinamide (Compound No. 2-122);

2-(((5-(difluoromethyl)-1-methyl-1H-1,2,4-triazol-3-yl)methoxy)methyl)-N-(1-methyl-1H-tetrazol-5-yl)-6-trifluoromethyl)nicotinamide (Compound No. 2-123);

2-(((5-(difluoromethyl)-1-methyl-1H-1,2,4-triazol-3-yl)-methoxy)-N-(1-propyl-1H-tetrazol-5-yl)-6-(trifluoromethyl)nicotinamide (Compound No. 2-124);

N-(1-allyl-1H-tetrazol-5-yl)-2-(((5-(difluoromethyl)-1-methyl-1H-1,2,4-triazol-3-yl)methoxy)methyl)-6-(trifluoromethyl)nicotinamide (Compound No. 2-125);

2-(((5-(fluoromethyl)-1-methyl-1H-1,2,4-triazol-3-yl)methoxy)methyl)-N-(1-methyl-1H-tetrazol-5-yl)-6-(trifluoromethyl)nicotinamide (Compound No. 2-126);

N-(1-methyl-1H-tetrazol-5-yl)-2-(((1-methyl-5-vinyl-1H-1,2,4-triazol-3-yl)methoxy)methyl)-6-(trifluoromethyl)nicotinamide (Compound No. 2-127);

N-(1-methyl-1H-tetrazol-5-yl)-2-(((1-methyl-5-(prop-1-en-2-yl)-1H-1,2,4-triazol-3-yl)methoxy)methyl)-6-(trifluoromethyl)nicotinamide (Compound No. 2-128);

2-(((5-methoxy-1-methyl-1H-1,2,4-triazol-3-yl)methoxy)methyl)-N-(1-methyl-1H-tetrazol-5-yl)-6-(trifluoromethyl)nicotinamide (Compound No. 2-129);

N-(1-methyl-1H-tetrazol-5-yl)-2-(((1-methyl-5-(2,2,2-tri-fluoroethoxy)-1H-1,2,4-triazol-3-yl)methoxy)methyl)-6-(trifluoromethyl)nicotinamide (Compound No. 2-130);

N-(1-methyl-1H-tetrazol-5-yl)-2-(((1-methyl-5-(methyl-thio)-1H-1,2,4-triazol-3-yl)methoxy)methyl)-6-(trif-luoromethyl)nicotinamide (Compound No. 2-131);

N-(1-methyl-1H-tetrazol-5-yl)-2-(((1-methyl-5-(methyl-sulfonyl)-1H-1,2,4-triazol-3-yl)methoxy)methyl)-6-(trifluoromethyl)nicotinamide (Compound No. 2-132);

2-(((5-(dimethylamino)-1-methyl-1H-1,2,4-triazol-3-yl)methoxy)methyl)-N-(1-methyl-1H-tetrazol-5-yl)-6-(trifluoromethyl)nicotinamide (Compound No. 2-133);

2-(((5-cyano-1-methyl-1H-1,2,4-triazol-3-yl)methoxy)methyl)-N-(1-methyl-1H-tetrazol-5-yl)-6-(trifluorom-ethyl)nicotinamide (Compound No. 2-134);

2-(((5-chloro-1-methyl-1H-1,2,4-triazol-3-yl)methoxy)methyl)-N-(1-methyl-1H-tetrazol-5-yl)-6-(trifluorom-ethyl)nicotinamide (Compound No. 2-135);

2-(((5-bromo-1-methyl-1H-1,2,4-triazol-3-yl)methoxy)methyl)-N-(1-methyl-1H-tetrazol-5-yl)-6-(trifluorom-ethyl)nicotinamide (Compound No. 2-136);

2-(((5-iodo-1-methyl-1H-1,2,4-triazol-3-yl)methoxy)methyl)-N-(1-methyl-1H-tetrazol-5-yl)-6-(trifluorom-ethyl)nicotinamide (Compound No. 2-137);

methyl (1-(2-(((1-methyl-1H-1,2,4-triazol-3-yl)methoxy)methyl)-N-(1-methyl-1H-tetrazol-5-yl)-6-(trifluorom-ethyl)nicotinamido)ethyl)carbonate (Compound No. 4-1);

methyl (1-(N-(1-methyl-1H-tetrazol-5-yl)-2-(((2-methyl-2H-tetrazol-5-yl)methoxy)methyl)-6-(trifluoromethyl)pyridin-3-carbothioamido)ethyl)carbonate (Compound No. 4-2);

methyl (1-(N-(1-methyl-1H-tetrazol-5-yl)-2-((((2-methyl-2H-tetrazol-5-yl)methyl)thio)methyl)-6-(trif-luoromethyl)nicotinamido)ethyl)carbonate (Compound No. 4-3);

methyl (1-(N-(1-methyl-1H-tetrazol-5-yl)-2-(((2-methyl-2H-tetrazol-5-yl)methoxy)methyl)-6-(trifluoromethyl)nicotinamido)ethyl)carbonate (Compound No. 4-4);

ethyl (1-(N-(1-methyl-1H-tetrazol-5-yl)-2-(((2-methyl-2H-tetrazol-5-yl)methoxy)methyl)-6-(trifluoromethyl)nicotinamido)ethyl)carbonate (Compound No. 4-8);

ethyl (1-(N-(1-methyl-1H-tetrazol-5-yl)-2-((((2-methyl-2H-tetrazol-5-yl)methyl)thio)methyl)-6-(trifluorom-ethyl)pyridin-3-carbothioamido)ethyl)carbonate (Compound No. 4-9);

ethyl (1-(4-methyl-5-((2-(((((2-methyl-2H-tetrazol-5-yl)methyl)thio)methyl)-6-(trifluoromethyl) nicotinoyl)imino)-4,5-dihydro-1H-tetrazol-1-yl)ethyl)carbonate (Compound No. 4-10);

cyclohexyl (1-(N-(1-methyl-1H-tetrazol-5-yl)-2-(((2-methyl-2H-tetrazol-5-yl)methoxy)methyl)-6-(trifluo-romethyl)nicotinamido)ethyl)carbonate (Compound No. 4-11); and isopropyl (1-(N-(1-methyl-1H-tetrazol-5-yl)-2-(((2-methyl-2H-tetrazol-5-yl)methoxy)methyl)-6-(trifluo-romethyl)nicotinamido)ethyl)carbonate (Compound No. 4-12).

5. A herbicide composition comprising
at least one active ingredient selected from the group consisting of the nicotinamide compound of claim 1 and agrochemically acceptable salts thereof, and
an agrochemically acceptable additive.

6. The herbicide composition of claim 5, wherein the composition comprises 0.1% to 99.9% by weight of the at least one active ingredient; and 0.1% to 99.9% by weight of the additive, and the additive is at least one selected from the group consisting of surfactants, solid diluents and liquid diluents.

7. The herbicide composition of claim 5, wherein the composition is formulated as a wettable powder, a suspension, an emulsifiable concentrate, an emulsion, a microemulsion, a soluble concentrate, a dispersible concentrate, a granule, a powder, a suspension concentrate, a water-dispersible granule, a water-floating granule, or a tablet.

8. The herbicide composition of claim 5, wherein the composition further comprises as additional active agent at least one selected from the group consisting of acetylCoA carboxylase inhibitors, acetolactate synthase inhibitors, microtubule assembly inhibitors, auxin-mimic herbicides, photosynthetic photosystem II inhibitors, EPSP synthase inhibitors, glutamine synthetase inhibitors, PDS inhibitors, DOXP synthase inhibitors, PPO inhibitors, VLCFAs inhibitors, DHP inhibitors, auxin transport inhibitors, photosystem I electron conversion herbicides, microtubule tissue inhibitors, uncoupler herbicides, HPPD inhibitors, cellulose synthesis inhibitors, fatty acid thioesterase inhibitors, serine threonine protein kinase inhibitors, solanesyl diphosphate synthase inhibitors, homogentisate solanesyl transferase inhibitors, lycopene cyclase inhibitors, and other herbicides.

9. A method for controlling weeds, comprising applying the herbicide composition according to claim 5 to soil or foliage.

10. A method for controlling weeds, comprising applying to soil or foliage a composition comprising at least one active ingredient selected from the group consisting of the nicotinamide compound according to claim 1 and an agrochemically acceptable salt thereof; and an agrochemically acceptable additive.

11. A method of manufacturing herbicides, comprising combining at least one active ingredient selected from the group consisting of the nicotinamide compound according to claim 1 and an agrochemically acceptable salt thereof with an agrochemically acceptable additive to obtain a herbicidal composition.

12. A method for preparing a nicotinamide compound represented by Chemical Formula 1-a below, comprising reacting nicotinic acid represented by Chemical Formula 2 below with 5-amino-1H-tetrazole represented by Chemical Formula 3 below,

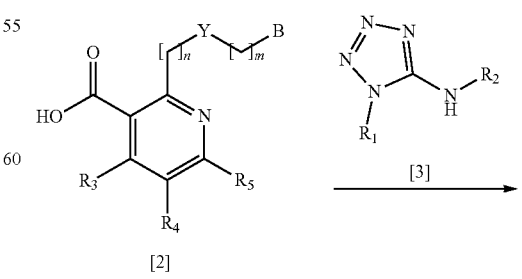

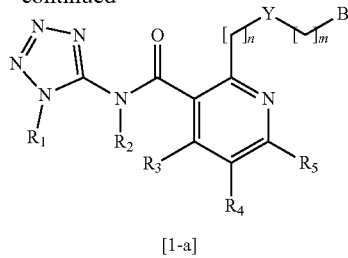

[1-a]

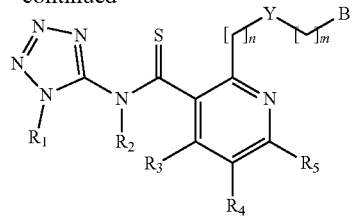

[1-c]

wherein B, Y, $R_1$, $R_2$, $R_3$, $R_4$, $R_5$, n and m are as defined in claim 1, respectively.

13. A method for preparing a nicotinamide compound represented by Chemical Formula 1-a below, comprising reacting a nicotinamide represented by Chemical Formula 1-b below with a compound represented by Chemical Formula 4 below, wherein B, Y, $R_1$, $R_2$, $R_3$, $R_4$, $R_5$, n and m are as defined in claim 1, respectively.

15. A method for preparing a nicotinamide compound represented by Chemical Formula 1-e below, comprising reacting a nicotinamide represented by Chemical Formula 1-d below with a compound represented by Chemical Formula 5 below,

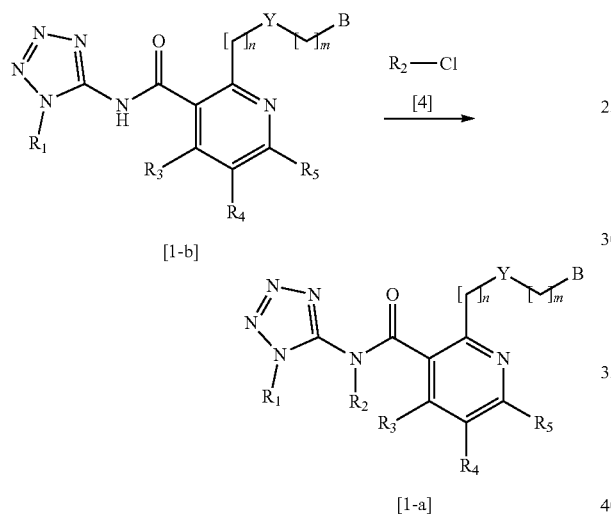

[1-b]

[1-a]

wherein B, Y, $R_1$, $R_2$, $R_3$, $R_4$, $R_5$, n and m are as defined in claim 1, respectively.

14. A method for preparing a nicotinthioamide compound represented by Chemical Formula 1-c below, comprising thionating a nicotinamide represented by Chemical Formula 1-a below,

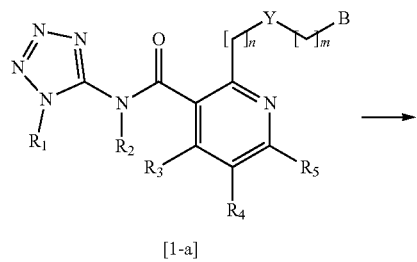

[1-a]

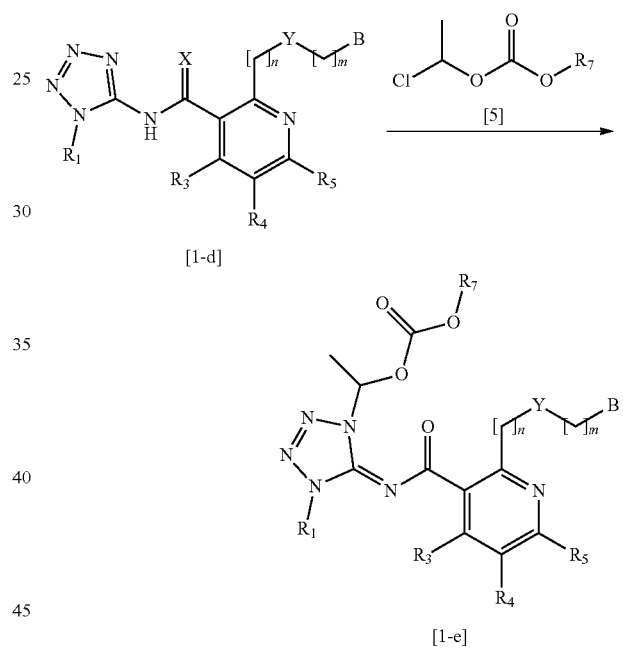

[1-d]

[1-e]

wherein B, X, Y, $R_1$, $R_3$, $R_4$, $R_5$, $R_7$, n and m are as defined in claim 1, respectively.

16. A method for controlling weeds, comprising applying the herbicide composition according to claim 6 to soil or foliage.

17. A method for controlling weeds, comprising applying the herbicide composition according to claim 7 to soil or foliage.

18. A method for controlling weeds, comprising the herbicide composition according to claim 8 to soil or foliage.

* * * * *